(12) United States Patent
Christopher et al.

(10) Patent No.: US 6,964,288 B2
(45) Date of Patent: Nov. 15, 2005

(54) APPARATUS AND METHOD FOR AUTOMATED PREPARATION OF AN OPTICAL FIBER

(75) Inventors: Anthony J. Christopher, Andover, MA (US); Arthur W. Johnson, III, Stoughton, MA (US); Dale A. Herman, Harvard, MA (US); Andre Sharon, Newton Centre, MA (US)

(73) Assignee: *k*SARIA Corporation, Wilmington, MA (US)

( * ) Notice: Subject to any disclaimer, the term of this patent is extended or adjusted under 35 U.S.C. 154(b) by 320 days.

(21) Appl. No.: 09/900,532

(22) Filed: Jul. 6, 2001

(65) Prior Publication Data

US 2003/0007774 A1 Jan. 9, 2003

(51) Int. Cl.[7] .......................... C03B 37/07; C03B 37/16
(52) U.S. Cl. .................. 156/367; 156/368; 65/485; 65/503; 65/539; 29/747; 29/862
(58) Field of Search ............... 414/793.5, 796.3; 198/346.1; 156/247, 249, 367, 368; 65/503, 539, 485; 29/862, 747; 64/485

(56) References Cited

U.S. PATENT DOCUMENTS

| | | |
|---|---|---|
| 3,204,334 A | 9/1965 | Long et al. |
| 3,283,398 A | 11/1966 | Andren |
| 3,456,324 A | 7/1969 | Hahn et al. |
| 3,686,752 A | 8/1972 | Hammond |
| 3,703,954 A | 11/1972 | Gudmestad |
| 3,768,143 A | 10/1973 | Holmes, Jr. |
| 3,875,662 A | 4/1975 | Folk |
| 3,909,900 A | 10/1975 | Gudmestad |
| 3,973,600 A | 8/1976 | Choromokos |
| 4,175,316 A | 11/1979 | Gudmestad |
| 4,214,848 A * | 7/1980 | Verwey et al. ........... 414/793.5 |
| 4,336,047 A | 6/1982 | Pavlopoulos et al. |
| 4,440,053 A | 4/1984 | Suzuki et al. |
| 4,671,629 A | 6/1987 | Doyle |
| 4,763,272 A | 8/1988 | McLandrich |
| 4,916,811 A | 4/1990 | Uehara et al. |
| 5,208,977 A | 5/1993 | Ricard |
| 5,386,490 A | 1/1995 | Pan et al. |
| 5,607,282 A * | 3/1997 | Brannen et al. ......... 414/796.3 |
| 5,770,001 A | 6/1998 | Nagayama et al. |
| 5,926,594 A | 7/1999 | Song et al. |
| 5,970,749 A | 10/1999 | Bloom |
| 6,003,341 A | 12/1999 | Bloom |
| 6,122,936 A | 9/2000 | Csipkes et al. |
| 6,237,370 B1 | 5/2001 | Bloom |

FOREIGN PATENT DOCUMENTS

WO    WO 9711917    4/1997

* cited by examiner

*Primary Examiner*—Chris Fiorilla
*Assistant Examiner*—George Koch
(74) *Attorney, Agent, or Firm*—Wolf, Greenfield & Sacks, PC

(57) ABSTRACT

An automated fiber preparation system and method for automatically fabricating an optical fiber. One or more fabrication processes associated with fiber preparation may be performed on an optical fiber without requiring active user input. The fiber preparation system may be configured to automatically carry out each of the process steps for fabricating an optical fiber pigtail. The fiber preparation system may include a fiber preparation module that is configured to automatically prepare one or both ends of an optical fiber in anticipation of one or more subsequent manufacturing processes involving the fiber.

55 Claims, 69 Drawing Sheets

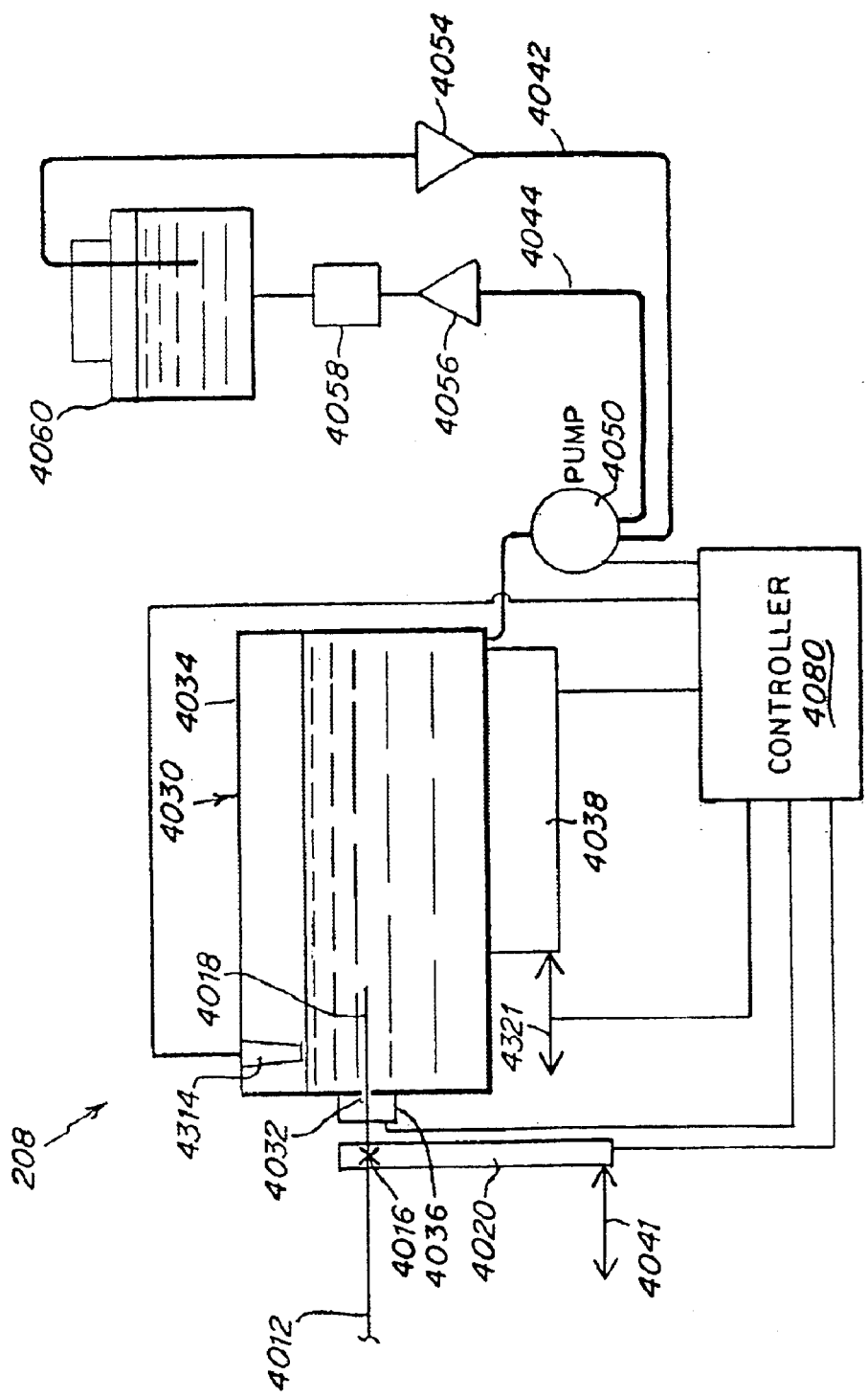

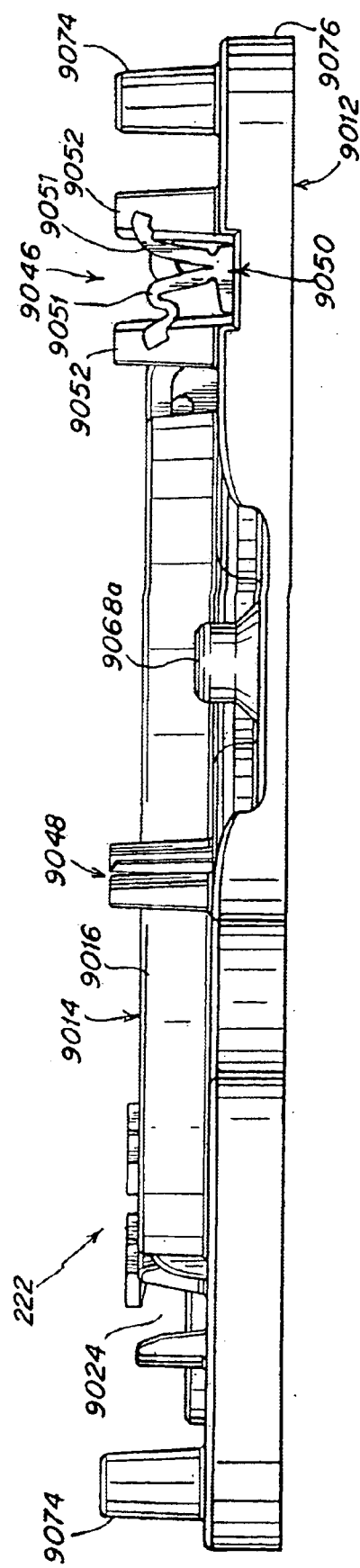
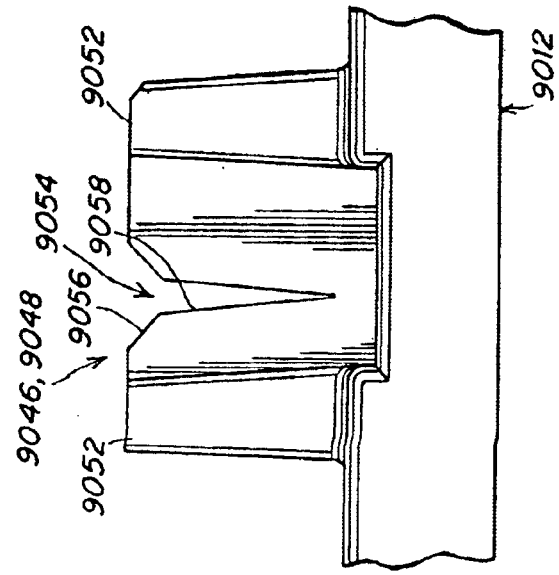
Fig. 88
Fig. 89

(1)

APPARATUS AND METHOD FOR AUTOMATED PREPARATION OF AN OPTICAL FIBER

FIELD OF THE INVENTION

The present invention relates to optical fibers, and more particularly, to an apparatus and a method for automating the preparation of optical fibers.

DESCRIPTION OF RELATED ART

Optical devices are becoming increasingly popular, particularly for use in networking applications. In an optical network or other circuit, optical devices are interconnected via optical fiber, which serves as the transmission medium for transmitting information between the devices. Similarly, an optical device is often made up of multiple optical components that are interconnected, internally within the device, via optical fibers.

The conventional techniques for interconnecting multiple optical components within a device is through the use of a pigtail. A pigtail is essentially a length of optical fiber that includes a connector, referred to as a ferrule, attached to one or both ends of the fiber. The ferrule provides structural support to the optical fiber making it easier to handle and to connect directly with optical components or other optical fibers. A pigtail is typically pre-assembled and provided ready to be connected to an optical component. An optical device may utilize one or more pigtails to optically interconnect any number of optical components.

Conventionally, a pigtail is formed by first cutting a desired length of optical fiber from a spool, and winding the fiber into a more compact configuration to facilitate its handling. The coiled fiber may be subject to various manufacturing steps, such as stripping the protective coating off at least one end of the fiber, cleaning the end of the fiber, cleaving the end of the fiber to obtain a high quality optical surface, and attaching a ferrule to the end of the fiber. During the fabrication process, the fiber is conventionally handled manually with one of more of the processes typically being performed by hand using manual or, in some instances, semi-automated tools.

It is an object of the invention to provide an apparatus and method for automated fiber preparation of an optical fiber.

SUMMARY OF THE INVENTION

In one illustrative embodiment, an automated fiber preparation apparatus is provided for an optical fiber. The apparatus comprises a transporter having an upstream end and a downstream end, the transporter being constructed and arranged to automatically index a tray, which is configured to hold the optical fiber, to a plurality of process stations in a direction from the upstream end toward the downstream end in response to a control signal. The apparatus also comprises a strip tool positioned at one of the plurality of process stations between the upstream end and the downstream end of the transporter, the strip tool being constructed and arranged to automatically strip coating from an end portion of the optical fiber in response to a control signal. The apparatus further comprises a cleave tool positioned at one of the plurality of process stations between the upstream end and the downstream end of the transporter, the cleave tool being constructed and arranged to automatically cleave the end portion of the optical fiber in response to a control signal.

In another illustrative embodiment, an automated fiber preparation apparatus is provided for an optical fiber. The apparatus comprises a tray including a fiber receptacle disposed between opposing ends thereof, the fiber receptacle being constructed and arranged to contain the optical fiber therein with opposing end portions of the optical fiber extending toward the opposing ends of the tray. The apparatus also comprises a transporter having an upstream end and a downstream end, the transporter being constructed and arranged to automatically index the tray in a direction from the upstream end toward the downstream end in response to a control signal. The apparatus further comprises a fiber preparation module including at least one pair of automated fiber preparation tools positioned on opposite sides of the transporter between the upstream end and the downstream end thereof, the at least one pair of fiber preparation tools being constructed and arranged to automatically process the opposing end portions of the optical fiber in response to a control signal.

In a further illustrative embodiment, an automated fiber preparation apparatus is provided for an optical fiber. The apparatus comprises a transporter having an upstream end and a downstream end, the transporter being constructed and arranged to automatically index a tray, which is configured to hold the optical fiber, in a direction from the upstream end toward the downstream end in response to a control signal. The apparatus also comprises a fiber preparation module including at least one automated fiber preparation tool positioned between the upstream end and the downstream end thereof, the at one fiber preparation tool being constructed and arranged to automatically process an end portion of the optical fiber in response to a control signal. The apparatus further comprises a load module and an unload module. The load module is positioned at the upstream end of the transporter, and is constructed and arranged to hold a stack of trays and to automatically load the tray from the stack of trays onto the transporter in response to a control signal. The unload module is positioned at the downstream end of the transporter, and is constructed and arranged to hold a stack of trays and to automatically unload the tray from the transporter into the stack of trays in response to a control signal.

In still another illustrative embodiment, a method is provided of automatically preparing a length of optical fiber. The method comprises steps of: (a) providing the length of optical fiber; (b) automatically stripping an end portion of the optical fiber; (c) automatically cleaving the end portion of the optical fiber; and (d) automatically transporting the optical fiber from the strip tool to the cleave tool.

In still a further illustrative embodiment, a method is provided of automatically preparing a length of optical fiber. The method comprises steps of: (a) providing the optical fiber on a tray; (b) automatically transporting the tray from an upstream end toward a downstream end of a transporter; (c) automatically processing an end portion of the optical fiber in the tray between the upstream end and the downstream end of the transporter; and (d) automatically unloading the tray with the optical fiber contained thereon from the downstream end of the transporter.

In yet another illustrative embodiment, a method is provided of automatically preparing a length of optical fiber. The method comprises steps of: (a) providing the optical fiber on a tray, which has an outer perimeter, with at least one end portion of the optical fiber extending outwardly beyond the outer perimeter of the tray in a first orientation; (b) automatically transporting the tray from an upstream end toward a downstream end of an automated transporter; (c)

automatically processing the end portion of the optical fiber in the tray between the upstream end and the downstream end of the transporter; and (d) automatically placing the end portion of the optical fiber within the tray in a second orientation that is different from the first orientation so that the end portion is contained within the outer perimeter of the tray, subsequent to step (c).

In yet a further illustrative embodiment, a method is provided of automatically preparing a length of optical fiber. The method comprises steps of: (a) providing the optical fiber on a tray with opposing end portions of the optical fiber extending from opposite ends of the tray; (b) automatically transporting the tray from an upstream end toward a downstream end of an automated transporter; and (c) automatically processing the end portions of the optical fiber simultaneously in the tray between the upstream end and the downstream end of the transporter.

BRIEF DESCRIPTION OF THE DRAWINGS

FIG. 35 illustrates a schematic diagram of one illustrative embodiment the cleaning device;

FIG. 88 is a side elevation view of the tray of FIG. 83 illustrating one embodiment of a fiber retainer;

FIG. 89 is a schematic view of another illustrative embodiment of a fiber retainer.

DETAILED DESCRIPTION

The present invention is directed to an apparatus and a method for automated fiber preparation of an optical fiber. It should be appreciated that automated fiber preparation may be done in any of numerous ways, and that the present invention is not limited to the particular apparatus and techniques described below.

Figure 1:
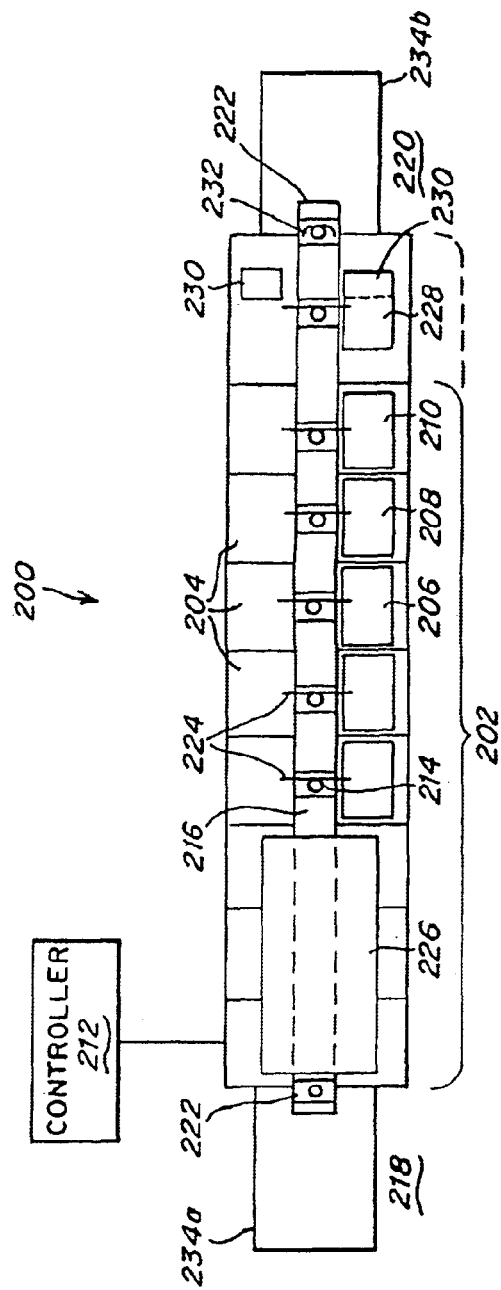
FIG. 1 is a schematic diagram of an automated fiber preparation apparatus according to one illustrative embodiment of the present invention.

FIG. 1 is a schematic representation of one illustrative embodiment of the present invention for an automated fiber preparation system and method for automatically fabricating an optical fiber, such as a pigtail. In this regard, one or more fabrication processes associated with fiber preparation, such as pigtail fabrication, may be performed on an optical fiber without requiring active user input. In one illustrative embodiment, the fiber preparation system is particularly configured to automatically carry out each of the process steps for fabricating an optical fiber pigtail. It is to be appreciated, however, that the automated system of the present invention is not limited to pigtail fabrication, and other suitable applications are contemplated for one or more aspects of the system.

The fiber preparation system 200 includes a fiber preparation module 202 (also referred to as the fiber-prep module) that is configured to automatically prepare one or both ends of an optical fiber in anticipation of one or more subsequent manufacturing processes involving the fiber. The fiber-prep 202 module may include one or more process stations that are configured to carry out any desired fabrication process on the fiber. As illustrated, the fiber-prep module 202 includes a plurality of process stations 204 that may be configured to accept one or more of various automated process tools so that the system may be arranged to carry out any one or various combinations of desired fiber preparation processes on a fiber end.

The fiber prep module 202 may be constructed with a modular configuration that allows any of the process stations 204 to accept various process tools. In any particular module configuration, one or more of the process stations 204 may include an automated process tool while one or more of the stations are left unoccupied to provide expansion and/or reconfiguration capabilities for the system. In this regard, each process station may include a common tool interface that provides the desired mechanical, electrical, pneumatic, control and like connections for operating the various process tools.

In one illustrative embodiment, the fiber preparation module 202 includes any one or any combinations of a strip tool 206 for stripping the protective coating to expose the end of the optical fiber, a cleaning tool 208 for cleaning the exposed end of the fiber and a cleave tool 210 for cleaving the exposed end to form a fiber end of high optical quality. Each of the process tools is automated to perform the desired fabrication process on the fiber end automatically in response to a control signal from a system controller 212. Illustrative embodiments for each of these process tools are described in more detail below. It is to be understood, however, that the fiber-prep module is not limited to any particular tool configuration, but may employ any suitable process tool configured to automatically perform one or more of the strip, clean and cleave processes.

To facilitate the automated fabrication process, the optical fiber 214 is placed on a transporter 216 that automatically transports it from an upstream end 218 of the system toward a downstream end 220 of the system in response to a transport signal from the system controller 212. The transporter 216 precisely locates the fiber 214 at one or more of the process stations 204 where any desired fabrication process may be automatically carried out on the fiber. The transporter 216 may be configured to operate on an intermittent basis to transport the fiber to each process station at the conclusion of each fabrication process. In this regard, actuation of the transporter may be based on the maximum process time required at any one of the process tools.

In one illustrative embodiment discussed in more detail below, the transporter 216 employs a walking beam configuration that precisely locates the fiber at each process station. It is to be appreciated, however, that any suitable transport configuration may be implemented with the system as would be apparent to one of skill. For example, the transporter may employ a conveyor-type transporter, a lift-type transporter, such as a pick-and-place transporter, and other like transporter configurations.

The optical fiber 214 may be provided on a transport medium, such as a tray 222 or other pallet-type device, that is configured to present the end portion of the fiber to the process tool. In this regard, the tray 222 may include one or more registration features that are configured to cooperate with the transporter to accurately locate the tray at each process station. The tray 222 may also include one or more fiber management features that are configured to present and maintain the fiber end within a predetermined region relative to each process tool. The various features, which are described in more detail below, allow the process tool to automatically capture and perform a desired process on the fiber.

In one illustrative embodiment, the fiber end 224 is retained by the tray 222 so that it extends beyond the outer perimeter of the tray for presentation to the various process tools. Additionally, the tray retains the fiber end against axial movement relative to the tray and process tools. In this regard, the tray manages the optical fiber in a manner that may reduce the overall complexity of the system and tools by ensuring that the end portions 224 of the fiber are repeatedly presented to the process tools within a well defined region relative to each tool. This allows the process tools to be configured to carry out the desired manufacturing process with minimal, if any, manipulation of the fiber end. This results in a reliable and efficient automated system for fiber preparation. It is to be understood that, while it may be beneficial, the system of the present invention is not limited to a fiber management arrangement that requires a length of fiber to extend beyond the perimeter of the tray.

In one illustrative embodiment, the optical fiber 214 is placed on the tray so that its opposing end portions 224 extend from opposite ends of the tray. This configuration allows one or both ends of the fiber to be processed by the system. For example, it may be desirable to simultaneously process each end of the fiber with the same or different process tools at any one or more of the process stations. It should be understood, however, that the fiber end 224 may be positioned at the same end or any other sides of the tray suitable for any particular system arrangement.

While the tray 222 may be pre-loaded with a desired length of optical fiber, it may be desirable to configure the system with an automated process tool that places a desired length of fiber on the tray. In one illustrative embodiment, the fiber-prep module 202 includes a fiber payout and spooling tool 226 (referred to as the spooling tool) that is configured to automatically cut a desired length of optical fiber 214 from a spool of optical fiber, configure the fiber into a manageable form and place the fiber on the tray 222. The spooling tool, if employed, is positioned toward the upstream end 218 of the transporter to receive empty trays from the transporter and load the trays with the fiber for subsequent delivery to the downstream fiber-prep process tools. While illustrated as a component of the fiber-prep module, it is to be appreciated that the spooling tool may be a separate stand alone module that is configured to be coupled to an end of the fiber-prep module.

In one illustrative embodiment described in more detail below, the spooling tool 226 draws a desired length of optical fiber from a supply of optical fiber, spools the fiber into a coiled configuration and deposits the coiled fiber 214 on the tray 222 with the fiber ends extending from opposite ends of the tray. In this regard, the spooling tool may be configured with one or more registration features configured to mate with corresponding features on the tray. Although not required, the mating registration features facilitate the transfer to and accurate placement of the coiled fiber 214 on the tray 222. The spooling tool 226 is configured to automatically form and deliver the coiled fiber in response to a spooling signal from the system controller. It is to be understood that the system is not limited to the illustrative embodiment of the spooling tool, and may employ any suitable tool configuration to automatically perform one or more of the payout, spooling and fiber transfer processes.

After one or both ends 224 of the fiber have been processed with the fiber-prep module, the fiber 214 may be delivered to any one or more downstream processes, either as a continuation of the automated fiber preparation system or to a separate fabrication process, either automated or manual, that utilizes prepared optical fibers. For example, the prepared fiber may be presented to a ferrule attachment module, a polishing module, a fusion splicing module, an inspection module, and a pigtailing machine, or any combinations thereof, that may be employed in conjunction with the fiber-prep module.

In one illustrative embodiment, the automated system 200 includes a ferrule attachment tool 228 that is configured to automatically attach a ferrule to one or both ends 224 of the optical fiber 214 in response to a ferrule attach signal from the system controller. The ferrule attachment tool 228 may be provided as part of the fiber-prep module or as a separate module that is used in conjunction with the fiber-prep module. Such an arrangement may be beneficial to providing a readily configurable system for automated fiber preparation.

The ferrule attachment tool 228 is positioned downstream from the fiber-prep module 202 so as to receive a tray 222 loaded with a pre-processed fiber 214 that is ready for receiving a ferrule on one or both ends of the fiber. In one illustrative embodiment described in more detail below, the ferrule attachment tool 228 automatically deploys a ferrule from a supply of ferrules, positions the ferrule in a predetermined location for mounting to the fiber, and mounts the ferrule onto the prepared fiber end. The ferrule attachment tool may also deposit an adhesive into the ferrule (if the ferrule has not been preloaded with an adhesive), and heat the adhesive to at least set the attachment of the ferrule and the fiber end. If necessary, the tool may also reorient the ferrule so that its appropriate end is presented to the fiber.

While it may become apparent that the ferrule attachment tool 228, as described below, possesses certain beneficial attributes for an automated system, it is to be understood that the fiber preparation system is not limited to any particular ferrule attachment tool configuration. Rather, the automated system may employ, if even desired, any suitable process tool configured to automatically attach a ferrule to one or both ends of an optical fiber.

Once the ends of the fiber have been fully processed by the system, it may be desirable to manipulate one or both fiber ends 224 so that they no longer extend beyond the perimeter of the tray 222. In this regard, likelihood of damage to the fiber end, including the ferrule, if attached, or interference with subsequent processing steps may be reduced.

In one illustrative embodiment shown in FIG. 1, the system 200 includes a fiber placement tool 230 that automatically repositions one or both fiber ends 232 inboard the perimeter of the tray. As shown, the fiber placement tool may be located toward the downstream end 220 of the transporter 216 so that it repositions the fiber ends at the conclusion of the fiber preparation process within the system. It is to be appreciated, however, that the fiber placement tool may be located, if even desired, anywhere along the fabrication process.

In one embodiment, the ferrule attachment tool 228 includes a fiber placement tool 230 configured to grasp and reposition the ferrule and fiber end in the tray at the ferrule attachment process station. As explained below in connection with an illustrative embodiment of the ferrule attachment tool, this may be beneficial to increasing the efficiency of the system by allowing the fiber to be moved with a set, rather than fully cured, adhesive.

In another embodiment, a fiber placement tool 230 may be provided in the system separate from the ferrule attachment tool so that one or both ends of the fiber may be repositioned on the tray apart from the ferrule attachment process. As illustrated in FIG. 1, in which the system is configured to process only one of the fiber ends, a fiber placement tool 230 may be provided opposite the ferrule attachment tool so that the non-processed end of the fiber may also be repositioned inboard the tray perimeter to avoid potential fiber damage and/or interference with downstream processes. Of course, the fiber placement tool for the non-processed fiber end may be located at any suitable process station considering that no fabrication processes are to be carried out on that end of the fiber.

The automated system 200 may employ a load module 234a and/or an unload module 234b configured to load and/or unload trays, respectively, onto and from the transporter. The use of load/unload modules contributes to the convenience and efficiency of the automated system by allowing trays to be loaded and unloaded with minimal user intervention. In this regard, the load and unload modules are configured to handle a plurality of trays before user intervention is required to add and remove trays from the modules.

In the illustrative embodiment shown in FIG. 1, the system includes a load module 234a at the upstream end of the transporter and an unload module 234b at the downstream end of the transporter. As explained below in conjunction with illustrative embodiments of the modules, the load module is configured to intermittently load trays onto the transporter from a tray cassette that is configured to hold a stack of trays therein. Similarly, the unload module is configured to intermittently remove the trays from the transporter and stack the trays in a tray cassette.

The stacked tray configuration of the system may be advantageous in allowing compact stacks of trays to be conveniently added to the system or transferred to other process systems. For example, trays containing prepared fibers may be conveniently provided to optical component manufacturers for assembly, either automatically or manually, to optical components or devices. It is to be appreciated, however, that the load and unload modules are not limited to the illustrative embodiments and any load/unload configuration, if even desired, may be implemented with the automated fiber preparation system.

One illustrative embodiment of a method of automatically preparing a length of optical fiber will now be described in conjunction with the system described above. More particularly, the illustrative method is directed to the preparation of an optical fiber pigtail.

The automated fabrication process begins with an empty tray 222 being automatically loaded onto the upstream end 218 of the system transporter by the load module 234a. The tray is indexed downstream by the transporter 216 to the spooling tool 226. In response to a signal from the system controller, the spooling tool 226 automatically draws and cuts a predetermined length of fiber from a supply of optical fiber, spools the fiber into a coiled configuration and places the coiled fiber 214 on the tray 222 with the opposing ends 224 of the coiled fiber extending from opposite ends of the tray.

The loaded tray is then indexed to the strip tool 206. Once the tray is located, one or both ends 224 of the fiber, as desired, are stripped of the protective coating to expose a predetermined length of glass core. The ends are stripped in response to a strip signal from the system controller.

The tray 222 is next delivered to the cleaning tool 208 where the stripped ends 224 of the fiber are cleaned of debris, such as may be associated with cutting and stripping the fiber. After being moved to the cleave tool 210, the stripped and cleaned fiber ends are cleaved to produce a fiber end having optical properties of high quality. The cleaving process may also remove potential glass defects present at the ends of the fiber. The clean and cleave processes are performed in response to appropriate signals from the system controller.

The coiled fiber, now having fully prepared fiber ends, is indexed to the ferrule attachment tool 228. Once positioned at the tool, a ferrule is attached to one or both ends 224, as desired, of the fiber in response to a control signal from the system controller. The fiber ends 232 are then repositioned inboard the perimeter of the tray in an orientation that is different from the initial outwardly extending direction of the fiber ends.

With the fiber now fully assembled as a pigtail, the tray 222 is removed from the downstream end of the transporter by the unload module 234b and stacked in a tray cassette to eventually be offloaded by a user or other system for subsequent processes involving use of a pigtail.

Figure 2:
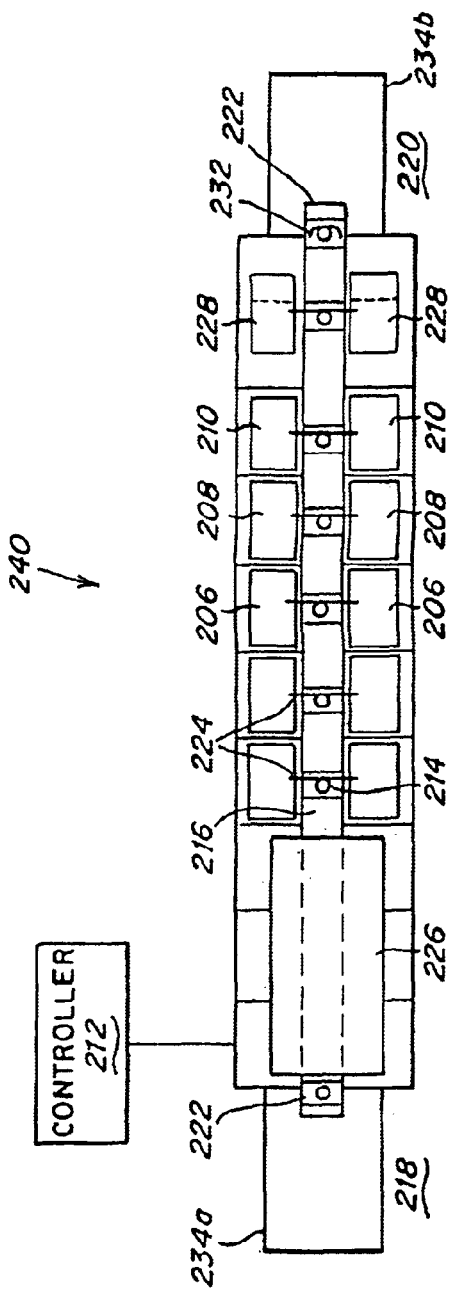
FIG. 2 is a schematic diagram of an automated fiber preparation apparatus according to another illustrative embodiment of the present invention.

FIG. 2 is a schematic representation of another illustrative embodiment of an automated fiber preparation system according to the present invention. The system 240 is configured to prepare both ends of the fiber. In this regard, pairs of strip, clean, cleave and ferrule attachment tools may be positioned on opposite sides of the transporter. Of course, any suitable combination of process tools along one or both sides of the transporter may be implemented to create a desired fiber preparation system. It is also contemplated that any combination of modules, including a plurality of similar modules, may be linearly arranged to provide a desired system. For example, it may be desirable to employ two or more fiber-prep modules arranged in series with or without other modules therebetween.

The above-enumerated modules, process tools and system configurations are merely representative of the types of modules, tools and systems that may be employed for automated fiber preparation. Neither the foregoing sequences, or any other sequence of these or other tools, nor the presence of any or all of such modules and process tools, or additional modules or process tools not identified above, should be considered a limitation of the automated fiber preparation apparatus of the present invention. It is contemplated that any one or more of the process modules and process tools may be a stand alone item that may be employed separately or in conjunction with other modules and tools for various applications related to the preparation of optical fiber and fiber-like devices.

Figure 3:
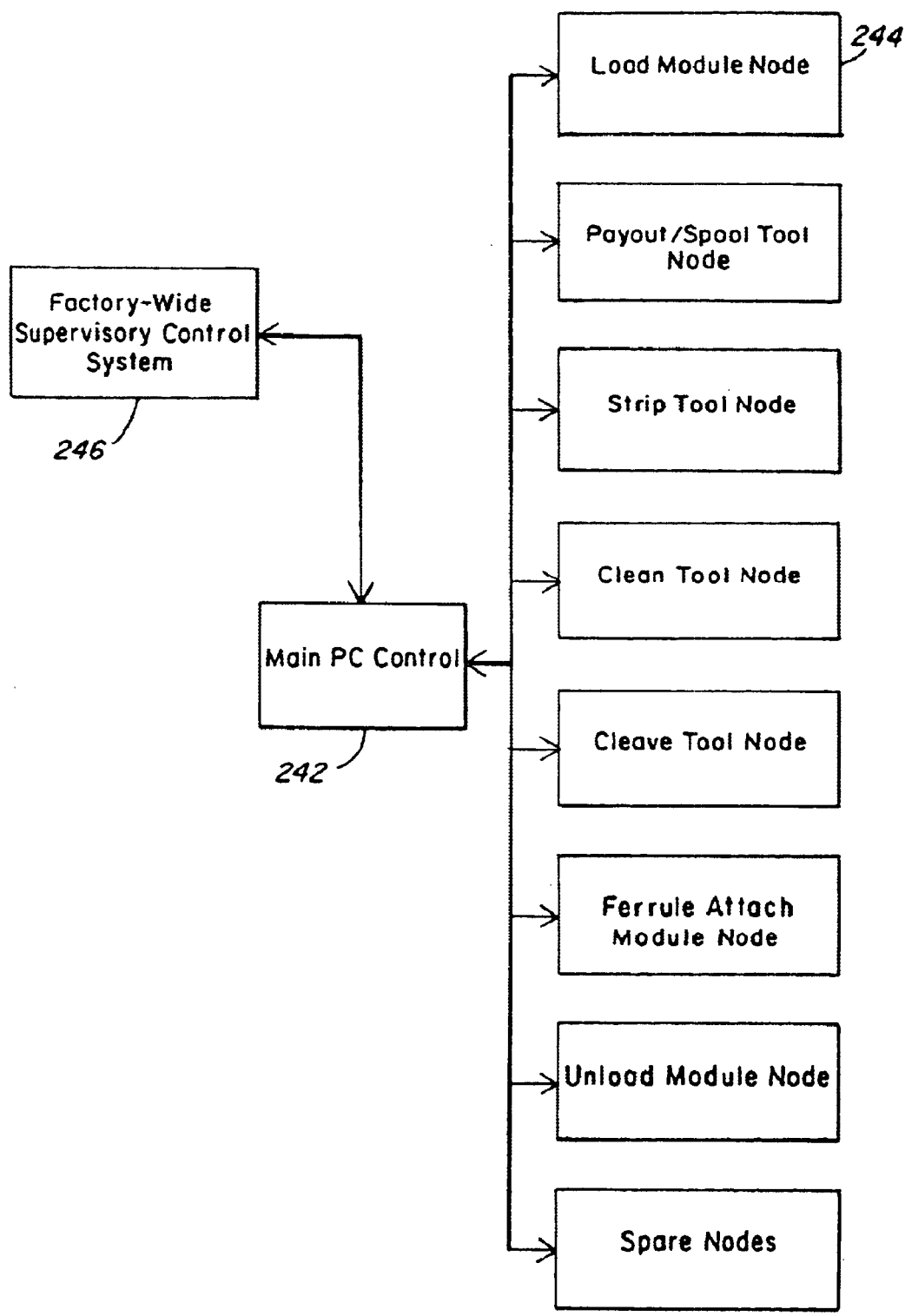
FIG. 3 is a block diagram of one illustrative embodiment of a system controller.

According to one embodiment as schematically shown in FIG. 3, operation of the system is controlled by a distributed control system. The distributed control system 212 includes a main controller 242, such as a personal computer (PC), and a number of local control nodes 244 located at each individual tool or module within the system. Each tool or module is directly controlled by its own local control node which communicates status information and receives command signals from the main controller.

Such a distributed control system has advantages in that each tool or module is a self-contained unit requiring only a single communication link to the main controller. This allows for easy maintenance, repair and expansion of the system. The main controller 242 may handle all data generated by the system, for example, maintenance data and process variable data, such as temperature, pressure or tension data that may be provided by certain tools, and may provide a main operator interface to the system. The main controller 242 may be adapted to receive information from a user via the operator interface and to provide the information to appropriate local control nodes. The operator interface may also present system data and information to the user. The main controller may also communicate with a supervisory control system 246 to facilitate, for example, factory-wide quality control.

Each local node 244 may control the associated tool to perform certain functions in response to signals received from the main controller, and may signal the main controller 242 when the functions performed by the tool are complete. According to one example, each local control node comprises a communications module to communicate with the main controller, an I/O interface module that sends and receives signals from the associated tool or module, and a servo control module that may control any motors or servos associated with a particular tool. It is to be appreciated that these functions may be provided by a number of discrete, interconnected modules forming the local control node, or may be provided by a single integrated control node. Furthermore, each local control node may be specifically adapted to control processes unique to the specific associated tool or module.

Illustrative embodiments of various aspects of the automated fiber preparation apparatus will be discussed in more detail. It is to be understood that the descriptions are merely exemplary and not intended to limit the present invention.

Figure 4:
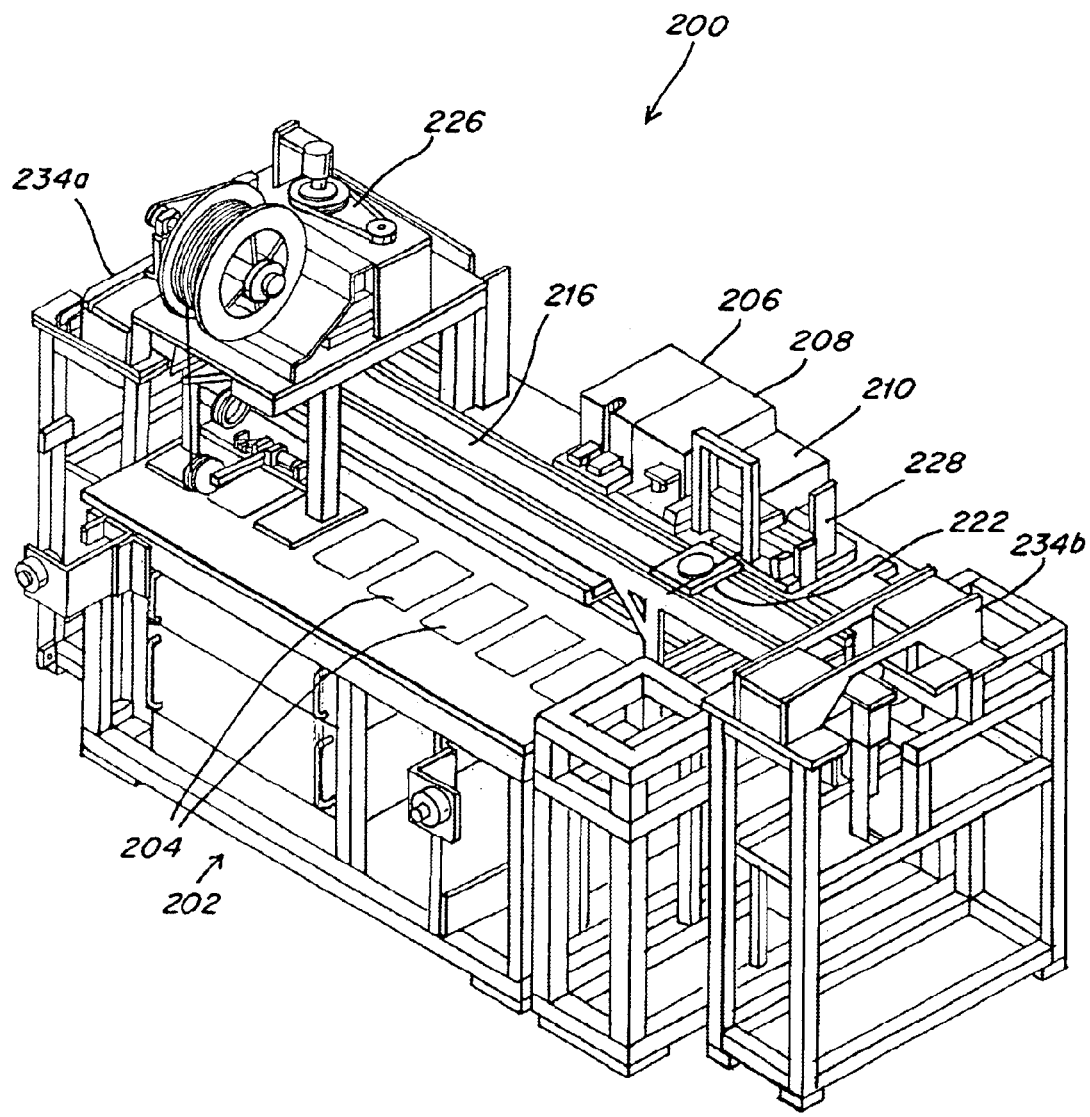
FIG. 4 is a perspective view of an automated fiber preparation apparatus according to one illustrative embodiment of the present invention.

FIG. 4 is a perspective view of an automated fiber preparation apparatus according to one illustrative embodiment of the present invention. The apparatus has a system configuration suitable for pigtail fabrication, as described above in connection with FIG. 1. This embodiment, however, is merely exemplary as to one of numerous configurations that may be attained with the modular capability of the present invention.

The apparatus 200 includes a fiber-prep module 202 configured with a strip tool 206, a cleaning tool 208 and a cleave tool 210 disposed along one side of a transporter 216. As illustrated, the fiber-prep module includes a plurality of spare process stations that may be populated with one or more tools on either or both sides of the transporter, as desired. The fiber-prep module also includes a spooling tool at the upstream end of the transporter to prepare and insert a coiled fiber into a tray 222.

A load module 234a is provided at the upstream end of the fiber-prep module to feed trays to the system. A ferrule attachment tool 228 is attached to the downstream end of the fiber-prep module for attaching ferrules to the prepared fiber ends. An unload module 234b is provided at the downstream end of the system to unload trays loaded with optical fiber pigtails.

As indicated above, this embodiment is one of numerous system configurations that may be employed with the present invention. In this regard, the illustrative embodiment is not intended as a limitation of the invention.

Transporter

As indicated above, the automated fiber preparation apparatus employs a transporter 216 for carrying an optical fiber to the various process stations. The transporter may be configured to operate intermittently such that the optical fiber remains at any particular tool for a predetermined period of time before being transported to the next process tool. While located at any particular process station, one or both ends of the fiber may be processed as desired.

The transporter is configured to precisely locate the optical fiber in a repeatable manner to facilitate the manufacturing processes at each station. In this regard, as described above, the transporter cooperates with a transport medium, such as a work tray or other pallet-like device, configured to retain the ends of a coiled fiber in a predetermined location relative to the tool.

Figure 5:
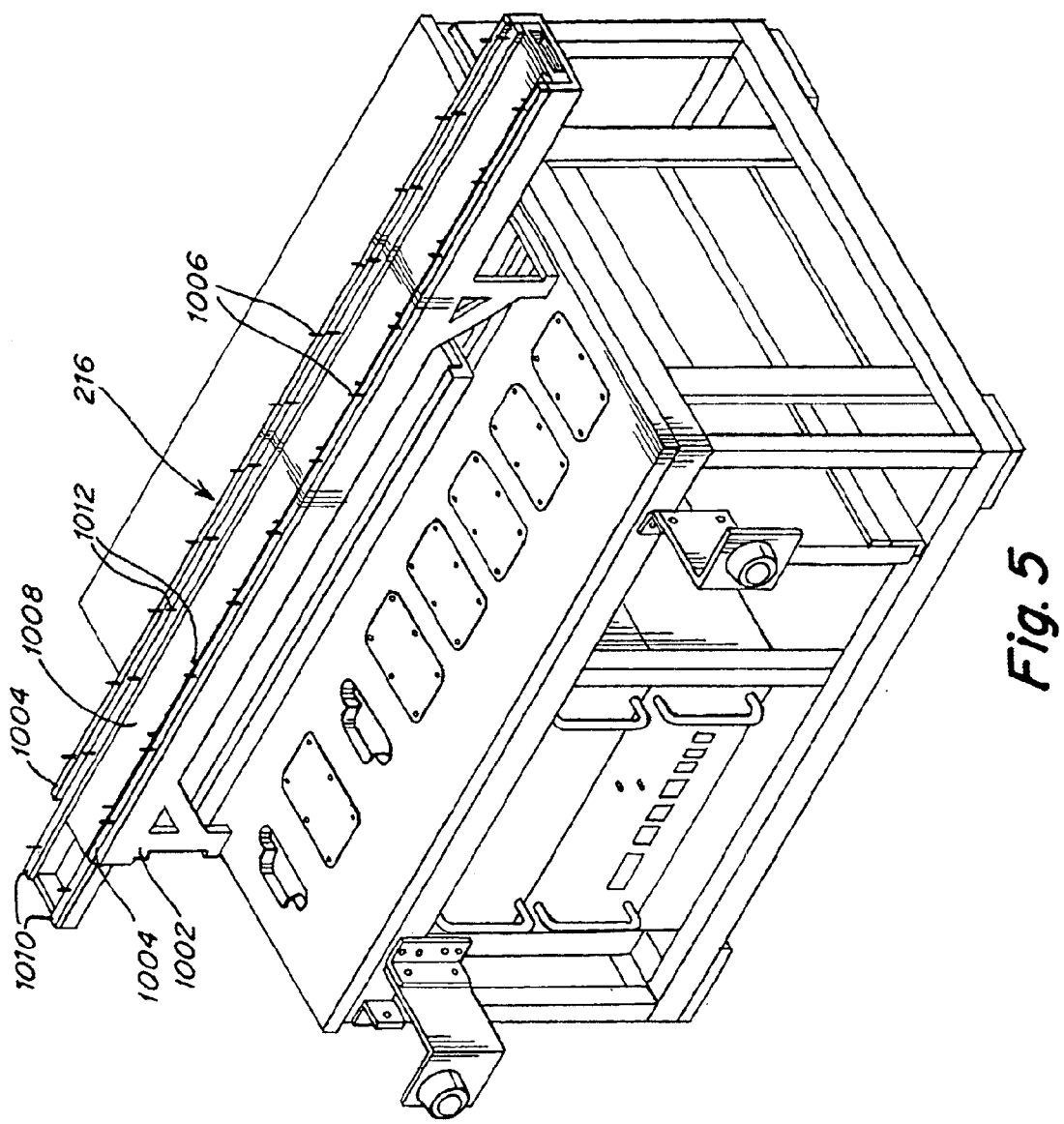
FIG. 5 is a perspective view of a transporter of the automated fiber preparation apparatus of FIG. 4 according to one illustrative embodiment of the present invention.

Although any suitably configured transporter may be implemented with the system, one illustrative embodiment of the system utilizes a walking beam transporter that carries and precisely positions the tray at each station along the beam. As illustrated in FIG. 5, the transporter 216 may be mounted to the deck of the fiber preparation module 202 between opposing rows of process stations 204.

In one illustrative embodiment, the transporter 216 includes a transporter frame 1002 that includes a pair of outer support rails 1004 that extend along the length of the frame. The outer support rails 1004 include a plurality of upstanding pins 1006 that are configured to mate with corresponding features on the tray 222 to precisely locate and maintain the tray in a fixed position relative to each process station. A walking beam 1008 is movably supported within the transporter frame 1002 to lift and move the tray to succeeding positions along the transporter frame. The walking beam 1008 includes a pair of inner support rails 1010 that engage the ends of the tray inward of the outer support rails 1004 to lift the tray from and move it along the outer support rails. The inner support rails 1010 also include a plurality of upstanding pins 1012 that are aligned with the pins on the outer support rails and cooperate with corresponding features on the tray to facilitate transportation of the tray along the transporter.

FIGS. 6(a)–(d) are a schematic representation of one illustrative embodiment of the transporter and its operational sequence. It is to be understood that the transporter is not limited to this illustrative embodiment as other configurations are contemplated.

Figure 6A:
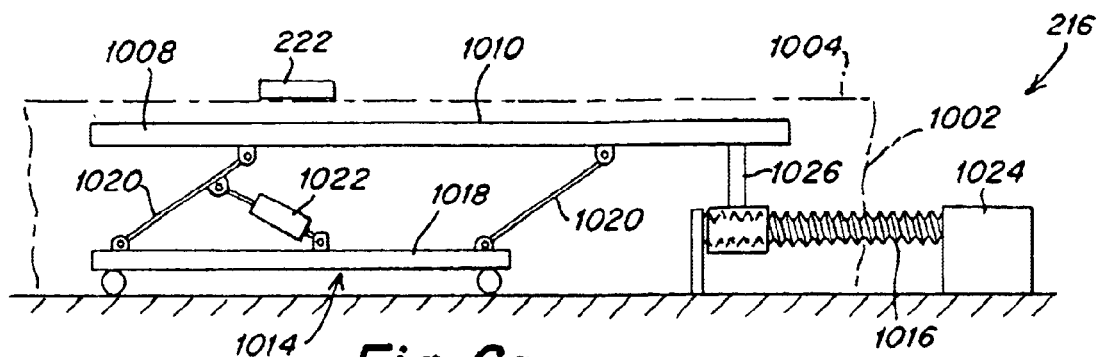
FIGS. 6(a)–(d) are schematic diagrams of the transporter of FIG. 5.

FIG. 6(a) illustrates a tray 222 supported by the outer support rails 1004 in any one of a plurality of locations along the transporter with the walking beam 1008 in its home position. The walking beam 1008 is located below the outer support rails 1004 in a lowered position so that the beam can be moved linearly along the length of the frame without disturbing the tray from its desired location.

As illustrated, the walking beam 1008 may be coupled to a lift drive 1014, which is configured to raise and lower the walking beam relative to the outer frame, and a linear drive 1016 which is configured to the walking beam in a linear direction along the length of the frame. The lift drive 1014 may include a carriage 1018 that is configured to move in a linear direction relative to the transporter frame. The carriage 1018 is coupled to the walking beam with a pair of links 1020 which are pivotally connected to the carriage and walking beam. A lift actuator 1022 is coupled between the carriage and at least one link 1020. The linear drive 1016 includes a drive mechanism 1024 that is coupled to the walking beam with a vertical slide 1026 to allow the walking beam to be raised and lowered in a fixed linear position.

Figure 6B:
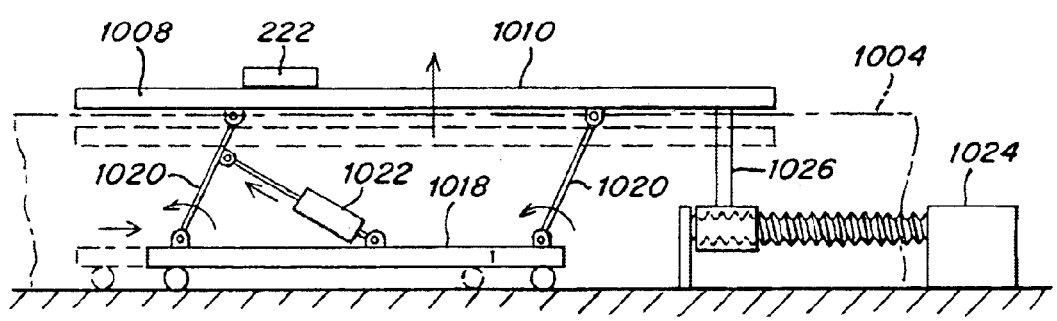

In response to a lift signal, as shown in FIG. 6(b), the lift actuator 1022 drives the links 1020 to rotate about their connections to the carriage. Since the walking beam is restrained against linear motion due to its coupling to the linear drive, the carriage 1018 moves below the walking beam 1008 to counter the force of the lift actuator, thereby extending the links 1020 and lifting the walking beam in a vertical direction to raise the tray above the outer support rails.

Figure 6C:
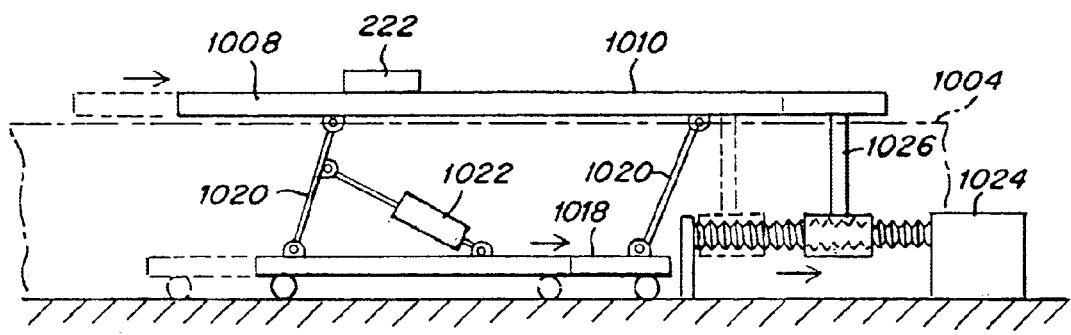
Figure 6D:
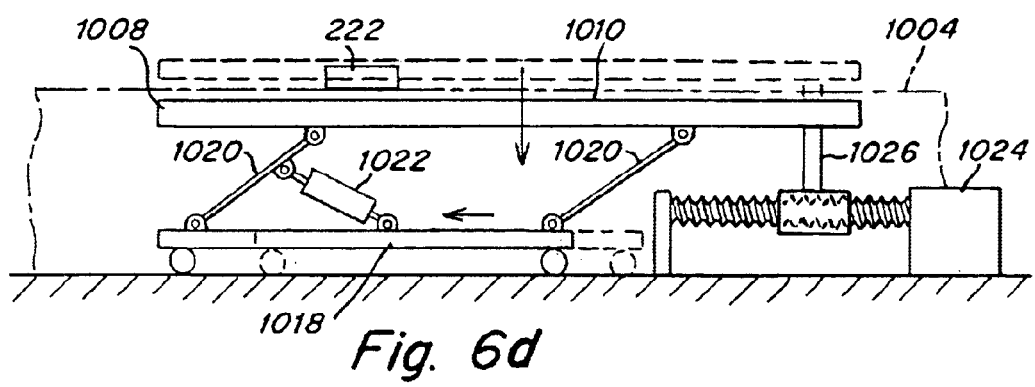

With the walking beam in its raised position, the linear drive 1016 is actuated to move the walking beam 1008 in a linear direction as shown in FIG. 6(c). In this regard, the linear drive, via the vertical slide 1026, moves the walking beam 1008 and the carriage 1018 a predetermined distance to position the tray 222 at the next process station. As illustrated, the vertical coupling 1026 may be moved using a ball/screw arrangement that is capable of precisely locating the tray at its desirable position.

Once the tray is properly positioned, the lift drive 1014 is actuated to lower the walking beam 1008 below the outer support rails 1004 so that the tray 222 is set in position on the outer rails. As illustrated, retracting the lift actuator 1022 causes the carriage 1018 to move relative to the walking beam due to the restraint of the vertical slide 1026 resulting in lowering of the walking beam. Once lowered, the linear drive 1016 is actuated to reposition the walking beam in its home position as shown in FIG. 6(a) in preparation for the next transport cycle.

Various aspects and features of the transporter will now be described in more detail below. It is to be appreciated, however, that the transporter is not limited to the illustrative embodiment, as numerous other configurations are possible.

Figure 7:
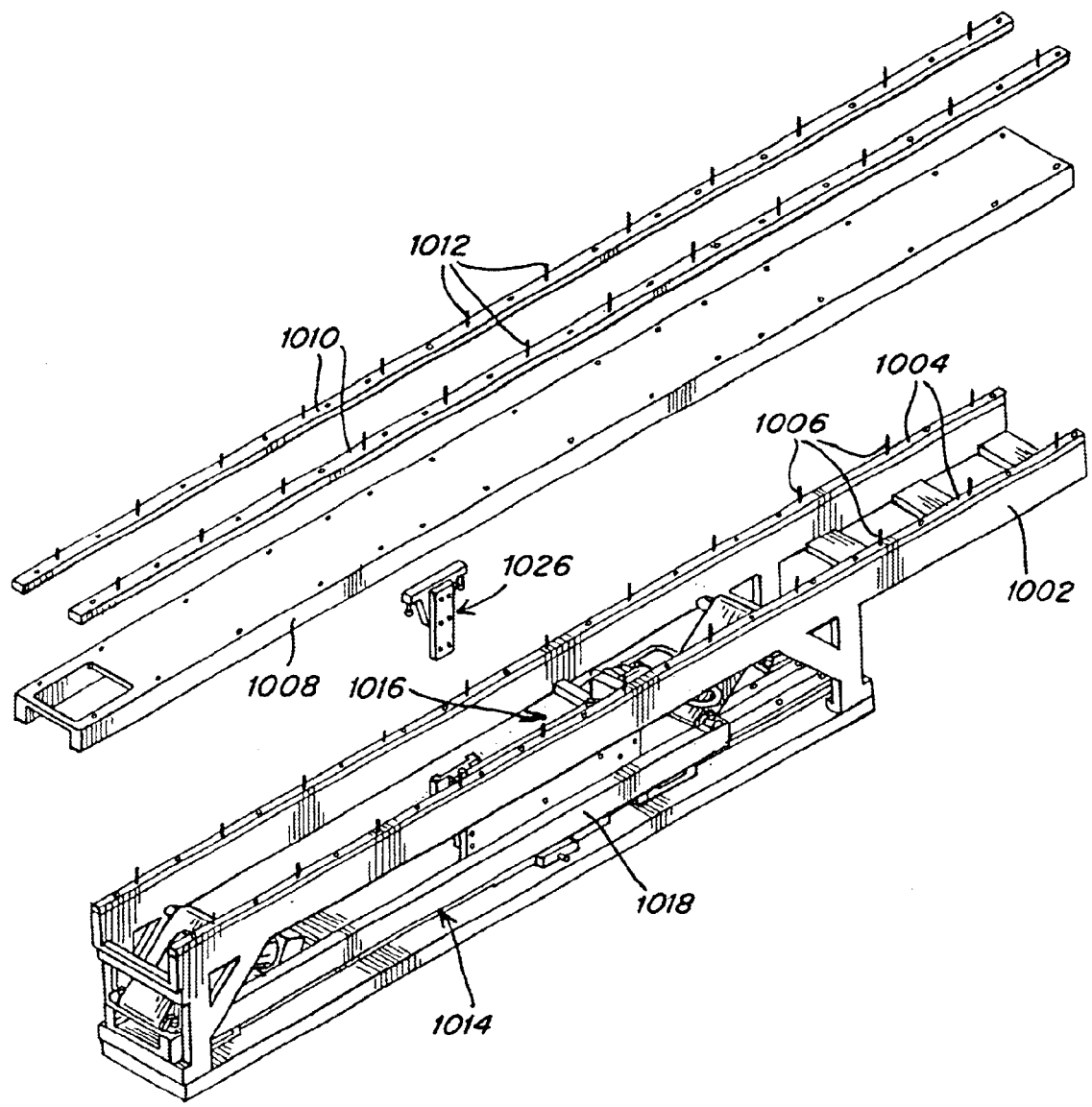
FIGS. 7–9 are exploded perspective views of various aspects of the transporter of FIG. 5
Figure 8:
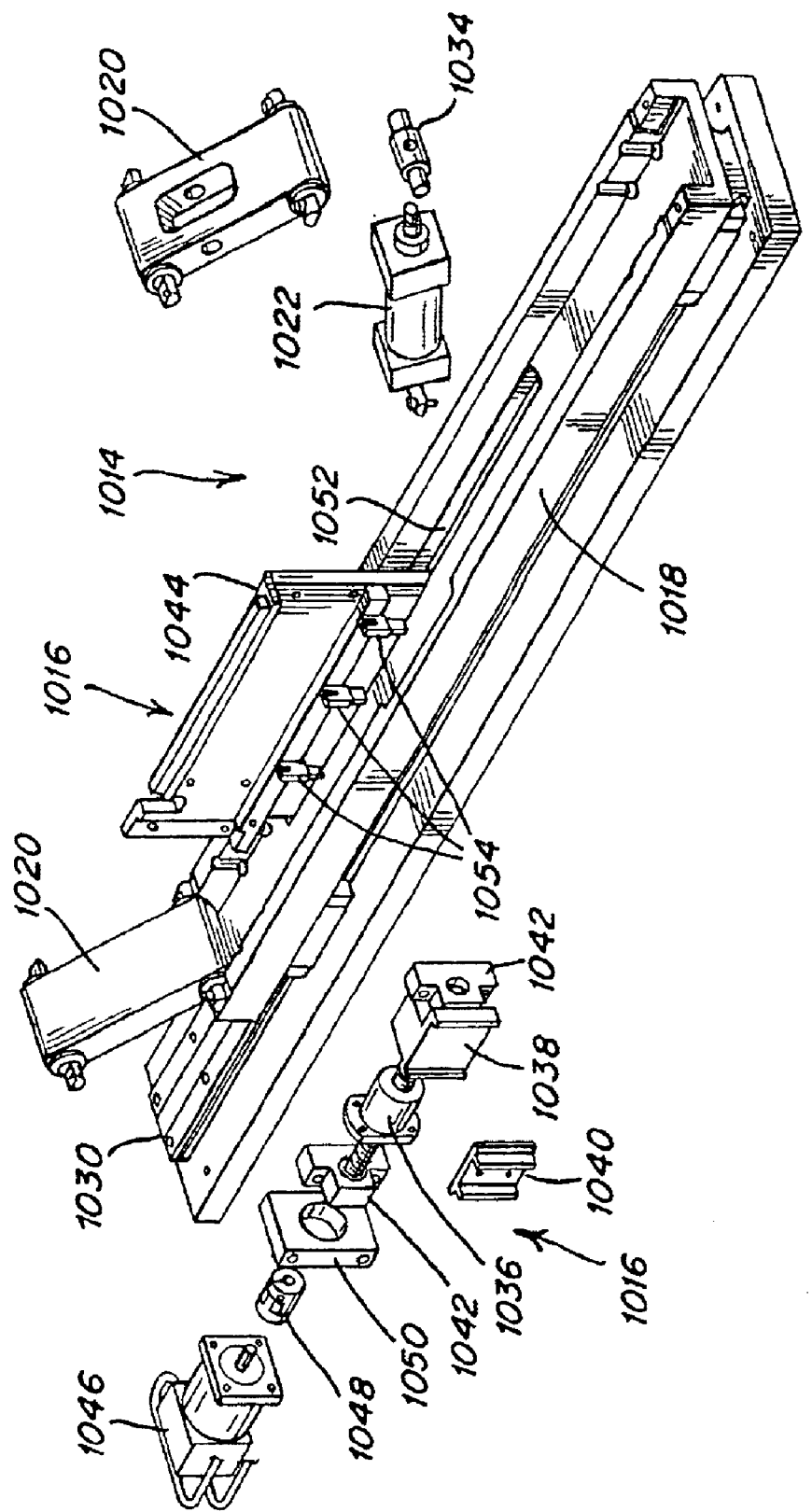
Figure 9:
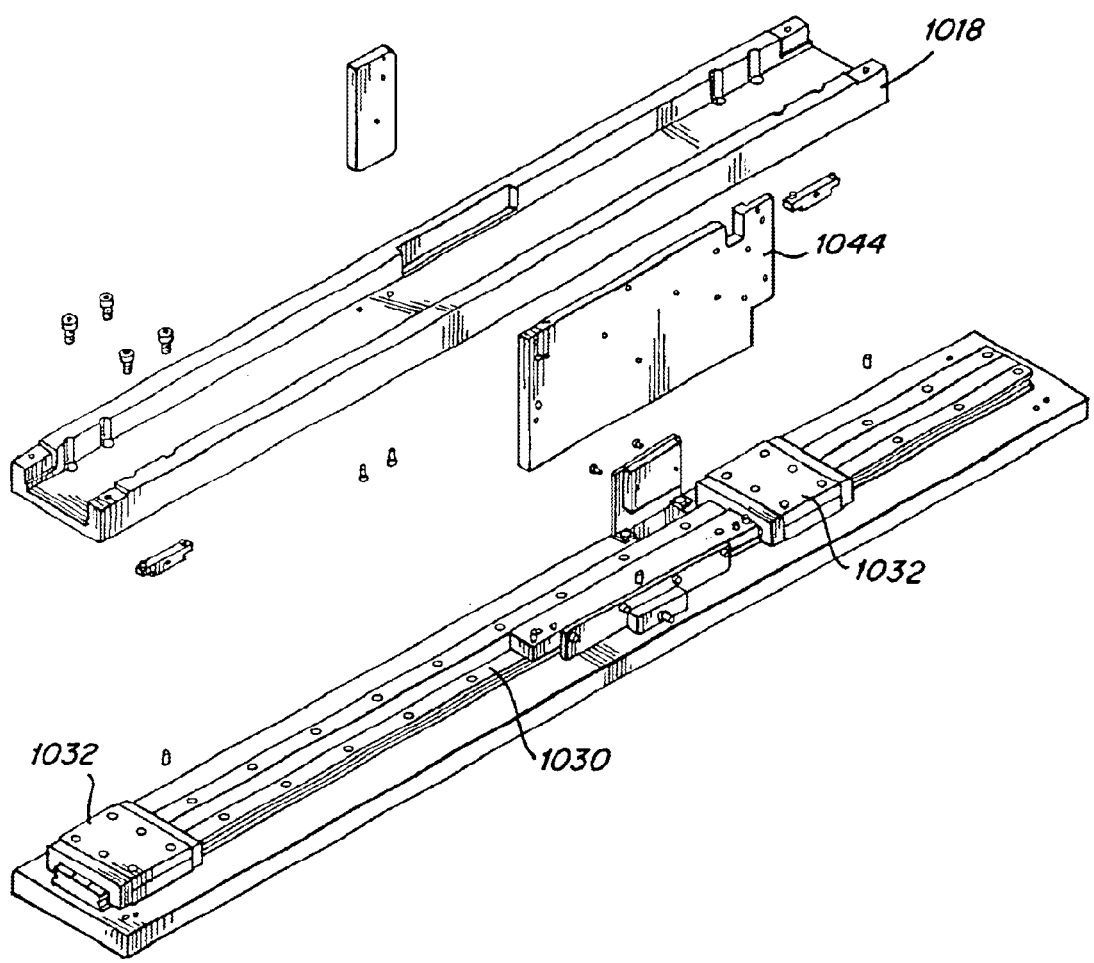

The transporter includes a drive mechanism configured to move the walking beam in both a vertical direction to raise and lower a tray relative to the outer support rails, and a linear direction to move the tray linearly adjacent stations. In one illustrative embodiment shown in FIGS. 7–9, the drive mechanism includes a lift drive 1014 that is used in conjunction with a linear drive 1016 to provide the desired motion for the walking beam. In this regard, the lift drive is configured to raise and lower the walking beam while the linear drive is configured to drive the walking beam in a linear motion along the transporter frame between stations.

As illustrated, the lift drive includes a carriage 1018 that is moveably supported on the fiber-prep deck with a rail and block arrangement including a linear rail 1030 that slidably carries a pair of carriage blocks 1032 to support opposing ends of the carriage. A pair of links 1020 couple the carriage 1018 to the walking beam 1008. As illustrated, the lower ends of the links 1020 are rotatably mounted to the opposing ends of the carriage 1018 while the upper ends of the links are rotatably mounted to the walking beam 1008.

The walking beam 1008 may be raised and lowered by driving at least one of the links 1020 relative to the carriage 1018. In the illustrative embodiment, an actuator 1022, such as a pneumatic air cylinder, is coupled between the carriage 1018 and one of the links 1020. As shown, the lower end of the actuator 1022 is mounted to the carriage 1018 while its opposite end is rotatably attached to the link 1020 using a link coupling 1034 disposed between the upper and lower ends of the link. In this manner, extending and retracting the actuator 1022 causes the link 1020 to rotate about its lower coupling relative to the carriage 1018, thereby raising and lowering the upper end of the link relative to the carriage.

As indicated above, linear motion of the walking beam is achieved using a linear drive coupled to the walking beam. In one illustrative embodiment shown in FIGS. 7–8, the linear drive includes a ball/screw assembly 1036 that drives a rail mount 1038 in a linear direction along the length of the screw. A rail block 1040, which is configured to receive a vertical rail 1026 mounted on the walking beam, is attached to the rail mount. Movement of the rail mount 1038 along the ball/screw assembly, via the rail block, drives the walking beam, via the vertical rail, in a linear direction. A pair of support bearings 1042 are disposed at opposite ends of the ball/screw assembly to mount the drive assembly to a stationary base plate 1044 which is fixed to the module deck.

A servomotor 1046 is coupled to the ball/screw assembly with a shaft coupling 1048. A motor mount 1050 supports the servomotor on the base plate. As shown, the base plate 1044 is disposed within a slot 1052 along the carriage 1018 so that the carriage may oscillate back and forth in a linear motion.

The servomotor 1046 may include an encoder that allows the control system to accurately locate the walking beam in a desired position. Sensors may also be employed to control both the lift drive and the linear drive. In one illustrative embodiment, a plurality of sensors 1054 are provided on the ball/screw baseplate to monitor the position of the rail block. In this regard, a home sensor may be provided to signal the control system when the rail block is located at its home position. Additionally, a pair of under-travel and over-travel sensors may be provided to limit the amount of linear travel of the rail block. In one embodiment, the sensors include optical sensors that cooperate with a flag mounted to the rail mount block. Similarly, the lift drive may be provided with one or more sensors to indicate a raised or lowered position for the walking beam. In one embodiment, a pair of magnetic sensors are supported on the actuator to monitor the position of the actuator piston being extended and retracted. It is to be understood that any suitable sensor configuration may be implemented with the walking beam to control its motion relative to the transporter frame.

In one illustrative embodiment, the transporter is configured to intermittently transport trays in linear increments of approximately 6.0 inches. As should be appreciated, the transporter may be configured to have any desirable pitch suitable for a particular system configuration.

Having described one embodiment of a transporter for use in the fiber preparation system, it should be understood that the description is by way of example only and that other suitable transporter configurations may be implemented with the system as would be apparent to one of skill.

Payout and Spooling Tool

As indicated above, the system may also include a spooling tool for winding a coiled fiber, such as an optical fiber, that may be placed on a tray for fiber preparation. An example of one spooling tool suitable for use with any of the embodiments of the present invention is described in co-pending U.S. patent application entitled "Method and Apparatus for Automatically Forming a Coiled Segment of Optical Fiber", filed on even date herewith, and incorporated herein by reference (hereafter the "Spooling Tool Application"). However, it should be appreciated that the various embodiments of the present invention directed to automated preparation of optical fiber is not limited to use with any particular spooling tool. Various illustrative embodiments of a spooling tool, as provided in the Spooling Tool Application, are presented below.

Figure 10:
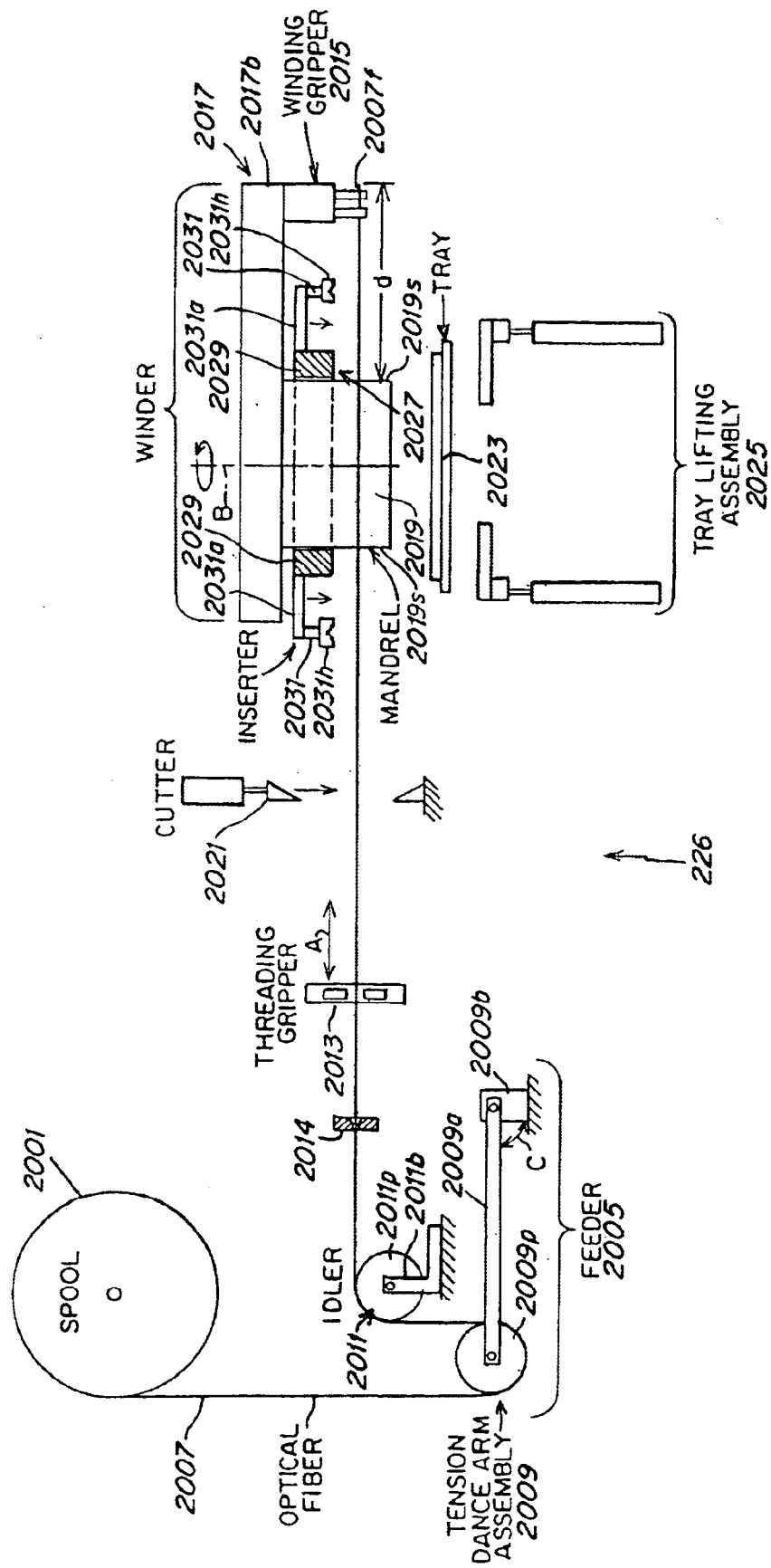
FIG. 10 is a conceptual illustration of a system for automatically generating a coiled section of optical fiber in accordance with one illustrative embodiment of the spooling tool.

FIG. 10 is a schematic illustration of one illustrative embodiment of the spooling tool for automating the process of taking a section of optical fiber from a spool 2001 of optical fiber, cutting it to size and forming a coil with the section of optical fiber. The system 226 shown in FIG. 10 includes a feeder 2005 that is adapted to take the optical fiber 2007 off of the spool 2001 and feed it to the remainder of the system. A goal of the feeder 2005 is to not only take the optical fiber 2007 off of the spool 2001, but to maintain constant tension in the optical fiber as it is taken off the spool, to facilitate handling. This can be done in any of numerous ways, including using techniques that have been employed in the past in the handling of other types of spooled cables, wires, threads, etc., as the spooling tool is not limited to using any particular feeding mechanism.

In the illustrative embodiment shown in FIG. 10, the feeder 2005 includes three main components, including a tension dance arm assembly 2009, an idler 2011 and a threading gripper 2013. To set up the system 226 for operation with a new spool 2001 of optical fiber 2007, the free end of the spool of fiber initially is thread through the feeder 2005 and then held in place by the threading gripper 2013. The threading gripper 2013 holds the free end of the spool of optical fiber 2007 not only when a new spool is added to the system, but also after a section of optical fiber is cut by the system in the manner described below. The threading gripper 2013 also serves to pass the free end 2007f of the fiber to a winder 2017 as discussed further below.

The idler 2011 serves as a guide for the optical fiber 2007 so that the fiber is aligned with the threading gripper 2013. The idler can be implemented in any of numerous ways. In accordance with one illustrative embodiment of the spooling tool, the idler 2011 includes a base 2011b and a pulley 2011p that is rotatably mounted thereto to reduce the friction caused by the optical fiber 2007 passing over the idler 2011. Of course, the idler 2011 can be implemented in numerous other ways, and is not limited to employing a pulley system.

In the embodiment shown in FIG. 10, the tension dance arm assembly 2009 includes a base 2009b, a pulley 2009p and an arm 2009a that mounts the pulley 2009p to the base 2009b. The tension dance arm assembly is the primary component within the feeder 2005 that acts to maintain constant tension on the optical fiber 2007 as it is fed through the system 226. The arm 2009a is pivotally mounted to the base 2009b so that the relative distance between the pulley 2009p and the spool 2001 can be altered by the tension dance arm assembly 2009. In this respect, the tension dance arm assembly 2009 is arranged so that the pulley 2009p is urged under the effect of gravity to tend to drop down and thereby reduce the angle c between the arm 2009a and the base 2009b. The pulley 2009p is prevented from dropping down by the optical fiber 2007, which is attached at one end to the spool 2001 and at the free end 2007f to other components of the system 2003 (e.g., the threading gripper 2013 and/or a component of the winder 2017 as discussed below). The tension dance arm assembly 2009 can be arranged so that a desired angle c between the arm 2009a and the base 2009b (e.g., an angle of 90° indicating that the arm 2009a is horizontal in FIG. 10) can be set to denote the optimal length of optical fiber 2007 to be extending between the spool 2001 and the idler 2011. Thus, if the spool 2001 is paying out the optical fiber 2007 at a rate above the optimal payout rate, additional slack in the optical fiber 2007 will result, thereby enabling the pulley 2009p to drop down under the effect of gravity so that the arm 2009a is below the optimum angle. The tension dance arm assembly 2009 can include a sensor to detect the angle c of the arm 2009a, and can then send a control signal to the spool 2001 to control the rate at which the optical fiber 2007 is being payed out. This can be done in any of numerous ways, including through a computer control system as discussed below. Thus, by monitoring the angle of the arm 2009a, the tension dance arm assembly 2009 can control the rate at which the optical fiber 2007 is payed out from the spool 2001, to maintain constant tension in the optical fiber 2007. In accordance with one illustrative embodiment of the spooling tool, the spool control can be used to speed up or slow down rotation of the spool 2001, and can be used to reverse the spool rotation to retract some of the optical fiber 2007 back onto the spool 2001.

It should be appreciated that the description provided above of the feeder 2005 is provided merely for illustrative purposes, as numerous other techniques can alternatively be used for feeding the optical fiber 2007 from the spool 2001 to the remainder of the system 226.

As mentioned above, in the embodiment of the invention shown in FIG. 10, the threading gripper 2013 is movably mounted to draw the free end 2007*f* of the optical fiber 2007 off of the spool 2001, and to pass it to another component of the system. Specifically, in the embodiment of the invention shown in FIG. 10, the threading gripper 2013 is mounted for sliding movement along an axis that is essentially in-line with the optical fiber 2007 after it has passed over the idler 2011, for moving in the direction of arrow A shown in FIG. 10. For example, after a new spool 2001 has been manually fed through the system so that its free end 2007*f* is grasped by the threading gripper 2013 and operation of the system 226 commences, the threading gripper moves to the right in FIG. 10 in the direction of arrow A, and draws the free end of the optical fiber 2007 with it. The threading gripper 2013 then passes the free end 2007*f* of the optical fiber to a winding gripper 2015 of the winder 2017, which performs a function that will be described further below. After the threading gripper 2013 passes the free end 2007*f* to the winder gripper 2015, the threading gripper 2013 releases the optical fiber 2007 and moves back to its initial position shown in FIG. 10. After the winder 2017 performs its winding function, the threading gripper 2013 then regrips the optical fiber 2007 in advance of a cutter 2021, which cuts the optical fiber to create a section thereof that has been removed from the spool 2001, with the result that the threading gripper 2013 then grips a new free end of the optical fiber 2007 that is still attached to the spool 2001. It should be appreciated that the cutter 2021 can be implemented in any of numerous ways and that the timing of the cutting operation can be varied. For example, the cutter 2021 can cut the optical fiber 2007 after the completion of the winding operation and before transfer of the coiled section of the optical fiber to a tray 2023, or after transfer of the wound coil to the tray 2023.

It should be appreciated that the above-described technique for passing the optical fiber 2007 to the winder 2017 is provided merely for illustrative purposes, as numerous other techniques are possible. For example, although the threading gripper 2013 is movable in the embodiment of FIG. 10 to draw the optical fiber 2007 to the winder 2017, numerous other alternatives are possible, including employing a fixed threading gripper 2013 and a winder 2017 that moves to meet the threading gripper 2013.

In the embodiment shown in FIG. 10, the winder 2017 includes the winding gripper 2015 and a mandrel 2019 that is mounted for rotation about an axis B. In one embodiment of the spooling tool, the winding gripper 2015 and the mandrel 2019 maintain a fixed rotational orientation, such that each rotates simultaneously about the axis B. In one illustrative embodiment of the spooling tool, the threading gripper 2013 moves across the mandrel 2019 to pass off the free end 2007*f* of the optical fiber to the winding grouper 2015, such that the optical fiber 2007 essentially rests against the mandrel 2019 before the winding gripper 2015 begins the winding operation. It should be appreciated that this is advantageous, as it assists in maintaining the optical fiber 2007 in alignment with the feeder 2005. Specifically, if the threading gripper 2013 were to hand the free end 2007*f* of the optical fiber to the winding gripper 2015 on the other side of the mandrel 2019, then when the winding operation began, the winding gripper 2015 would draw the free end 2007*f* (out of the page in FIG. 10) outwardly away from the mandrel 2019 so that the optical fiber 2007 would not maintain a constant alignment with the feeder 2005. It should be appreciated that the winder 2017 can rotate through any desired range of rotation (including one or more 360° rotations) to wind the optical fiber 2007 about the mandrel 2019. After this winding is complete, the cutter 2021 cuts (either before or after transfer to the tray 2023) the optical fiber, thereby creating a coiled section of optical fiber that is separated from the spool 2001.

In accordance with one embodiment of the spooling tool, the winding gripper 2015 is movably mounted to a base 2017*b* of the winder 2017, to enable the winding gripper to be moved in an up and down direction. For example, in accordance with one illustrative embodiment of the spooling tool, a fiber guide 2014 is positioned between the idler 2011 and the threading gripper 2013 to assist in guiding the optical fiber 2007 to the winder 2017. The fiber guide 2014 can take any of numerous forms, but in one embodiment of the spooling tool, it is a small circular guide that fixes the position of the optical fiber 2007 passing therethrough to the relatively small surface area provided by the guide 2014. The winder gripper 2015 can initially be put in a position where it is in-line vertically with the fiber guide 2014 when it grasps the free end 2007*f* of the optical fiber. However, before the winding operation begins, the winding gripper 2015 can be actuated to a vertical position either higher or lower than the position of the fiber guide 2014. In accordance with one illustrative embodiment of the spooling tool, the winding gripper 2015 is actuated to a vertical position higher than the optical guide 2014, which causes a downward bias on the top surface of the optical fiber 2007 that abuts against a lower surface of a component 2029 provided on a stripper 2027 that is described in more detail below. Thus, as the winder 2017 winds the optical fiber 2007 about the mandrel 2019, the downward bias causes the optical fiber to form a helical coil. Furthermore, the relative position of the winding gripper 2015 higher than the optical guide 2014, and thus higher than the portion of the fiber 2007 leading from the optical guide 2014 to the mandrel 2019, allows the winding gripper 2015 to rotate freely around the mandrel 2019 without coming into contact with the fiber 2007. Although providing an actuated winding gripper is advantageous for these reasons, it should be appreciated that the spooling tool is not limited in this respect, and that a winding gripper 2015 can be employed that does not move up and down relative to the base 2017*b* of the winder.

In accordance with one illustrative embodiment of the spooling tool, the coil of optical fiber formed using the methods and apparatus disclosed herein is intended to have both of its ends available for additional processing, for example to undergo other automated steps for preparing an optical fiber as may be performed with the fiber preparation apparatus. Thus, unlike conventional processes where a cable or fiber is formed into a coil but only one end of the cable or fiber need be accessible, in accordance with one illustrative embodiment of the spooling tool, it is desired to form a coiled section of optical fiber wherein both ends are accessible. Thus, the embodiment of the invention shown in FIG. 10 includes a winder 2017 that produces a coiled section of optical fiber with both ends accessible.

In the illustrative embodiment of FIG. 10, an aspect of the winder 2017 that results in both ends of the coiled section of optical fiber 2007 being accessible is that the winding gripper 2015 is spaced from an outer surface 2019*s* of the mandrel 2019 about which the optical fiber 2007 is wound. In this respect, many conventional winding systems wind a cable or fiber about a mandrel with one of the ends of the cable or fiber attached directly to the surface of the mandrel about which the cable or fiber is wound, thereby making that end of the cable or fiber inaccessible. In the illustrative embodiment shown in FIG. 10, the winding gripper 2015 spaces the free end 2007f of the optical fiber a distance d from the outer surface 2019s of the mandrel. Thus, after the winder 2017 has completed its winding of the optical fiber 2007 about the mandrel 2019, the free end 2007f of the optical fiber will be accessible (i.e., it will not be trapped under other sections of the coil). In addition, after the winding operation is completed, the cutter 2021 will cut the optical fiber 2007 in the manner discussed above, which will result in another free end of the optical fiber being freely accessible on the opposite side of the mandrel. In accordance with one illustrative embodiment of the spooling tool, the position of the cutter 2021 is selected to ensure that the two free ends of the coiled section of optical fiber will be of approximately equal length, which provides advantages when used in accordance with other automated equipment for processing the coil of optical fiber. It should be appreciated that there are numerous other ways of producing a coil of fiber with both ends accessible, such that this aspect of the spooling tool is not limited to the particular implementation shown in FIG. 10.

Although the embodiment described above in connection with FIG. 10 employs a threading gripper 2013 and a separate winding gripper 2015, it should be appreciated that the spooling tool is not limited in this respect, as a single gripper alternatively can be employed to perform both the threading and winding functions discussed above.

In the embodiment of the invention illustrated in FIG. 10, the coiled section of optical fiber formed by the winder 2017 is automatically transferred to a transport medium in the form of a tray 2023. An example of one tray suitable for use with the embodiment of the spooling tool shown in FIG. 10 is described below. However, it should be appreciated that the embodiment of the spooling tool directed to automatically forming a coiled section of optical fiber is not limited to use with any particular transport medium.

In the embodiment illustrated in FIG. 10, the system 2003 is adapted for use in an assembly line system that includes a conveyor mechanism (not fully shown) for providing a tray 2023 to the system 226 for receiving a coiled section of optical fiber, and that then moves the tray 2023 away from the system 226 after a coiled section of optical fiber has been loaded onto the tray 2023. An example of a suitable conveyor mechanism is the transporter described above. However, it should be appreciated that the spooling tool is not limited to using this or any other type of conveyor system. In addition, although the use of a conveyor system provides a number of advantages in allowing the system 226 to be included in a larger overall system that automates other steps in the handling of the fiber coil, it should be appreciated that the embodiments of the spooling tool disclosed herein are not limited to use with such an automated conveyor system, as the steps of providing the tray 2023 to and removing the tray 2023 from the system 226 can be performed manually in other embodiments of the spooling tool. In the embodiment shown in FIG. 10, the system 226 includes a tray lifting assembly 2025 that lifts the tray 2023 from the conveyor mechanism to interact with the inserter 2031 to receive a fiber coil. Alternatively, the mandrel 2019 and inserter 2031 could be made movable relative to the tray 2023 to facilitate transfer of the fiber coil to the tray 2023.

In the embodiment of the spooling tool shown in FIG. 10, the winder 2017 includes a stripper 2027 that is constructed and arranged to automatically strip a wound coiled section of optical fiber from the mandrel 2019. As used herein, the term strip is meant to refer to removal of the coiled section of optical fiber from the mandrel without completely unwinding the coiled section of optical fiber. In this respect, one of the advantages to coiling a section of optical fiber is to ensure that the section of optical fiber can be confined in a relatively small work space when contrasted to the section of optical fiber being completely unwound. Therefore, it is desirable to remove the coiled section of optical fiber from the mandrel 2019 without completely unwinding it.

It should be appreciated that there are numerous techniques that can be employed for implementing the stripper to remove the coiled section. In the embodiment illustrated in FIG. 10, the stripper 2027 includes a component 2029 that is disposed adjacent the surface 2019s of the mandrel about which the optical fiber is wound. The stripper 2027 is mounted for movement relative to the mandrel 2019, for example in a direction along the axis B about which the mandrel rotates. As the stripper 2027 is moved downwardly in FIG. 10, the component 2029 pushes down on the wound section of optical fiber to strip it from the mandrel 2019. The component 2029 can take any of numerous forms, as the spooling tool is not limited to any particular configuration. In one embodiment of the spooling tool, the component 2029 is a cylindrical sleeve that matches a cylindrical shape of the mandrel 2019. The component 2029 need not extend all the way around the mandrel, as it can include spaced sections disposed at one, two or more locations about the mandrel to achieve the same function. However, in accordance with one illustrative embodiment of the spooling tool, the stripper is arranged to have a contour that matches the winding surface (e.g., the mandrel surface 2019s) about the entire circumference of the winding surface. As used herein, the reference to the circumference of the surface is intended to relate to any curved surface, and is not intended to be limited to a circle. By using a stripper that has a contour that matches the entire circumference of the winding surface, it is possible to have the stripper apply an essentially equal stripping force to the coil about the entire circumference, which is advantageous in smoothly stripping the coil off of the winding surface, without damaging it. Although this provides the advantages discussed above, it should be appreciated that this is not a limitation of all embodiments of the spooling tool, as other configurations are possible.

While the stripper 2027 is movably mounted to the mandrel 2019 in accordance with one embodiment of the spooling tool, it should be appreciated that in an alternate embodiment of the invention, the stripper 2027 can be stationary, and the mandrel 2019 can be mounted for movement relative thereto, for example, to enable movement of the mandrel upward in FIG. 10.

The system 226 illustrated in FIG. 10 further includes an inserter 2031 that handles the two ends of the coiled optical fiber created after the section of optical fiber has been wound about the mandrel 2019. In the embodiment shown, the inserter 2031 includes a pair of arms 2031a and a pair of handlers 2031h mounted thereto. The arms 2031a space the handlers 2031h from the surface of the mandrel 2019s, and position the handlers 2031h adjacent to the ends of the fiber coil. As opposed to the stripper component 2029 that may simply be a flat surface to push the wound fiber off of the mandrel, the stripper 2031 includes handlers 2031h because the ends of the fiber can benefit from more support when removing the fiber coil from the mandrel and inserting it into the tray 2023. In this respect, in accordance with one embodiment of the spooling tool, the tray 2023 includes particular features that are adapted to restrain the free ends of the coiled optical fiber. Therefore, by employing handlers 2031h to handle the ends upon insertion, the apparatus of the spooling tool shown in FIG. 10 can ensure that the ends of the fiber coil are precisely aligned with the appropriate features on the tray 2023.

In the illustrative embodiment shown in the FIGS., the surface 2019s of the mandrel 2019 about which the optical fiber is wound is a continuously curved surface (e.g., a cylinder). This is advantageous in that it minimizes the bending stresses on the optical fiber during the winding operation. However, it should be appreciated that this is not a limitation of all embodiments of the spooling tool, as other configurations are possible For example, in accordance with one illustrative embodiment of the spooling tool, the winding surface is sized and shaped to insure that a minimum bending radius of the optical fiber is not violated during the formation of the fiber coil.

It should be appreciated that in the embodiment of the spooling tool described above, the acts of stripping the fiber coil from the mandrel 2019 and inserting the fiber coil into the tray 2023 are performed without gripping the optical fiber. In this respect, the component 2029 of the stripper 2027 simply pushes the coil off of the mandrel 2019, without gripping the coil. Similarly, in accordance with one illustrative embodiment of the spooling tool, the handlers 2031h of the inserter 2031 also only exert downward force on the fiber but do not grip it. By performing the stripping and insertion functions without gripping the fiber, potential damage to the fiber from the gripping operation is avoided. Although this is advantageous, it should be appreciated that all embodiments of the spooling tool are not limited in this respect, and that it is possible to perform the stripping and/or inserting operations using gripping devices.

It should be appreciated that the structure of the inserter 2031 shown in FIG. 10 is provided merely for illustrative purposes, as numerous other configurations are possible. For example, although the handlers 2031h provide the advantages discussed above, it should be appreciated that they are not required in all embodiments of the spooling tool.

The sequence of operation of the components of the system 226 described above can be varied in numerous ways. For example, in accordance with one embodiment of the spooling tool, the handlers 2031h are V-shaped fiber guides that position the ends of the fiber in features of tray 2023, and cutter 2021 cuts the optical fiber once the handlers 2031h have asserted downward force on the optical fiber (so that tension will be maintained on the optical fiber) and inserted the fiber ends into the tray, but prior to the wound section of optical fiber being inserted into the tray 2023. However, in an alternate embodiment of the spooling tool, the cutter 2021 does not cut the optical fiber 2007 until after the fiber coil has been stripped from the mandrel 2019 and inserted into the tray 2023, in which case the handlers need not assert force on the ends of the fiber to maintain tension thereon.

Figure 23:
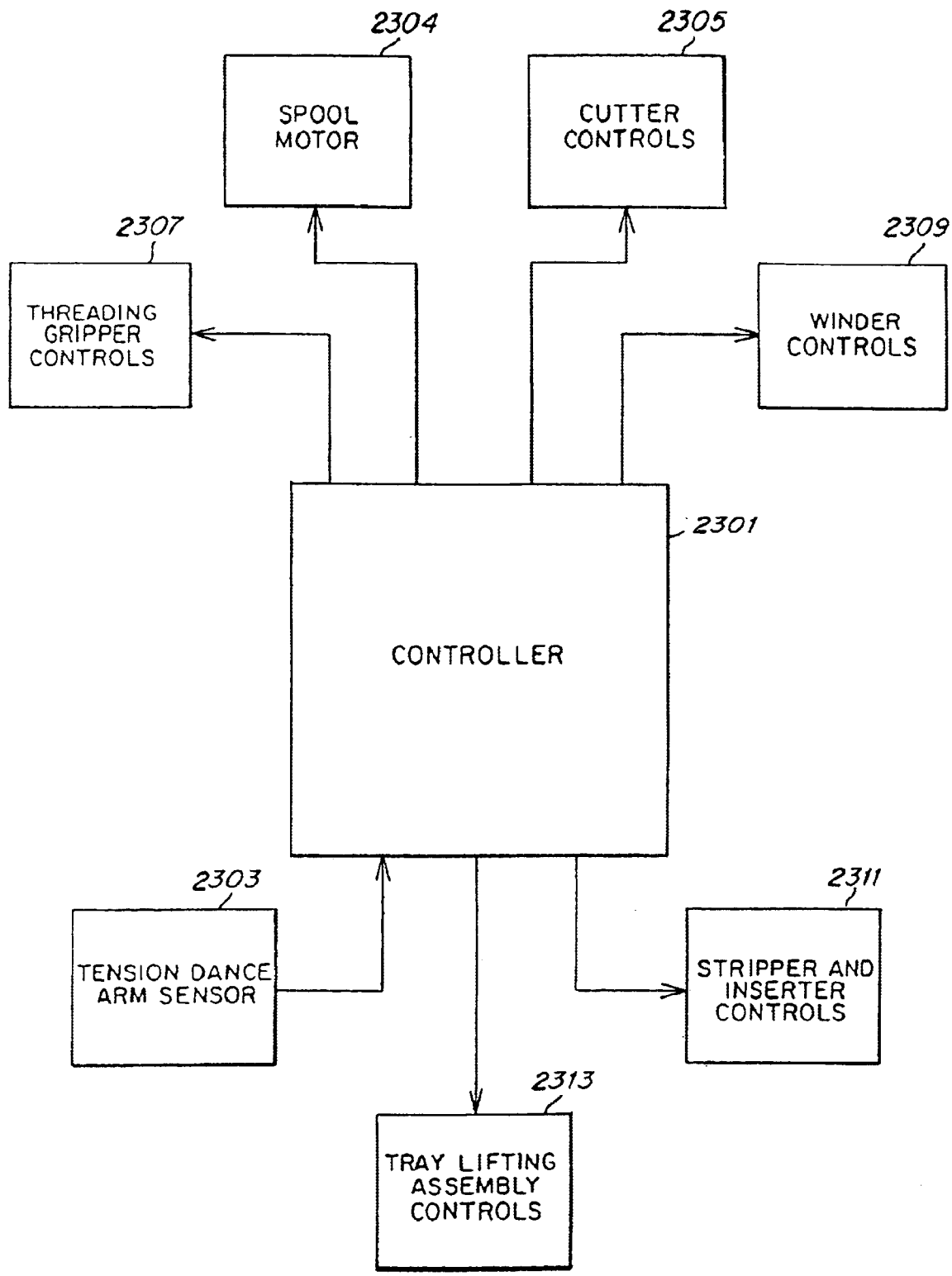
FIG. 23 is a block diagram of a control circuit for operating the system of FIGS. 11–12.

It should be appreciated that there are a number of moving parts in the system of FIG. 10. In accordance with one illustrative embodiment of the spooling tool, a control system (illustrated schematically in FIG. 23) is provided to coordinate control of each of these movable components of the system. In the illustrative embodiment shown in FIG. 23, a controller 2301 receives an input from a sensor 2303 associated with the tension dance arm assembly 2009, and uses that information to control a spool motor 2304 as discussed above. The controller 2301 also controls actuation of cutter controls 2305 that control actuation of the cutter 2021 (FIG. 10), threading gripper controls 2307 that control actuation of the grippers on the threading gripper 2013, as well as movement of the threading gripper 2013 to advance the optical fiber 2007 toward the winder 2017. In addition, the controller 2301 controls actuation of winder controls 2309 to control rotation of the winder 2017 and actuation of the winder grippers 2015, stripper controls 2311 that control actuation of the stripper 2027 and inserter 2031, and tray lifting assembly controls 2313. It should be appreciated that by controlling actuation of each of these components via a central controller 2301, coordination of the system can be achieved, to ensure that each component performs the appropriate action at the appropriate time.

The controller 2301 can be implemented in any of numerous ways, as the spooling tool is not limited to any particular technique. In accordance with one illustrative embodiment of the spooling tool, the controller 2301 is a processor that is programmed (via software) to perform the above-recited control functions, and to coordinate interaction amongst the various system components. Of course, it should be appreciated that other implementations are possible, including the use of a hardware controller, and/or multiple controllers that replace the single central controller 2301.

It should be appreciated that the system 226 schematically illustrated in FIG. 10 can be implemented in any of numerous ways, as the spooling tool is not limited to any particular implementation technique. A detailed explanation is provided below of an illustrative machine that implements the system 226 of FIG. 10. Of course, this implementation is provided merely for illustrative purposes, as numerous other implementations are possible.

Figure 11:
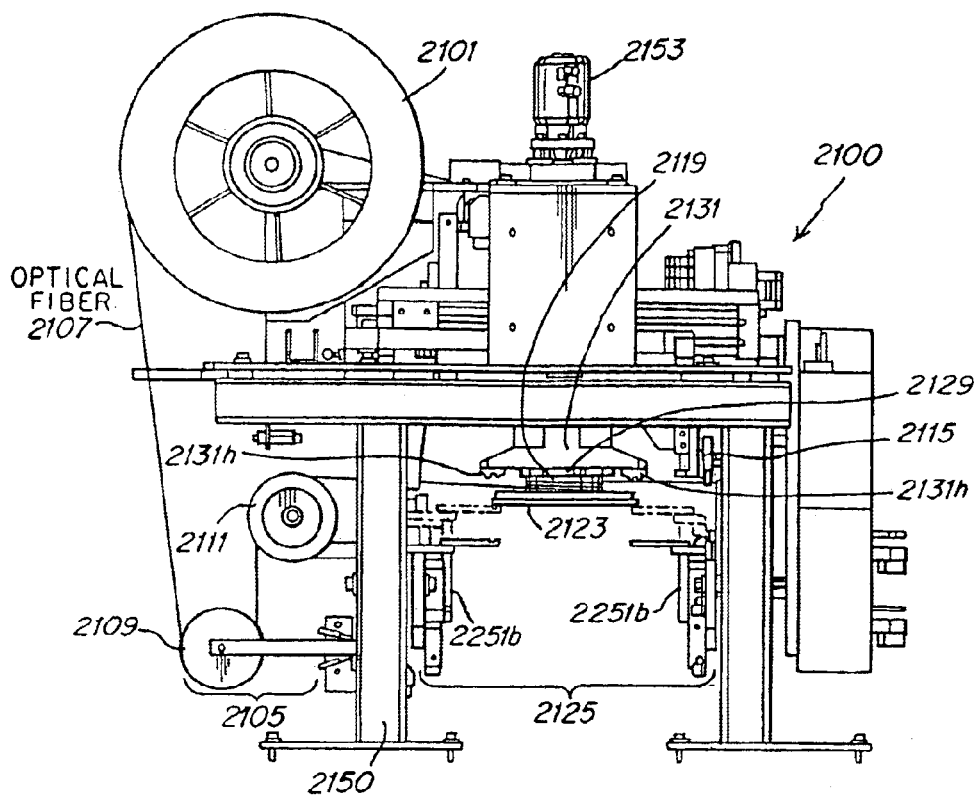
FIG. 11 is a side view of an illustrative machine for implementing the system of FIG. 10.
Figure 12:
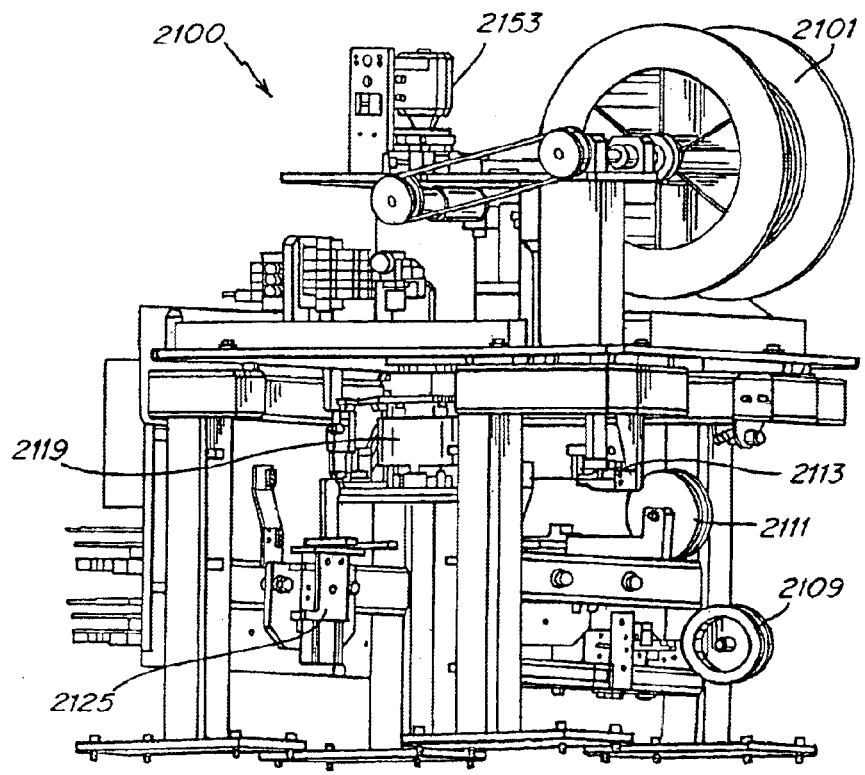
FIG. 12 is a perspective view of the machine of FIG. 11.

FIGS. 11–12 illustrate different views of a complete machine 2100 for implementing the system 226 of FIG. 10, with FIG. 11 being a side view of the machine 2100 having an optical fiber 2107 threaded therethrough, and with FIG. 12 being a perspective view of the machine 2100 without an optical fiber being threaded therethrough.

The machine 2100 includes a spool 2101 of optical fiber 2107, as well as a feeder 2105 to feed the optical fiber 2107 to the other components of the machine 2100. The feeder 2105 includes a tension dance arm assembly 2109 and an idler 2111, which perform the functions discussed above in connection with the tension dance arm assembly 2009 and idler 2011 of FIG. 10. In this respect, while the more detailed components illustrated in FIGS. 11–12 perform essentially the same functions as discussed above with the schematic representation in FIG. 10, different reference numerals are used in the more detailed FIGS. 11–12, to denote that the components are not identical to the schematic representations shown in FIG. 10. Stated differently, it should be appreciated that the more detailed components illustrated in FIGS. 11–12 are merely examples of ways in which the schematic components discussed above in connection with FIG. 10 can be implemented.

The machine 2100 includes a threading gripper 2113 (see FIGS. 11–12) that performs the function of the threading gripper 2013 of FIG. 12, as well as a winder 2117 that includes a mandrel 2119 and winding gripper 2115 that perform the functions of the components of the winder 2017 discussed in connection with FIG. 10. In addition, the machine 2100 includes a stripper that includes a cylindrical sleeve 2129 and an inserter 2131 that includes handlers 2131h that perform the functions of the stripper and inserter components discussed above in connection with the schematic illustration of FIG. 10. Furthermore, the machine includes a tray lifting apparatus 2125 to present a tray 2123 to the stripper 2131 to receive a coiled section of optical fiber 2107, in much the same manner as the schematic components discussed above in connection with FIG. 10. The machine 2100 includes a base or frame 2150 that supports each of the other components.

Figure 13:
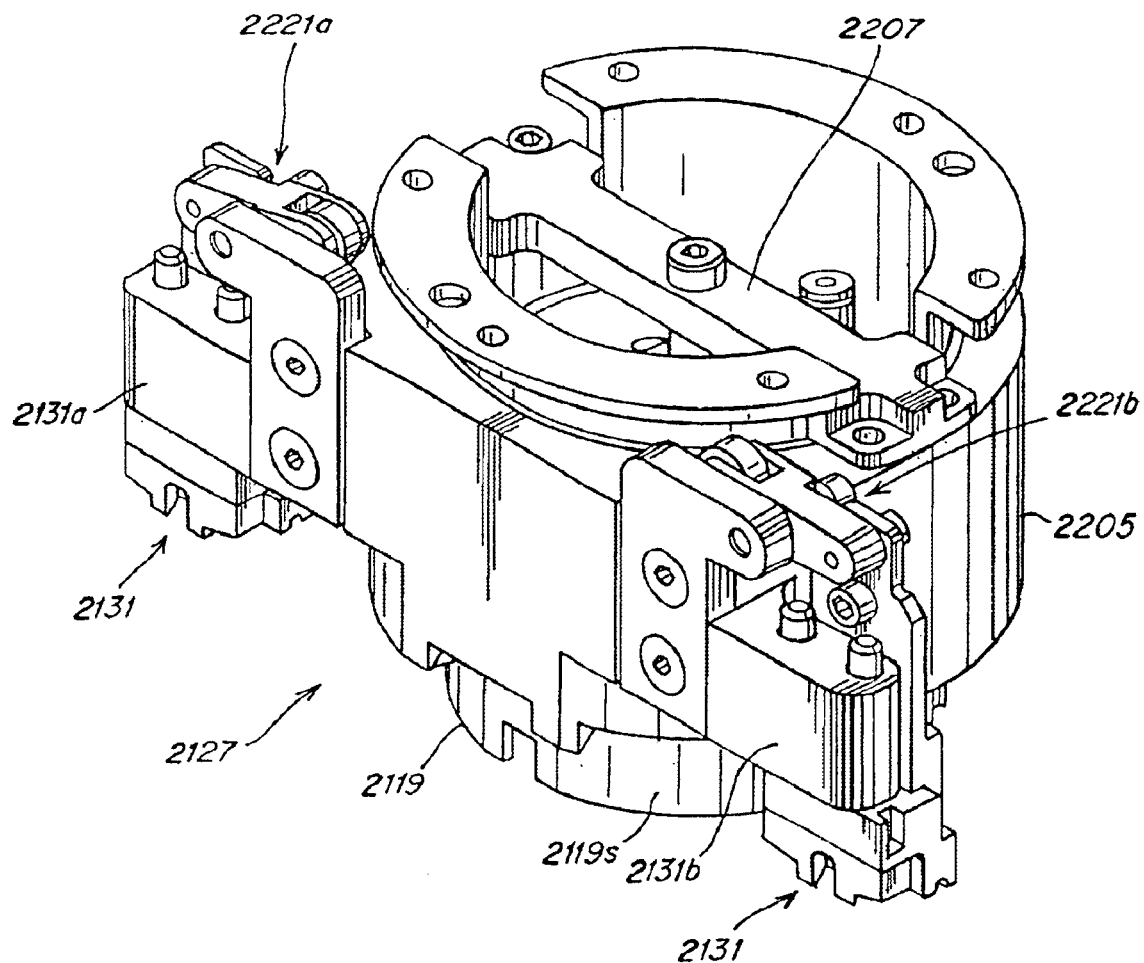
FIG. 13 is a perspective view of certain components that form the winder of the machine of FIGS. 11–12.

A more detailed exploded perspective view of the mandrel 2119 is provided in FIG. 13. In the embodiment shown, the mandrel 2119 has a cylindrical shape. However, it should be appreciated that the spooling tool is not limited in this respect, and that the mandrel 2119 can take any suitable shape that enables the optical fiber to be wound about it. In the embodiment shown, the optical fiber is wound, by the winding gripper 2115, about the mandrel 2119 in a helical coiled pattern. The machine 2100 can be adapted for use with fibers of various diameters. For example, the machine 2100 can be used to process optical fibers having diameters between 180 μm and 900 μm, although the machine 2100 can obviously be adapted to work with fibers of other sizes. In accordance with one embodiment of the spooling tool, the mandrel 2119 has a diameter of approximately 75 millimeters, and the winding gripper 2115 is spaced from the mandrel 2119 so that each 360° rotation of the mandrel 2119 winds approximately one-quarter meter of optical fiber about the outer surface 2119s of the mandrel. With a single rotation of the mandrel 2119, a 0.75 meter segment of coiled optical fiber can be formed with each successive 360° rotation of the mandrel 2119 adding 0.25 meters to the optical fiber coil. It should be appreciated that the diameter of the mandrel 2119 can be selected to any desired diameter, and will impact the diameter of the fiber coil formed by the machine 2100. In addition, the diameter of the mandrel will, along with the number of rotations of the mandrel used in forming a coil, impact the length of fiber included in a fiber coil formed by the machine 100. In one embodiment of the spooling tool, the mandrel diameter is also selected to prevent a coiled fiber from reaching a minimum bend radius when it is wound about the mandrel, which would cause damage to the optical fiber. For many optical fibers used in the applications discussed above, the minimum bend radius is 35 millimeters.

Figure 14:
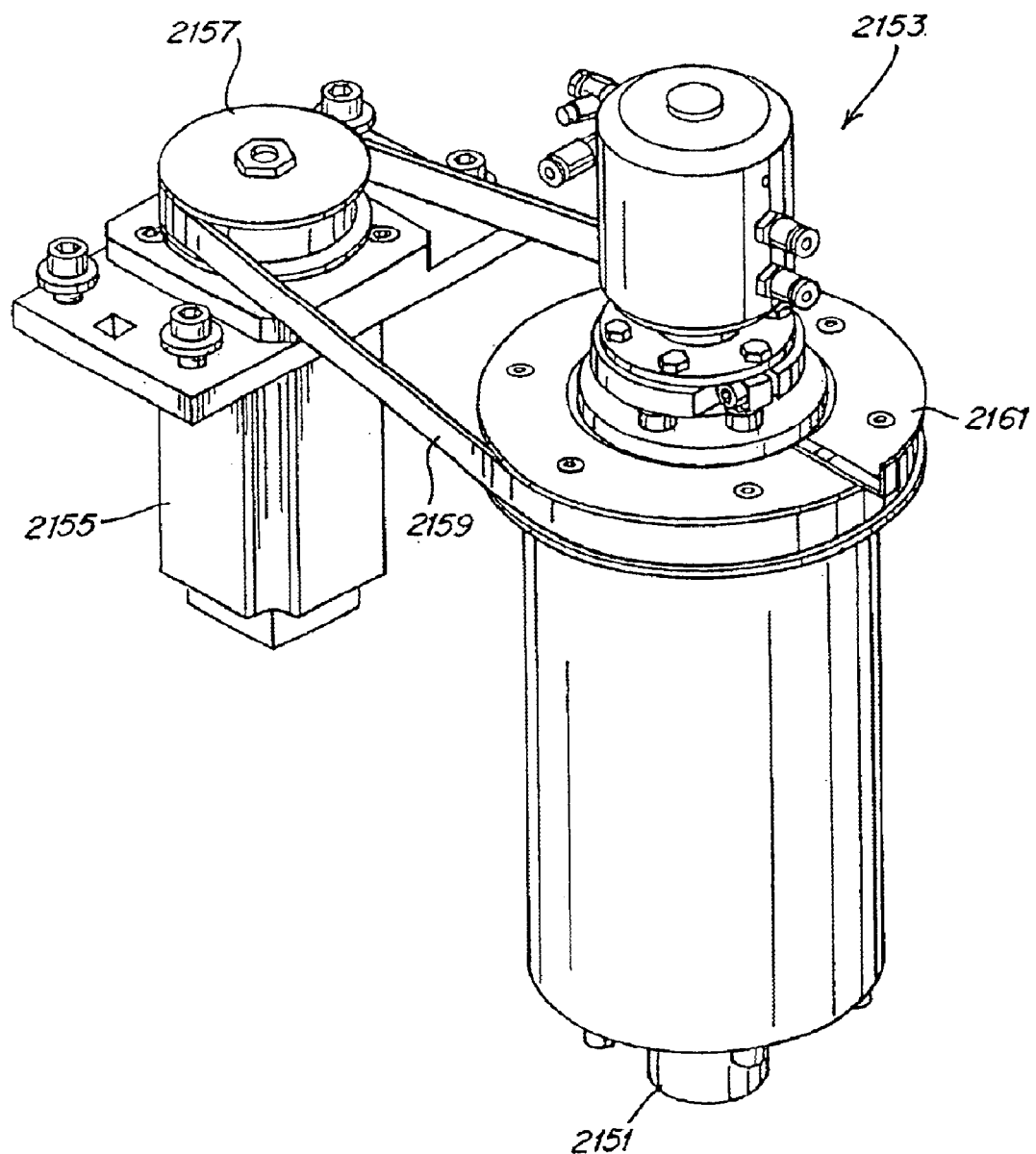
FIG. 14 is a perspective view of additional components relating to the winder of the machine of FIGS. 11–12.

It should be appreciated that the mandrel 2119 can be rotated in any of numerous ways. In the illustrative embodiment shown in the FIGS., the mandrel 2119 is driven by a mandrel winding shaft 2151 (see FIGS. 14–15). The mandrel winding shaft 2151 is in turn driven by a spindle assembly 2153 (see FIGS. 11–12 and 14). The spindle assembly 2153 includes a servo motor 2155 that drives a drive pulley 2157, which is coupled, via a timing belt 2159, to a shaft pulley 2161, which is in turn coupled to the mandrel winding shaft 2151 to cause rotation thereof. Again, the spindle assembly 2153 illustrated in FIG. 14 is merely one example of a technique for driving rotation of the mandrel 2119, as numerous other techniques are possible, such that the spooling tool is not limited to the spindle assembly 2153 illustrated in FIG. 14, or any other type of drive mechanism.

Figure 15:
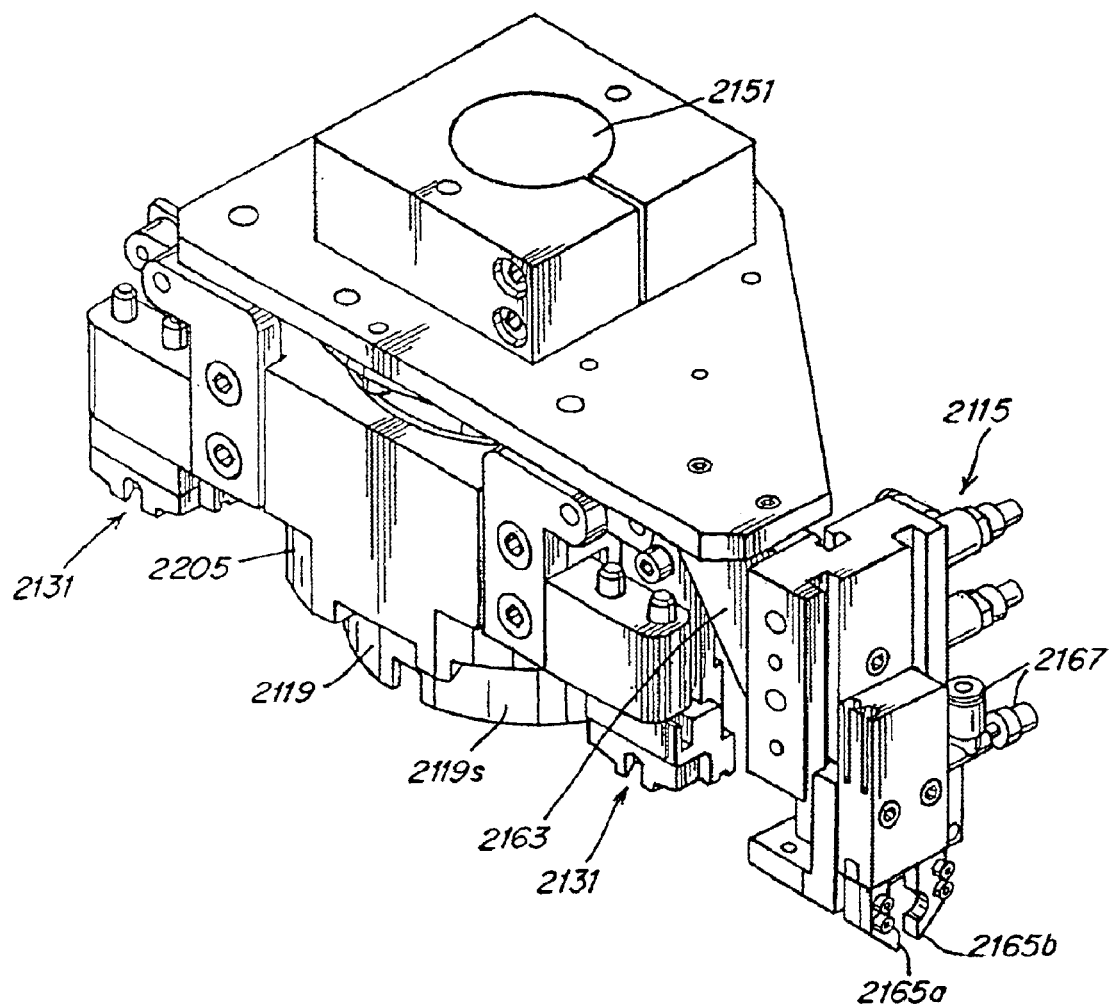
FIG. 15 is a perspective view of certain components of the stripper of the machine of FIGS. 11–12.
Figure 16:
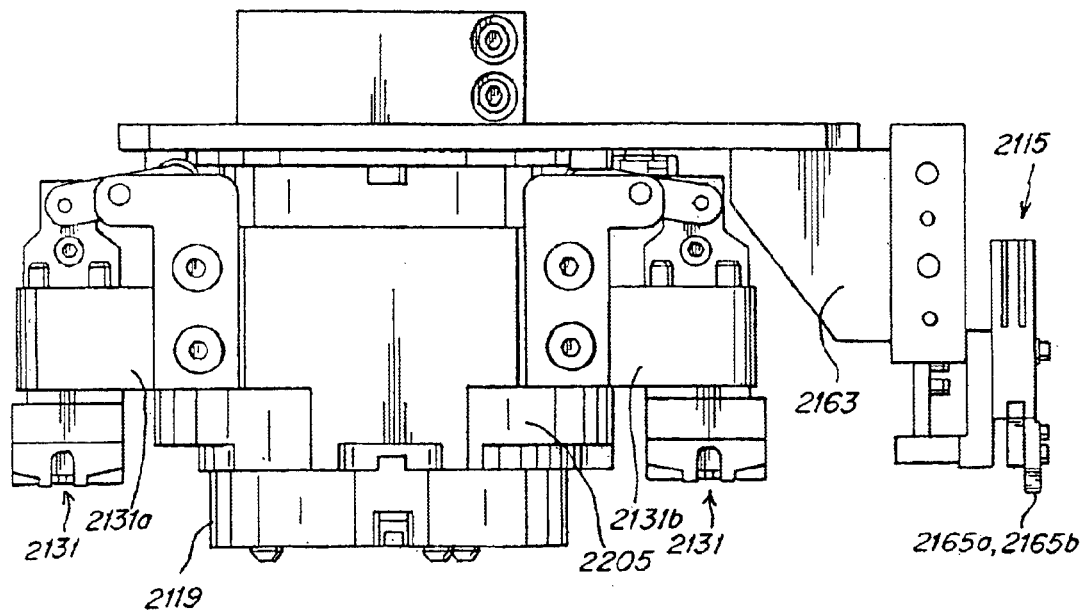
FIG. 16 is a side view of the winder and stripper of the machine of FIGS. 11–12.

A more detailed view of one illustrative technique for implementing the winding gripper 2115 (see FIGS. 11–12) is provided in FIGS. 15–16. The winding gripper 2115 is mounted to the mandrel 2119, via a mounting brace plate 2163, in such a way that rotation of the mandrel 2119 about its rotational axis causes corresponding and equal rotation of the winding gripper 2115 about the mandrel axis. In the embodiment illustrated in FIG. 15, the winding gripper 2115 includes a pair of gripping fingers 2165a, 2165b that are adapted to pinch the optical fiber 2107 and hold it in place. The pinching force for the gripping fingers 2165a, 2165b can be applied, for example, by a controllable pneumatic pressure unit 2167 or any other technique suitable for exerting sufficient pressure to cause the gripping fingers to hold the fiber in place without damaging it. It should be appreciated that the winding gripper 2115 alternatively can be implemented using arrangements other than a dual gripping finger configuration. For example, the optical fiber 2107 can be held in place by a gripping assembly having a cylindrical opening into which the fiber is placed, with a centripetal force applied to the fiber holding it in place during winding, or using any other suitable configuration.

In the embodiment shown in the FIGS., it is the mandrel 2119 that is rotatable relative to the frame 2150 (FIG. 11), with the winding gripper 2115 being mounted for rotation in a fixed orientation relative to the mandrel. However, it should be appreciated that other techniques are possible, including using a fixed mandrel 2119 and a winding gripper 2115 that is rotatably mounted relative to the fixed mandrel 2119.

Figure 17:
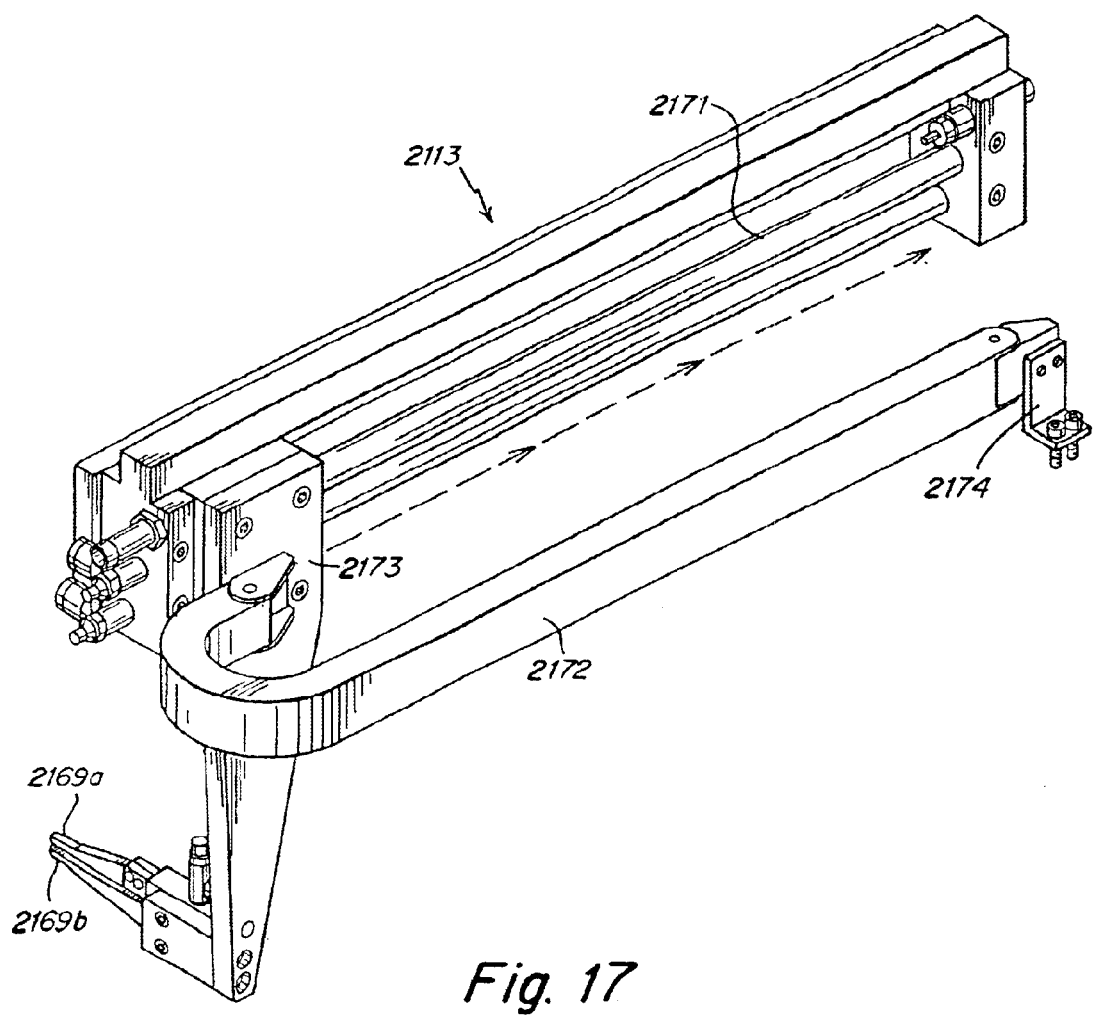
FIG. 17 is a perspective view of components of the threading gripper in the machine of FIGS. 11–12.

An illustrative implementation of the threading gripper 2113 is shown in FIG. 17. The threading gripper 2113 includes a pair of gripping fingers 2169a, 1269b that work in much the same manner as the gripping fingers 2165a, 2165b described above in connection with the winding gripper 2115. As discussed above, when a new spool 2101 of optical fiber 2107 is installed onto the machine 2100, the optical fiber 2107 can be manually fed through the gripping fingers 2169a, 2169b. The threading gripper 2113 further includes a track 2171 that receives a sliding mount 2173 to which the gripping fingers 2169a, 2169b are mounted. The track 2171 is supported by the frame 2150 so that the gripping fingers 2169a, 2169b are movable from a position adjacent the idler 2111 to a position accessible to the winding gripper 2115. As should be appreciated from the discussion of the schematic illustration in FIG. 10, the gripping fingers 2169a, 2169b initially grip a free end of the optical fiber 2107, then slide over the track 2171 to a position adjacent the winding gripper 2115, enabling the winding gripper 2115 to grasp the free end of the optical fiber 2107. At that point, the gripping fingers 2169a, 2169b release their grip on the optical fiber and the sliding mount 2173 returns, via the track 2171, to its original position, with the fiber continuing to pass between the gripping fingers 2169a, 2169b. After the winding operation is complete, the gripping fingers 2169a, 2169b again grasp the optical fiber 2107 in preparation for the cutter 2121 cutting the optical fiber in the manner discussed above.

Actuation of the gripping fingers 2169a, 2169b and movement of the sliding mount 2173 across the track 2171 can be controlled in any of numerous ways, as the spooling tool is not limited to any particular control technique. In accordance with one embodiment of the spooling tool, these components are pneumatically controlled, in much the same manner as the gripping fingers 2165a, 2165b of the winding gripper 2115 described above. Movement of these and the other movable components of the machine 2100 can be controlled and coordinated by a centralized controller as described below, or in any other suitable manner. In the embodiment shown in FIG. 17, the threading gripper 2113 includes a flexible sleeve 2172 that is coupled between the sliding mount 2173 and a fixed mount 2174 that can be mounted to the frame 2150 (FIG. 11). The flexible sleeve can be used to house control wires or cables to couple the sliding mount 2173 and the gripping fingers 2169a, 2169b to a controller.

It should be appreciated that the threading gripper 2113 need not employ a pair of gripping fingers 2169a, 2169b, nor a linear tracking mechanism as described above, as numerous other configurations are possible. For example, any movement of the gripping fingers 2169a, 2169b from a position adjacent the idler 2111 to a position adjacent the winding gripper 2115 can be employed, as linear movement is not required. In addition, these components need not be controlled pneumatically, as other types of control can be employed, including hydraulic, electrical or other actuation control techniques. Furthermore, it should be appreciated that the machine 2100 need not include a threading gripper 2113 that is distinct from the winding gripper 2115, as both gripping functions can alternatively be formed by a single gripping component.

Figure 18:
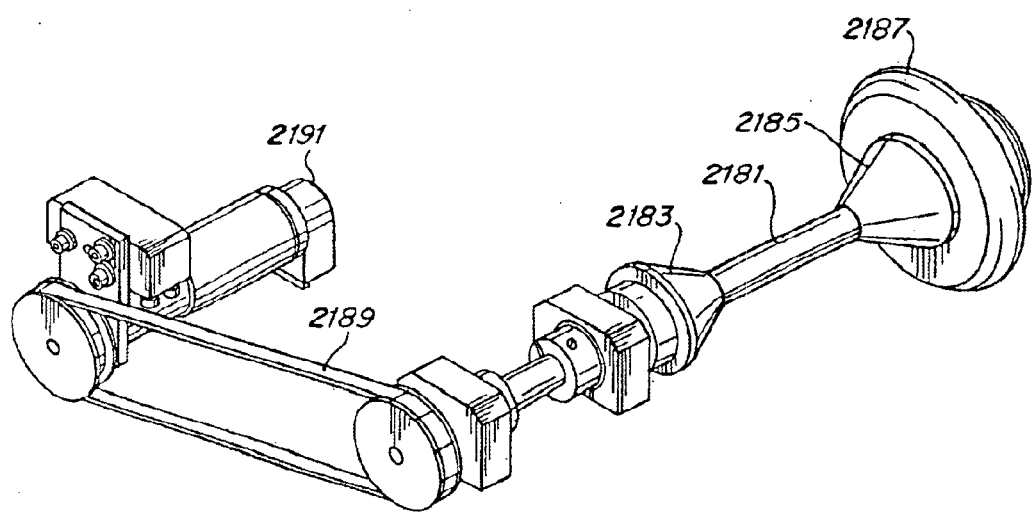
FIG. 18 is a perspective view of components of a payout spool assembly for the machine of FIGS. 11–12.
Figure 19:
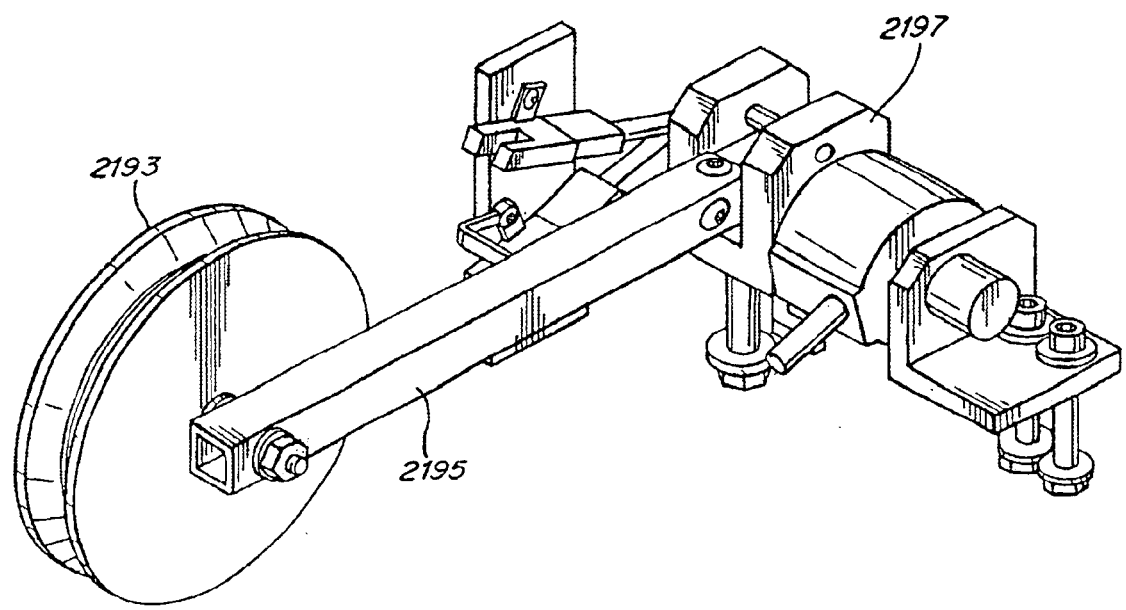
FIG. 19 is a perspective view of the dancer arm assembly of the machine of FIGS. 11–12.
Figure 20:
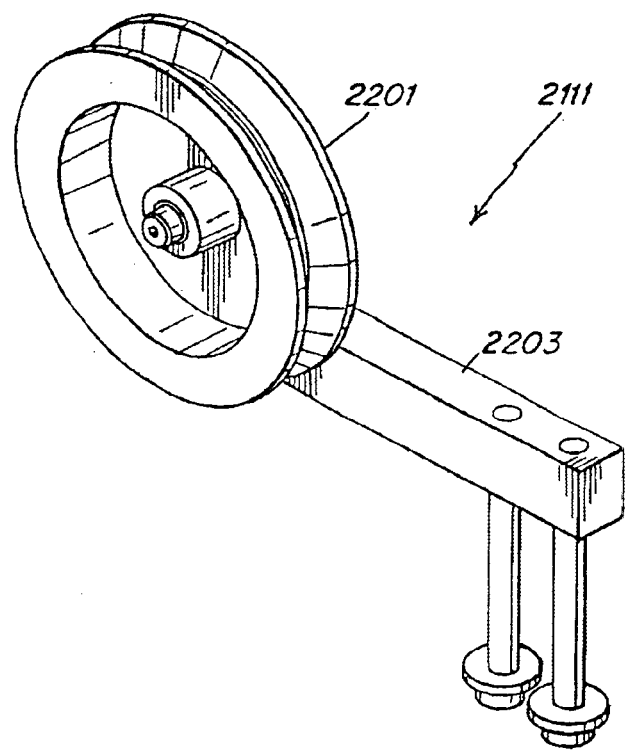
FIG. 20 is a perspective view of the idler of the machine of FIGS. 11–12.

An illustrative implementation of the feeder 2105 is shown in FIGS. 18–20. The feeder 2105 includes a spool shaft 2181 to support a spool 2101 including the optical fiber 2107. Conical bushings 2183, 2185 are mounted on the spool shaft 2181 and are adapted to securely seat and hold the fiber spool 2101 on the shaft. These components can be dimensioned to accommodate spools 2101 of any size. For example, in one embodiment of the spooling tool, the spool shaft 2181 and the bushings 2183, 2185 are adapted to accommodate spools 2101 with an outside diameter of up to twelve inches, a width of up to five inches, a core diameter of up to two inches, and spool weight of five pounds. Of course, it should be appreciated that the spooling tool is not limited in this respect, and that the machine components can be adapted to accommodate spools 2101 of different sizes and dimensions.

Once the spool 2101 is empty, it can be removed from the shaft 2181 by removing the exterior conical bushing 2185 along with an associated spool tightening dial 2187, and then slidably removing the spool 101 from the shaft 2181. The spool shaft 2181 is connected to a stock driver and belt assembly 2189 to rotate the spool shaft 2181, and thereby dispense the optical fiber 2107 to the other components of the machine 2100. A motor 2191 is used to actuate the stock drive and belt assembly 2189 and control the rate of dispensing the optical fiber 2107. The motor 2191 is responsive to controls received from the tension dance arm assembly 2109 to control the rate at which the optical fiber 2107 is dispensed, in the manner discussed above.

It should be appreciated that the spooling tool is not limited to the particular spool mounting and drive mechanism shown in FIG. 18, as numerous other implementations are possible.

An illustrative implementation of the tension dance arm assembly 2109 is shown in FIG. 19. The tension dance arm assembly and idler can be adapted, along with the spool mounting and drive mechanism of FIG. 18, to maintain a predefined tension in the optical fiber. In accordance with one embodiment of the spooling tool, the tension in the optical fiber is maintained below grams, although the machine can be adapted to maintain the fiber 2107 at a different tension.

In the embodiment of the invention shown in FIG. 19, the tension dance arm assembly 2109 includes a dancer pulley 2193 that is rotatably mounted to a dancer arm 2195, which is in turn pivotally mounted to a mounting block 2197 that is mounted to the frame 2150 (FIG. 11). The dancer arm 2195 can be mounted to the frame 2150 at any suitable location. As discussed above in connection with FIG. 10, the gravitational pull on the dancer pulley 2193 and dancer arm 2195 creates tension in the fiber 2107 between the spool 2101 and the threading gripper 2113 and the winder 2117. An encoder (not shown) or other sensor located at the point where the dancer arm 2195 is pivotally mounted to the block 2197 senses the angle of elevation of the dancer arm 2195. Based on this sensor information, a controller sends control signals to the spool payout motor 2191 (FIG. 18) to control the rate of dispensing the optical fiber 2107. As discussed above in connection with FIG. 10, the rotation of the spool can be increased, decreased, stopped or even reversed, with the goal of the control system being to provide feedback to the feeder 2105 to maintain a constant elevation of the dancer arm 2195, which results in maintenance of a constant tension in the optical fiber 2107.

An illustrative implementation of the idler 2111 is shown in FIG. 20. The idler 2111 includes an idler pulley 2201 that is rotatably mounted to a pulley mount 2203. The pulley mount 2203 is mounted to the frame 2150 (FIG. 11), and can be positioned in any suitable position between the dancer pulley 2193 and the threading gripper 2113. In accordance with one illustrative embodiment of the spooling tool, the idler 2111 is positioned so that a top surface of the pulley 2201 is aligned with the threading gripper 2113, so that the optical fiber 2107 forms an essentially straight horizontal line when extending between the idler 2111 and the winder 2117, although numerous other configurations are possible.

An illustrative implementation of the stripper 2127 is shown in FIG. 13. As discussed above in connection with FIG. 10, one component of the stripper 2127 is adapted to fit closely to an outer surface 2119s of the mandrel 2119. In the embodiment of FIG. 13, this component is a cylindrical sleeve 2205 having an inner diameter that is only slightly larger than the outer diameter of the cylindrical mandrel 2119, such that the tolerance between the sleeve 2205 and the mandrel 2119 is less than one half the diameter of the optical fiber 2107. This close tolerance ensures successful stripping of the optical fiber 2107. Of course, as discussed above, numerous other configurations are possible. The cylindrical sleeve 205 is arranged so that when the optical fiber 2107 is being wound about the mandrel 2119 by the winder 2117, the sleeve 2205 is disposed above the surface 2119s of the mandrel 2119 that receives the optical fiber. Within the interior of the cylindrical sleeve 2205 is an air cylinder (not shown) that is fastened to a mount 2207. When the air cylinder is actuated (i.e., under computer control), the mount 2207 and the cylindrical sleeve 2205 move downwardly (i.e., in the direction of the arrows shown schematically in FIG. 10) with the cylindrical sleeve 2205 sliding over and in close tolerance with the mandrel 2119 to push the fiber coil off of the lower end of the mandrel 2119 and into the work tray 2123. The air cylinder then causes the cylindrical sleeve 2205 to retract over the mandrel surface 2119s and return to its original position.

As mentioned above, it should be appreciated that numerous alternative configurations to perform the stripping function are possible, such that the spooling tool is not limited to the particular configuration shown in FIG. 13. An example of an alternative arrangement includes using mechanical stripping arms that pull the coiled fiber from the mandrel 2119, as opposed to the cylindrical sleeve 2205 that pushes it from above.

Figure 16A:
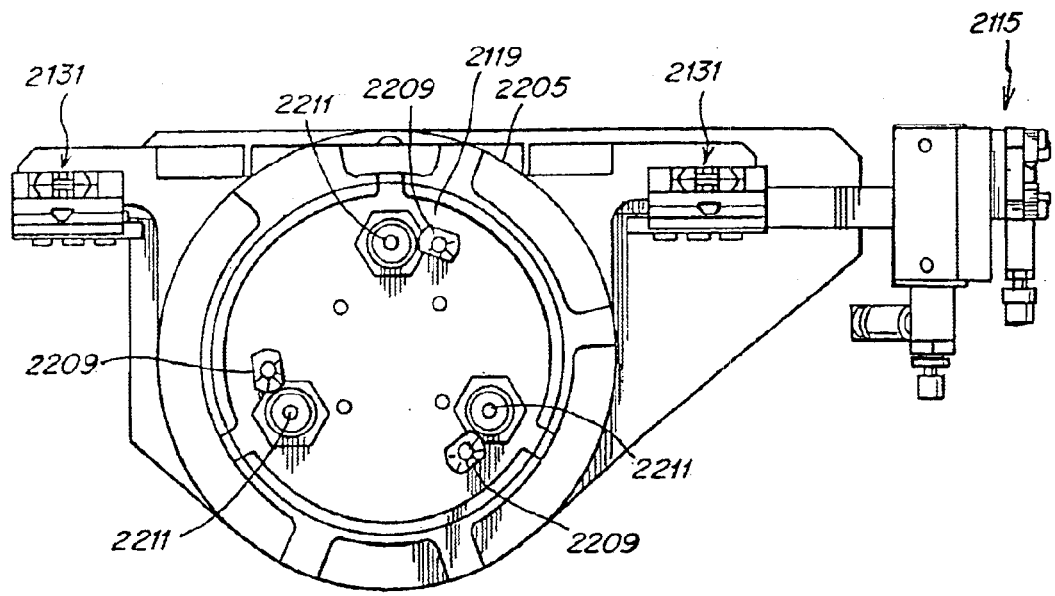
FIG. 16a is a bottom view of the mandrel used in the winder of the machine of FIGS. 11–12.

An illustrative implementation of the inserter 2131 is shown in FIGS. 13, 16 and 16a. As shown in FIG. 16a, the mandrel 2119 has a plurality of tray locator pins 2209 fixed in position on its bottom surface. The tray locator pins 2209 are adapted to mate with receiving features on the work tray 2123 to mechanically align the work tray and allow the fiber coil being stripped from the mandrel 2119 to be transferred to a precise position in the work tray 2123, and are specifically adapted to work with a work tray 2123 as described and explained below. In the embodiment shown, the mandrel 2119 also includes extendable tray actuator pins 2211 that open the corresponding features on the work tray 2123 to enable the fiber coil to be inserted into and secured on the work tray 2123. The tray actuator pins can be actuated in any of numerous ways. For example, the tray actuator pins 2211 can be pneumatically activated to extend from their initial position in the mandrel 2119 to interact with the corresponding features in the work tray 2123, or can be actuated in any other suitable way. After the fiber coil is inserted into the work tray 2123, the tray actuator pins 2211 can retract into the mandrel 2119 to their initial position. The configuration, number and locations of the locator pins 2209 and tray actuator pins 2211 can obviously be varied from the illustrative embodiment shown in FIG. 16a, as the spooling tool is not limited to the particular configuration shown. Furthermore, it should be appreciated that numerous other features and techniques can be employed for aligning the work tray 2123 with the winding surface on the mandrel 2119 to facilitate inserting the fiber coil into a precise location in the work tray 2123, as this aspect of the spooling tool is not limited to any particular implementation technique.

As discussed above in connection with FIG. 10, the inserter 2131 handles the free ends of the fiber coil and inserts the free ends into precise locations in the work tray 2123, so that when the work tray is used with other automated tools, the free ends of the fiber coil can be precisely located by the other tools. It should be appreciated that although the use of a pair of inserter components to separately handle the two free ends is advantageous, all embodiments of the spooling tool are not limited thereto. For example, a single inserter component can be adapted to interact with both ends of the fiber coil, only a single inserter component can be used if it is only desirable to precisely position one end of the fiber coil, or no inserter components need be used if it is not necessary to precisely locate either end of the fiber coil.

In the illustrative embodiment shown in FIG. 13, the inserter 2131 is implemented by arm assemblies 2131a, 2131b that are pivotally mounted to the cylindrical sleeve 2205 via cam assemblies 2221a and 2221b, respectively. As the cylindrical sleeve 2205 is lowered over the mandrel 119 to strip the fiber coil therefrom, the arm assemblies 2131a, 2131b also are lowered and engage the ends of the fiber coil. In the embodiment shown, the arm assemblies 2131a, 2131b include fiber capturing features that are V-shaped to guide the fiber for insertion into the work tray 2123. The downward force of the inserter arm assemblies 2131a, 2131b applied to the ends of the fiber coil is created by a gravity-induced pivoting of the cam assemblies 2221a, 2221b, as the arm assemblies move in a downward direction with the cylindrical sleeve 2205. Additional downward force is generated via compression springs (not shown) located within the inserter arm assemblies 2131a, 2131b. The spring loaded arm assemblies also act to limit the maximum insertion force applied against the fiber going into the work tray 2123, to ensure that the optical fiber is not damaged. It should be appreciated that the force applied by the compression spring can alternatively be provided by numerous other mechanisms, examples of which include a solenoid, an air cylinder and an elastomeric member.

Again, it should be appreciated that the inserter 2131 alternatively can be implemented in numerous other ways, as the spooling tool is not limited to the particular implementation shown.

Figure 21:
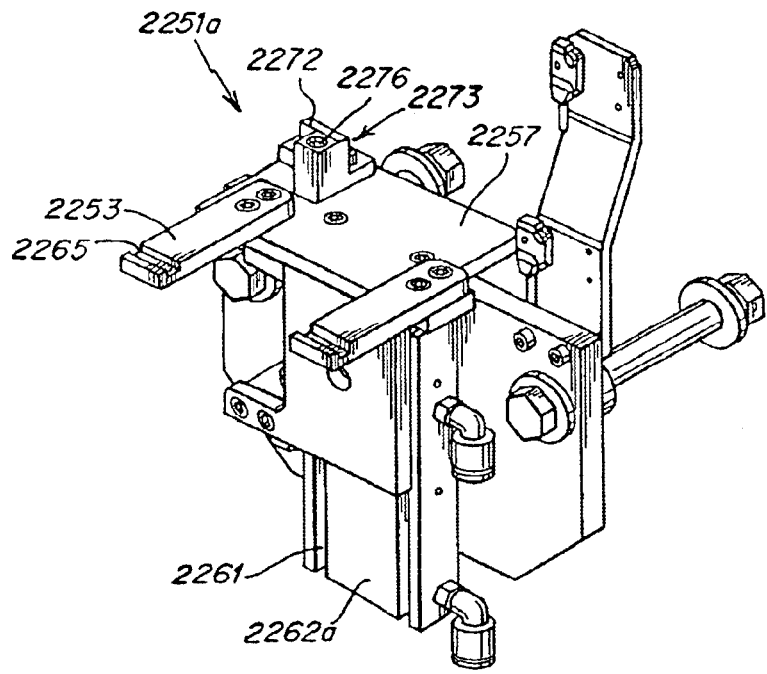
FIG. 21 is a perspective view of the far tray lifting sub-assembly of the machine of FIGS. 11–12.
Figure 21A:
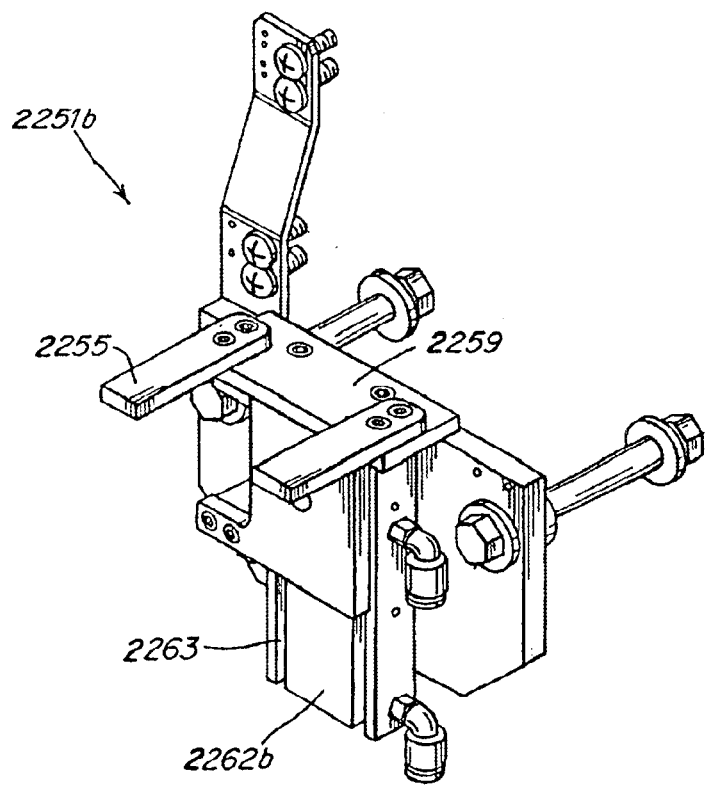
FIG. 21a is a perspective view of the near tray lifting sub-assembly of the machine of FIGS. 11–12.

An illustrative embodiment of the tray lifting assembly 2125 is shown in FIGS. 11, 21 and 21a. The tray lifting assembly 2125 includes a near subassembly 2251a (FIG. 21) and a far subassembly 2251b (FIG. 21a). An illustrative implementation of the near subassembly 2251a is shown in FIG. 21, and an illustrative implementation of the far subassembly 2251b is shown in FIG. 21a. The tray lifting assembly 2125 is adapted to move the work tray 2123, which is positioned between the two subassemblies 2251a, 2251b, into proximity with the vertically stationary mandrel 2119 to assist in the process of inserting a fiber coil (stripped from the mandrel 119) into the work tray 2123. The tray lifting assembly 2125 includes lifting arms 2253 (FIG. 21) and 2255 (FIG. 21a) that support opposite sides of the tray 2123 and are fastened to slidable tray lifting mount plates 2257 (FIG. 21) and 2259 (FIG. 21a) respectively. The near subassembly lifting arms 2253 include grooves 2265 cut transversely across the lifting arms to engage with tray features to hold the tray 2123 in place for the fiber insertion process. The mount plates 2257, 2259 are adapted to move up and down on supports 2262a, 2262b, which are mounted to the frame 2150 (FIG. 11) and have corresponding grooves 2261 (FIG. 21) and 2263 (FIG. 21a) to receive the mount plates 2257, 2259. The tray lifting assembly 2125 can be actuated in any of numerous ways. In one embodiment of the spooling tool, the tray lifting assembly 2125 is pneumatically actuated (although other techniques are possible), and moves the work tray 2123 approximately two inches in the vertical direction (i.e., by having the mount plates 2257, 2259 move up along the supports 2262a, 2262b) to place the work tray 2123 into close proximity with the mandrel 2119. After a fiber coil is inserted into the work tray 2123, the mount plates 2257, 2259 are lowered to their original positions so that the tray can be moved to other locations for subsequent processing, for example using the conveyor techniques described above or any other suitable technique.

Figure 22:
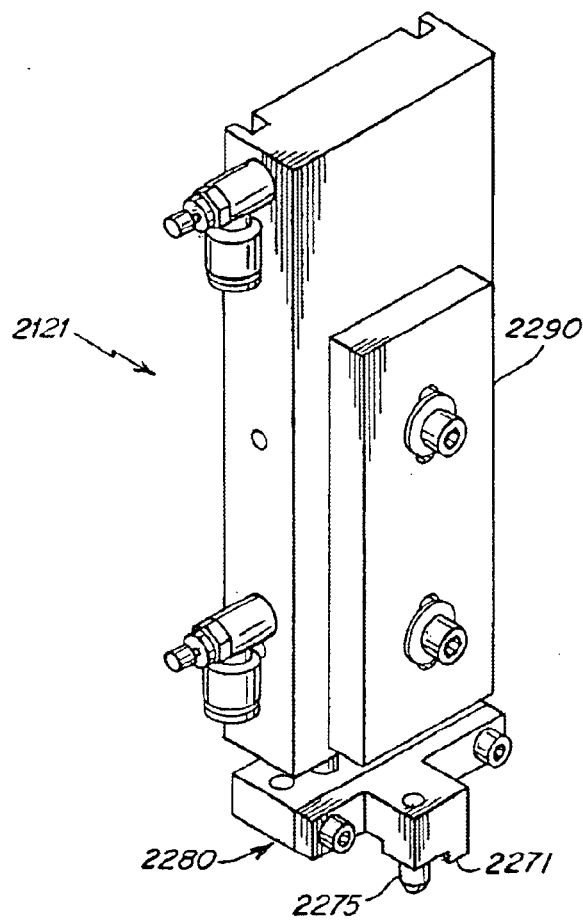
FIG. 22 is a perspective view of the cutter of the machine of FIGS. 11–12.
Figure 22A:
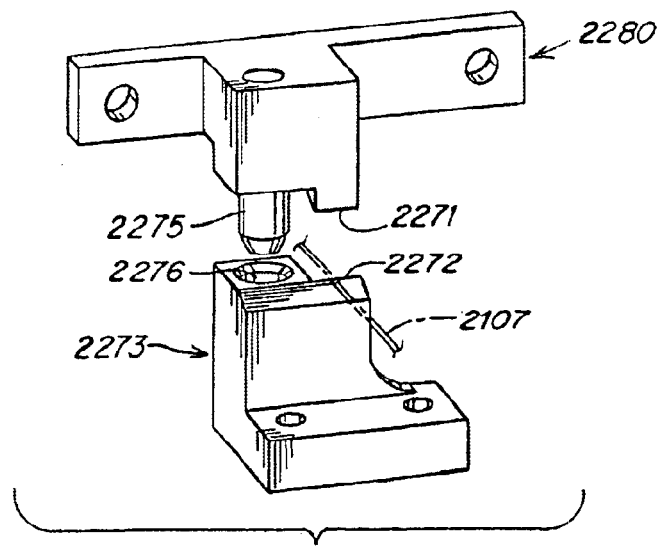
FIG. 22a is an enlarged perspective view of certain components of the cutter of the machine of FIGS. 11–12.

An illustrative embodiment of the cutter 2121 is shown in FIG. 22, with an enlarged view of certain components of the cutter 2121 shown in FIG. 22a. As discussed above, the cutter 2121 is adapted to cut a section of the optical fiber 2107 extending between the threading gripper 2113 and the winder 2117 and/or the work tray 2123. The cutter 2121 comprises two main components: a stationary cutter mounting plate 2290 and a movable upper cutting blade support 2280. The upper cutting blade support 2280, in turn, comprises an upper cutting blade 2271, which will be described in further detail below. The cutter 2121 is adapted to be mounted via the cutter mounting plate 2290, relative to the frame 2150 (FIG. 11), in the appropriate position. In accordance with one illustrative embodiment of the spooling tool, the cutter 2121 comprises an internal dual rod pneumatic cylinder (not shown) to guide the movement of the upper cutting blade support 2280 relative to the cutter mounting plate 2290, in the up and down direction as illustrated conceptually in FIG. 10. However, it should be appreciated that the movement of the upper cutting blade support 2280 can be guided in numerous other ways. The control of actuation of the cutter 2121 can be accomplished pneumatically, or in any other suitable way.

As previously described, the movable upper cutting blade support 2280 comprises an upper cutting blade 2271. When the cutter 2121 is actuated, the upper cutting blade 2271 moves vertically down to a cutting position in close proximity to a stationary lower cutting blade 2272 located on a cutting block 2273 (FIGS. 21 and 22a) within the near subassembly 2251a of the tray lifting assembly 2125. The convergence of the upper cutting blade 2271 with the lower cutting blade 2272 shears the optical fiber 2107 (shown in relief in FIG. 22a) between the two blades. The upper cutting blade support 2280 then moves back to the non-cutting position, leaving the cut end of the fiber coil as a free end. As discussed above, the cutting action can take place either before or after insertion of the fiber coil into the work tray 2123. In the embodiment shown in the FIGS., the cutting operation takes place after insertion of the fiber coil into the work tray.

In accordance with the illustrative embodiment shown that has a pair of cutting blades 2271, 2272 to shear the optical fiber 2107, an aligning system can be employed to ensure that the converging cutting blades maintain the proper alignment to shear the optical fiber. The aligning system can be implemented in any of numerous ways, as this embodiment of the spooling tool is not limited to any particular aligning technique. In the embodiment shown, an aligning pin 2275 is located on the upper cutting blade support 2280, and is adapted to mate with an aligning pin receptacle 2276 located within the cutting block 2273. Thus, as the upper cutting blade support 2280 moves towards the cutting block 273, the aligning pin 275 and the aligning pin receptacle 2276 mate to guide the cutting blades 2271, 2272 to their proper cutting positions. Another example of a technique for aligning the cutting blades includes the use of an electronic sensor that can detect the relative positions of the cutting blades and induce relative movement to ensure proper alignment.

It should be appreciated that although the use of an aligning system provides the advantages discussed above, it is not a necessity, and can be eliminated in other embodiments of the spooling tool. Furthermore, it should be appreciated that the specific implementation of the cutter 2121 described above is provided merely for illustrative purposes, and that numerous other implementations are possible. For example, rather than employing a pair of cutting blades that shear the optical fiber, an alternative arrangement could include a single cutting blade that cuts the optical fiber on a cutting block surface. In accordance with that embodiment of the spooling tool, the alignment system can be eliminated.

In accordance with one illustrative embodiment of the spooling tool, the following timing sequence is followed. As a preliminary step, a length of fiber sufficient to reach from the spool 2001, through the tension dance arm assembly 2009 and idler 2011, to the threading gripper 2013, is manually fed out from the spool 2001. The end of the fiber is held in the threading gripper 2013 in such a way that a length of the fiber (e.g., less than one inch), protrudes from the threading gripper 2013. Once the threading gripper 2013 is actuated to secure the free end of the fiber, the operation of the machine to create a fiber coil and insert it into a tray 2023 takes 26.65 seconds when coiling the maximum three meter coil length. Of course, the invention is not limited in this respect, as various modifications can be made to the machine that will impact this timing.

When an operation begins, the conveyor mechanism (not shown) actuates for two seconds to move an empty work tray to the location of the payout and spool tool to receive a coil of fiber. At this point, the threading sequence begins. The threading gripper 2013 extends from its originating position to the position adjacent the winding gripper, over a three second period. The winder 2017 closes its gripper 2015 in 0.75 seconds, and secures the end of the fiber that protrudes from the threading gripper 2013. The threading gripper then opens in 0.75 seconds to release the fiber, and retracts linearly to its originating position in 1.5 seconds. The winding gripper 2015 then retracts, with the fiber secured in its grip, in the upward second vertical direction for 1 second to position the end of the fiber for the winding sequence as discussed above.

In the embodiment of the spooling tool described above, each of the steps is performed sequentially, such that no two actuation or movement operations are done in parallel. However, it should be appreciated that the spooling tool is not limited in this respect, and that some of the operations described above can be performed in parallel. For example, the movement of a tray 2023 to the location under the mandrel 2019 can be performed while the threading gripper 2013 is handing the free end 2007*f* of the optical fiber to the winding gripper 2015, and/or while the winder 2017 is winding the optical fiber about the mandrel 2019. Similarly, the operation of retracting the threading gripper back to its original position after the fiber has been grasped by the winding gripper 2015 can be performed in parallel with the winding gripper moving upwardly.

The winding sequence follows, and for approximately ten seconds, depending on the length of fiber to be wound for the specific application. In one embodiment, the maximum wound length of fiber is three meters, which requires eleven complete rotations of the mandrel 2019 and winding gripper 2015. The mandrel and winding gripper rotate in multiples of complete 360 degree rotations. Once the winding of the fiber is complete, the winding gripper 2015 extends in the downward vertical direction for one second to the position from where it received the fiber from the threading gripper 2013. At the same time as the winding gripper 2015 extends, the mandrel pins, located on the underside of the mandrel and used to open the fiber coil holding features of the work tray, extend in one second in preparation for the coil insertion sequence.

The coil insertion sequence begins with the tray lift assembly 2025 lifting the tray 2023 in one and a half seconds from its originating position to close proximity with, and directly below, the mandrel 2019. At this point, the inserter arms 2031 a extend for one and a half seconds to place the free ends of the fiber coil into the receiving features on the tray 2023. At the same time that the inserter arm begins to move, the stripper 2029 extends for one second to strip the fiber coil off the mandrel 2019 and into the tray 2023. After the fiber coil is placed into the tray 2023, the threading gripper 2013 closes in 0.75 seconds and grips the trailing portion of the optical fiber 2107. The cutter 2021 then extends in one half second and cuts the fiber, separating the wound coil of fiber from the spool 2001, and leaving a trail portion of the fiber to protrude from the work tray. Once the fiber is cut, the mandrel pins retract in one half second to allow the fiber coil holding features of the work tray 2023 to close on, and secure, the fiber coil in the tray. Next, the winding gripper 2015 opens in one second, releasing a lead portion of the fiber coil, thus allowing this lead portion to protrude from the tray. Contemporaneous with the winding gripper opening, the stripper 2029, inserter arms 2031*a* and cutter 2021 all retract in one second to their respective originating positions. Finally, the tray lift assembly retracts to its originating position, leaving the work tray 2023 on the conveyor mechanism 2025. This entire coil insertion sequence lasts 7.75 sec. The assembled work tray, containing the fiber coil, is then ready to be moved to subsequent tool modules.

Again, although a number of operations are described above as being performed sequentially, it should be appreciated that the spooling tool is not limited to operating in this manner, as any operations that are not required to be performed sequentially can be performed in parallel.

As mentioned above, in one embodiment of the spooling tool, the fiber coil is transferred to a transport medium, one example of which is a tray 2023 as described in more detail below. It should be appreciated that the tray described below is merely one example of a transport medium that can be used with the embodiments of the spooling tool described above.

Having described various embodiments of a spooling tool for use in the fiber preparation system, it should be understood that the description is by way of example only and that other suitable spooling tool configurations may be implemented with the system as would be apparent to one of skill.

Stripper Tool

The fiber preparation module 202 of the fabrication system 200 may include an automated stripper tool 206 for automatically removing a selected amount of outer buffer material from an optical fiber to expose a desired length of glass in preparation for one or more subsequent processes. The stripper tool may be configurable to adjust the amount of buffer material that is to be removed. The stripper tool may also be configurable to strip fibers of varying diameters. In this regard, the stripper tool may be configured to strip the outer buffer of an optical fiber having an outer buffer material ranging from approximately 180 microns to approximately 900 microns with a core diameter of approximately 125 microns. The tool may also be configured to strip varying lengths of buffer material. In this regard, the stripper tool may be configured to remove a length of buffer material ranging from approximately 1 inch to approximately 1.75 inches. It is to be appreciated, however, that the stripper tool may be configured to strip any amount of buffer material from any size fiber as would be apparent to one of skill.

Figure 24:
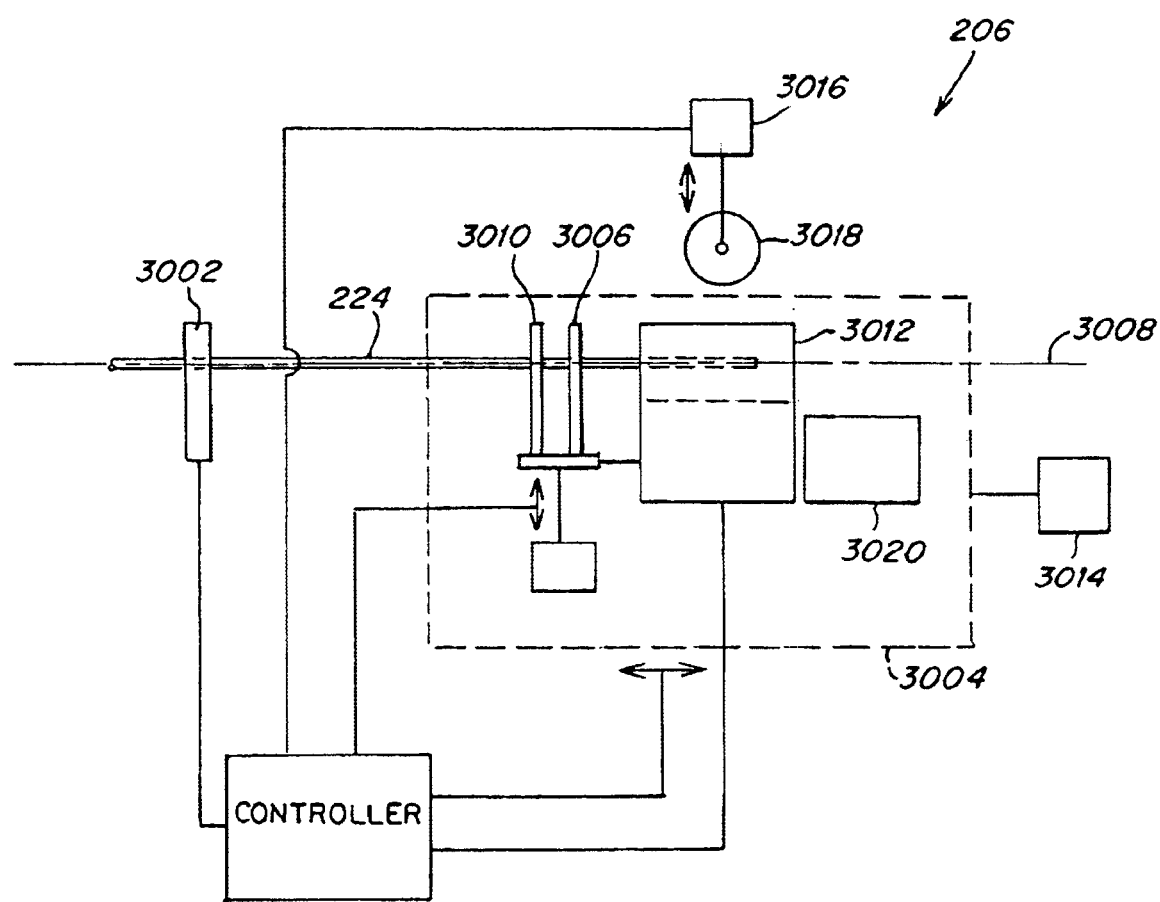
FIG. 24 is a schematic diagram of one illustrative embodiment of a stripper tool.

In one illustrative embodiment schematically shown in FIG. 24, the stripper tool 206 includes a fiber centralizing clamp 3002 and a stripper mechanism 3004 that is configured to remove a desired amount of buffer material from a fiber presented to the stripper tool. The centralizing clamp locates and maintains the fiber in a desired position relative to the stripper mechanism, which is configured to remove a predetermined amount of buffer material from the fiber.

The stripper mechanism 3004 includes a pair of centralizer blades 3006 that are configured to grasp the end of the fiber 224 and precisely locate the fiber along a strip axis 3008. A pair of strip blades 3010 are provided to penetrate the fiber buffer without contacting the glass core to strip the buffer from the fiber end. The strip process is facilitated with a heater 3012 that is configured to soften the buffer material at the fiber end adjacent the strip blades. In this regard, heating the buffer material allows the buffer material to be readily stripped from the glass core without necessarily applying a large amount of tension on the fiber.

The stripper mechanism 3004 is moveable relative to the centralizing clamp 3002 to position the stripper blades 3010 in a desired location relative to the tip of the fiber, depending upon the amount of buffer material to be removed, and to strip the buffer material from the fiber as the stripper mechanism is moved away from the centralizing clamp. The stripper mechanism 3004 may be located in various positions relative to the centralizing clamp to vary the amount of buffer material to be stripped from the fiber. A drive mechanism 3014 may be provided to move the gripper mechanism 3004 toward and away from the centralizing clamp as desired. It should be understood, however, that the stripper tool may be configured to move a fiber relative to a fixed stripper mechanism, or both of the fiber and stripper mechanism may be moveable relative to each other to vary the amount of buffer material to be stripped from a fiber.

The stripper tool 206 may also include a cleaning mechanism 3016 to remove stripped buffer material. As illustrated, a brush 3018 may be provided to sweep the stripped buffer material from the heater 3012 and into a waste container 3020. In this regard, the heater 3012 may be cleaned during each strip cycle or any number of desired cycles. The waste container 3020 may be removed from the stripper mechanism on some periodic basis, such as daily, to discard accumulated waste material.

The stripper mechanism 3004 may be configured to strip fibers of varying sizes. In this regard, the stripper mechanism may be configured with strip and centralizer blades constructed with a plurality of stripping and centralizing features that are configured for particular sized fibers. The stripper mechanism may be configured to automatically position the blade such that the appropriate stripping and/or centralizing features are positioned along the strip axis 3008 of the tool. It is to be understood, however, that this feature is not a limitation of the present invention and other suitable arrangements may be employed to accommodate the fibers of varying sizes.

Although the fiber preparation system is not intended to be limited to any particular stripper tool configuration, one illustrative embodiment of a stripper tool 206 is shown in FIGS. 25–32. It is to be understood that any automated stripper tool suitable for fiber preparation may be implemented with the system of the present invention.

Figure 25:
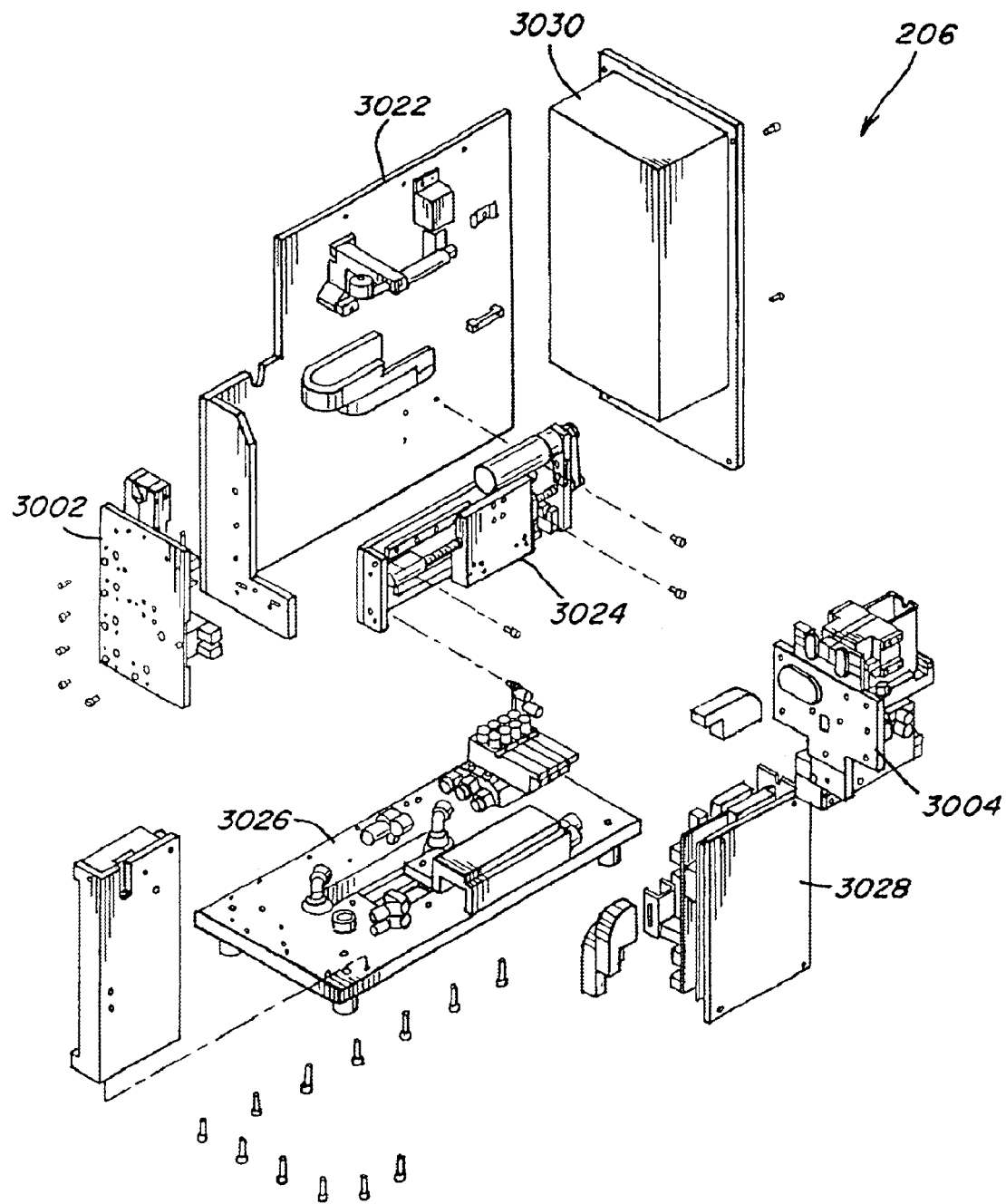
FIG. 25 is an exploded perspective view of one illustrative embodiment of a stripper tool.
Figure 26:
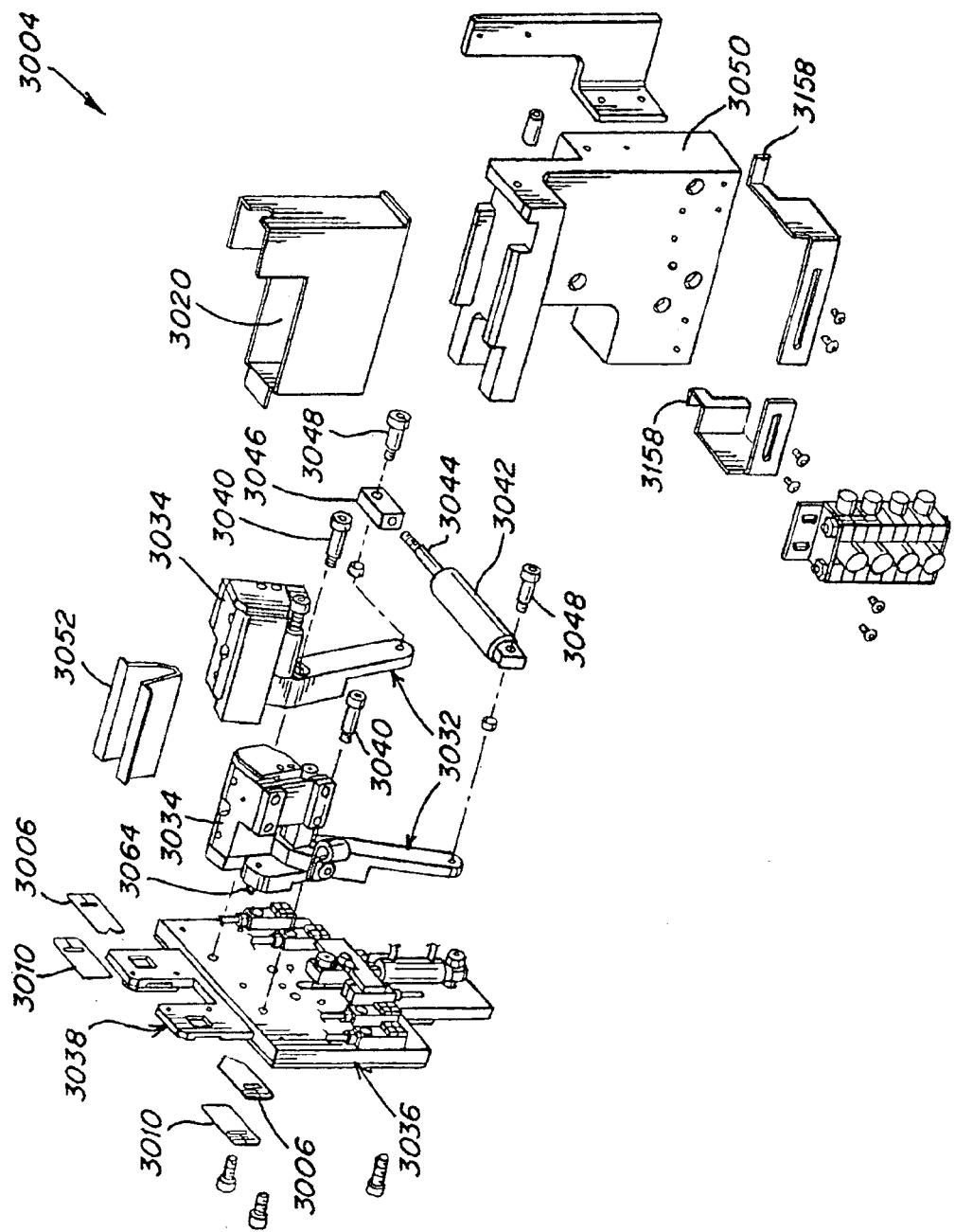
FIG. 26 an exploded perspective view of one illustrative embodiment of a stripper mechanism for the stripper tool of FIG. 25.

As generally shown in FIG. 25, the stripper tool 206 includes a centralizing clamp 3002 supported by the stripper housing 3022 and a stripper mechanism 3004 movably supported by the housing relative to the centralizing clamp. In this regard, the stripper mechanism is mounted to a linear stage 3024 that is supported by the housing. A cleaner mechanism 3016 is provided adjacent the stripper mechanism to clean the stripper of waste buffer material. The stripper tool also includes a tool interface 3026 configured to couple the stripper tool to the system and provide all necessary electrical, mechanical, pneumatic and control connections to the tool. A controller 3028 and tool electronics 3030 may also be housed within the stripper tool.

As indicated above, the centralizing clamp 3002 is configured to locate a fiber presented to the stripper tool and precisely position the fiber relative to the stripper mechanism. The centralizing clamp is described in greater detail below and, therefore, will not be described in connection with the stripper tool.

The stripper mechanism 3004 is configured to be precisely located relative to a fiber end portion to heat and strip a predetermined amount of buffer material to expose a desired length of glass core. In one illustrative embodiment shown in FIG. 26, the stripper mechanism 3004 includes a pair of strip arms 3032 that support a pair of heaters 3034 and cooperate with a pair of strip blades 3010 and centralizer blades 3006 to heat and subsequently strip buffer material from a fiber. The strip arms 3032 are rotatably mounted to a back plate 3036 that also supports the strip and centralizer blades. As discussed further below, the blades are supported by an adjustable blade mechanism 3038 to accommodate fibers of various sizes.

As shown, the strip arms 3032 are mounted to the back plate 3036 about a pair of pivots 3040 that allow the arms to rotate between open and closed positions. In this regard, the lower ends of the strip arms are coupled to opposing ends of an actuator 3042 to be either driven apart to close the strip arms or pulled towards each other to open the strip arms. In one embodiment, the actuator 3042 may include a pneumatic air cylinder that extends and retracts a piston 3044 in response to signals from a stripper control system. One end of the actuator is pivotally connected to one strip arm while the actuator piston is pivotally connected to the other strip arm using a pivot mount 3046 attached to the end of the piston. Any suitable fastener 3048, such as a shoulder screw, may be employed to mount the actuator to the strip arms.

The back plate 3036, which supports the strip arms and blades, is mounted to a base 3050 that is coupled to the linear stage 3024. Thus, the strip arms and blades may be precisely located relative to the centralizing clamp for stripping a preprogrammed amount of buffer material.

To support the end portion of the fiber between the strip arms, a heat resistant liner 3052 is supported within the heating zone between the heaters 3034. As illustrated, the liner may have a generally V-shaped configuration that opens and closes with the strip arms. The liner is configured to engage the fiber end portion and maintain it within a desired region about the stripping axis to facilitate the stripping process. Waste material retained by the liner may be subsequently swept into a waste container 3020 supported on the stripper base adjacent the strip arms.

Figure 27:
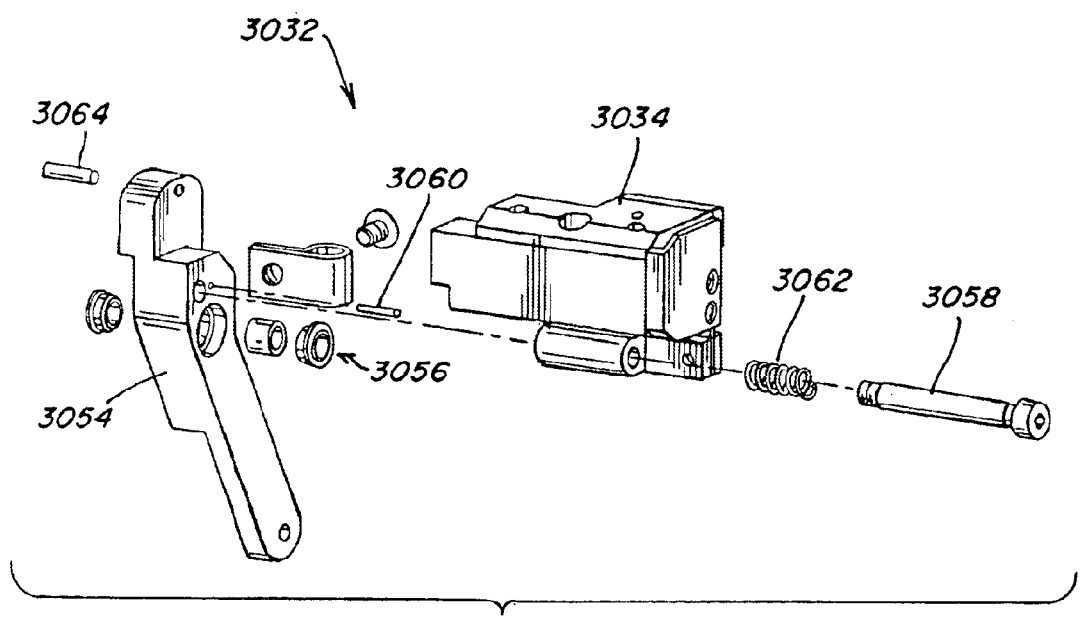
FIG. 27 an exploded perspective view of one illustrative embodiment of a strip arm for the strip mechanism of FIG. 26.

In one illustrative embodiment shown in FIG. 27, each strip arm 3032 includes a lever arm 3054 with a heater 3034 supported at an upper end of the lever arm. To facilitate rotation of the strip aim in the stripper mechanism, an inner spacer and a pair of bearings may be employed to form a journal 3056 about which the lever arm rotates.

As illustrated, the heater 3034 may be rotatably mounted to the lever arm 3054 to facilitate maintenance of the stripper mechanism, such as periodic cleaning of the strip tool. In this regard, the heater may be rotatably mounted to the lever arm about a suitable pivot 3058, such as a shoulder screw. Since rotation of the heater relative to the lever arm may not be desirable during normal stripping operations, the heater is normally locked against rotation relative to the lever arm using a locking pin 3060 disposed between the lever arm and heater. A biasing member 3062, such as a compression spring, is disposed between the heater 3034 and pivot 3058 to urge the heater into engagement with the lever arm and the pin to prevent relative rotation therebetween. In the event that it becomes desirable to rotate the heater, it may be pulled rearwardly against the biasing force of the spring 3062 and out of engagement with the locking pin 3060, whereupon the heater may freely rotate about the pivot.

A drive pin 3064 extends from the forward face of the lever arm 3054 to couple the lever arm to the strip and centralizer blades, as discussed in more detail below. In this regard, the drive pin 3064 acts as a cam to drive the blades linearly in response to rotation of the strip arms between the open and closed positions.

Figure 28:
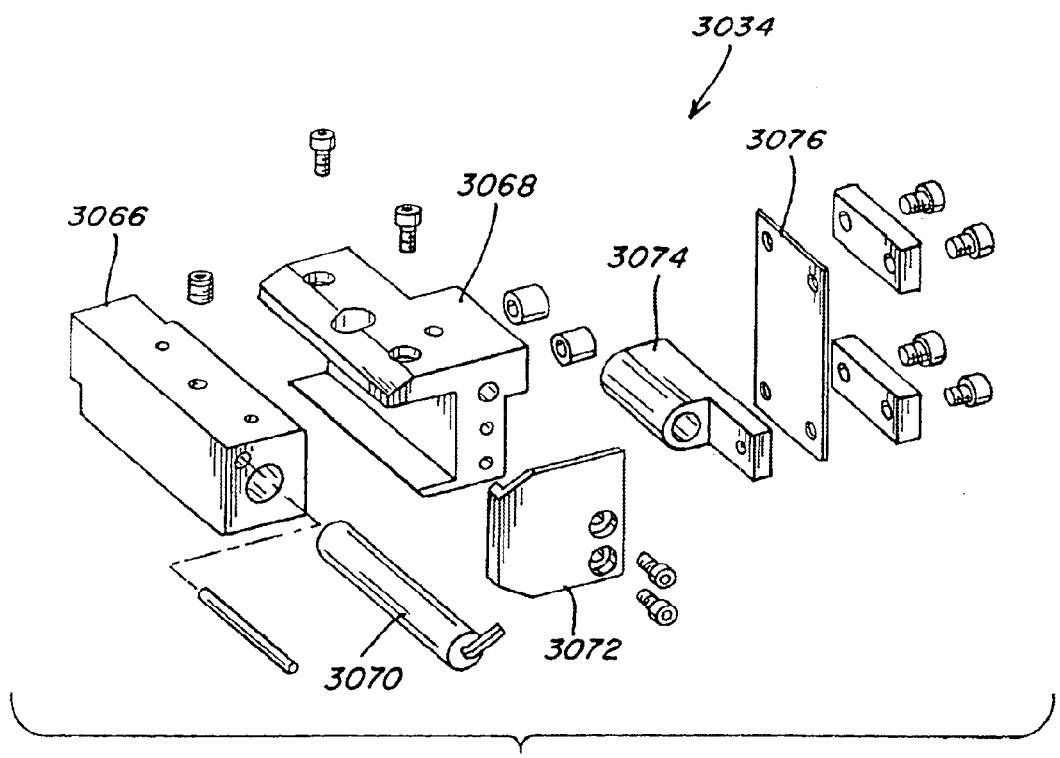
FIG. 28 an exploded perspective view of one illustrative embodiment of a heater for the strip arm of FIG. 27.
Figure 29:
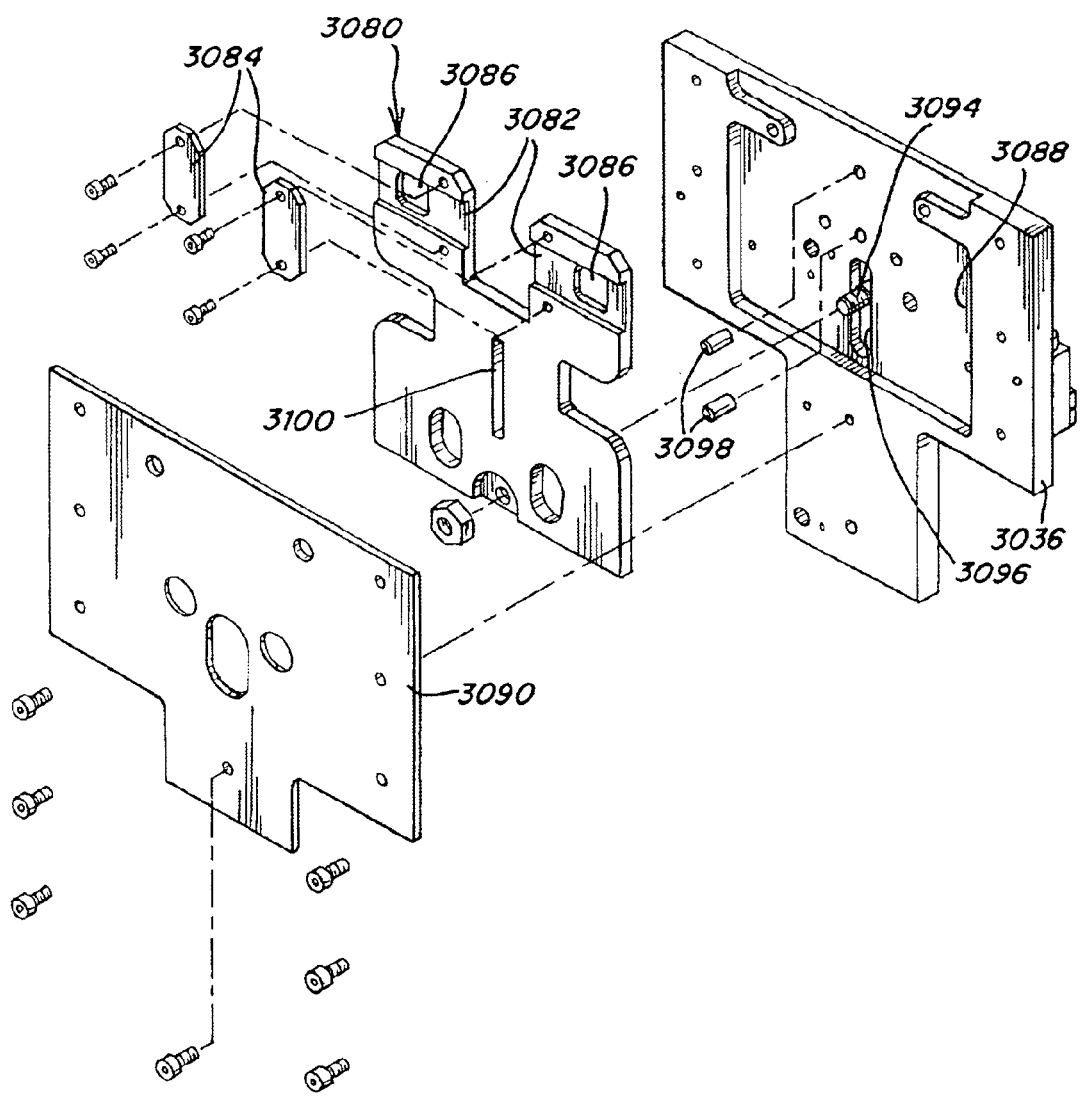
FIGS. 29–30 are exploded perspective views of one illustrative embodiment of a blade adjustment mechanism for the stripper mechanism of FIG. 26.
Figure 30:
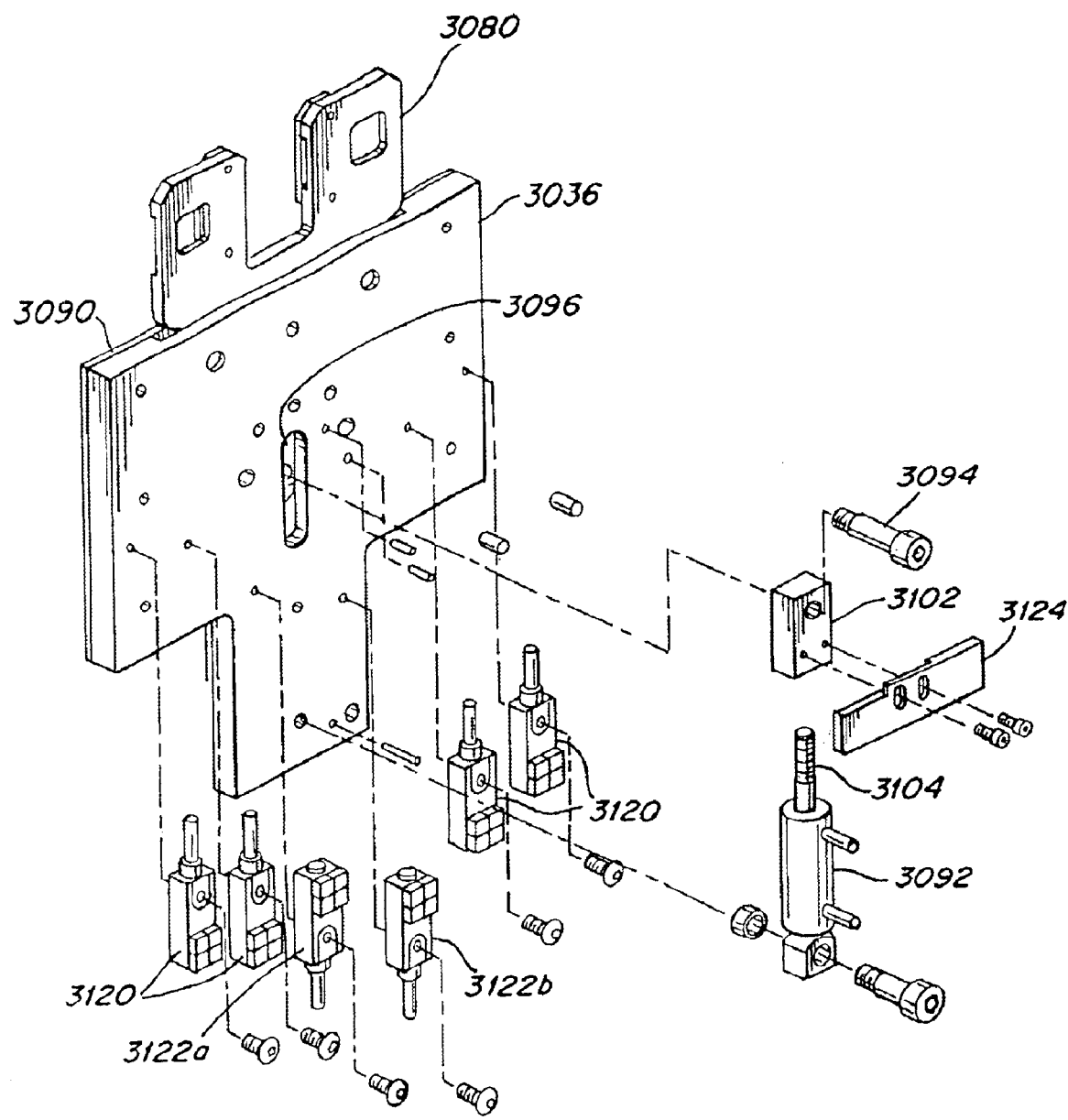

In one illustrative embodiment shown in FIG. 28, each heater 3034 includes a heater pad 3066 that is supported by an insulated heater body 3068. Heat is generated by a heater element 3070, such as a cartridge heater, that is inserted into the heater pad. A thermocouple may be provided on the heater pad 3066 to monitor the pad temperature to ensure that it is at a desired temperature for the stripping operation. An insulated cover 3072 may be secured to an end of the heater body to cover the corresponding end of the heater pad.

To accommodate fibers of various diameters between the heaters, it may be desirable to resiliently mount the heater body 3068 relative to a mounting bracket 3074 for the heater. In one illustrative embodiment, the heater body 3068 is coupled to the mounting bracket 3074 with a resilient member 3076, such as a leaf spring, that allows the heater body to flex relative to the mounting bracket. In this regard, the strip arms 3032 may be configured to ensure that the heaters engage each other to ensure contact between the heaters and any fiber place therebetween. Depending upon the size of a particular fiber presented between the heaters, the leaf spring 3076 allows each heater body 3068 to flex relative to its mounting bracket 3074 to accommodate a fiber placed therebetween. It is to be appreciated that any biasing arrangement, if even desired, may be employed to accommodate fibers of varying diameters.

As indicated above, each strip arm 3032 is coupled to the strip and centralizer blades in a manner that opens and closes the blades in response to the strip arms opening and closing the heaters about a fiber. In one illustrative embodiment shown in FIG. 29, a blade holder 3080 is supported on the stripper back plate 3036. The blade holder includes a pair of blade guides 3082 that are configured to slidably support the stripper and centralizer blades between the open and closed positions. A pair of covers 3084 are removably attached to the blade holder to overlie the guides to maintain the blades therein. An aperture 3086 is provided within each of the blade guides to receive the drive pin 3064 from each of the strip arms to drive the blades linearly along the guides in response to rotation of the strip arms.

As indicated above, the strip and centralizer blades may be configured to accommodate fibers having various diameters. In this regard, it may be desirable to automatically position the blades to position appropriately configured portions of the blades adjacent the strip access. In one illustrative embodiment shown in FIGS. 29–30, the blade holder 3080 is supported within a cavity 3088 on the stripper back plate 3036 and captured within the cavity by an outer cover 3090. The cavity 3088 is configured to allow the blade holder 3080 to slide in a vertical direction to raise and lower the blades relative to the strip axis. In this manner, each blade may be configured with multiple notches along the blade edge that can be positioned adjacent the strip axis by raising and lowering the blade holder.

The blade holder 3080 may be coupled to a drive actuator 3092 via a vertical adjustment coupler 3094 extending through a vertical slot 3096 in the gripper back plate. In one illustrative embodiment, the lower portion of the blade holder is attached to the coupler 3094 such that movement of the coupler in the vertical direction along the slot similarly moves the blade holder 3080 in the vertical direction to either raise or lower the blades. A pair of guide pins 3098 may be provided to cooperate with a vertical guide slot 3100 in the blade holder to guide the blade holder in the vertical direction as it is raised and lowered by the drive mechanism. The coupler is attached to the actuator 3092 via a pivot mount 3102 such that operation of the actuator raises and lowers the coupler and blade holder.

In one embodiment, the actuator 3092 is a pneumatic air cylinder that extends and retracts a piston 3104 which is attached to the pivot mount. It is to be appreciated, however, that any suitable drive mechanism may be implemented with the stripper mechanism to adjust position of the strip and centralizer blades relative to the strip access.

One or more sensors may be provided to monitor and control the operation of the stripper mechanism. In one illustrative embodiment shown in FIG. 30, a pair of sensors 3120 may be provided to monitor the position of each strip arm as being either in the open or closed position. Similarly, a pair of sensors 3122 may be provided to monitor the position of the blade holder in the raised and lowered positions. In one embodiment, each sensor is an inductive proximity sensor configured to detect the presence of a flag or other feature indicative of the position of the particular component. In this regard, one of the arm sensors 3120 is positioned to underlie the lever arm 3054 in the open position while the other arm sensor is positioned to underlie the lever arm in the closed position so that the presence of the lever arm over either of these sensors generates a signal indicative of the lever arm position. Similarly, one of the blade position sensors 3122a is positioned to underlie, in the raised position, a sensor flag 3124 which is supported by the pivot mount, while the other blade position sensor 3122b is positioned to underlie the sensor flag in the lower position to generate signals indicative of the position of the blade holder. It is to appreciated that any suitable sensor arrangement may be implemented with the stripper mechanism for monitoring and controlling the various components.

Figure 31:
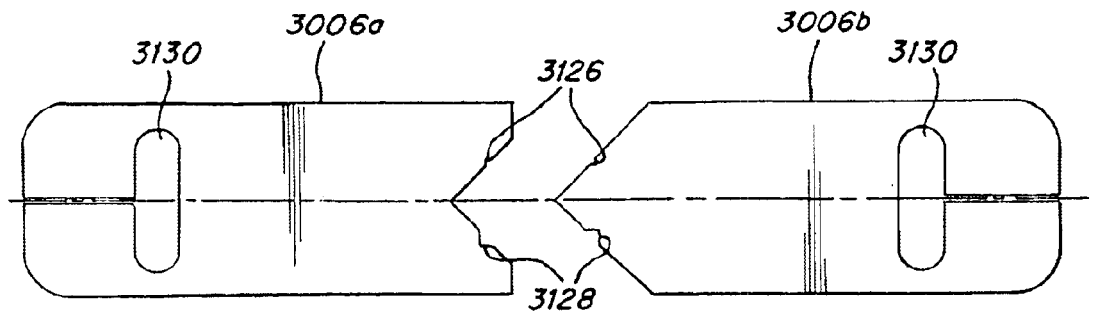
FIG. 31 is a plan view of one illustrative embodiment of a pair of centralizer blades for the stripper mechanism of FIG. 26.

In one illustrative embodiment in FIG. 31, the centralizer blades 3006 include a mating pair of blades configured to hold and locate a fiber along a predetermined strip axis. As illustrated, the blades include a female blade 3006a having a generally V-shaped end that is configured to mate with a correspondingly-shaped male blade 3006b. Each blade includes a pair of notches 3126, 3128, one along each of the upper and lower surfaces of the mating surfaces of the blades, to form a pair of apertures for holding a fiber when the blades are moved to a closed position. The notches are dimensioned to accommodate fibers having at least two different diameters. In this regard, the notches may be configured to accommodate fibers having an outer diameter ranging from approximately 180 microns to approximately 900 microns. It should be understood, however, that the blades may be configured to accommodate fibers having other diameters.

As illustrated, each blade has a vertically elongated slot 3130 at the ends opposite the mating surfaces. The slots 3130 are configured to receive the drive pin 3064 from the strip arms to move the blades between the open and closed positions relative to the strip axis. In this regard, the drive pin acts as a cam, and the slots act as cam followers so that radial movement of the blades is achieved by rotating the strip arms between the open and closed positions. Other drive arrangements for moving the blades are contemplated as would be apparent to one of skill.

Figure 32:
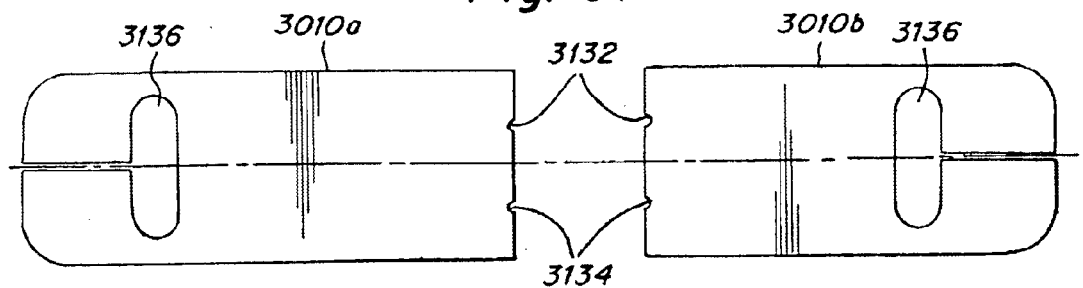
FIG. 32 is a plan view of one illustrative embodiment of a pair of strip blades for the stripper mechanism of FIG. 26.

In one illustrative embodiment shown in FIG. 32, the pair of strip blades 3010a, b include a pair of opposing notches 3132, 3134 which act in conjunction with the centralizer blades to strip the buffer from the fiber. In this regard, while the centralizer blades 3006 locate the fiber along the strip axis, the strip blades 3010 pierce the buffer material of the fiber and strip the buffer from the fiber as the gripper assembly is retracted away from the centralizing clamp.

In one embodiment, each notch 3132 is configured to strip a fiber having the same core diameter, regardless of the outer diameter of the buffer material. Preferably, the notches are configured to pierce the buffer material without contacting the fiber core to avoid potential damage to the core during the stripping process. In one embodiment, the pair of strip blades 3010 form a hole having a diameter of approximately 0.0067 inches for stripping a fiber having a core diameter of 125 microns. It is to be appreciated, however, that strip blades may be provided with any suitably configured notches capable of stripping any desired fibers as would be apparent to one of skill.

Similar to the centralizer blades described above, each of the strip blades includes a vertically elongated slot 3136 configured to receive the drive pin 3064 from the strip arms to move the strip blades between the open and closed positions in response to movement of the strip arms.

Figure 33:
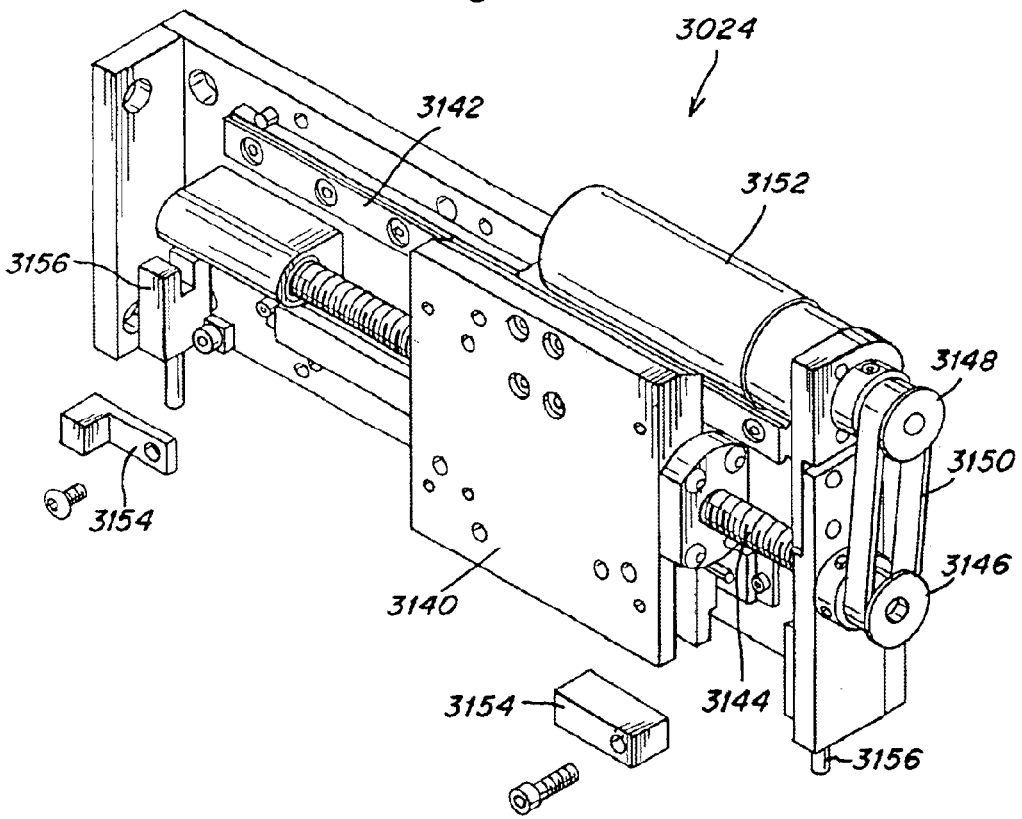
FIG. 33 an exploded perspective view of one illustrative embodiment of a drive mechanism for the stripper tool of FIG. 25.

As indicated above, the stripper mechanism 3004 is mounted to a linear stage 3024 that is configured to drive the stripper mechanism toward and away from the centralizing clamp during the stripping process. In one illustrative embodiment shown in FIG. 33, the linear stage 3024 includes a carriage 3140 that is moveable along a linear bearing 3142. A drive mechanism 3144, such as a ball screw drive, operates to move and precisely locate the carriage along the linear bearing. A ball screw pulley 3146 is coupled to one end of the ball screw drive and is rotatably coupled to a drive pulley 3148 via a belt 3150. The drive pulley 3148 is coupled to the shaft of a motor 3152, such as a servomotor, to drive the carriage 3140 along the bearing in response to a signal to the motor. An encoder may be provided on the servomotor to ensure precise positioning of the carriage and the stripper assembly relative to the centralizing clamp.

A pair of hard stops 3154 may be provided at opposite ends of the linear stage to prevent over-travel of the carriage. In this regard, sensors may also be provided to signal an over-travel condition of the carriage. In one embodiment, a pair of optical sensors 3156 may be provided at opposite ends of the linear stage 3024 that cooperate with a pair of flags 3158 (FIG. 26) mounted to the stripper base.

While one embodiment of a linear stage 3024 suitable for moving the gripper mechanism has been described, it is to be appreciated that any suitable drive mechanism may be implemented with the gripper tool as would be apparent to one of skill.

As indicated above, it may be desirable to provide a cleaner for removing waste buffer material stripped from the fibers. In one illustrative embodiment shown in FIG. 34, the cleaner 3016 includes a brush 3018 that is moveably supported above the heaters between a cleaning position and a stored position. In the cleaning position, the brush is lowered between the opposing heaters 3012 to sweep debris from the heater liner into the waste receptacle 3020 at the rear of the heaters as the stripper mechanism is moved toward the centralizing clamp to receive a fiber therein. In the stored position, the brush is raised to a stored position above the stripper mechanism so that it may be retracted away from the centralizing clamp.

Figure 34:
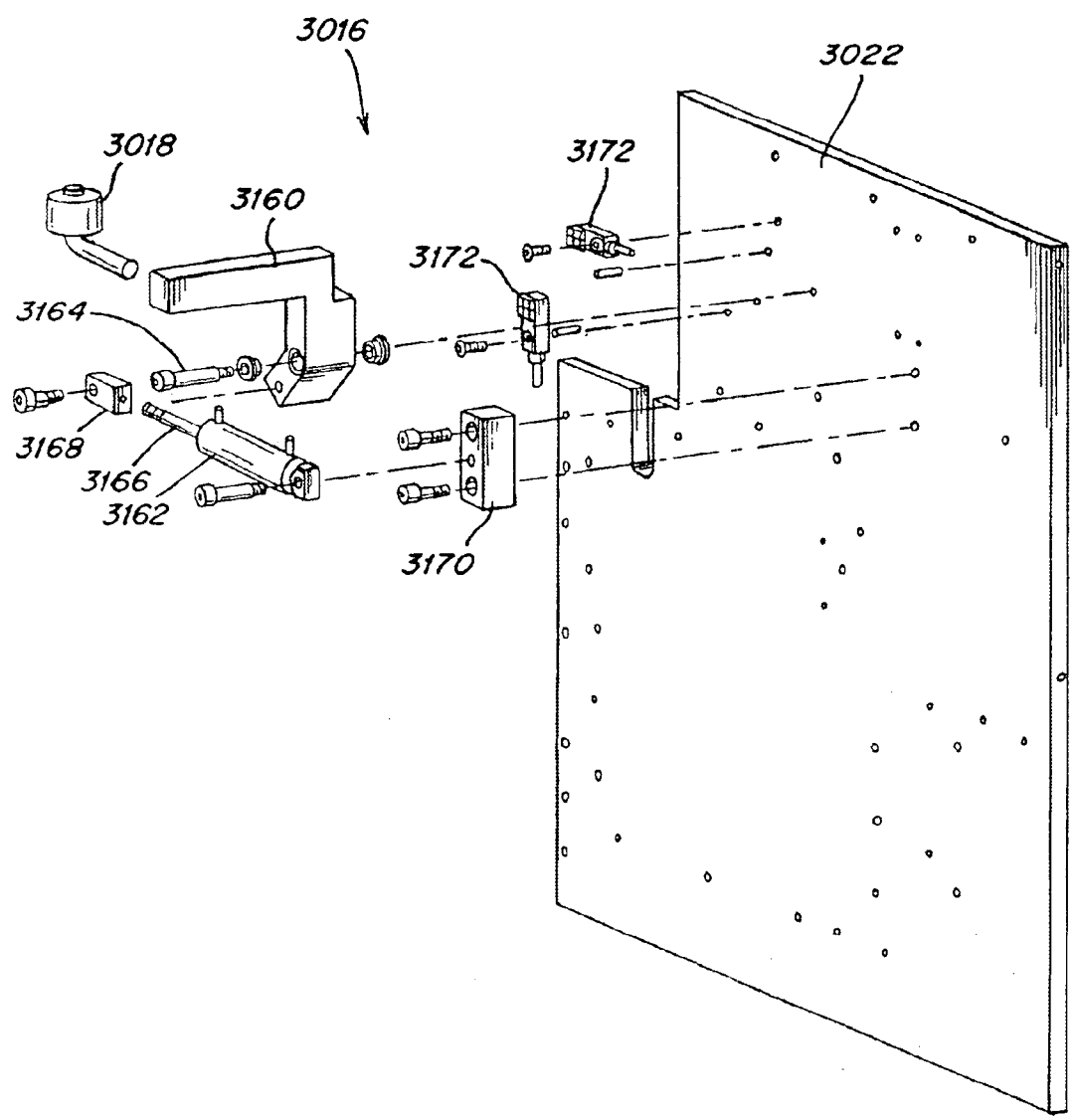
FIG. 34 an exploded perspective view of one illustrative embodiment of a cleaning device for the stripper tool of FIG. 25.

As shown in FIG. 34, the brush 3018 is supported at the end of a rotatable brush arm 3160 mounted to a wall of the stripper housing 3022. The lower end of the arm 3160 is coupled to an actuator 3162, such as a pneumatic air cylinder, configured to rotate the brush about an arm pivot 3164.

In one embodiment, the actuator 3162 includes a pneumatic air cylinder configured to extend and retract a piston 3166 that is coupled to the brush arm with a pivot mount 3168. The opposite end of the cylinder is pivotally supported by a mount 3170 that is connected to the housing wall. Extending and retracting the piston, in response to an actuation signal, rotates the brush arm 3160 about the pivot, thereby raising and lowering the brush between the stored and cleaning positions.

A pair of sensors 3172 may be provided to monitor the position of the brush arm. In one embodiment, the sensors are inductive proximity sensors. Of course, any suitable sensor arrangement may be employed with the cleaner mechanism.

While one embodiment of a cleaner mechanism has been described, the present invention is not limited in this regard. Rather, any suitable cleaner device, if even desired, may be employed with the stripper tool as may be apparent to one of skill.

Having described various embodiments of a stripper tool for use in the fiber preparation system, it should be understood that the description is by way of example only and that other suitable stripper tool configurations may be implemented with the system as would be apparent to one of skill.

Cleaning Tool

As indicated above, the system may also include a cleaning tool for cleaning the end portion of a fiber, such as an optical fiber. An example of a cleaning tool suitable for use with any of the embodiments of the present invention is described in co-pending U.S. patent application entitled "Method and Apparatus for Cleaning an Optical Fiber", filed on even date herewith, and incorporated herein by reference (hereafter the "Cleaning Tool Application"). However, it should be appreciated that the various embodiments of the present invention directed to automated preparation of optical fiber is not limited to use with any particular cleaning tool. Various illustrative embodiments of a cleaning tool, as provided in the Cleaning Tool Application, are presented below.

In particular, the cleaning device may be an automated cleaning device that automatically captures an optical fiber and places an end of the optical fiber within a fluid tank assembly cleaning the end of the optical fiber. According to one aspect of the cleaning device, the clamping assembly and the cleaning device may be configured for use with optical fibers having any outer diameter from approximately 180 $\mu$m to approximately 900 $\mu$m. However, it is to be appreciated that the clamping assembly and the cleaning device may be used for cleaning the plurality of components including an optical fiber, an end of a stripped, solid or stranded wire, cable including, for example, a coaxial cable, a communications cable including a plurality of twisted pairs having an outer jacket and a protective coating on the twisted pairs stripped away, and the like.

Figure 36A:
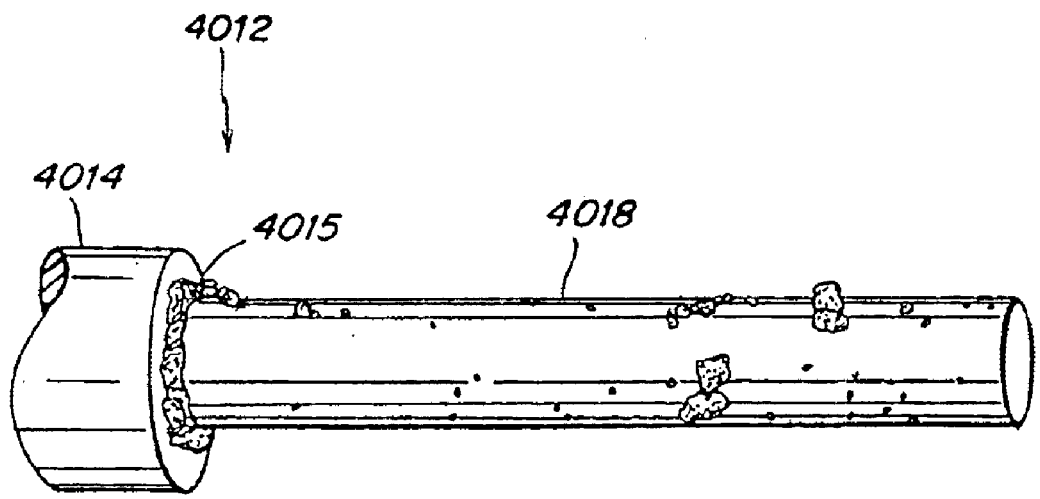
FIG. 36a illustrates a magnified view of an end of an optical fiber after it has been stripped of its outer coating and illustrating residual buffer material and debris that may contaminate the fiber.

Referring to FIG. 35, there is illustrated a schematic diagram of one embodiment of a cleaning device 208. This illustrative embodiment of the cleaning device can be used to clean and remove debris and residual buffer material from a stripped end of an optical fiber. FIG. 36a illustrates a magnified view of such an optical fiber 4012 after an outer coating 4014 has been removed from the end of the optical fiber. As illustrated in FIG. 36a, the optical fiber can contain debris and residual material that remains on the optical fiber after the outer coating has been removed. It is desirable to remove this debris and residual material. The cleaning method and cleaning device herein described may be used to remove this debris and residual material.

Referring again to FIG. 35, the cleaning device comprises a clamping assembly 4020 that can hold the optical fiber 4012 such that the optical fiber is aligned along a horizontal clamping axis 4016, with one end of the optical fiber 4018 protruding from the clamping assembly through an aperture 4032 in a tank assembly 4030. As will be described in further detail infra, one aspect of the clamping assembly is that it can hold the fiber by gripping the outer coating 4014 of the fiber after a fiber to coating transition 4015 (See FIGS. 36a–36b). Another aspect of the clamping assembly is that it can be provided with a sealing mechanism that provides a fluid tight seal around an outer circumference of the optical fiber coating.

According to one illustrative embodiment of the cleaning device 208, the tank assembly 4030 may be moved toward and away from the clamping assembly 4022 as illustrated by double arrow 4321. According to another aspect of the cleaning device 208, the clamping assembly may be moved as illustrated by double arrow 4041 to accommodate gripping the optical fiber at the outer coating 4014 after the fiber to coating transition 4015 (see FIGS. 36a and 36b).

Once the fiber has been secured by the clamping assembly 4020, the tank assembly 4030 can be moved in the axial direction along an axis of the fiber toward the clamping assembly so that the end 4018 of the fiber 4012 enters the tank assembly through the aperture 4032.

As will be discussed in greater detail infra, according to one aspect of the tank assembly, the aperture is provided with a sufficient diameter so that any tolerance in the end of the fiber from the clamping axis 4016 of the clamping assembly is accommodated by the aperture, such that the end of the fiber threads the aperture into the tank assembly. A further aspect of the clamping assembly is that the clamping assembly can be provided with a sealing mechanism 4022 (see FIG. 38) that is constructed and arranged to mate with the aperture 4032 of the tank assembly 4030 and to provide a fluid seal of the aperture of the tank assembly. For example, the sealing mechanism of the clamping assembly may be biased against and into the aperture of the tank assembly to seal the aperture, and also is constructed and arranged to provide a fluid seal around the optical fiber.

As will be further described infra, another aspect of the illustrative embodiment of the tank assembly 4030 is that it can be provided with a sensor 4036 to sense that the tank assembly is engaged against the clamping assembly 4020, that a seal exists around the optical fiber 4012 and that a seal exists for the aperture 4032 in the tank assembly 4030.

Another aspect of the illustrative embodiment of the cleaning device is that it may include a pump 4050 and a fluid reservoir assembly 4060. According to one aspect of the cleaning device, once it is sensed that the tank assembly 4030 has been moved against the clamping assembly 4020, and that a seal exists around the optical fiber 4012 and the aperture 4032 of the tank assembly, the pump 4050 can be activated to draw a cleaning fluid from the fluid reservoir assembly 4060 and to pump the cleaning fluid into a tank 4034 of the tank assembly.

According to one aspect of the tank assembly, the tank assembly can be provided with at least one sensor 4314 to sense that the tank is filled with the cleaning fluid to a desired level. It is to be appreciated, however, as will be discussed in detail infra, that the tank assembly can also be provided with a second sensor 4316 (not illustrated in FIG. 35) that senses whether the fluid in the tank assembly has been drained to a certain level or completely removed. Thus, the tank assembly can be provided with at least one sensor 4314 to sense that the tank is filled with a cleaning fluid to a desired level, and the pump can be activated to pump the cleaning fluid to the tank 4034 until the tank is filled.

As will be discussed in further detail infra, according to another aspect of the illustrative embodiment of the cleaning device 208, the cleaning device comprises a controller 4080 that controls, for example, any of the clamping assembly 4020, servo or actuator assemblies to move the clamping assembly and the tank assembly along respective axis 4041, 4321, the pump 4050 and an ultrasonic generator 4038. According to this illustrative embodiment of the cleaning assembly, once the fluid level sensor 4314 senses that the tank has been filled with the cleaning fluid to the desired level, the pump 4050 can be deactivated by the controller. In addition, the ultrasonic generator 4038 can be activated to emit ultrasonic waves within the fluid of the tank assembly. As will be discussed in further detail infra, the ultrasonic generator can be activated for a selected period of time to clean the end of the fiber submerged within the cleaning fluid of the tank 4034. After such time, the ultrasonic generator can be deactivated by the controller. Further, the pump assembly can be activated by the controller to pump the fluid in the tank 4034 to the fluid reservoir assembly 4060.

According to the illustrative embodiment of the cleaning device 208, the cleaning device can also be provided with at least one check valve 4054, 4056 disposed between the pump 4050 and the fluid reservoir assembly 4060. The check valve can be used to prevent the pump from pumping the fluid in one direction. For example, a check valve 4054 can be provided to ensure that the cleaning fluid flows in one direction from the fluid reservoir assembly 4060 to the tank assembly 4036 in one fluid line 4042. Another check valve 4056 can be provided to ensure that the cleaning fluid flows in one direction from the tank assembly to the fluid reservoir in a second fluid line 4044. In addition, the illustrated embodiment of the cleaning device can be provided with a filter 4058 between the pump 4050 and the fluid reservoir assembly 4060, that filters out any debris or residual buffer material that is in the fluid so that the fluid can be reused, and so that the cleaning device is a closed loop fluid device.

Figure 36B:
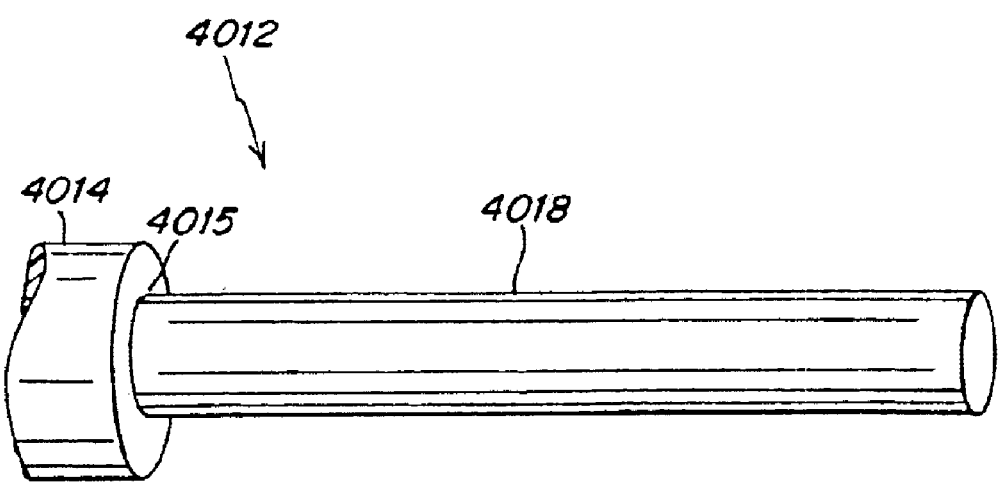
FIG. 36b illustrates a magnified view of an optical fiber after it has been cleaned by the cleaning device.

According to another aspect of the illustrative embodiment of the cleaning device 208, the tank 4034 of the tank assembly 4030 may be moved along axis 4321 away from and out of engagement with the clamping assembly 4020, so that the clamping assembly no longer seals the aperture 4032 of the tank. According to the illustrative embodiment, once the fluid has been pumped by the pump 4050 from the tank assembly 4030 to the fluid reservoir assembly 4060, the tank assembly 4030 can be moved to a position no longer in engagement with the clamping assembly 4020. According to this embodiment, the clamping assembly can also be controlled to move to an open position so that the fiber can be removed from the clamp assembly 4020. FIG. 36b illustrates a magnified view of an optical fiber after it has been cleaned by the illustrated embodiment of the cleaning device 208.

According to one aspect of the illustrative embodiment of the cleaning device 208, the fiber may be allowed to dry for a period of time, such as, for a few seconds and may be subsequently processed, for example, by an automatic fiber manufacture system such as described in co-pending U.S. application, Apparatus and Method for preparation of an optical fiber, filed on even date herewith. For example, the fiber may subsequently be cleaved and a ferrule may be attached to the cleaned and cleaved end of the fiber to produce a fiber optical pigtail.

Figure 37:
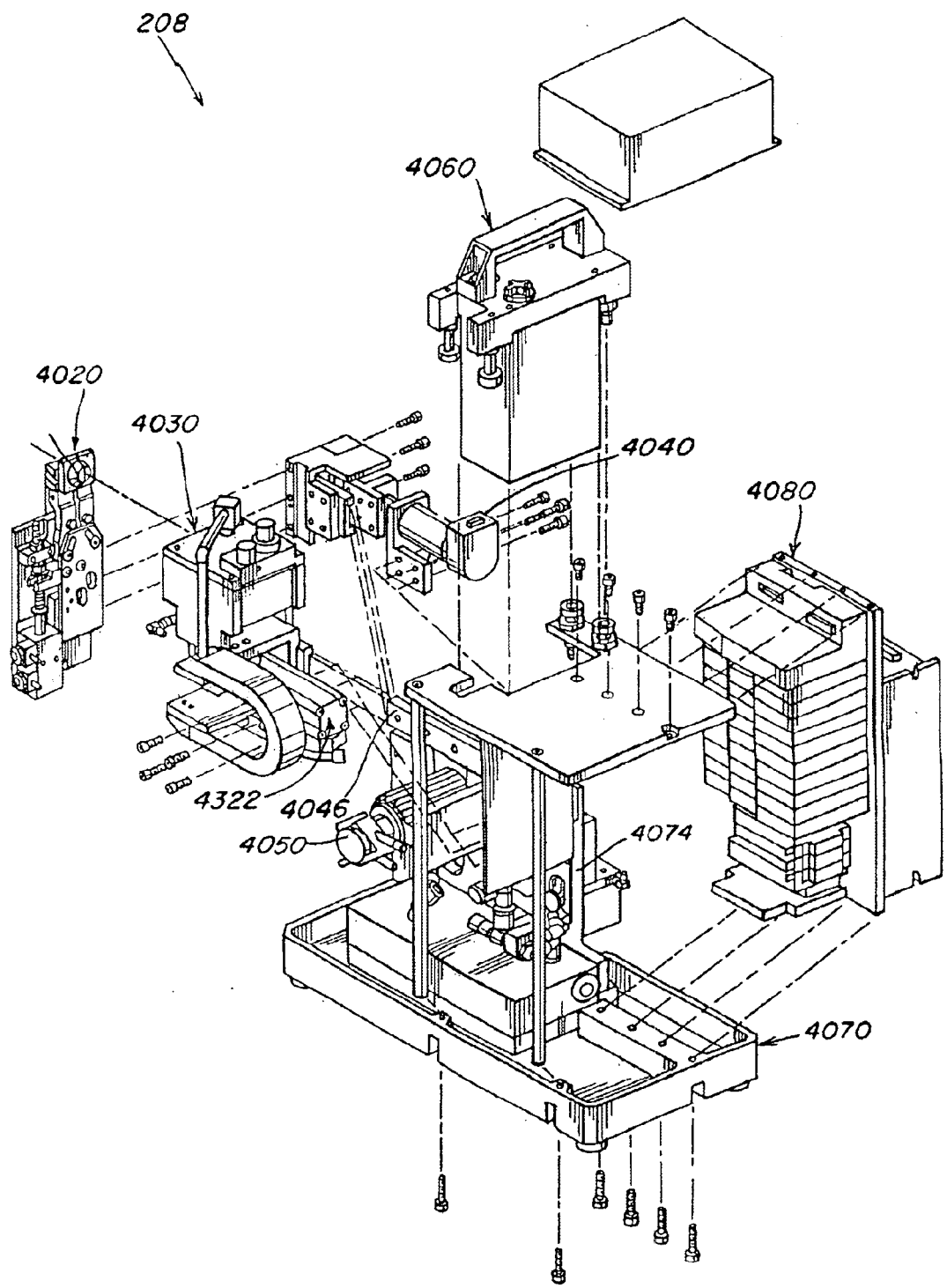
FIG. 37 illustrates a perspective view of one illustrative embodiment of a cleaning device.

FIG. 37 illustrates a perspective view of one embodiment of the cleaning device 208. The cleaning device comprises a clamping assembly 4020, a tank assembly 4030, a servo assembly 4040, a pump device 4050, and a fluid reservoir assembly 4060, a frame assembly 4070, a controller 4080, and an actuator 4322. The frame assembly may house various assemblies of the cleaning device 208. The controller 4080 may contain any of software and/or hardware and may be coupled to and control the various assemblies and devices of the cleaning device and may also contain, for example, an interface to a central controller such as a personal computer. Accordingly, the controller assembly may have some local control and may also be interfaced to a network to allow for central control.

Figure 38:
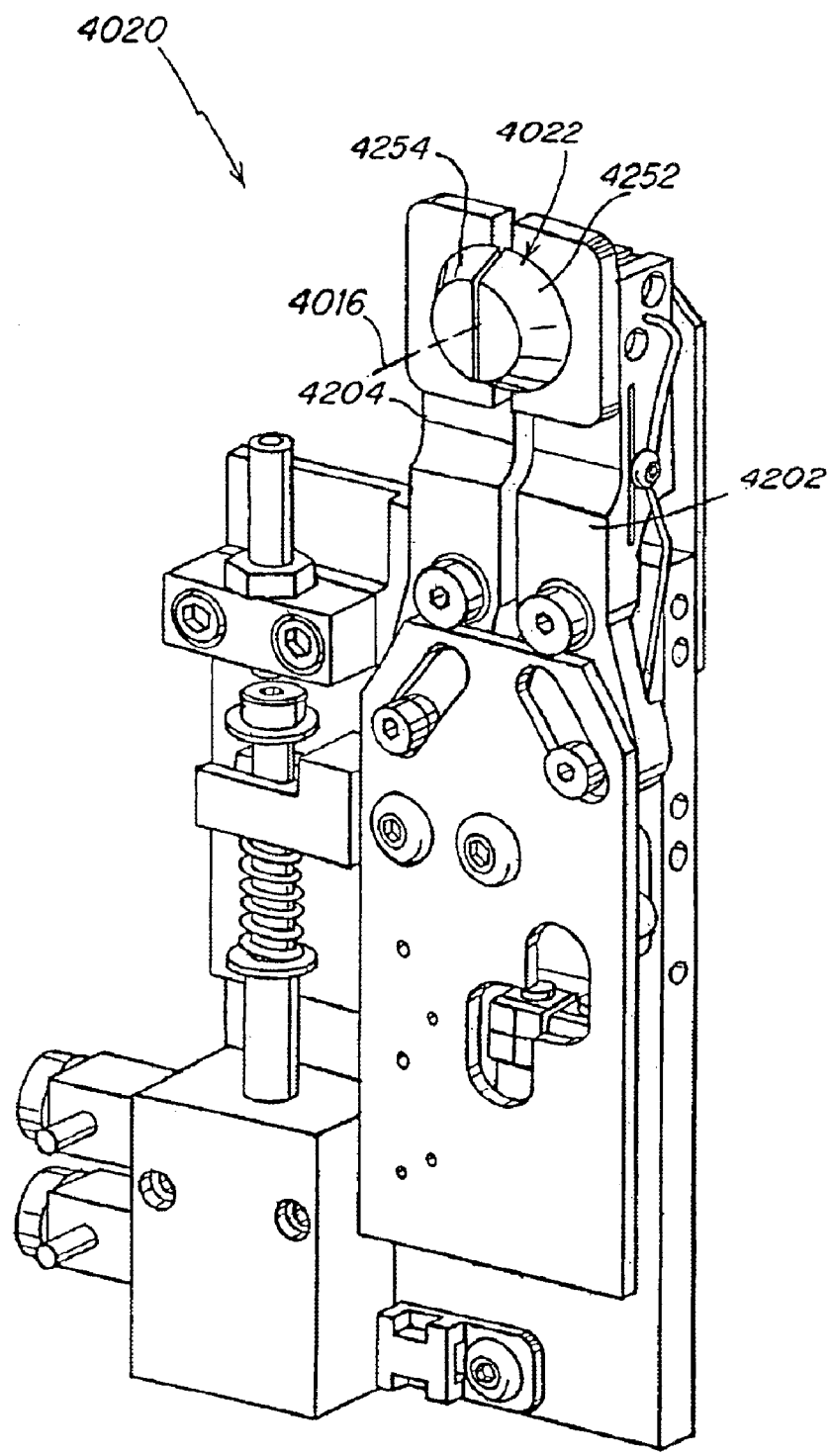
FIG. 38 illustrates a view of one embodiment of a clamping assembly of the cleaning apparatus.

One embodiment of the clamping assembly, illustrated in FIG. 38, is described below and in co-pending U.S. entitled Centralizing Clamp for an Optical Fiber, filed on the same date herewith. The clamping assembly may be provided with a sealing mechanism 4022 that seals around the diameter of the optical fiber and that mates with the aperture 4032 and a sealing gland 4304 (see FIG. 39) of the tank 4034 of the tank assembly 4030. With this arrangement, the sealing mechanism 4022 will seal the aperture 4032 through which the fiber extends into the tank 4034 with the sealing mechanism 4022 of the clamping assembly. The sealing mechanism may comprise opposing sealing members 4252, 4254. The sealing members and clamping assembly 4020 may be used to clamp the fiber in a position with an end 4018 of the optical fiber 4012 protruding from the sealing members 4252, 2454 so that the end 4018 of the fiber can be threaded through the aperture 4032 of the tank 4034 of the tank assembly 4030. It is to be appreciated that the sealing members may be attached to the clamping arms 4202, 4204 by any attachment means such as a bolt, screw, rivets, epoxy, and the like. The sealing members are configured to be compressed around the outer coating 4014 of the optical fiber in the closed position. The sealing members are also configured to form a plug that is inserted into the aperture 4032 of the tank 4034. In the illustrated embodiment, the plug has a frusto-conical shape that corresponds to the aperture 4032 and sealing gland 4304 of the tank 4034. It is to be appreciated that the plug can be formed from a compliant, solvent resistant material, such as a polyurethane material having a hardness of 55 Shore. It is also to be appreciated that the seal may be formed from any suitable material for preventing leaking of a solvent or other fluid. It may also have any suitable shape that is compatible with a corresponding aperture 4032 in the tank 4034. For example, the sealing mechanism may comprise sealing members having many shapes, such as the illustrated frusto-conical or cork-shaped sealing member (see exploded view in FIG. 40a). An alternative sealing mechanism may comprise sealing members 4257, 4259 and may be described as a super imposed bulls-eye shape, as illustrated in FIG. 40b.

Figure 39:
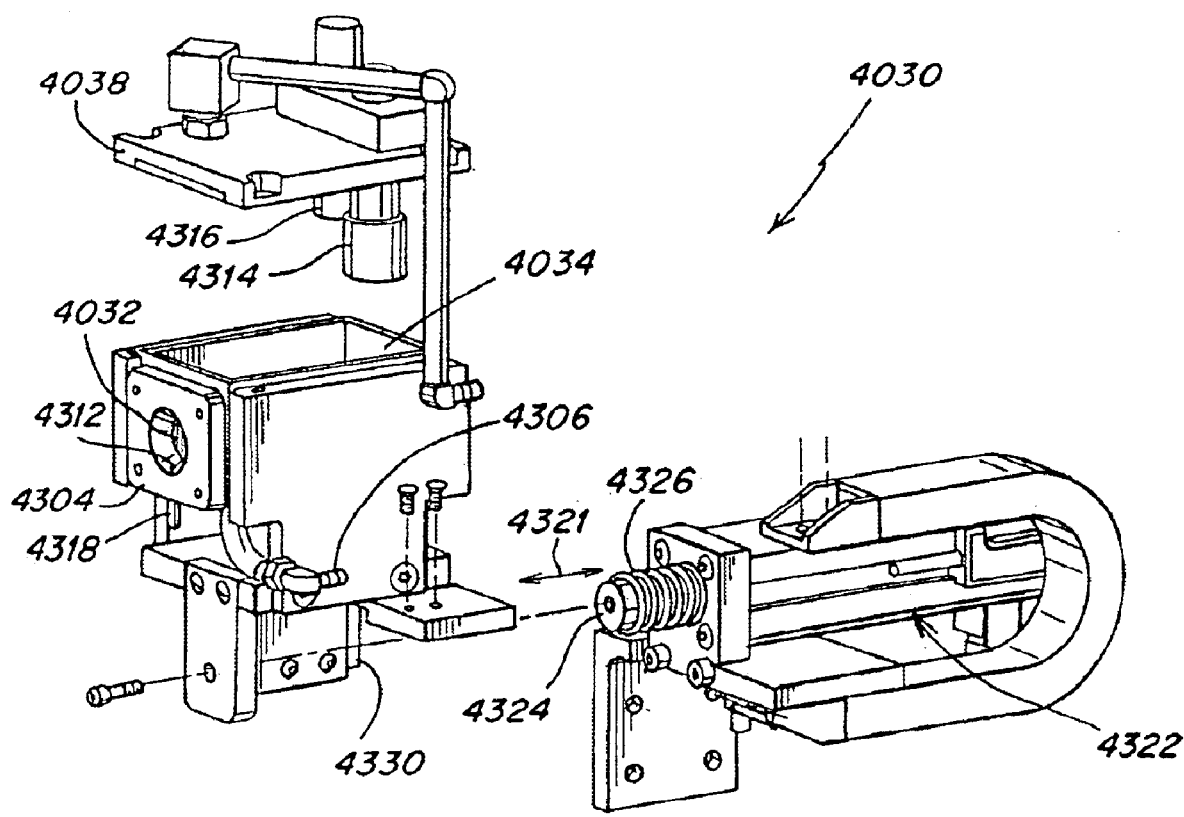
FIG. 39 illustrates an exploded view of one embodiment of a tank assembly of the cleaning apparatus.
Figure 40A:
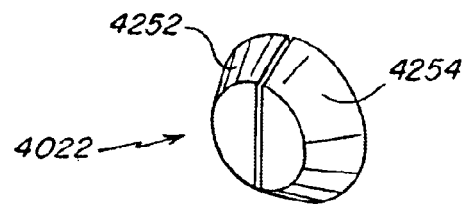
FIGS. 40a and 40b illustrate various embodiments of sealing jaws that may be used in the clamping assembly of the cleaning apparatus.
Figure 40B:
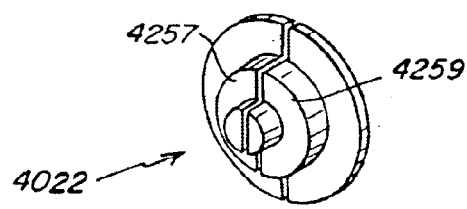

Referring to FIG. 39, there is illustrated an embodiment of a tank assembly 4030 of the cleaning apparatus 208. According to this illustrated embodiment, the tank assembly 4030 comprises a tank 4034, an aperture 4032 for receiving an optical fiber held by the clamping assembly 4020, and a sealing gland 4304. According to one aspect of the illustrated embodiment, the aperture 4032 and the sealing gland 4304 are shaped and arranged to mate with the sealing mechanism 4022 of the clamping assembly 4020 and, in particular, the sealing members 4252, 4254 (see FIG. 40a) of the clamping assembly. With this arrangement, the combination of the sealing mechanism 4022 and the sealing gland 4304 provide a fluid seal of the aperture 4032 and tank 4034, with the clamping assembly holding an optical fiber within the tank 4034. Further, with the optical fiber held in the tank by the clamping assembly 4022 to form the fluid seal, the tank 4034 can be filled with a cleaning fluid without the cleaning fluid leaking from the tank and sealing mechanism 4022 interface. It is to be appreciated that alterations and modifications to the sealing mechanism and sealing gland may be apparent to those of skill in the art, and that such modifications and alterations are intended to be within the scope of this disclosure.

The illustrated embodiment of the tank assembly 4030 may also be provided with a fill/drain port 4306 that may be coupled to a fluid line and the pump 4050 (see FIG. 37), to pump the fluid from a fluid reservoir assembly 4060 (see FIG. 37) to the tank 4034, and also to the pump the cleaning fluid from the tank 4034 to the fluid reservoir assembly. The pump 4050 and the fluid reservoir assembly 4060 will be described in further detail infra. It is to be appreciated that various modifications may be readily apparent to one of skill in the art and that these modifications are intended to do within the scope of this disclosure. For example, although the tank assembly is illustrated with one fill/empty port, it may be provided with a fill port and an empty port that each may be coupled to one or more pumps.

According to another aspect of the illustrated embodiment of the tank assembly, the tank assembly may be provided with a top assembly 4308. In addition, referring to the schematic of FIG. 35, the tank assembly may be provided with a sensor 4036 for sensing a fluid level in the tank 4034. In the illustrated embodiment of FIG. 39, the top assembly 4308 is provided with a first sensor 4314 and a second sensor 4316. According to one aspect of the tank assembly 4030, each of the sensors 4314, 4316 may be capacitive sensors that sense a capacitance associated with a fluid level of the cleaning fluid inside the tank 4034. It is also to be appreciated that alternative sensors may also be used, such as, optical sensors, and the like. With this arrangement, one sensor 4316 may be calibrated and used to detect the presence of the cleaning fluid up to a desired fill level in the tank. In other words, the sensor 4316 may detect whether the tank is filled with the cleaning fluid. In addition, the other sensor 4314 can be calibrated and used to sense that the tank is not empty. In particular, the second sensor may be calibrated to detect the presence of some fluid in the tank, which is indicative that the tank is not empty. With this arrangement, the first and second sensors act in concert to detect when the tank is filled with the cleaning fluid, when the tank is not empty (when the tank is neither full nor empty), and therefore also when the tank is empty. In the illustrated embodiment, the first and second sensors may also be coupled to controller 4080. The sensors can monitor the different levels of the cleaning fluids as sensed by the first and second sensors, and provide this information to the controller. It is to be appreciated that various modifications to the top assembly may be readily apparent to those of skill in the art and that such modifications are intended to be within the scope of this disclosure. For example, the second sensor may be used to detect that the tank is empty. In addition, each sensor can be provided with respective sensor electronics. Further, the sensor electronic may include a processor that determines the fluid levels as indicated by the sensor signals, and may provide this information to the controller 4080.

Referring again to FIG. 37 in conjunction with FIG. 39, controller 4080 may be coupled to the sensor to monitor the fluid level within the tank 4034. In addition, controller 4080 may be coupled to an ultrasonic transducer 4038 (not illustrated). With this arrangement the cleaning fluid level in the tank can be monitored, and when it is filled to a desired level, the ultrasonic transducer 4038 may be turned on for a predetermined period of time, which is adaptable to various conditions. For example, the predetermined length of time may be selected to optimize cleaning the optical fiber after the outer coating has been stripped from the end of the optical fiber, for different optical fibers having different diameters, outer coatings, coating types and the like. With this arrangement, ultrasonic transducer 4038 may remain on for the predetermined period of time and then be deactivated by the controller 4080. It is to be appreciated that various alterations and modifications may be readily apparent to those of skill in the art and that such modifications are intended to be within the scope of this disclosure. For example, the transducer may be other than ultrasonic and the controller may be implemented in any of hardware, software and combinations thereof.

According to another aspect of the illustrated embodiment of the tank assembly 4030, the tank assembly may be provided with a vacuum port 4318. The vacuum port 4318 may be coupled to a vacuum sensor 4320 and vacuum assembly 4072 (see FIG. 43). In addition, the sealing gland 4304 may be provided with an aperture 4312 coupled to the vacuum port 4318. Further, the vacuum sensor 4320 may be coupled to the controller 4080. With this arrangement, the vacuum sensor can sense when there is a vacuum seal present at the interface between the sealing gland 4304 of the tank 4034 and the sealing mechanism 4022 of the clamping assembly 4020. The vacuum assembly 4072 can be interfaced to the vacuum port 4318 to provide a suction through the aperture 4312. With this arrangement, the vacuum sensor 4320 can detect the presence of a strong vacuum and a weak vacuum. A strong vacuum can be an indication that there is a fluid seal between the tank assembly 4030 and the clamping assembly 4022. Less vacuum pressure may indicate that there is no seal or that the seal is not fluid tight. Moreover, the aperture 4312 and vacuum port 4318 can be used to suction any residual cleaning fluid that may reside at the interface, when the tank assembly 4030 is disengaged from the cleaning assembly 4022. Further, the combination of the aperture 4312, the vacuum port 4318 and vacuum assembly 4072 may also be used to vacuum any fluid leaks that occur at this interface.

It is to be appreciated that, with this arrangement, there is an automatic sensing of a fluid seal between the tank assembly 4030 and the clamping assembly 4022. This detection of a fluid seal can initiate a sequence of steps of a method of cleaning a portion of an optical fiber, comprising, for example, the filling the tank assembly 4030 with the cleaning fluid, activating the ultrasonic transducer 4038 to clean the optical fiber for the predetermined period of time and draining the tank of cleaning fluid. For example, after the optical fiber has been clean for a selected time period, the pump assembly 4050 may pump the cleaning fluid out of the tank assembly 4034 to the fluid reservoir assembly 4060. It is to be appreciated that various alterations and modifications to the vacuum port and vacuum sensor may be readily apparent to those of skill in the art and are intended to be within the scope of this disclosure. For example, in addition to vacuum port that suctions off any residual cleaning fluid, there may also be provided an additional sensor, such as, an optical sensor to detect a fluid seal between the tank assembly 4030 and the clamping assembly 4020.

Another aspect of the illustrated embodiment of the cleaning apparatus 208 and the tank assembly 4030 is that it may be provided with an actuator assembly 4322, as illustrated in FIG. 39. The cleaning device may also comprise a linear bearing rail 4046 (see FIG. 37) and the tank assembly can be provided with a corresponding linear bearing car 4330 that mates with the linear bearing rail. The tank assembly may be mounted to the linear bearing car 4330 (see FIG. 39). The tank assembly is provided with a pneumatic actuator 4322 to move the tank 4034 along axis 4321 against the clamping assembly 4022 and to hold the tank 4034 in fluid engagement with the clamping assembly. The pneumatic actuator 4322 may operate in a similar manner as the pneumatic actuator 4322 of the clamping assembly. In particular, the pneumatic actuator may comprise an air piston 4324 and an adjustment spring 4326. In the illustrated embodiment, the pneumatic actuator is attached to the frame 4074 of frame assembly 4070 (see FIG. 37). The air piston may be actuated, for example, against a fixture (not illustrated) rigidly attached to the tank assembly 4030. With this arrangement, the pneumatic actuator, in response to an actuation signal, can bias the air piston against the fixture which in turn will urge the tank assembly into engagement with the clamping assembly. In one aspect of this embodiment, the pneumatic actuator will constantly bias the tank assembly against the clamping assembly to provide the fluid seal. In other words, the tank assembly 4030 is constantly biased against the frame assembly 4022, unless the pneumatic actuator is provided with a deactivation signal from controller 4080, and it will stay in the activated position even if there is a power loss. In response to a deactivation signal, the pneumatic actuator may retract the air piston and allow the tank assembly to disengage from engagement with the clamping assembly.

Figure 41:
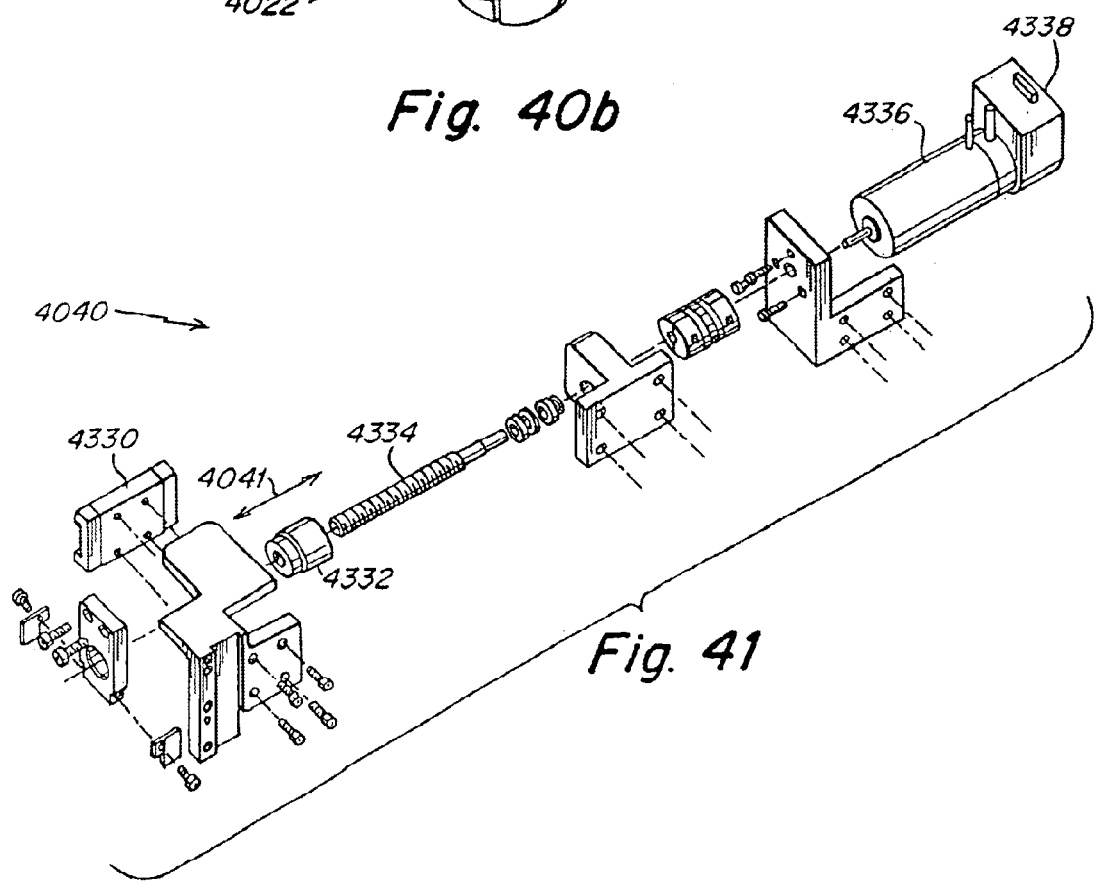
FIG. 41 illustrates an exploded view of one embodiment of a servo assembly of the cleaning apparatus.

Another aspect of the illustrated embodiment of the cleaning device 208, is a servo assembly to which is illustrated in detail in FIG. 41. The servo assembly may be coupled to the clamping assembly 4020 to move the clamping along axis 4041, to facilitate the clamping of the optical fiber 4012 at the outer coating 4014 beyond the fiber to coating transition 4015 (see FIGS. 36a–36b). The illustrated embodiment of the servo assembly may be provided with a nut 4332 and a lead screw 4334 which are attached to a servo motor 4336. According to one aspect of this servo assembly 4040, a corresponding linear bearing car 4330 can be affixed to the nut 4332 by coupling arrangement and the servo motor 4336 can rotate the lead screw to move the nut back and forth along the longitudinal axis 4041 of the lead screw to a plurality of positions. In addition, the servo motor can be provided with an encoder 4338 wherein a plurality of positions of the lead screw and linear bearing car corresponding to encoding positions of the encoder. According to one aspect of the servo assembly, the servo encoder can be coupled to the controller 4080. With this arrangement, the controller 4080 can control the servo assembly to move the lead screw, nut and the linear bearing car to any of a plurality of positions based on the encoder positions of the encoder. With this arrangement, the linear bearing car and therefore the clamping assembly 4020 can be moved to a number of positions away with respect to a stationary optical fiber, which may be held in place, for example, by a tray such as disclosed in co-pending U.S. application entitled Tray for a Coiled Optical Fiber, filed on the same date herewith. With this arrangement the clamping assembly can be moved to a position to hold the optical fiber at the outer coating beyond the fiber to coating transition 4015.

It is to be appreciated that according to one aspect of the cleaning device 208 the servo assembly 4040 and the pneumatic actuator 4322 can in combination move the tank assembly into an engaged and fluid sealed position with the clamping assembly 4020. It is also to be appreciated that with this arrangement the clamping assembly can be moved to along axis 4041 to a position that the clamping assembly can hold the optical fiber 4012 of its outer coating 4018, without damaging the optical fiber. It is further to be appreciated that various alterations and modifications may be made by those of skill in the art and are intended to be within the scope of the disclosure.

Figure 42:
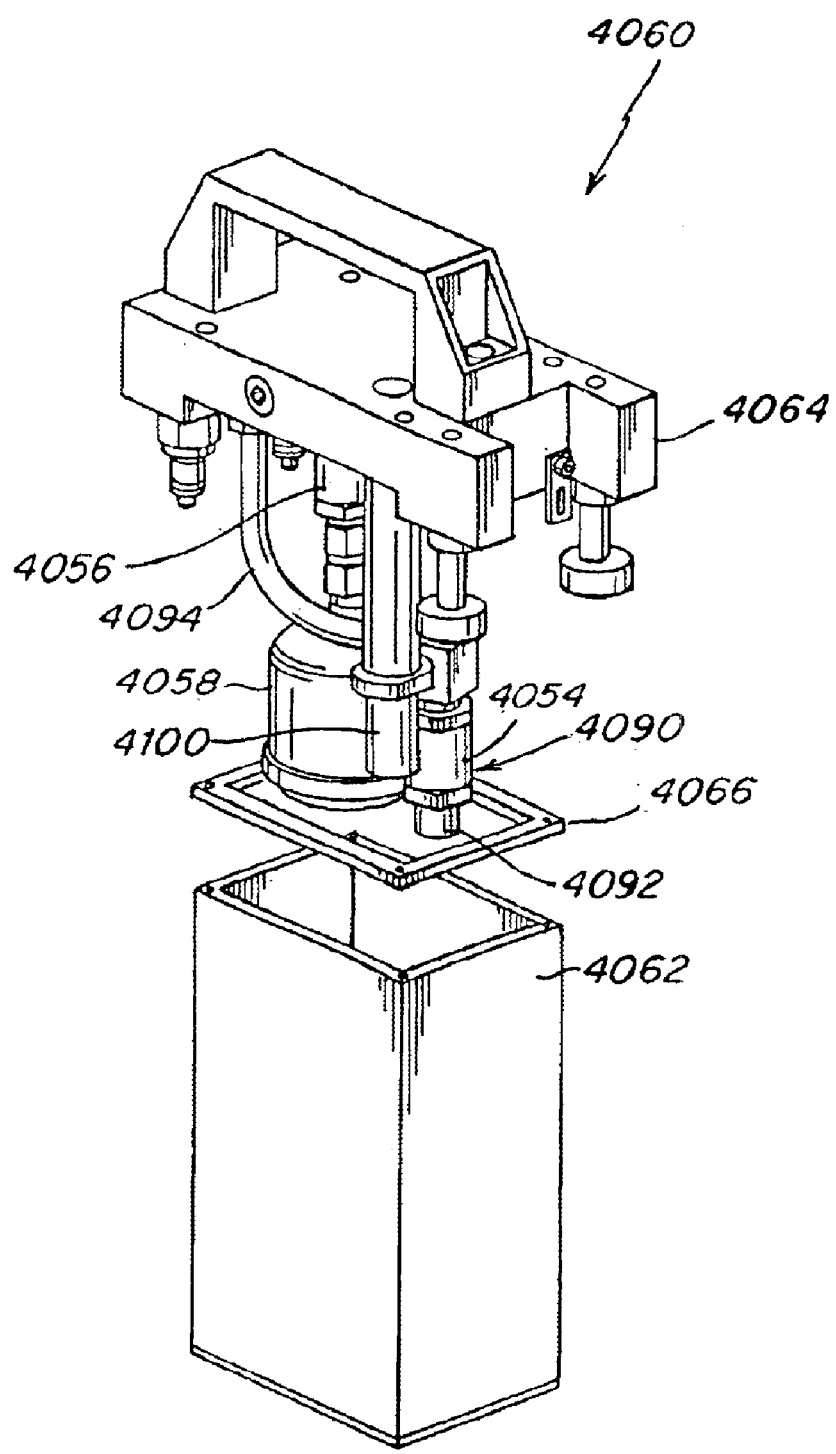
FIG. 42 illustrates an exploded view of one embodiment of a fluid reservoir assembly of the cleaning apparatus.

Referring to FIG. 42, there is illustrated a perspective view of an embodiment of the fluid reservoir assembly 4060 of the cleaning apparatus 208. According to this embodiment, the fluid reservoir assembly includes a reservoir tank 4062, a cap assembly 4064, and a gasket 4066 that may be disposed between a top of the reservoir tank 4062 and the cap assembly 4064. The fluid reservoir assembly holds the cleaning fluid and may be coupled to pump 4050, which is illustrated with an exploded view of a portion of frame assembly 4070 in FIG. 43. According to the illustrated embodiment of the fluid reservoir assembly 4060, the cap assembly 4064 comprises a dip tube assembly 4090 including a dip tube 4092 which extends into the reservoir tank 4062. The dip tube assembly comprises check valve 4054 in series between the dip tube assembly and a fluid line 4094 that is coupled to the pump 4050. This check valve 4054 is arranged to allow cleaning fluid to be drawn by the pump 4050 from the reservoir tank 4062 to the pump and to be pumped to the tank assembly 4030. In addition, the check valve 4054 prevents fluid from being pumped by the pump 4050 to the fluid reservoir assembly through the dip tube assembly. The illustrated embodiment of the cap assembly 4064 is also provided with a second check valve 4056 in series with a filter 4058. The second check 4056 valve allows fluid to be pumped by the pump 4050 from the tank assembly 4030 to the fluid reservoir assembly 4060. With this arrangement, the fluid can be pumped to the fluid reservoir assembly 4060 by the pump 4050 and filtered by the filter 4058 to filter out any debris or residual buffer material that may be in the cleaning fluid.

Figure 43:
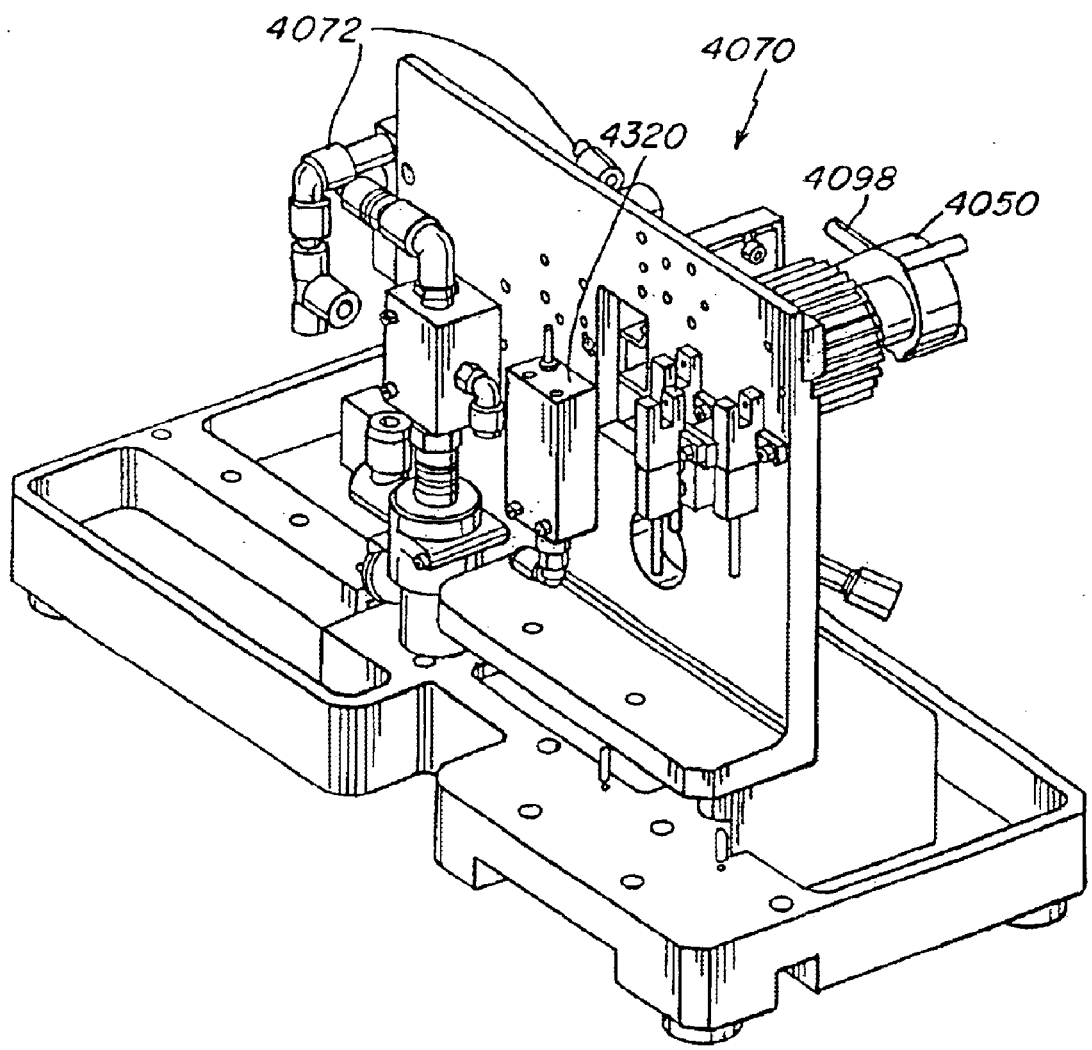
FIG. 43 illustrates an exploded view of one embodiment of a frame assembly of the cleaning apparatus.

According to the illustrated embodiment each of the check valves 4054, 4056 may be coupled by a respective fluid line coupled to the pump 4050 of FIG. 43. The pump 4050 may comprise a first port 4098 and a second port (not illustrated). The respective fluid lines may be coupled to the first and second ports. As has been discussed herein, the pump 4050 can pump fluid from the fluid reservoir assembly 4060 to the tank assembly 4030 via the dip tube assembly including dip tube 4092, the check valve 4054 and the fluid line (not illustrated). In addition, the pump 4050 can pump the fluid from the tank assembly 30 to the fluid reservoir assembly 4060 via a fluid line (not illustrated), check valve 4056 and the filter 4058. The check valves 4054, 4056 to ensure that the fluid only moves in one direction through the corresponding fluid line. It is to be understood that in the illustrated embodiment, the cleaning fluid is filtered when it is pumped to the fluid reservoir assembly. However, it is to be appreciated that modifications of this embodiment may be readily apparent to those of skill in the art and are intended to be within the scope of this disclosure. For example, the filter can alternatively be placed in a series between dip tube assembly 4090 and check valve 4054 to filter the cleaning fluid as it is pumped from the fluid reservoir assembly to the tank assembly 4030. Moreover, more than one pump may be used to pump the fluid in both directions between the fluid reservoir assembly and the tank assembly, one pump to pump the cleaning fluid from the fluid reservoir assembly to the tank assembly and a second pump to pump the fluid from the tank assembly to the fluid reservoir assembly. It is further to be appreciated that with more than one pump, the check valves may not be provided.

The illustrated embodiment of the fluid reservoir assembly 4060 may also be provided with a fluid liquid level sensor 4100. The fluid level sensor can be an optical sensor, a capacitive sensor or any other sensor known to those of skill in the art. It is to be appreciated that the sensor can be calibrated to sense a level of the cleaning fluid in the reservoir tank 4062. In addition, this embodiment can be provided with sensor electronic including, for example, a sensor amplifier that may be coupled to the controller 4080 and that receives a sensor signal corresponding to the level of fluid in the fluid reservoir tank 4062. With this arrangement, the controller can monitor the level of the cleaning fluid within the reservoir assembly and provide an indication that the cleaning fluid has reached a certain level. The controller 4080, with information about the fluid level of the fluid reservoir assembly and with information from the fluid level sensors in the fluid tank assembly 4030, can determine whether the cleaning fluid is in the tank assembly 4030 or that cleaning fluid should be added to the fluid reservoir assembly 4060. For example, this arrangement can determine if there has been an evaporation of the cleaning fluid. It is to be appreciated that various alterations and modifications may be readily apparent to those of skill in the art and that such alterations and modifications are intended to be within the scope of this disclosure. For example, more than one sensor can be used to determine the level of the cleaning fluid in the reservoir tank.

Referring to FIG. 43, there is also illustrated an exploded view of a portion of the frame assembly 4070 of the cleaning apparatus 208. According to the illustrated embodiment, the pump 4050 may be housed at this part of the frame assembly. In addition, vacuum assembly 4072 may also be disposed in this portion of the frame assembly and coupled to aperture 4312 in sealing gland 4304 through vacuum port 4318, (see FIG. 37) and to vacuum sensor 4320. This arrangement of the vacuum assembly 4072 and the vacuum sensor 4320 monitors the vacuum pressure in the vacuum assembly to determine whether there is a fluid seal between the clamping assembly 4022 and the tank assembly 4030, as discussed herein, and to suction any fluid leaking or remaining at the clamping assembly to tank assembly interface. Further, the illustrated embodiment of the frame assembly may comprise the sensors that monitor the position of the clamping arms 4202, 4204 of the clamping assembly 4020, as discussed herein. It is to be appreciated that various modifications to the frame assembly and to the cleaning assembly may be readily apparent to those of skill in the art and are intended to be within the scope of the disclosure. For example, any of the pump 4050, the vacuum assembly 4072, the vacuum sensor 4320 and the position sensors may not be disposed within this part of the frame assembly.

One embodiment of cleaning fluid that can be used in the automatic cleaning device 208 is known by the trade name EnSolv® which is manufactured by Enviro Tech International, Inc., 2525 W. LeMoyne Ave., Melrose Park, Ill. 60160. One of the properties of EnSolv® that makes it suitable for the cleaning device 208 is its relatively high flash point of 400° C. In contrast, isopropyl alcohol has a flash point of 12° C. Accordingly, EnSolv® is suitable to the automatic cleaning device described herein, which has a high throughput of fiber optical assemblies and reuses the same cleaning solution. In particular, EnSolv® can be used in the automatic cleaning device without the risk of heating the cleaning solution to its flash point and subsequent fire. Additional advantages of using EnSolv® is the cleaning fluid comprise that it may attack the residual particulate material and buffer material left on the optical fiber after it has been stripped. Further, EnSolv® does not leave a film on the optical fiber after it has been cleaned.

It is to be appreciated that various alterations and modifications to the cleaning device and method, and the cleaning solution may be readily apparent to those of skill in the art and are intended to be within the scope of this disclosure. For example, other cleaning solutions having the same properties may be used and are intended to be within the scope of this disclosure. In addition, it has been discovered that cleaning optical fibers with the method and apparatus described herein improves with heating of the cleaning fluid. The heating of the cleaning fluid can be done, for example, by repeated cycling and use of the cleaning device and cleaning fluid. Alternatively, the cleaning device can be provided with a heater to heat the cleaning fluid. Moreover, it is possible, for example, to use alcohol and to provide the cleaning device, for example, with a temperature sensor, and to vary the throughput rate so that there is a low probability of reaching the flash point of the alcohol.

Having described various embodiments of a cleaning tool for use in the fiber preparation system, it should be understood that the description is by way of example only and that other suitable cleaning device configurations may be implemented with the system as would be apparent to one of skill.

Cleave Tool

The fiber preparation module may include an automated cleave tool 208 that is configured to cleave a portion of the stripped fiber to produce a fiber end of high optical quality. In this regard, the cleave tool is configured to remove a portion of the core that may include various defects associated with cutting the fiber to length and/or stripping the buffer from the fiber. The cleaving process generally includes placing the fiber end under a desired amount of axial tension and scoring the surface of the fiber to create a surface defect at a desirable location. Under the influence of the axial tension, the surface defect propagates diametrically across the fiber core, resulting in a cleaved end.

Figure 44:
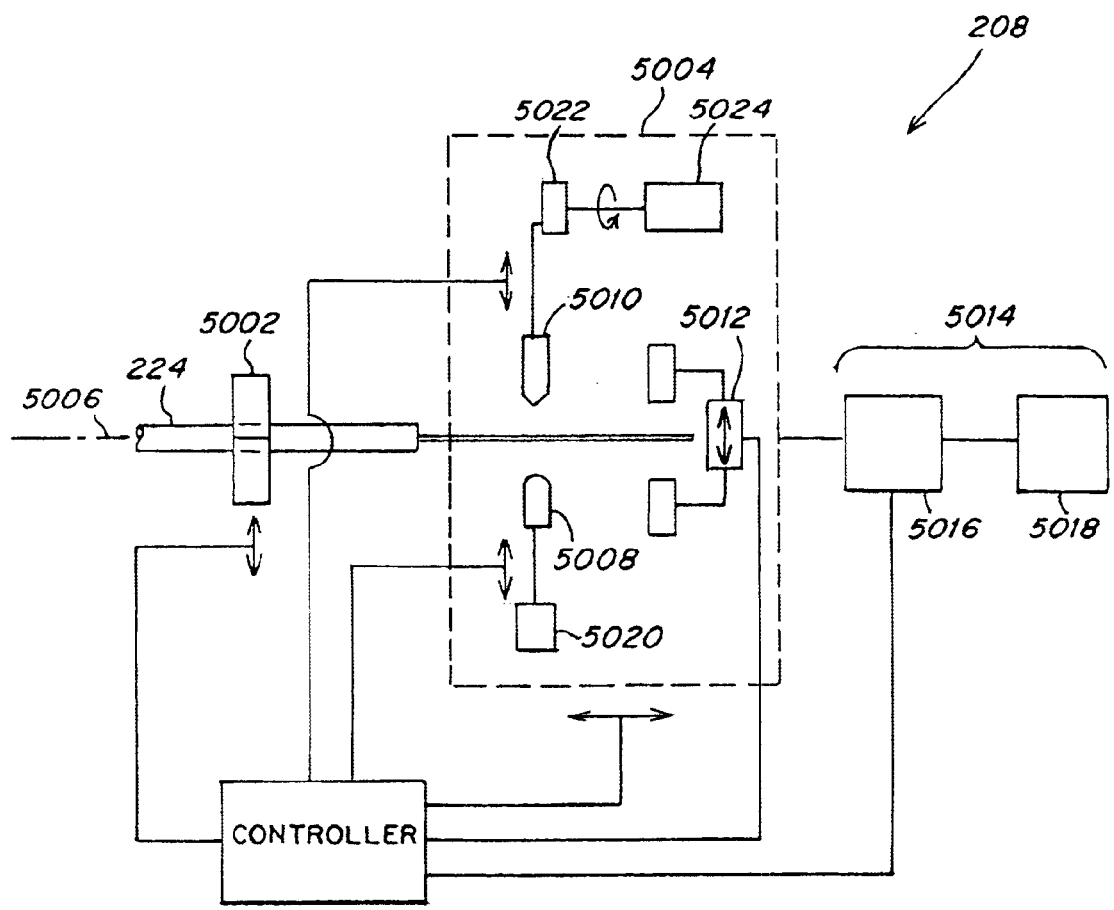
FIG. 44 is a schematic diagram of one illustrative embodiment of a cleave tool.

One embodiment of the cleave tool 208 is schematically illustrated in FIG. 44. The cleave tool 208 includes a centralizing clamp 5002 that is configured to locate a fiber 224 presented to the cleave tool and clamp the fiber along a cleave axis. A cleave mechanism 5004 is moveably supported toward and away from the centralizing clamp 5002 along the cleave axis 5006 to precisely position an arbor 5008 and an opposing cleave knife 5010 at a desired location along the stripped fiber end. Once the arbor and the cleave knife are positioned, a secondary clamp 5012 provided on the cleave mechanism grasps the tip portion of the fiber. A fiber tension device 5014 pulls the cleave mechanism 5004, which in turn pulls the secondary clamp 5012 away from the centralizing clamp to place a load on the fiber to create a desired axial tension in the fiber.

Once the desired tension is achieved, the arbor 5008 is moved radially into engagement with the fiber, thereby pushing a portion of the fiber toward the cleave knife 5010 to create a bend in the fiber. Once the bend is created, the cleave knife 5010 is moved radially inward toward the surface of the fiber opposite the arbor. Touching the surface of the fiber with the cleave knife 5010 creates a defect that propagates diametrically across the fiber to produce the cleaved end.

In one embodiment, the fiber tension device 5014 may include a load cell 5016 that connects the cleave mechanism to a solenoid 5018. As current is delivered to the solenoid in response to an actuation signal, the cleave mechanism is pulled away from the centralizing clamp to place the fiber under axial tension. The amount of tension is determined by the axial force measured by the load cell. Electrical current to the solenoid may be adjusted, in response to the signal from the load cell, to vary the amount of tension in the fiber.

In one embodiment, the arbor 5008 is moved toward and away from the fiber using a pneumatic air cylinder 5020. The cleave knife 5010 may be moved toward and away from the fiber using a slider/crank mechanism 5022 driven by a servomotor 5024 to exercise precise control of the speed of the knife toward the fiber. Other suitable mechanisms for driving the arbor and/or the cleave knife are contemplated such that the cleave tool is not limited to any particular drive mechanisms. The cleave knife may include a diamond blade, although other cleaving devices, such as a carbide wheel, may be employed to create the surface defect.

Figure 45:
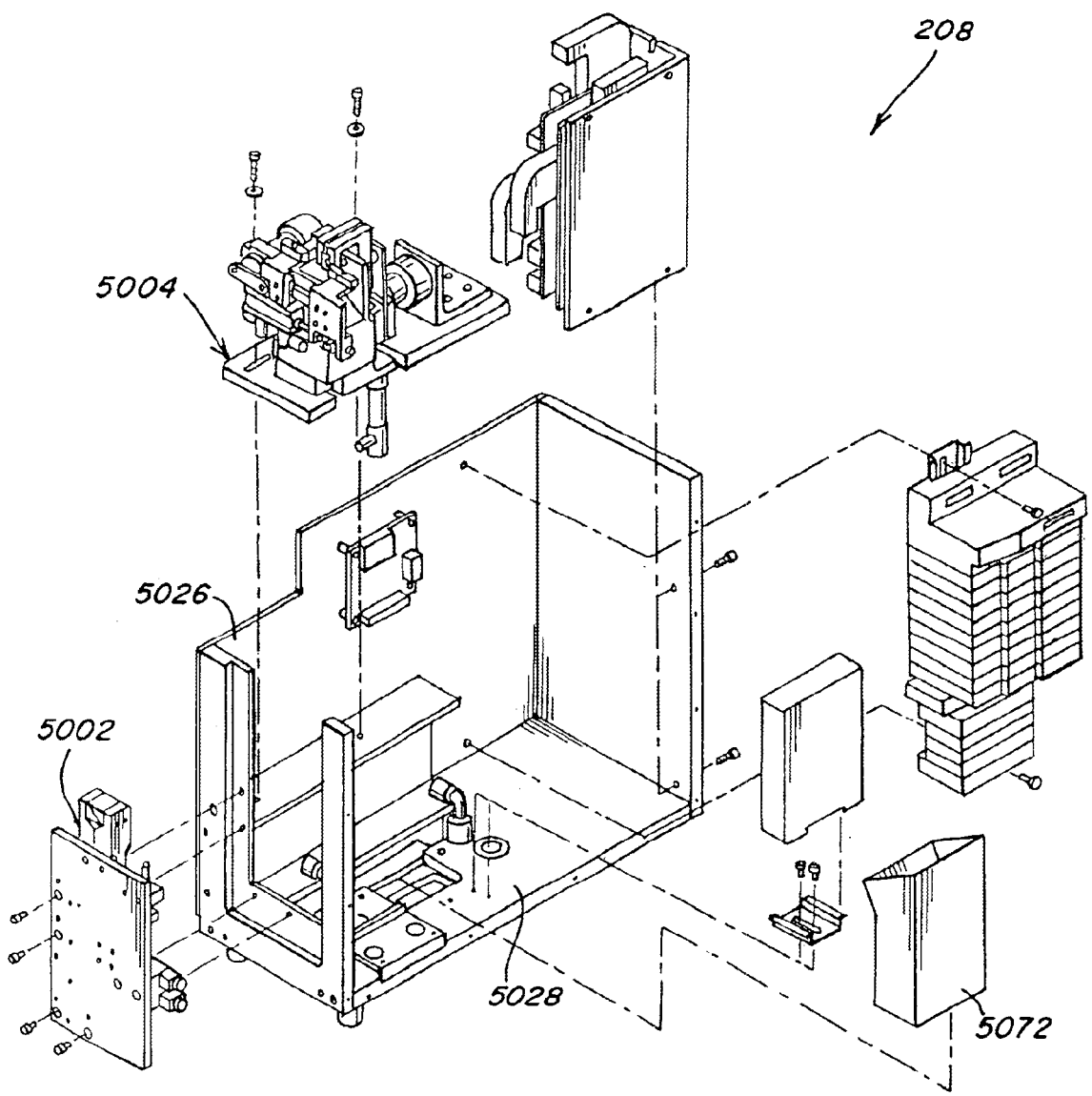
FIG. 45 is an exploded perspective view of one illustrative embodiment of a cleave tool.
Figure 46:
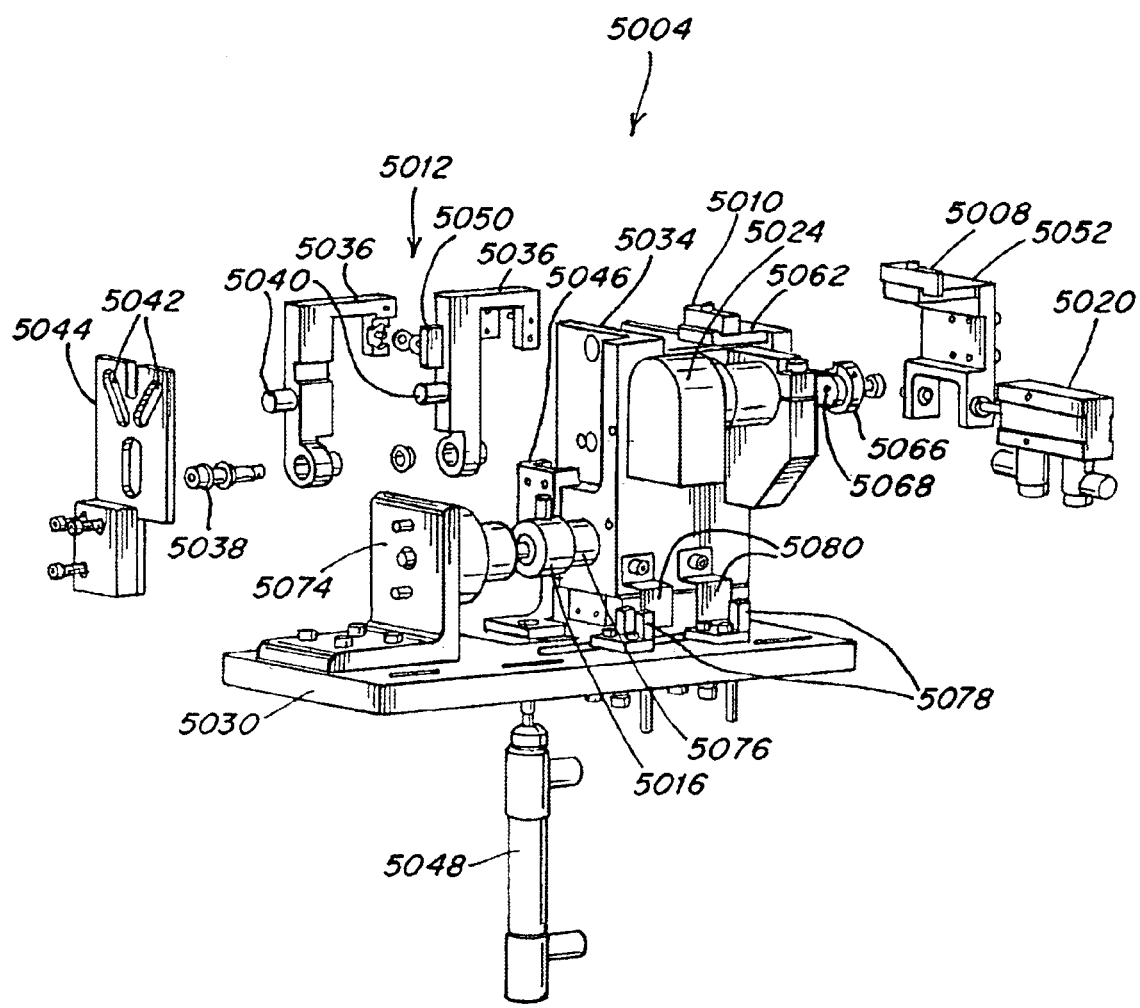
FIGS. 46–47 are exploded perspective views of a cleave mechanism for the cleave tool of FIG. 45.
Figure 47:
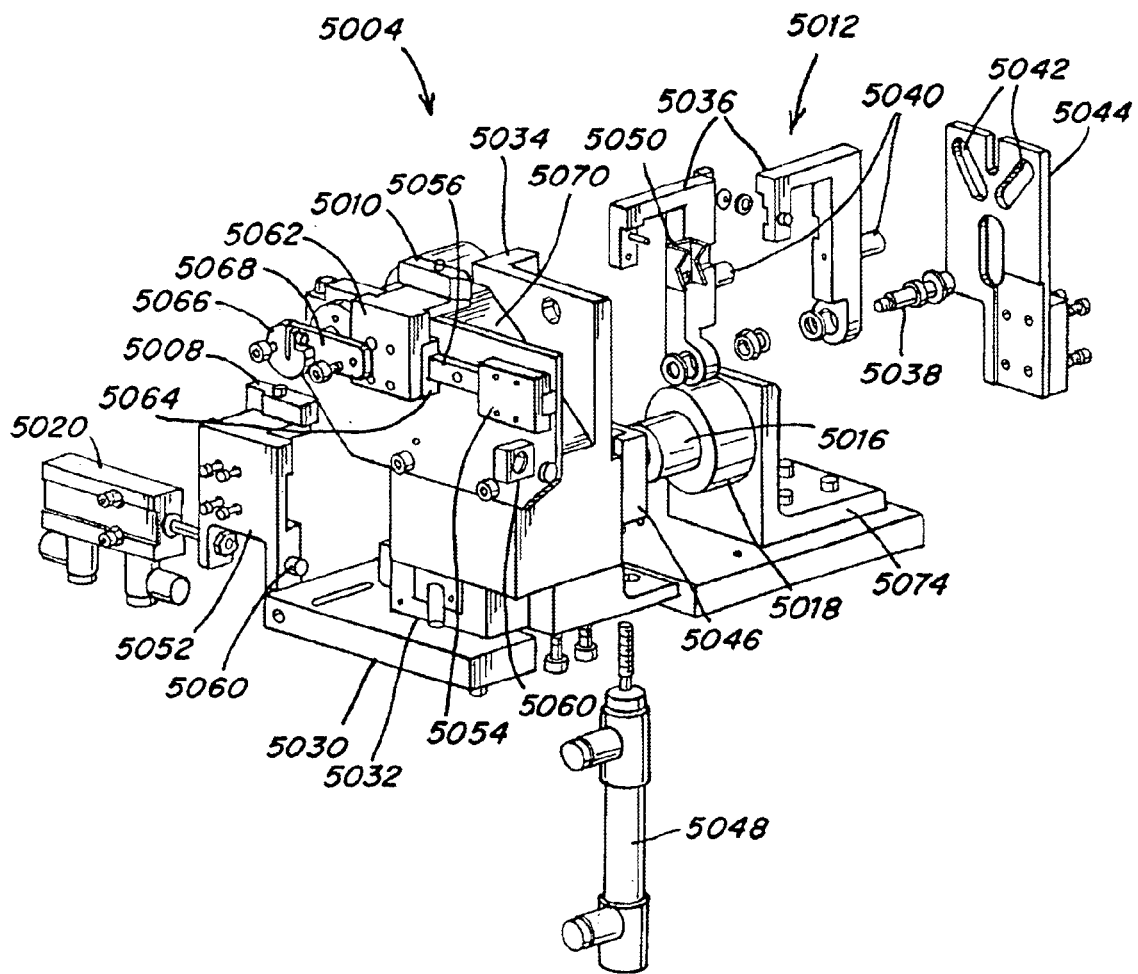
Figure 48:
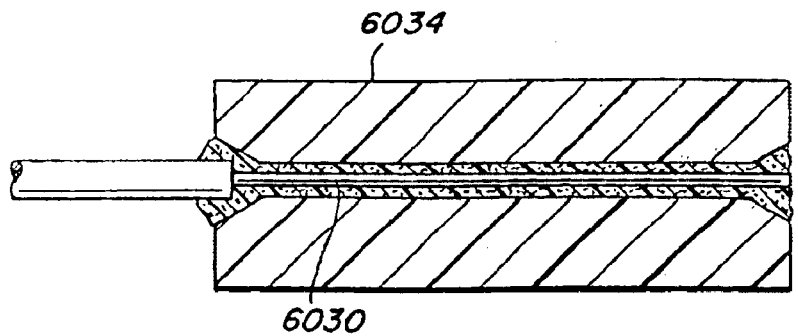
FIG. 48 is a cross-sectional side view of a ferrule attached to a fiber.
Figure 49:
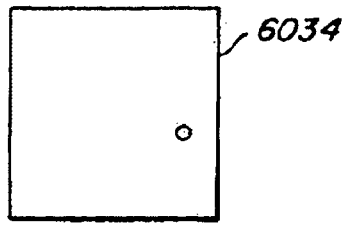
FIG. 49 is an axial view of a fiber ferrule with an offset opening.
Figure 50:
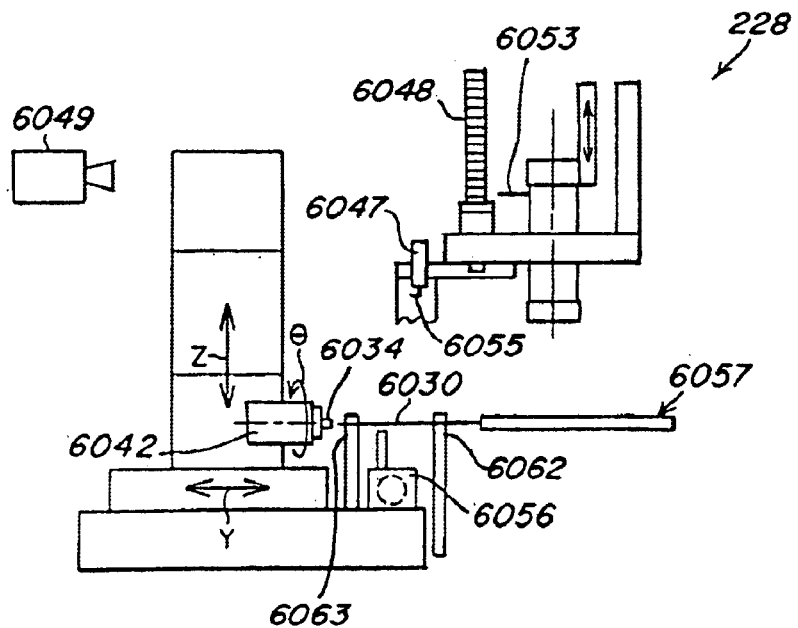
FIG. 50 is a schematic view of an embodiment of the ferrule attachment tool.
Figure 51:
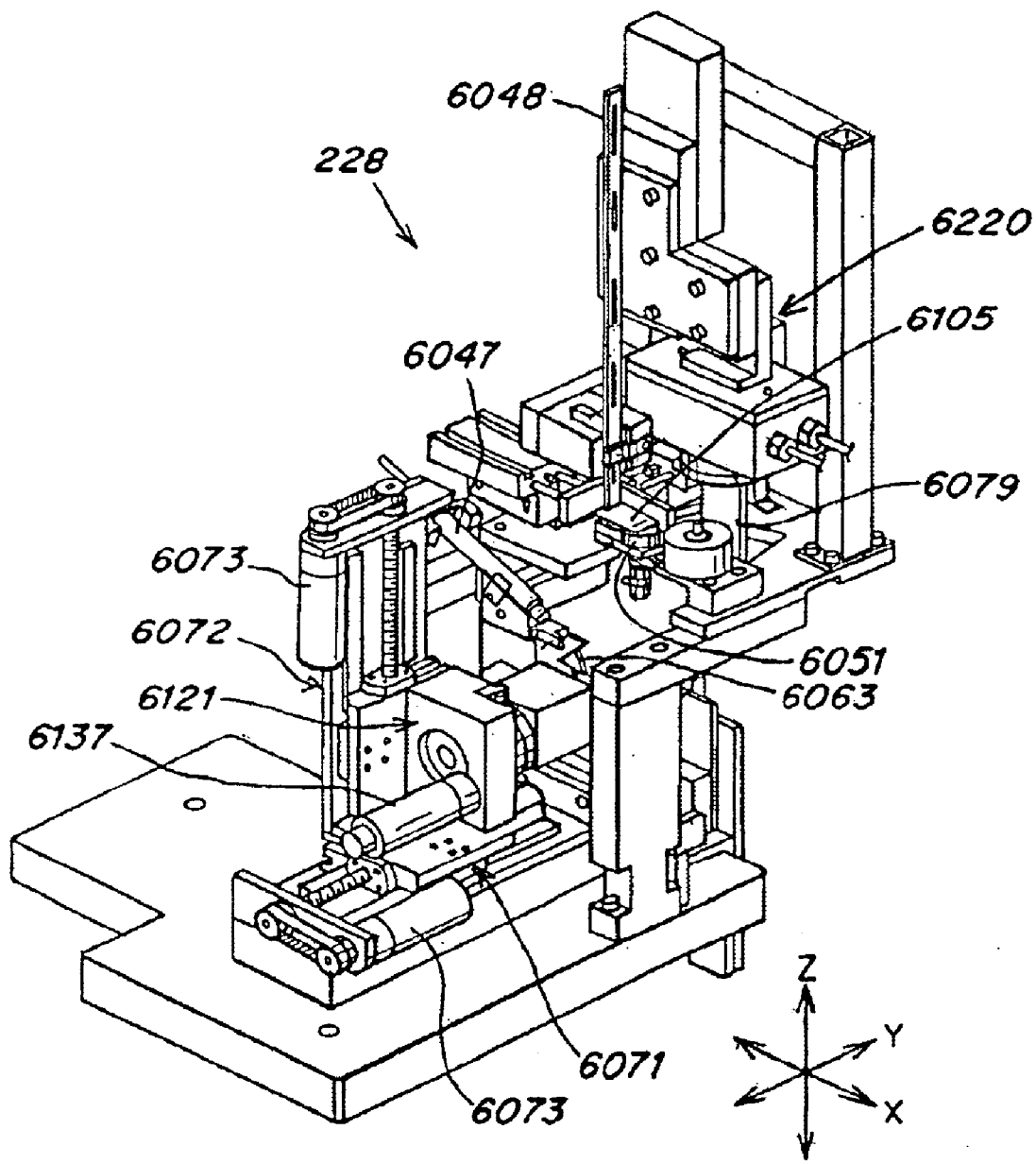
FIG. 51 is a perspective view of a ferrule attachment apparatus according to one illustrative embodiment of the ferrule attachment tool.

FIGS. 45–47 illustrate one embodiment of a cleave tool 208 that may be employed with the fiber preparation systems. It is to be understood, however, that the system may employ any suitable cleaver tool that is configured to automatically cleave a fiber end.

In one illustrative embodiment shown in FIG. 45, the cleave tool 208 includes a cleave mechanism 5004 that may be supported within a cleave housing 5026. A centralizing clamp, as described more fully below, may be mounted to the housing to locate a fiber presented to the cleave tool and located along a cleave axis relative to the cleaver mechanism.

The cleave tool 208 may also include a tool interface 5028 to provide all necessary mechanical, electrical, pneumatic and control signals to and from the tool. Tool electronics and a controller may also be provided with the cleave tool.

In one illustrative embodiment shown in FIGS. 46–47, the cleaver assembly 5004 includes a cleave mechanism 5004 that is moveably supported on a base plate 5030 and a tension mechanism 5014 that is coupled to the cleave mechanism and configured to move the cleave mechanism along the cleave axis of the tool.

The cleave mechanism is mounted to the base plate with a linear slide 5032 to allow the cleave mechanism to move along the cleave axis. The secondary clamp 5012, arbor 5008 and cleave knife 5010 are all supported by a cleave block 5034 that is mounted to the slide. It is to be appreciated that other suitable arrangements for moveably mounting the cleave mechanism to the base plate are contemplated as would be apparent to one of skill.

As indicated above, the cleave mechanism 5004 includes a secondary clamp 5012 that is configured to securely grasp the tip portion of the stripped fiber so that the fiber may be placed under a desired amount of tension. In one illustrative embodiment, the secondary clamp 5012 includes a pair of clamp arms 5036 that are rotatably supported on the block along a common pivot 5038. Each clamp arm includes a cam follower 5040 that is configured to cooperate with an angled slot 5042 provided in a cam plate 5044 that is moveably supported on the block with a linear slide 5046. The cam plate 5044 is coupled to a clamp actuator 5048, such as an air cylinder, which drives the cam plate in a vertical direction to open and close the clamp arms about the fiber. Clamp pads 5050 may be provided on the clamp arms 5036 to locate and securely grasp the fiber. It is to be appreciated that numerous other clamp arrangements may be used to grasp the fiber end.

In one illustrative embodiment, the arbor 5008 is supported by an arbor plate 5052 that is mounted to the carriage 5054 of a linear slide 5056 to allow the arbor to move in a radial direction relative to the cleave axis. An actuator 5020, such as a pneumatic air cylinder, is coupled to the arbor plate 5052 to move the arbor toward and away from the fiber in response to an actuation signal. An adjustment feature 5060 may be provided to selectively adjust the amount of bend placed on the fiber by the arbor. Of course, the arbor may be moved using any other suitable drive mechanism.

In one illustrative embodiment, the cleave knife 5010 is supported by a knife plate 5062 that is mounted to a carriage 5064 located on the linear slide 5056 along with the arbor. The knife plate 5062 is moved in a radial direction toward and away from the fiber axis using a cam 5066 and link 5068 arrangement that is driven by an actuator 5024, such as a servomotor, to precisely control the speed of the knife toward the fiber. Of course, any suitable drive mechanism may be employed to move the cleave knife.

The cleave block 5034 may be configured with a waste ramp 5070 that underlies the clamp pads 5050 of the secondary clamp. The ramp 5070 is configured to deliver cleaved material to a catch bin 5072 (FIG. 45) that is located within the housing adjacent the cleaver mechanism. The catch bin may be configured to accommodate a quantity of cleaved material that allows the tool to operate over any desired number of cycles or period of time. The catch bin may be readily removed from the tool housing to discard the waste material from the tool.

In one illustrative embodiment, the tension mechanism 5014 includes a solenoid 5018 that is supported on the base plate 5030 with a solenoid mount 5074. A load cell 5016 couples the solenoid 5018 to the cleave mechanism to monitor the load being applied by the solenoid on a fiber grasped by the secondary clamp. A coupler 5076 may be disposed between the load cell and cleave block.

One or more sensors may be provided on the cleave mechanism to monitor and control operation of the device. In one embodiment, a pair of optical sensors 5078 are mounted to the base plate 5030 adjacent the cleave block to monitor the forward and rearward motion of the cleave mechanism. The sensors cooperate with flags 5080 disposed on the block.

Having described various embodiments of a cleave tool for use in the fiber preparation system, it should be understood that the description is by way of example only and that other suitable configurations may be implemented with the system as would be apparent to one of skill.

Ferrule Attachment Tool

As indicated above, the system may also include a ferrule attachment tool for attaching a ferrule to the end of a fiber, such as an optical fiber. An example of a ferrule attachment tool suitable for use with any of the embodiments of the present invention is described in co-pending U.S. patent application entitled "Apparatus and Method for Attaching a Component to a Fiber", filed on even date herewith, and incorporated herein by reference (hereafter the "Ferrule Attachment Tool Application"). However, it should be appreciated that the various embodiments of the present invention directed to automated preparation of optical fiber is not limited to use with any particular ferrule attachment tool. Various illustrative embodiments of a ferrule attachment tool, as provided in the Ferrule Attachment Tool Application, are presented below.

The ferrule attachment station may perform one or more of the following functions automatically, that is without requiring manual user interaction: accepting a stripped end of an optical fiber, maintaining the stripped end of the fiber in a predetermined location that is accessible to mounting by a ferrule, deploying a ferrule from a supply of ferrules, determining the orientation of the ferrule and then re-orienting (if necessary) the ferrule, depositing an adhesive into the ferrule (if the ferrule has not been pre-loaded with an adhesive), mounting the ferrule onto the prepared fiber end, heating the adhesive to secure the attachment of the ferrule and the fiber end, and then releasing the ferrule attached fiber end from the station for subsequent processing if desired.

The optical fiber may be pre-arranged on a tray or other pallet type device that is delivered to a tray receiving area in the ferrule attachment station. The tray may be constructed for compatibility with a transport system that may be used to deliver the fiber to one or more stations within an automated system for fabricating an optical fiber and component. The tray may be arranged with a retainer for maintaining the extension of a stripped fiber end outwardly from the tray and a receptacle for maintaining the rest of the fiber as coiled within the tray. A second retainer may be provided to hold, within the internal confines of the tray, the fiber end after it has been attached to a ferrule. By not leaving the ferrule mounted end hanging over the edge of the tray, the likelihood of damage to the ferrule or interference with subsequent processing steps should be reduced. A pair of first and second retainers may be provided when a ferrule will be attached to each end of the fiber (i.e., pigtail).

An example of one tray suitable for use with any embodiments of the ferrule attachment tool is described below. However, it should be appreciated that the embodiments directed to automatically attaching a ferrule to an optical fiber end are not limited to use with any particular transport medium.

A ferrule attachment tool may include one or more of the following constituent devices and/or station areas which first will be described generally and then each constituent will be discussed in more detail. As shown in FIGS. 50–54, the ferrule attachment station includes a collet 6042 for positioning and manipulating a ferrule 6034 relative to the other devices and areas within the station. The collet shown is moveable in the "Y" and "Z" axes, but a collet also is contemplated that is moveable along the "X" axis as well. For purposes of this patent application, "X" is the horizontal axis across the station, "Z" is the vertical axis relative to the station, and "Y" is an axis perpendicular to the "X" axis and that extends between the front and the back of the station. The collet also may be rotatably moveable. A magazine 6048 or other source of an inventory of ferrules is provided and cooperates with an escapement 6105 and a loader 6053 to provide a delivery system for presenting an individual ferrule to the collet when it is present at the ferrule loading area. A dispenser 6047 introduces a preprogrammed amount of adhesive into the ferrule when the collet locates the ferrule in an appropriate position relative to the dispenser outlet. An entrance into the station may include a receiving area 6057 for a tray supporting a fiber coil. Adjacent the tray receiving area, a clamp is provided to hold the bare fiber end along a path that will be traveled by the collet. The clamp may include a primary clamp 6063 that supports a jacketed portion of the fiber, and a secondary clamp 6062 that supports the ferrule mounting segment of the bare fiber. A heater 6056 may be activatable to partially or fully cure the adhesive after the ferrule has been mounted to the fiber end. A gripper 6075 may be provided for carefully picking up the ferrule mounted fiber end and placing it in a desired location in the tray or other coil support device. A hold down member 6080 may be deployed to clamp the tray when the "pick and place" fiber gripper is repositioning the ferrule mounted fiber end in the tray. The various components may be under computer control.

Now certain individual components of the ferrule attachment station will be discussed in more detail.

Figure 55:
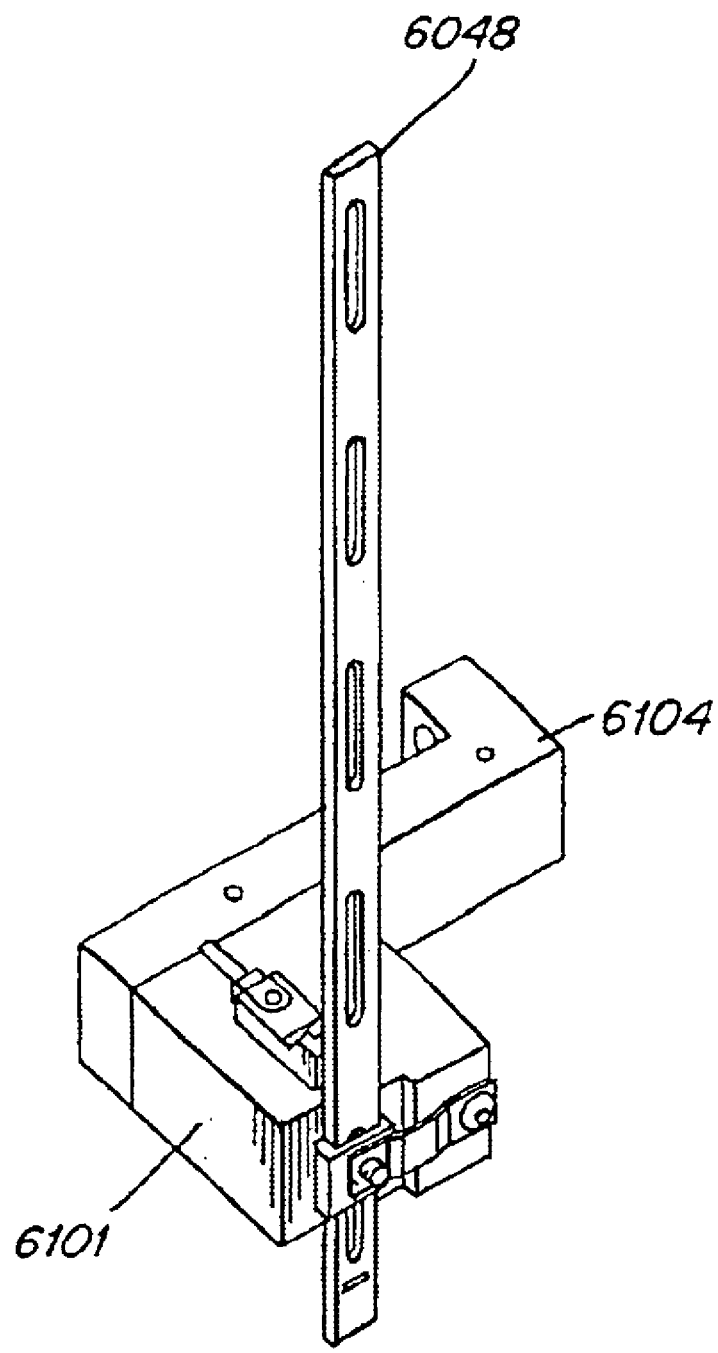
FIG. 55 is a perspective view of a ferrule supply according to one illustrative embodiment of the ferrule attachment tool.
Figure 56:
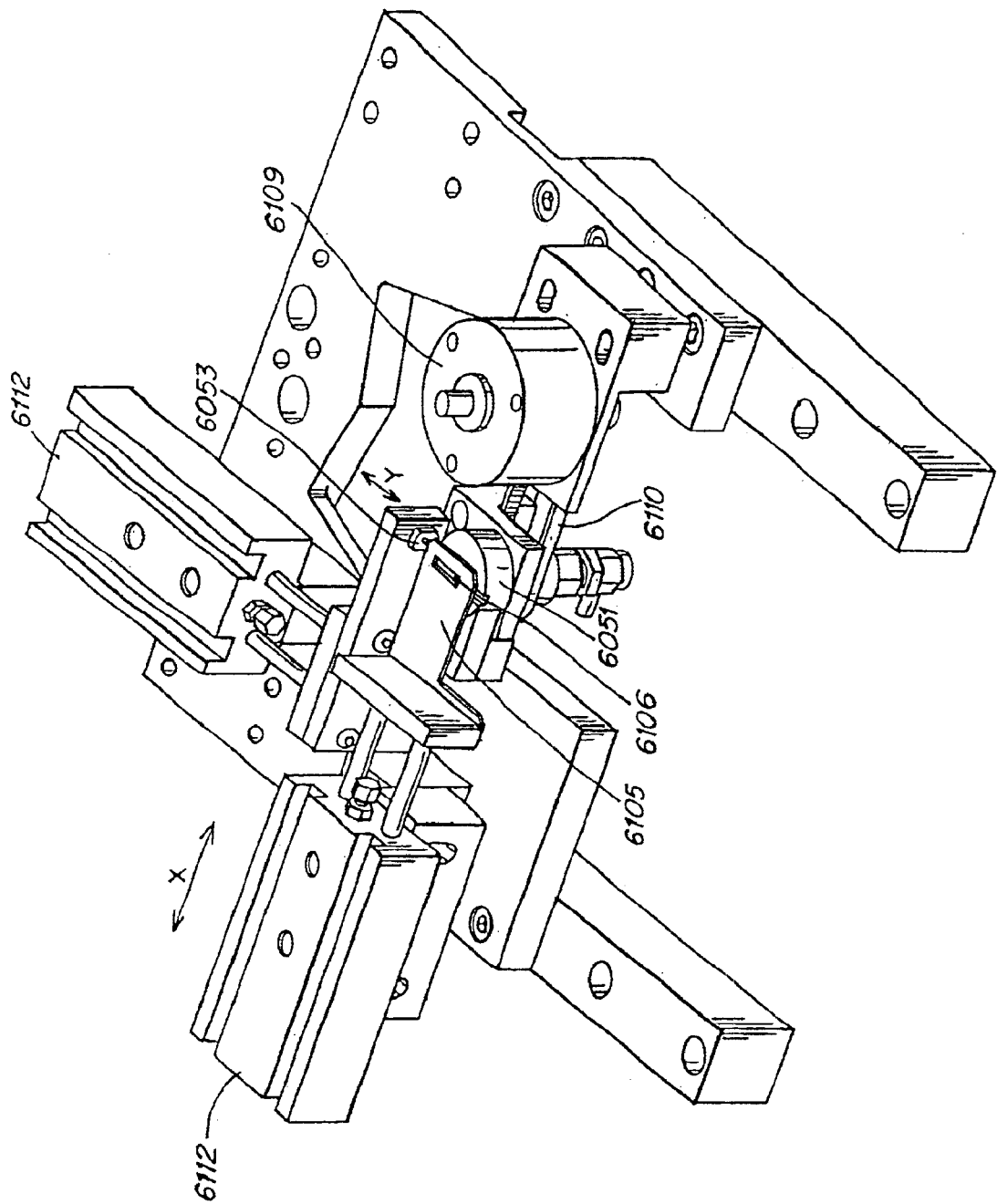
FIG. 56 is a perspective view of a ferrule delivery system according to one illustrative embodiment of the ferrule attachment tool.

A supply for feeding a stack of ferrules to the collet is shown in FIG. 55. A magazine 6048 supported by a magazine mount block 6101 is mounted by a bracket 6104 to the ferrule attachment apparatus. The magazine exit opens directly above a slide pusher 6105 (see FIG. 56). When the slide pusher 6105 is retracted along the X-axis, a ferrule is gravity fed into the slot 6106. The slide pusher 6105 is moved forward, loading the ferrule into a chuck, such as the illustrated cylindrical vacuum chuck 6051. The slide pusher 6105 then retracts to load another ferrule. A vision system 6049 (see FIG. 50), includes a camera, or other imaging device, linked to a computer, so that an image of the ferrule 6034 taken by the camera can be examined, to determine if the ferrule is in the desired orientation. The vision system may check the location of the ferrule opening and/or may determine what type of opening is being presented to the collet 6042. Other methods of determining the orientation of the ferrule 6034 also are contemplated. For example, a probe may be used to physically detect the location of the ferrule opening or the type of ferrule opening. If it is desirable to reverse the orientation of the ferrule, the chuck 6051 may be rotated 180 degrees, switching the ferrule end which is presented to the collet 6042. A pneumatic actuator 6109 may rotate the chuck 6051 with a timing belt 6110. After acceptance of the orientation of the ferrule, a pusher tool such as, for example, a pin 6053 may be actuated to present the ferrule to the collet. The slide pusher 6105 and pin 6053 may be actuated with dual rod cylinders, belt systems, electric motors, or any other suitable actuators. Pneumatic dual rod cylinders 6112 are shown in FIG. 56.

Figure 57:
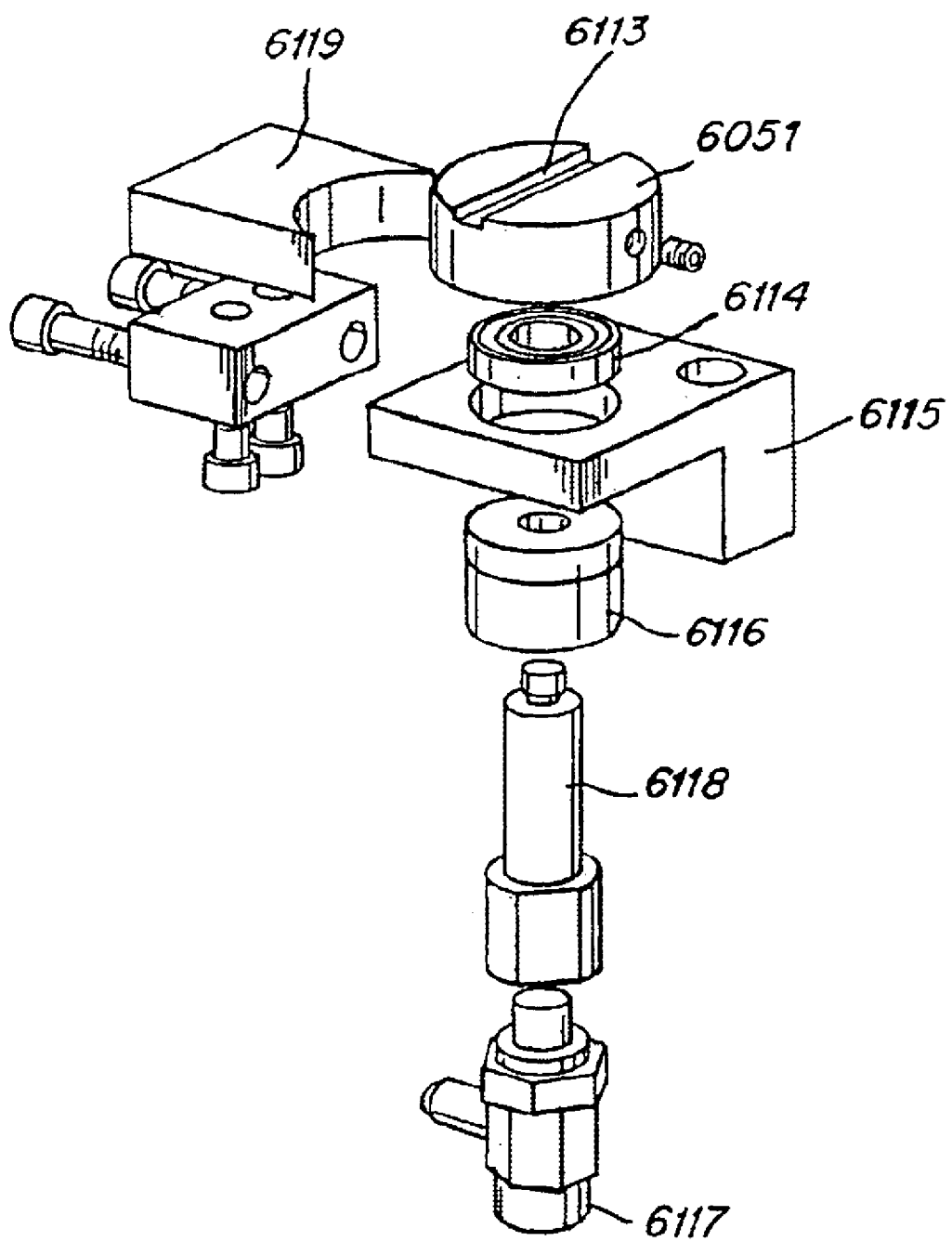
FIG. 57 is an exploded perspective view of a ferrule orienter according to one illustrative embodiment of the ferrule attachment tool.

Referring to FIG. 57, a chuck 6051 may be mounted on a bearing 6114 in a bearing block 6115. A pulley 6116 may be rotated by the timing belt 6110 described above. A swivel fitting 6117 and a vacuum shaft 6118 direct a vacuum force that holds a ferrule against one edge of a vacuum slot 6113 in the chuck 6051. A load floor 6119 abuts and is co-planar with the vacuum chuck 6051 so that the ferrule may be loaded into the vacuum chuck 6051 by sliding it across the load floor from the ferrule magazine 6048.

Figure 58:
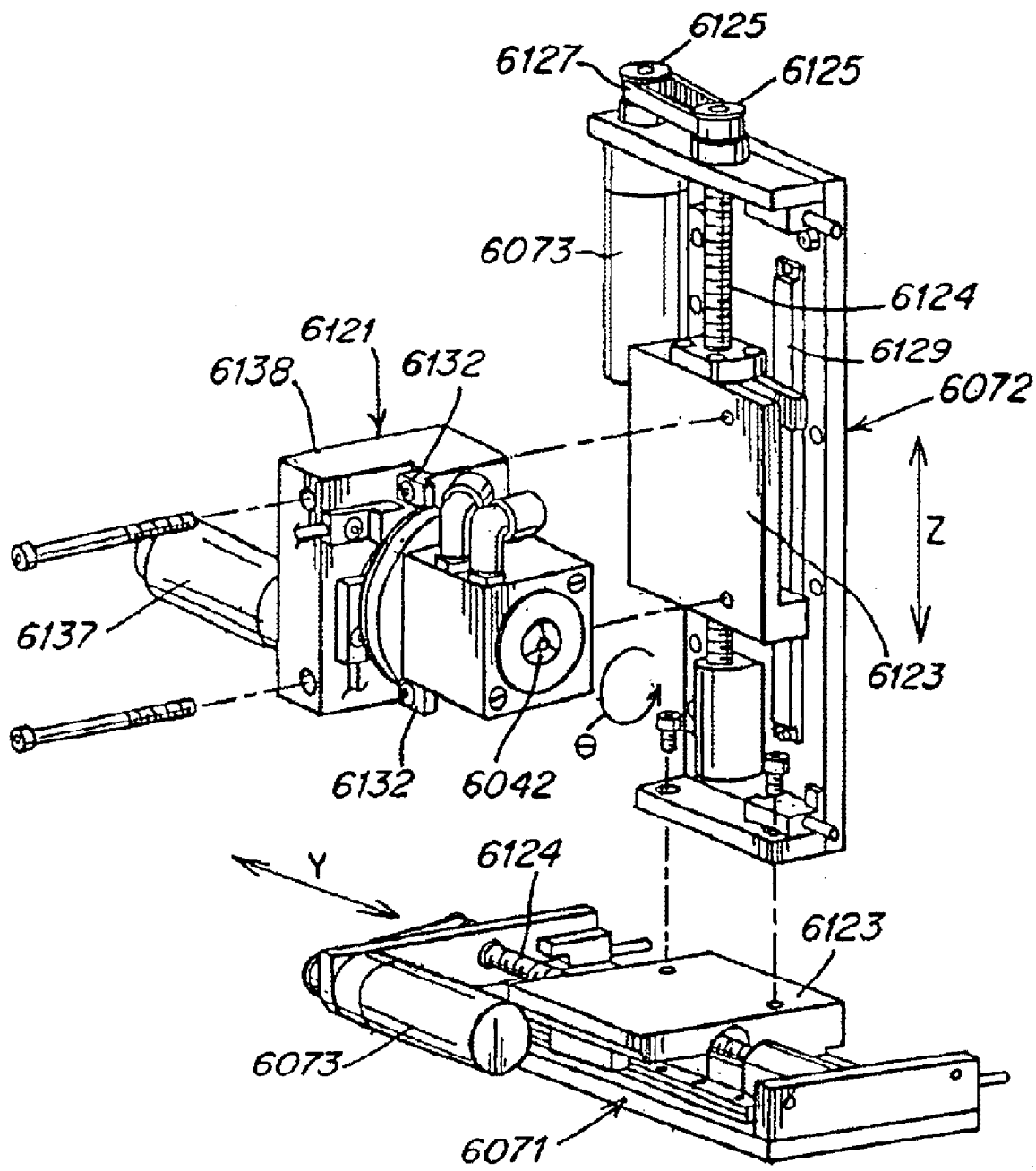
FIG. 58 is an exploded perspective view of a ferrule support according to one illustrative embodiment of the ferrule attachment tool;.
Figure 59:
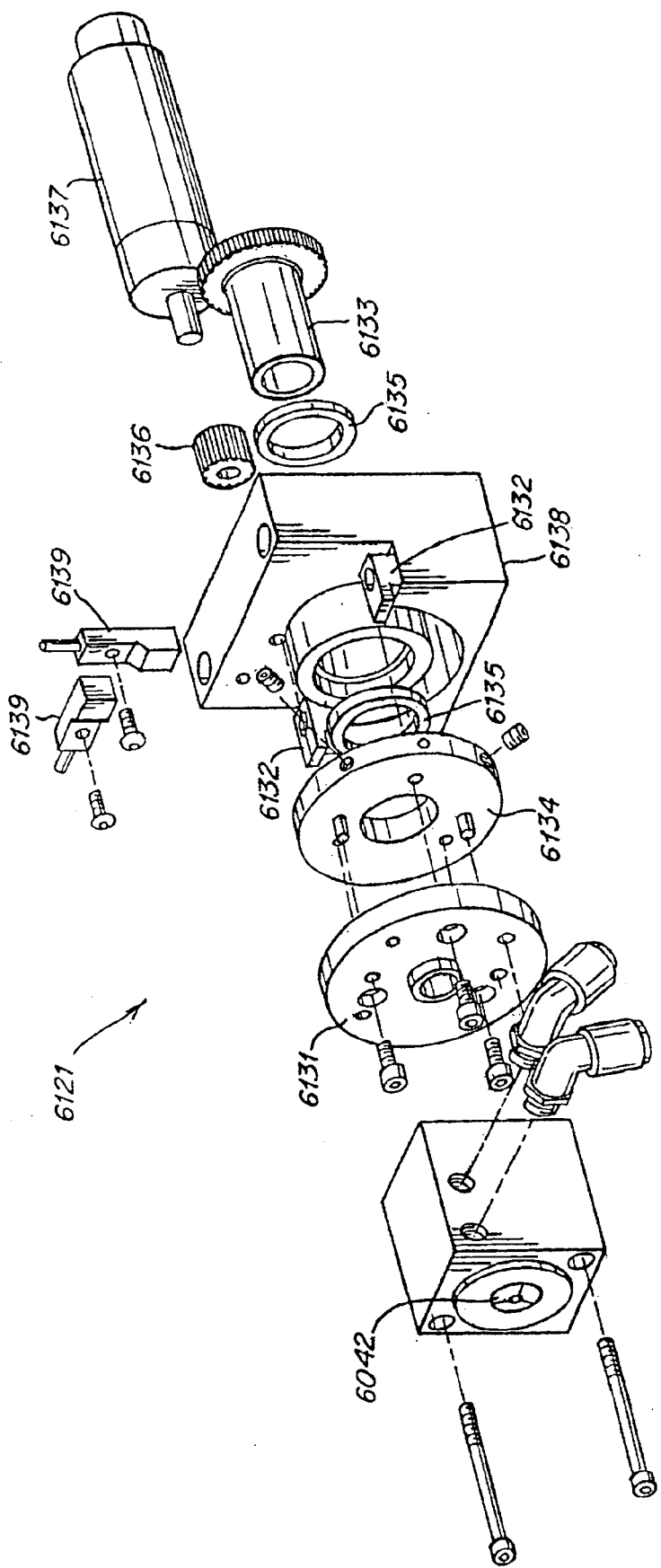
FIG. 59 is an exploded perspective view of a ferrule support according to one illustrative embodiment of the ferrule attachment tool.

The collet 6042 approaches, grasps and removes the ferrule 6034 presented by the chuck. If necessary, the collet 6042 may also rotate, before and/or after grasping the ferrule 6034, to re-orient the ferrule 6034; particularly where an offset fiber through hole in a ferrule is not in a desired, pre-determined orientation. Horizontal and vertical linear drive assemblies 6071 and 6072 move the collet 6042 up and down ("Z" axis) and side to side ("Y axis"), as illustrated in FIG. 58. In each drive assembly 6071 and 6072, a carriage 6123 moves linearly with the turning of a lead screw 6124, which may be, for example, a ball screw. An electric motor 6073 rotates the lead screw 6124 with a belt 6127 and pulley 6125 system. An encoder 6129 may be used to sense the linear position of the carriage 6123 and hence the collet 6042. Alternately, a rotary encoder may be used on one of the pulleys 6125 to determine the linear position of the carriage 6123. The collet 6042 may be rotated by a drive assembly 6121 as shown in FIGS. 58–59. A collet mount 6131 holds the collet 6042 and is coupled to a collet gear 6133 by a mount plate 6134, and the assembly rotates in bearings 6135 that are mounted in collet axis body 6138. A drive gear 6136 that is rotated by an electric motor 6137 turns the collet gear 6133. Two rotary stops 6132 prevent the collet 6042 from rotating beyond certain angles. A pair of sensors 6139 may be added to sense the rotational position of the collet 6042. Other arrangements for moving a collet in any combination of the "X", "Y", and/or "Z" axes and/or rotating the collet are contemplated as should be apparent to one of skill in the art.

Figure 60:
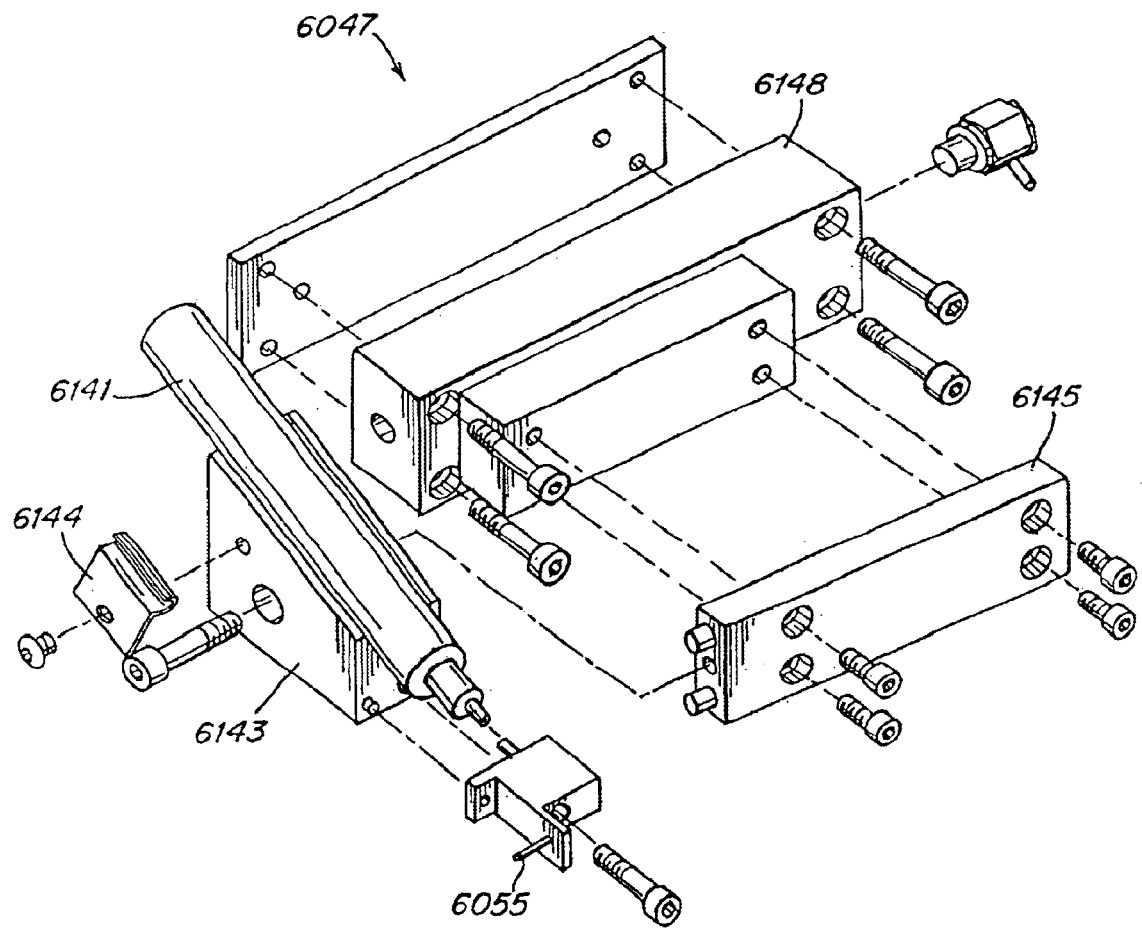
FIG. 60 is an exploded perspective view of an adhesive dispenser according to one illustrative embodiment of the ferrule attachment tool.

After accepting the ferrule, the collet then finds the adhesive dispenser. In an embodiment illustrated in FIGS. 50–54, the collet 6042 moves downward along the Z-axis bringing the ferrule 6034 adjacent the dispenser allowing adhesive to deposit through a needle 6055 into the ferrule. The dispenser for depositing adhesive, such as epoxy, into the ferrule is shown in more detail in FIG. 60. A syringe 6141 type dispenser, responsive to a control signal, releases a predetermined amount of epoxy through a needle 6055 into the ferrule. A disposable syringe 6141 is held in an adhesive mount 6143 by a clip 6144. The adhesive mount 6143 is attached to a slide block 6145. The slide block 6145 may be mounted on an air actuator 6148. The air actuator 6148 may be used to provide a small resistance that helps to maintain contact between the ferrule 6034 and the needle 6055 and/or the air actuator 6148 may help to move the needle 6055 into contact with the ferrule 6034. For example, an air pressure of approximately 1–5 psi may be supplied to the air actuator to provide a constant, or variable, preload force that resists the push of the ferrule, but does not act as a hard stop which might damage the needle 6055 or the ferrule if a component is misaligned or the ferrule is moved to far over the needle. Other adhesive dispensers also are contemplated, and the ferrule attachment tool is not limited to the particular arrangement described above. For example, a positive displacement system may be used to push the epoxy through the needle 6055. A suitable epoxy, is Epo-Tek® 353ND. Two-part epoxies that cure without the application of heat may also be used. The type of adhesive administered by the dispenser is not a limiting feature of the ferrule attachment tool.

The collet 6042 carrying the adhesive filled ferrule approaches the site where the bare end of the fiber is supported by a fiber clamp. The fiber clamp may include a primary fiber clamp and a secondary fiber clamp. The primary fiber clamp 6062 may act as a coarse locator and support, holding an unstripped portion of the fiber 6030 (i.e., still includes a fiber jacket). A secondary fiber clamp 6063 may be employed to grip the stripped portion of the fiber end. Examples of primary and secondary clamps that may be employed to hold and grip the fiber end are described in more detail below under the heading "Centralizing Clamp".

The secondary fiber clamp 6063 grasps the fiber at a predetermined location beyond a preprogrammed length of travel by the collet 6042 (for example, 25% of the ferrule length) at which point the collet 6042 may adequately support the tip of the fiber itself. When the collet 6042 advances to the preprogrammed length, the secondary clamp releases so it will not obstruct further movement of the collet 6042. The collet 6042 continues moving along the fiber tip until the ferrule is fully mounted. The collet 6042 may be rotated and/or moved reciprocatingly to more evenly distribute the adhesive within the ferrule. The rotational motion of the ferrule may also help to prevent buckling of the fiber. The collet 6042 having released the ferrule 6034, returns to the ferrule supply area to acquire the next ferrule 6034.

Figure 61:
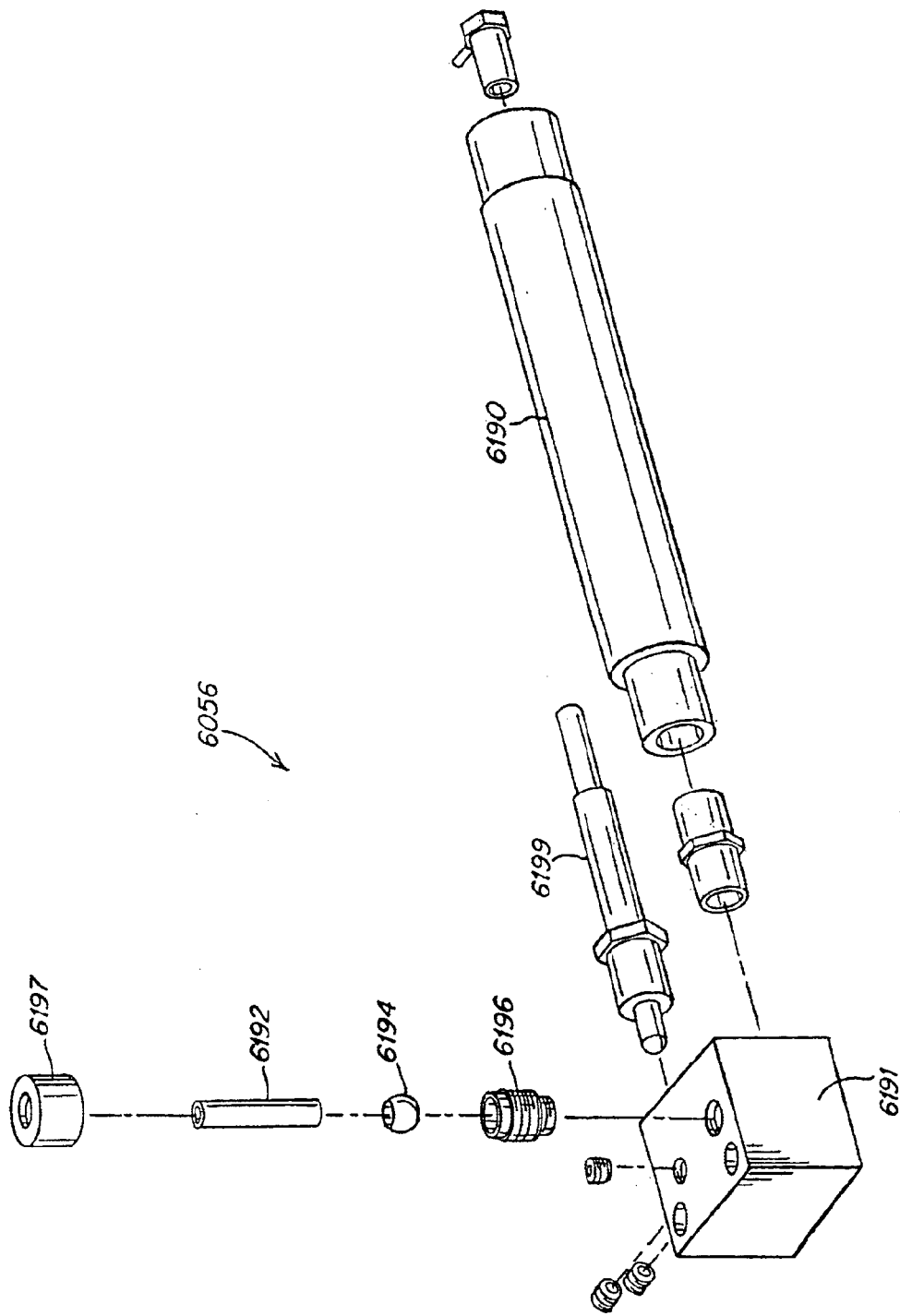
FIG. 61 is an exploded perspective view of a heater according to one illustrative embodiment of the ferrule attachment tool.

With the ferrule mounted about the fiber end, the heater 6056 may be activated to set or cure the adhesive. The heater 6056 may be a hot air blower, as shown in FIG. 61, or it may be another suitable heater as should be recognized by one of skill in the art. The illustrated heat gun includes an air heater 6190 connected through a manifold 6191 to a heater shaft 6192 that directs the heated air at the ferrule. The heater shaft 6192 and a heater ball 6194 are secured to a swivel base 6196 by a heater nut 6197 so that the direction of the airflow may be adjusted. A thermocouple 6199 may be included to detect the temperature of the airflow and help to maintain desired temperatures. A pressure sensor (not shown) may also be included to signal a controller to shut off the heater 6190 if low airflow is detected. The air heater 6190 may be, in one embodiment, a 6200-watt triple pass inline heater. Other suitable devices for delivering heat to the ferrule may be used, including contact heaters and radiant heaters.

Figure 52:
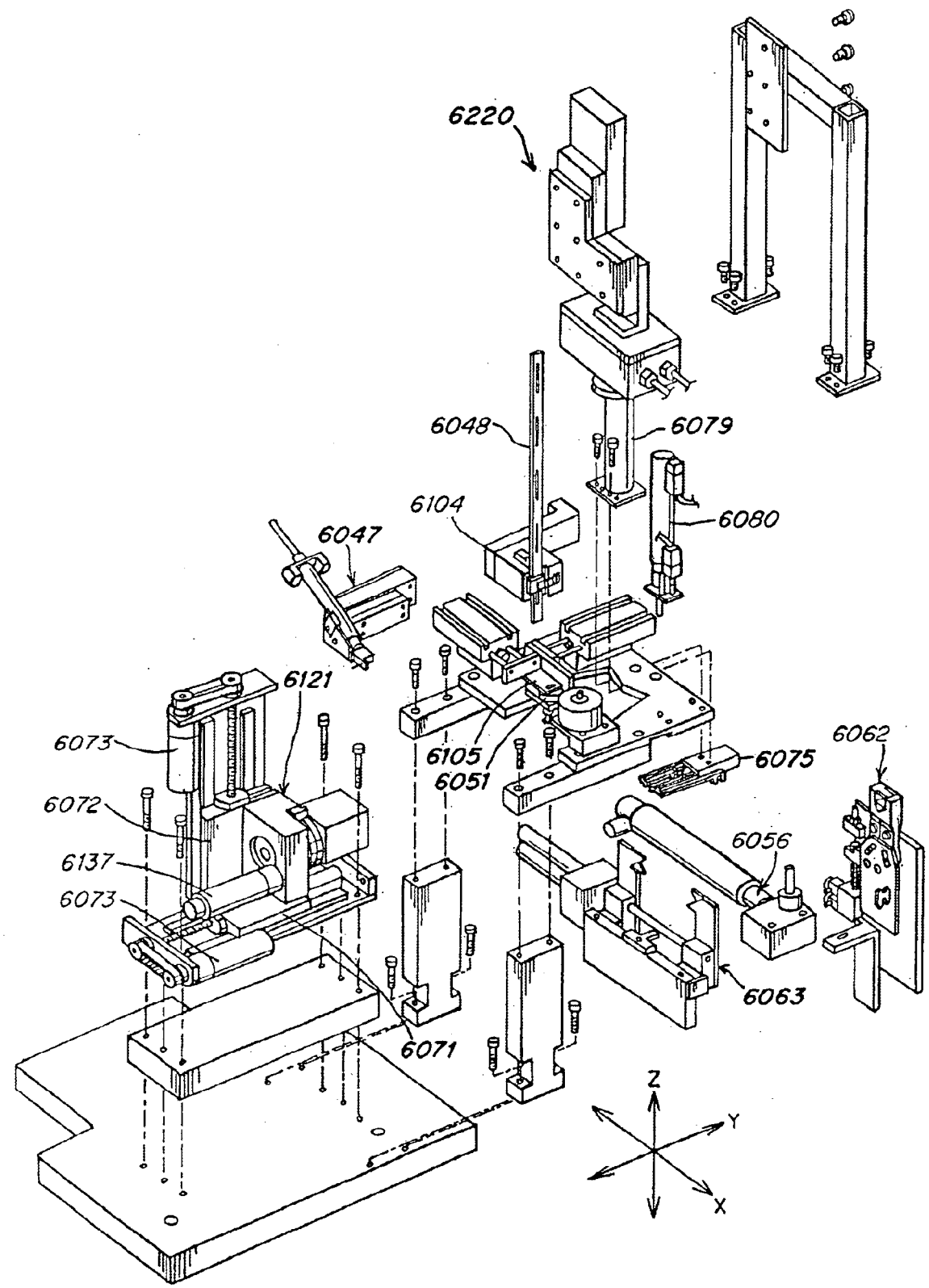
FIG. 52 is an exploded perspective view of the ferrule attachment apparatus of FIG. 51.
Figure 53:
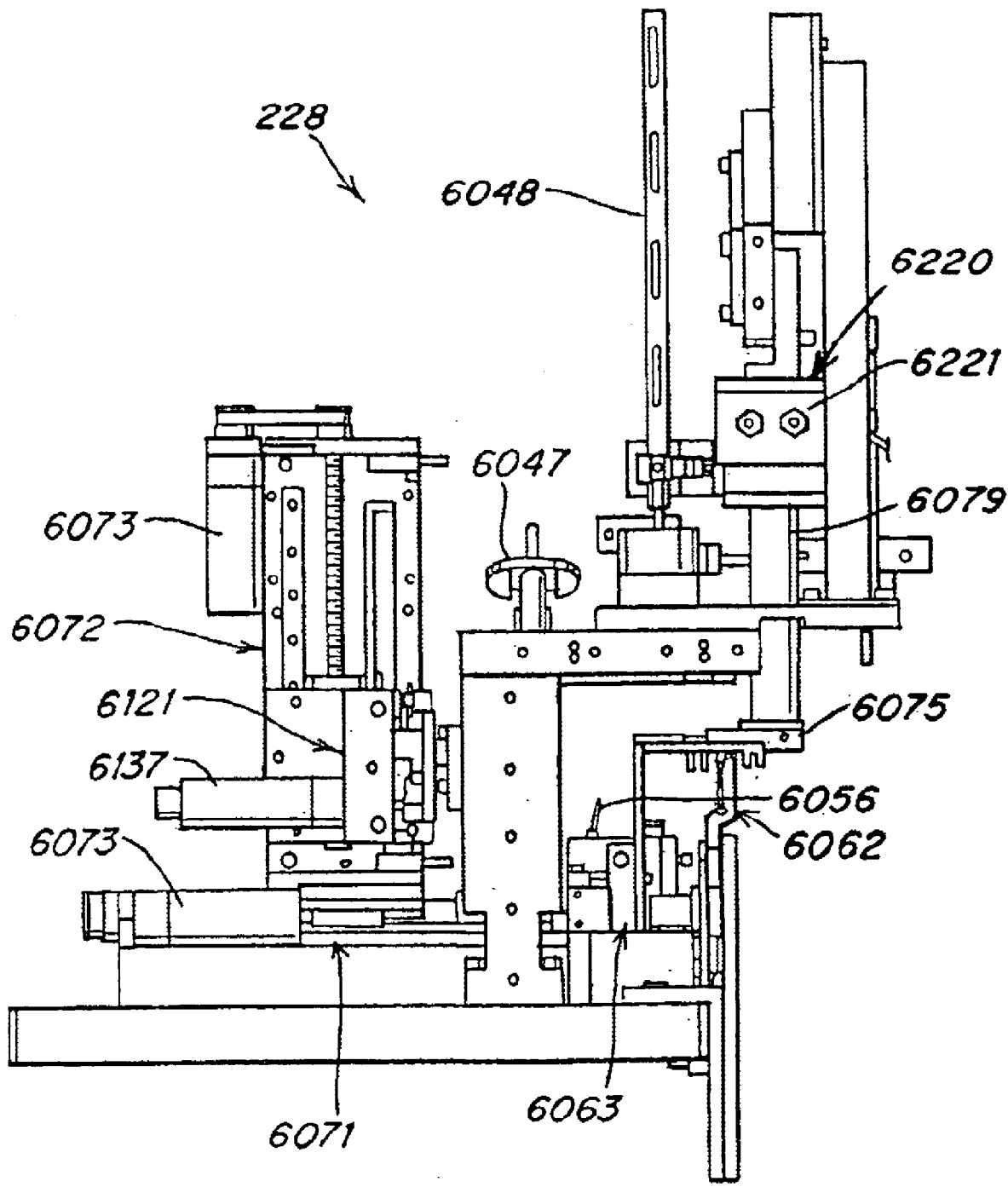
FIG. 53 is a side elevation view of the ferrule attachment apparatus of FIG. 51.
Figure 62:
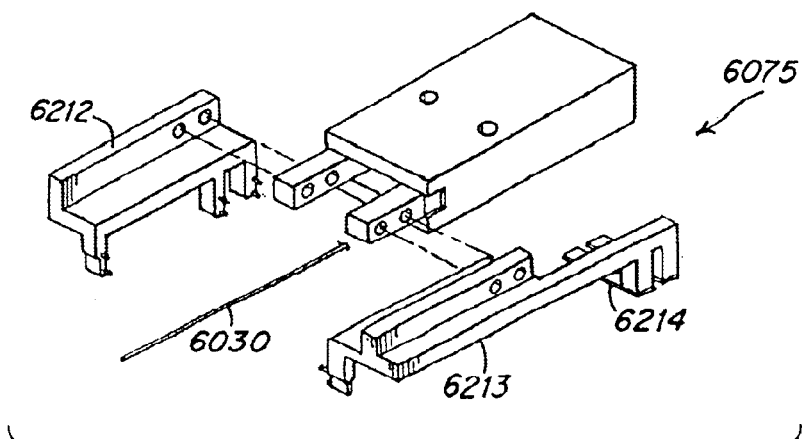
FIG. 62 is an exploded perspective view of a fiber gripper according to one illustrative embodiment of the ferrule attachment tool.
Figure 63:
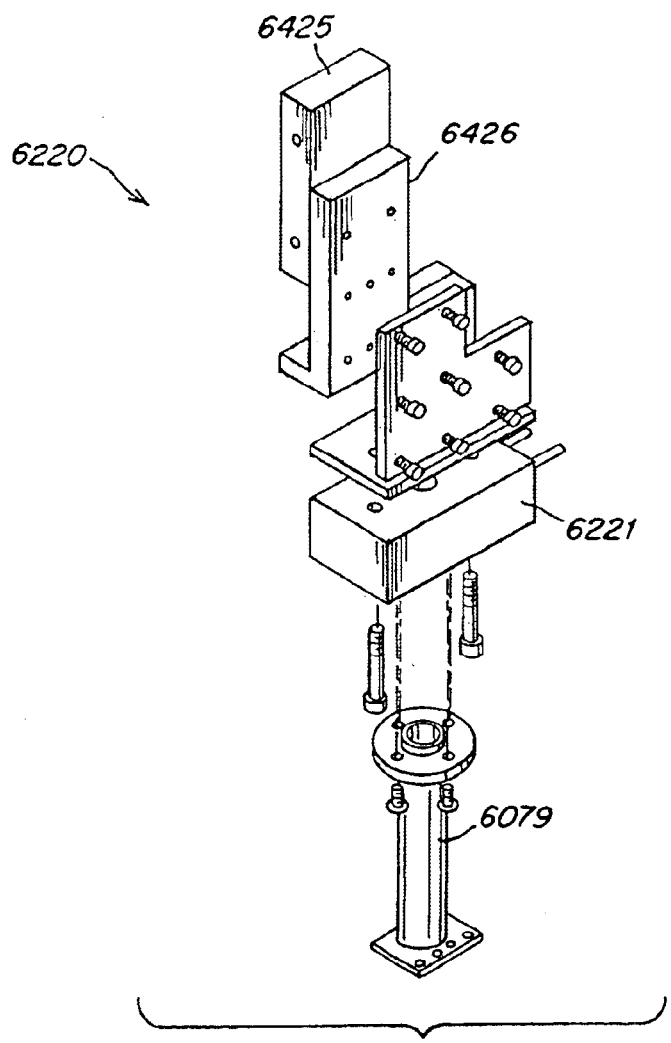
FIG. 63 is an exploded perspective view of a fiber gripper according to one illustrative embodiment of the ferrule attachment tool.

After completion of a predetermined heating cycle, the primary and secondary fiber clamps open, releasing the fiber. A hold down member 6080, such as the pneumatically driven piston illustrated in FIG. 52, is deployed to clamp the tray. A fiber gripper grasps and then repositions the ferrule mounted end of the fiber within the internal confines of the tray, so that the fiber end no longer hangs from the side of the tray as it did when it was first received in the entrance area of the station. FIG. 62 shows an exploded view of a fiber gripper 6075 that may be employed in the ferrule attachment tool and that includes two gripper arms 6212 and 6213 that move toward one another to grasp the fiber 6030. Gripper arm 6213 includes a fiber support 6214 for supporting the fiber as the gripper 6075 lifts, rotates and lowers the ferrule mounted end into a retainment position within the tray. FIG. 63 shows a fiber gripper drive assembly 6220 that includes a rotational drive system 6221 for rotating a spindle 6079. The rotational drive may be mounted on a linear drive system so that the gripper may be moved in the Z direction. Two linear actuators 6425 and 6426 are shown in FIG. 63. Other suitable arrangements for moving the ferrule gripper 6075 may be employed, and the gripper may be arranged for movement along any combination of the "X", "Y" and/or "Z" axes, although the gripper illustrated in the Figures is arranged only for movement along the Z axis. After the ferrule mounted fiber end is properly positioned in the tray, the hold down member retracts freeing the tray for movement away from the ferrule attachment station.

Figure 54:
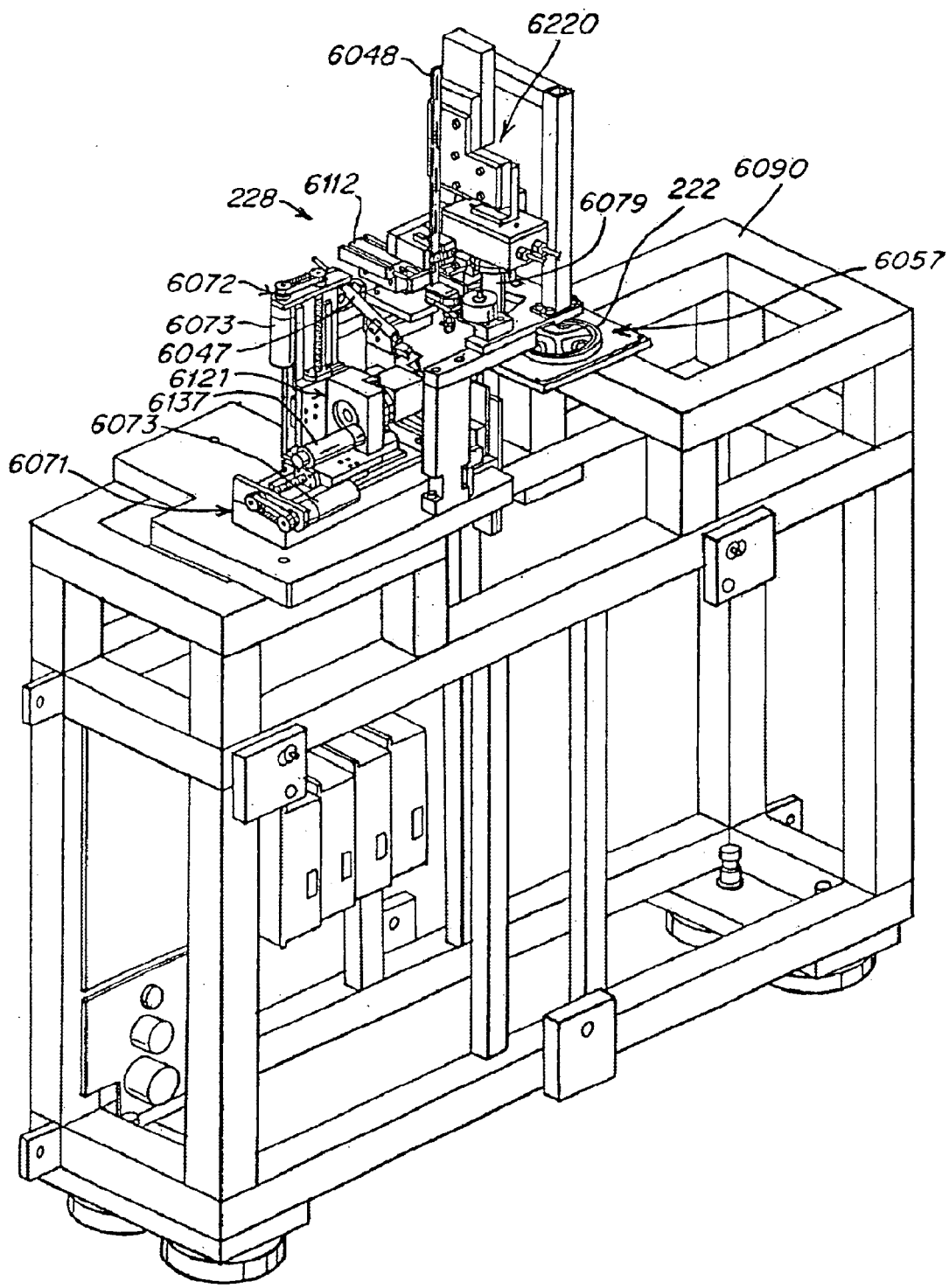
FIG. 54 is a perspective view of a ferrule attachment apparatus according to one embodiment of the ferrule attachment tool.

A frame 6090 supports the ferrule attachment module 228, and additionally may house various electronics, pneumatic controls and connections, and a dedicated controller if desired as well as other displays, input devices and so on as illustrated in FIG. 54. The automated ferrule attachment station may be arranged to respond to signals from a computer controller; the controller being arranged to receive and transmit signals from and to various components, to control the various operations of the ferrule attachment station. The computer controller may be arranged to communicate with the various station components by direct hard link, wireless, and other arrangements as would be apparent to one of skill in the art. The computer controller may receive a signal that a particular step has begun or ended and the controller may, responsive to such a signal, generate a new signal initiating one or more operations of various of the devices incorporated into the station. The controller can be implemented in any of numerous ways, as the ferrule attachment tool is not limited to any particular technique. In accordance with one illustrative embodiment of the ferrule attachment tool, the controller is a processor that is programmed (via software) to perform the above-recited control functions, and to coordinate interaction amongst the various system components. Of course, it should be appreciated that other implementations are possible, including the use of a hardware controller, and/or multiple controllers that replace a single central controller. As an example, and without limiting the ferrule attachment tool, the controller may include a Windows NT based PC, and a distributed I/O system using a field bus such as CANOpen.

As an example, and without restricting the control features that may be employed with the automated ferrule attachment station, one or more sensors may be provided to detect the location of a workpiece and then the controller responsive to such a sensed signal may cause one or more components within the station to perform a desired function. Thus, a sensor may be provided to detect when the collet has advanced the ferrule a predetermined distance over the fiber end. Upon receipt of such a signal from the sensor, the controller may transmit a signal causing the secondary fiber clamp to retreat out of the path of further movement of the collet. Other arrangements, of course may be employed to influence a device to begin or cease a particular function. Thus, the drive system for moving the collet towards the fiber end could have a pre-set limit switch that is triggered when the collet has advanced a predetermined distance, or a predetermined timing sequence corresponding to the time required for the collet to advance the predetermined distance may be employed that, when completed triggers withdrawal of the secondary fiber clamp.

The previous examples, as should be apparent to one of skill in the art, merely inform that different control components are compatible with the automated ferrule attachment station and that the ferrule attachment tool described here is not limited to any particular control system. Further, the control system may be arranged, or modified, to accept various work pieces, such as fibers, ferrules, adhesives, and or trays, of varying sizes, shapes, composition and/or other variables. Any of the pneumatic actuators described herein may be provided with a sensor to acknowledge that a stroke has completed. Any of the drive systems discussed herein may be provided with an encoder so that encoder feedback may be employed by the controller to determine the location of a component. Other arrangements for determining the location of a component within the station also are contemplated and the ferrule attachment tool is not limited only to encoder type systems as should be apparent to one of skill in the art.

A representative control sequence now will be described. The presence of a tray in the receiving area is sensed and a signal is generated by the controller and transmitted to the primary clamp which closes around the still jacketed portion of the fiber adjacent the bare end. A sensor in the jaws of the primary clamp checks to ensure that a fiber is present and the controller then sends a signal to close the secondary clamp about the stripped and cleaned portion of the fiber end where the ferrule will be mounted. A collet, supporting a ferrule, is directed by the controller to advance in a mounting path along the bare fiber end. The secondary clamp is directed to retract when the collet has moved a predetermined length. The collet is instructed to move along the mounting path until it reaches a final position. The collet may be instructed to rotationally oscillate as it moves along the mounting path. It also may be instructed by the controller to move in reciprocating fashion. The controller then issues a signal activating the heater for a predetermined dwell time. The fiber gripper is instructed to move to the ferrule/fiber assembly and then a signal from the controller opens the jaws of the gripper which then close about the fiber and the ferrule. The controller deploys the tray hold down member and then the collet is opened and withdrawn from the ferrule. The fiber gripper is then instructed to rotate the ferrule mounted fiber end over the tray and then places the assembly in a predetermined position within the tray so that the pigtail is within the interior of the tray rather than hanging outwardly as it was when it arrived at the ferrule attachment station. The controller then sends a signal causing the hold down member to release the tray. As the fiber gripper is manipulating the ferrule mounted fiber end, the controller instructs the escapement to deposit a ferrule in the chuck. The vision system determines the orientation of the ferrule and, if necessary, the controller directs the chuck to rotated 180 degrees to a desired orientation. The collet is directed by the controller to move to the chuck to pick up the ferrule. A loading tool, such as a pin, is activated by the controller to move the ferrule into the collet which then closes around the ferrule. The collet is instructed by the controller to move to the adhesive dispenser and then the adhesive dispenser is activated by the controller to deposit a predetermined amount of adhesive into the ferrule. The collet is then instructed by the controller to move to the area of the secondary clamp where it awaits the presence of a new tray.

The automated ferrule attachment station may be arranged to operate two or more of its constituent devices simultaneously. For example, after the collet has accepted a ferrule and moved away from the chuck area, a new ferrule may be supplied by the magazine and placed in the chuck awaiting return of the collet. Similarly, when the "pick and place" fiber gripper is returning the ferrule attached fiber end from the heating area back to the tray, the collet may deploy to the chuck area to receive a new ferrule as mentioned above. Alternatively, the station may be configured so that only one constituent device is activated at a time; so referring back to the previous example, the collet would refrain from approaching the chuck area until a new fiber had been sensed in the fiber end supporting area.

Figure 64:
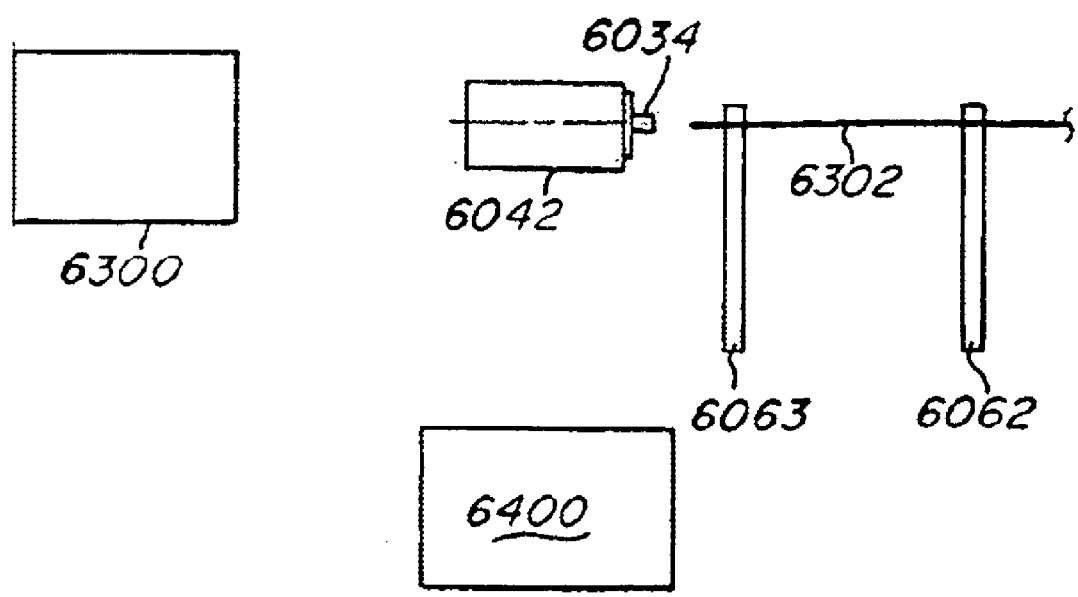
FIG. 64 is a schematic view of a ferrule attachment station for mounting a connector to a polarization maintaining fiber according to one illustrative embodiment of the ferrule attachment tool.

The ferrule attachment station may be arranged to mount a connector, such as a ferrule, to a polarization maintaining fiber. As shown schematically in FIG. 64, a detector 6300 is provided to determine the alignment of the polarization maintaining axis of the fiber 6302. While the ferrule attachment tool is not limited to a particular device for determining the alignment, it is contemplated that passive, active and POL devices should be suitable as would be apparent to one of skill in the art. The collet 6042 is then manipulated to orient the ferrule 6034 in a position that corresponds to the alignment of the polarization maintaining axis of the fiber. The ferrule may be keyed to facilitate adjustment to the desired mounting position. The detector communicates with the system controller 6400 which then instructs the drive system to move the collet, such as by rotating, until the ferrule is in the desired orientation for mounting to the PM fiber. The collet may be rotatable at least 180 degrees to ensure proper matching of the ferrule to the alignment of the polarization maintaining axis of the fiber.

An automated method of assembling a connector, such as a ferrule, to a fiber, such as an optical fiber also is provided. The method, under computer control, includes a step of automatically positioning an adhesive filled ferrule relative to an end of a fiber, and then moving the ferrule over the fiber end and, where desired, rotating the ferrule either as the ferrule is plunged over the fiber end or after the ferrule is mounted about the fiber end. The method may also include the step of checking the orientation of the ferrule and then, if desired, reorienting the ferrule prior to mounting on the fiber end. Reorienting the ferrule may involve turning the ferrule 180 degrees about an axis perpendicular to a lengthwise axis of the ferrule (reversing end-to-end orientation), as well as rotating the ferrule about its lengthwise axis to change the position of the fiber through hole where it is offset of center. The ferrule also may be rotated to correspond the ferrule to an alignment of a polarization axis of the fiber. Where the ferrule has not been pre-loaded with an adhesive, the method also may include the step of dispensing an adhesive into the ferrule. After the ferrule has been positioned about the end of the fiber, the method may also include the step of heating the adhesive. The automated method of assembling a ferrule to a fiber also may include the step of repositioning the ferrule connected fiber in a tray with the pigtail supported within the tray rather than hanging off the edge of the tray. The automated method of assembling a ferrule to a fiber may include any one of the foregoing steps, a combination of two or more of the foregoing steps, or all of the foregoing steps. The sequence in which the automated method steps has been described may be varied as should be apparent to one of skill in the art.

Having described various embodiments of a ferrule attachment tool for use in the fiber preparation system, it should be understood that the description is by way of example only and that other suitable configurations may be implemented with the system as would be apparent to one of skill.

Load/Unload Module

The fiber preparation apparatus system may include a load module for providing trays at the upstream end of the system and an unload module for removing the trays at the downstream end of the system. At the upstream end of the system, the load module may load either empty or loaded trays onto the transporter, depending upon the particular fabrication processes being carried out within the system. The unload module may similarly offload either loaded or empty trays from the transporter at the downstream end of the system depending upon the particular processes carried out by the system.

In one illustrative embodiment of the system, a load module 234a is provided to load empty trays at the upstream end of the transporter and an unload module 234b is provided at the downstream end of the system to remove trays loaded with a prepared fiber.

Figure 65:
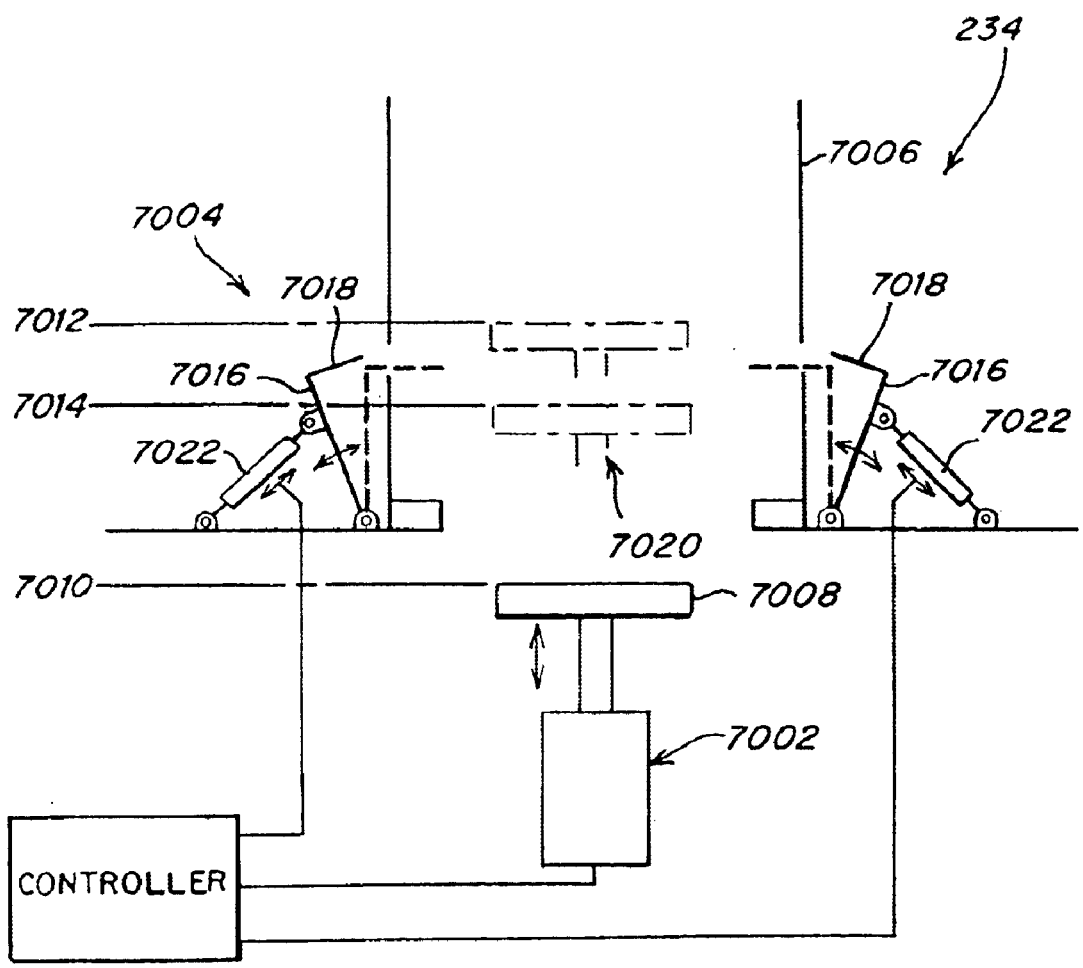
FIG. 65 is a schematic diagram of one illustrative embodiment of a load/unload module.

FIG. 65, is a schematic representation of one illustrative embodiment of both a load module 234a and an unload module 234b suitable for the fiber preparation system of the present invention. Since the load and unload modules employ the same components, the module will be referred to as a load/unload module 234 for convenience. It is to be understood, however, that each module may employ different configurations.

As illustrated, the load/unload module 234 includes a lift 7002 supported below a gripper mechanism 7004. A tray cassette 7006 is supported on the gripper mechanism 7004 above the lift. The cassette 7006 is configured to hold a plurality of stacked trays 222 that are to be either delivered to the transporter (load module) or removed from the transporter (unload module).

The gripper mechanism 7004 is configured to hold the stack of trays within the cassette and to act in concert with the lift 7002 to either remove or deliver a tray to the cassette. In this regard, in the load configuration, the lift 7002 cooperates with the gripper mechanism 7004 to deliver a tray to the transporter, while in the unload configuration, the lift cooperates with the gripper mechanism to offload trays into the cassette.

In one illustrative embodiment, the lift is configured to position a lift plate 7008 in any one of three selected positions to load and/or unload trays in cooperation with the gripper mechanism as explained below. As illustrated, the lift 7002 has a bottom home position 7010, a top lift position 7012, and an intermediate lift position 7014 located between the home and top lift positions. It is to be appreciated that any suitable lift device with any number of lift positions may be implemented for any desired application.

As indicated above, the lift 7002 acts in concert with the gripper mechanism 7004 either to lower a tray 222 from the cassette or raise a tray into the cassette. In one illustrative embodiment, the gripper mechanism 7004 includes a pair of opposed grippers 7016 that are movably supported adjacent the cassette. As shown, the grippers 7016 are rotatably mounted between a closed position to support a tray 222 within the cassette and an open position to allow a tray to be either lowered from or raised into the cassette. Each gripper 7016 includes at least one arm 7018 that extends inwardly and is configured to support a tray above a tray receiving region 7020 when the grippers are placed in the closed position.

The grippers 7016 may be moved between the open and closed positions using any suitable arrangement. In one illustrative embodiment, each gripper is actuated between the open and closed positions using an actuator 7022, such as a pneumatic air cylinder, that is coupled between the gripper and a support member. Each end of the actuator 7022 is rotatably coupled to the gripper and the support member. The actuators are coupled to a tool control system that signals the grippers to open and close, so as to load and unload trays onto and from the transporter.

FIGS. 66(a)–(f) schematically illustrate the operation of one embodiment of the load module. As is to be appreciated, the illustrated operation is merely exemplary as any number of load operations may be implemented with the system.

Figures 66A, 66B, 66C:
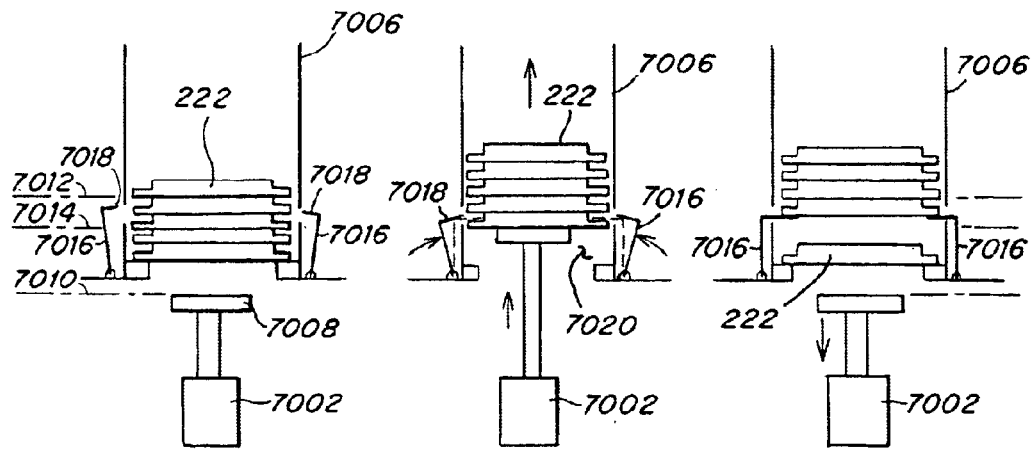
FIGS. 66(a)–(f) are schematic diagrams of one illustrative embodiment of a loading sequence for the load/unload module.

FIG. 66(a) illustrates a cassette 7006 having a stack of trays 222 initially positioned in the tray receiving region 7020 of the module. Upon initiation of the load sequence, the lift 7002 is raised from its home position 7010 to its intermediate lift position 7104, as shown in FIG. 66(b), to position the lowest tray of the stack below the gripper arms 7018. Once the stack of trays is raised to the intermediate lift position 7014, the grippers 7016 are closed to position the gripper arms 7018 between the bottom tray and the penultimate tray resting on the bottom tray.

With the gripper arms 7108 in their closed position, the lift 7002 is lowered to its home position 7010 thereby lowering the bottom tray onto tray supports in the tray receiving region 7020 of the load module, as shown in FIG. 66(c). With a tray 222 positioned in the load position, the transporter 216 is actuated to move the tray downstream from the load region of the load module as shown in FIG. 66(d).

Figures 66D, 66E, 66F:
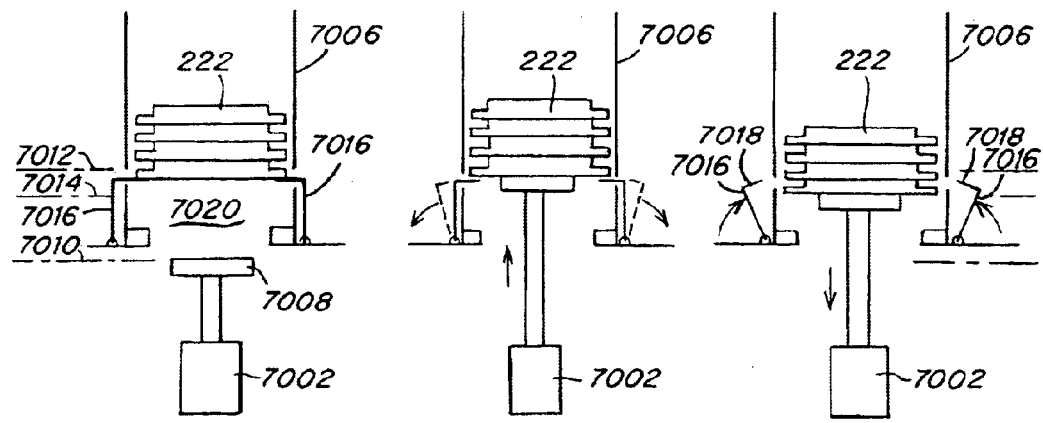

With the tray receiving region 7020 cleared, the lift 7002 is raised to its top lift position 7012, as shown in FIG. 66(e), to raise the entire stack of trays above the gripper arms. The gripper arms 7018 are then retracted to the open position and the lift 7002 is lowered to its intermediate lift position 7014, as shown in FIG. 66(f), whereupon the grippers 7016 are closed to support the stack of trays resting on the bottom tray. The bottom tray 222 is then lowered into the load region 7020. The load sequence shown in FIGS. 66(c)–(f) continues until the cassette 7006 is emptied and replaced with a full cassette, whereupon the load sequence will again be initiated as shown in FIGS. 66(a)–(b).

As indicated above, the unload module 234b is essentially identical to the load module 234a in structure. However, the unload module 234b removes trays from the system using an unload sequence that may differ from the load sequence described above. One illustrative embodiment of an unload sequence is schematically illustrated in FIGS. 67(a)–(f).

Figures 67A, 67B, 67C:
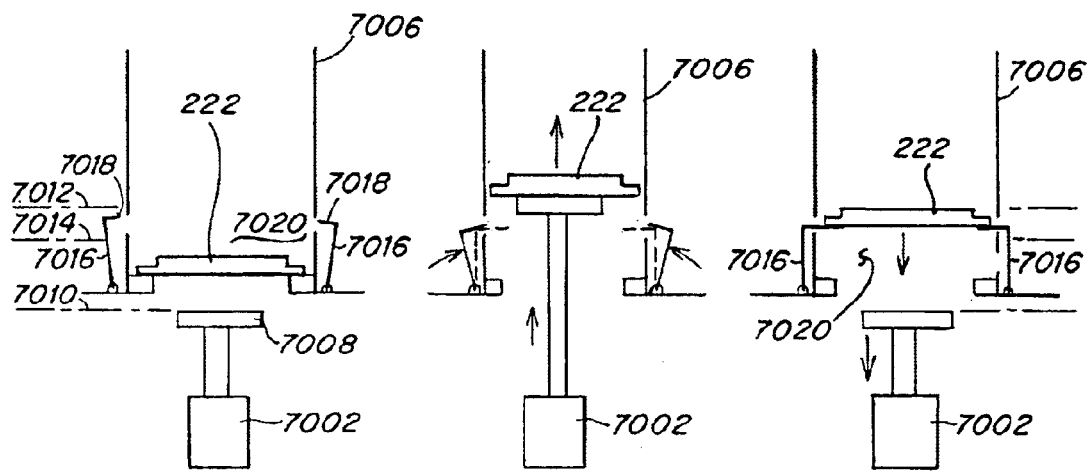
FIGS. 67(a)–(f) are schematic diagrams of one illustrative embodiment of an unloading sequence for the load/unload module.

FIG. 67(a) illustrates an initial unload step that occurs when an empty cassette 7006 is placed in the unload module. As illustrated, the transporter 216 delivers a tray 222 to the unload region 7020 of the module with the lift in its home position 7010. With the grippers 7016 in the open position, the lift 7002 raises the tray 222 to the top lift position 7012, as shown in FIG. 67(b). The gripper arms 1018 are then closed so that they underlie the tray.

With the gripper arms closed, the lift 7002 is then lowered to its home position 7010, as shown in FIG. 67(c), whereupon the tray 222 is lowered onto the gripper arms 7018 and supported above the unload region 7020 of the module.

Figures 67D, 67E, 67F:
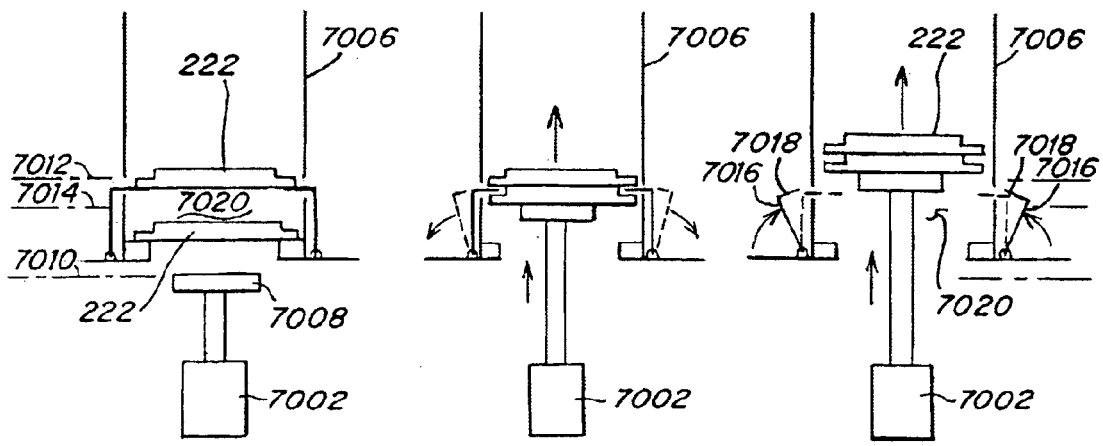

As shown in FIG. 67(d), the transporter then delivers another tray 222 to the unload region 7020 with the lift 7002 in its home position 7010. The lift 7002 is raised to its intermediate lift position 7014, as shown in FIG. 67(e), whereupon the tray that is being moved upwardly by the lift engages with and raises the bottom tray of the supported stack above the gripper arms. Thereafter, the gripper arms 7018 are retracted to their open position with the stack being supported by the lift 7002 in its intermediate lift position 7014.

With the gripper arms open 7018, the lift 7002 is then raised to its top lift position 7012, as shown in FIG. 67(*f*) to raise the entire stack to the top lift position above the gripper arms 7018. The gripper arms 7108 are then closed below the bottom tray 222 of the stack, and the lift 7002 is lowered to its home position 7010, as shown in FIG. 67(*c*), such that the stack of trays are now supported by the gripper arms 7018 above the unload region 7020 of the module.

The unload sequence shown in FIGS. 67(*c*)–(*f*) continues until the tray cassette 7006 is filled, whereupon the cassette is removed and an empty cassette is placed in the unload module. The initial unload sequences shown in FIGS. 67(*a*)–(*b*) are again carried out to begin the unload sequence.

It is to be appreciated that the load and unload sequences described above are merely exemplary and the any suitable methods of loading and unloading trays to and from the system may be employed as would be apparent to one of skill.

Various aspects and features of the load/unload module 234 will now be described in more detail below. It is to be understood, however, that the load/unload module is not limited to the illustrative embodiment, as numerous other configurations are possible.

Figure 68:
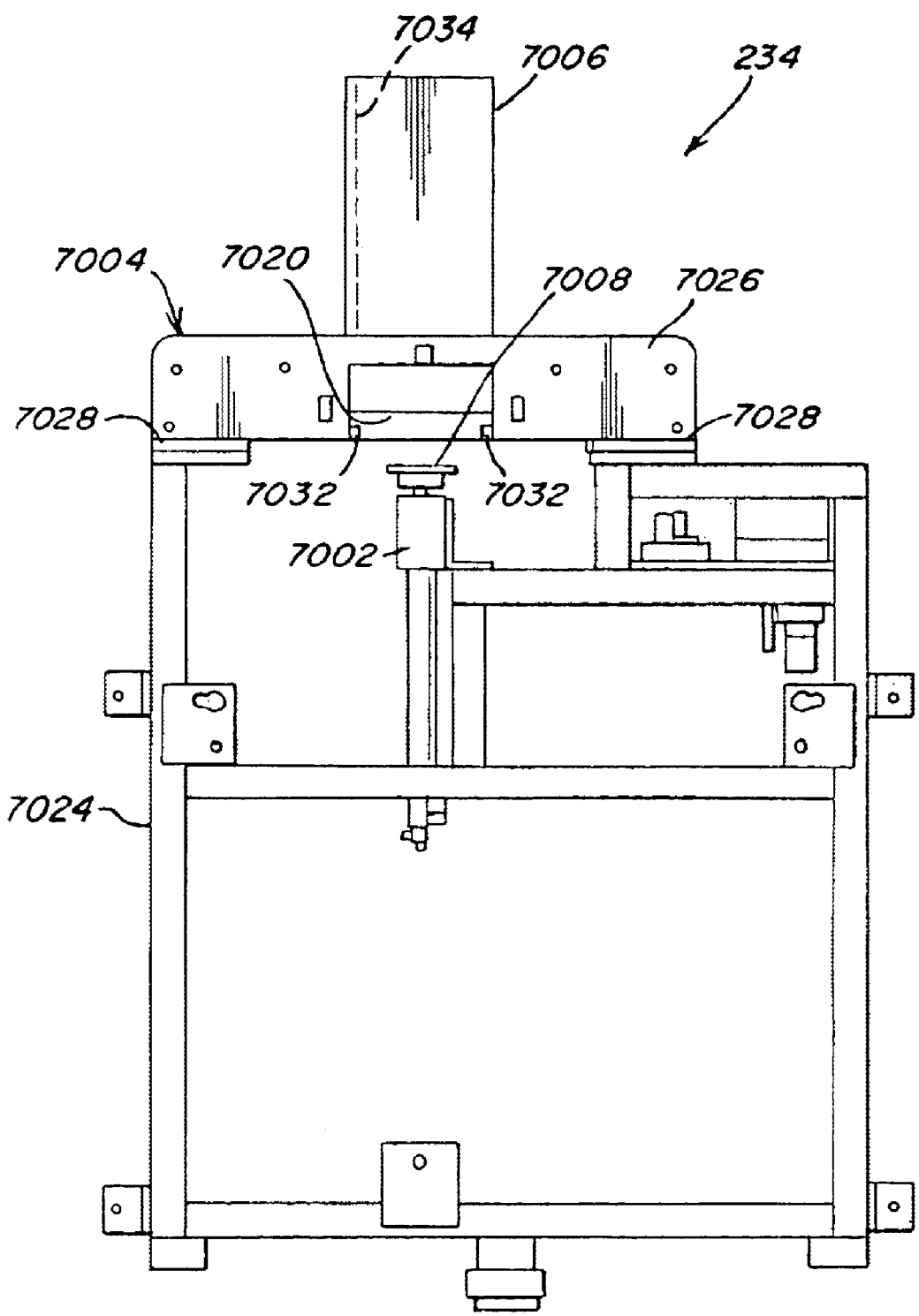
FIG. 68 is a side elevation view of one illustrative embodiment of a load/unload module.
Figure 69:
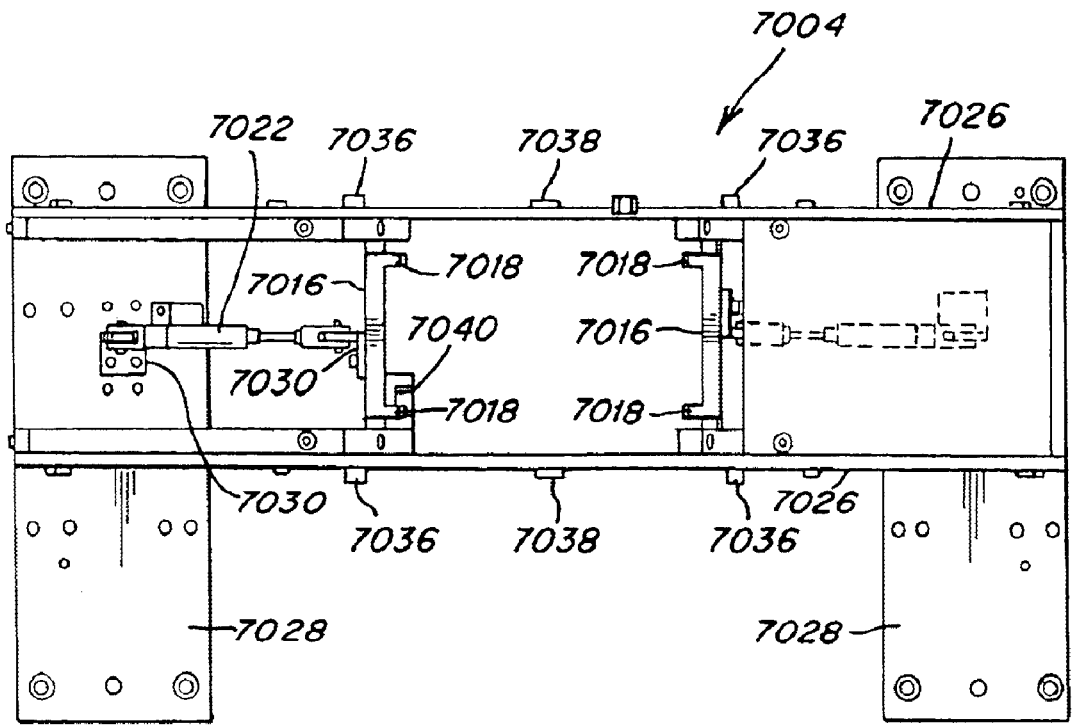
FIG. 69 is a top plan view of one illustrative embodiment of a gripping mechanism for the load/unload module of FIG. 68.
Figure 70:
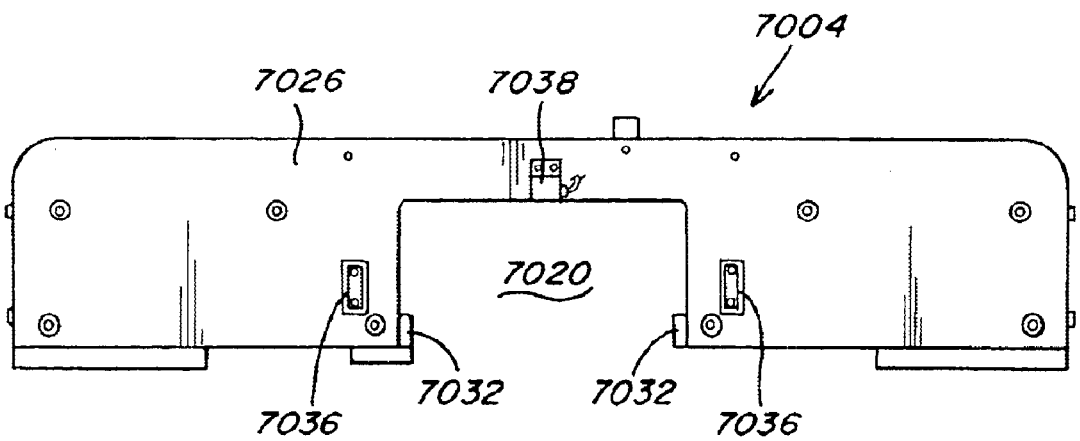
FIG. 70 is a side elevation view of the gripping mechanism of FIG. 69.

In one illustrative embodiment shown in FIGS. 68–70, the load/unload module 234 includes a lift 7002 supported on a base frame 7024 below the gripper mechanism 7004. A tray cassette 7006 is removably supported by the gripper mechanism above the lift 7002.

The lift may include a linear thruster with a lift plate 7008 supported at the top end of the thruster. In one embodiment, the thruster includes a three position air cylinder that is configured to position the lift plate 7008 in any one of the home position 7010, the top lift position 7012 and the intermediate lift position 7014, as indicated above. As an example of the various lift positions, the thruster is configured with a 4.375 inch stroke for the top lift position and a 4.0 inch stroke for the intermediate lift position relative to its home position. Of course, any suitable lift device having any number of lift positions may be implemented for a desired application.

Although numerous gripper mechanism configurations are contemplated, one illustrative embodiment of the mechanism includes a pair of gripper plates 7016 rotatably mounted to side walls 7026 of the gripper. Each gripper plate includes a pair of gripper arms 7018 extending from opposite ends of the plate. Each gripper plate is pivoted between the open and closed positions using an actuator 7022 that is mounted to the plate and a base 7028 of the mechanism using a clevis mount 7030. As is to be appreciated, the illustrative arrangement of the gripper mechanism is merely an example of numerous arrangements that may be implemented with the load/unload module.

In one illustrative embodiment, the tray cassette 7006 includes an elongated body con figured to hold a plurality of stacked trays therein. The cassette may be configured to have an interior cavity configured to closely conform to the shape of the trays to facilitate proper tray alignment during loading and unloading operations. A pair of supports 7032 extend inwardly from opposing sides of the cassette to maintain the trays within the cassette and to position a tray within the tray receiving region 7020 of the gripper mechanism. The upper surface of the tray supports 7032 are configured to be aligned with the outer rails of the transporter.

It may be desirable to provide a keying feature on the cassette to ensure proper orientation of the tray within the cassette, particularly when the tray is asymmetrical. In one illustrative embodiment, a vertical rib 7034 extends along the inner surface of the cassette. The rib cooperates with a correspondingly shaped recess on the cassette to ensure its proper orientation therein. The cassette may be formed from any material suitable for a particular application. In one embodiment, the cassette is extruded from a plastic material, such as 20% glass reinforced polysulfone. Of course, any suitable material may be employed for the cassette as would be apparent to one of skill.

The load/unload modules may be provided with one or more sensors that cooperate with a tool control system for controlling proper operation of the modules. In the illustrative embodiment, tray position sensors 7036 are provided adjacent each gripper plate to detect a tray that may be misplaced within the gripper assembly. In one embodiment, the tray sensors include a pair of optical detector and emitter sensors supported on opposing sides of the gripper frame to ensure that the tray is not out of position within the cassette.

The gripper assembly may also include a sensor to monitor presence of a tray in the cassette. In one embodiment, the sensor 7038 is a through-beam sensor that includes a source and a receiver mounted to opposing sides of the gripper frame above the tray receiving area to monitor the presence of a tray on the gripper arms.

A sensor may also be provided to ensure the presence of a cassette in the gripper mechanism. In one embodiment, the cassette sensor 7040 includes an optical reflective sensor. Sensors may also be provided to monitor the position of the gripper plates. In one embodiment, a pair of magnetic sensors are disposed on each air cylinder to monitor when the actuator is either extended or retracted. Signals from one or more or the sensors may be provided to any suitable control system as would be apparent to one of skill in the art to monitor and control the gripper mechanism. It should also be understood that any suitable sensor may be employed to monitor any desirable parameter of the mechanism for loading and/or unloading trays from the system.

Having described various embodiments of a load/unload module for use in the fiber preparation system, it should be understood that the description is by way of example only and that other suitable configurations may be implemented with the system as would be apparent to one of skill.

Centralizing Clamp

One or more of the process tools, as described above, may include a centralizing clamp for positioning a length of fiber along a predefined clamping axis. The clamp captures a fiber having any outer diameter within a range of diameters and positions the fiber coaxial with the clamping axis. The clamp also captures and positions the fiber regardless of its location within a region of uncertainty about the clamping axis.

The clamp may be employed to precisely locate a fiber in a desired position to facilitate various manufacturing processes. For example, the clamp may be particularly suited to precisely locate an optical fiber for stripping, cleaning, cleaving and ferrule attachment processes associated with the fabrication of optical fiber pigtails and the like. In this regard, the clamp may be configured for use with optical fibers having an outer diameter from approximately 180 $\mu$m to approximately 900 $\mu$m. It is to be appreciated, however, that the clamp may be utilized for any application where it is desirable to precisely locate a fiber, wire, cable and other like objects in a desired position.

The clamp includes clamping jaws that are movable between an open position for receiving and releasing the fiber and a closed position for capturing and centralizing the fiber along the clamping axis. The jaws may be configured to form a radial opening in the open position to receive the fiber in a radial direction relative to the clamping axis. The jaws may form a fiber receptacle in the closed position that is adapted to radially position the fiber coaxial with the clamping axis.

The jaws may be configured to apply a desired clamping force in the closed position to grip and retain the fiber, without damaging the fiber, when it is placed under axial tension. In this regard, the jaws may be configured to grip the fiber with minimal, if any, shear force placed on the fiber. Additionally, the clamping force of the jaws may be adjustable.

Each clamp jaw may include at least two clamp surfaces that are configured to cooperate with their respective opposing clamp surfaces to centralize and grip the fiber along the clamping axis. The pair of opposing clamp surfaces move toward a pair of clamping planes that intersect each other along the clamping axis. The intersecting plane configuration of the clamp surfaces facilitates the accurate positioning of the fiber along the clamping axis. The clamp surfaces may be adapted to clamp the fiber using only radial compressive forces and substantially without exerting any shear forces on the fiber.

The clamp may be configured to automatically actuate the jaws between the open and closed positions. One or more sensors may be employed to determine the operational configuration of the jaws and/or to sense the presence of a fiber within the fiber receptacle.

It is to be appreciated that the centralizing clamp may include any one or combination of these and other features. Several examples of centralizing clamps suitable for use with any of the embodiments of the present invention described above is described in co-pending U.S. patent application entitled "Centralizing Clamp", filed on even date herewith, and incorporated herein by reference (hereafter the "Centralizing Clamp Application"). However, it should be appreciated that the embodiment of the present invention directed to automated preparation of optical fiber is not limited to use with any particular clamp. The description of the centralizing clamp provided in the Centralizing Clamp Application is presented below.

Figure 71:
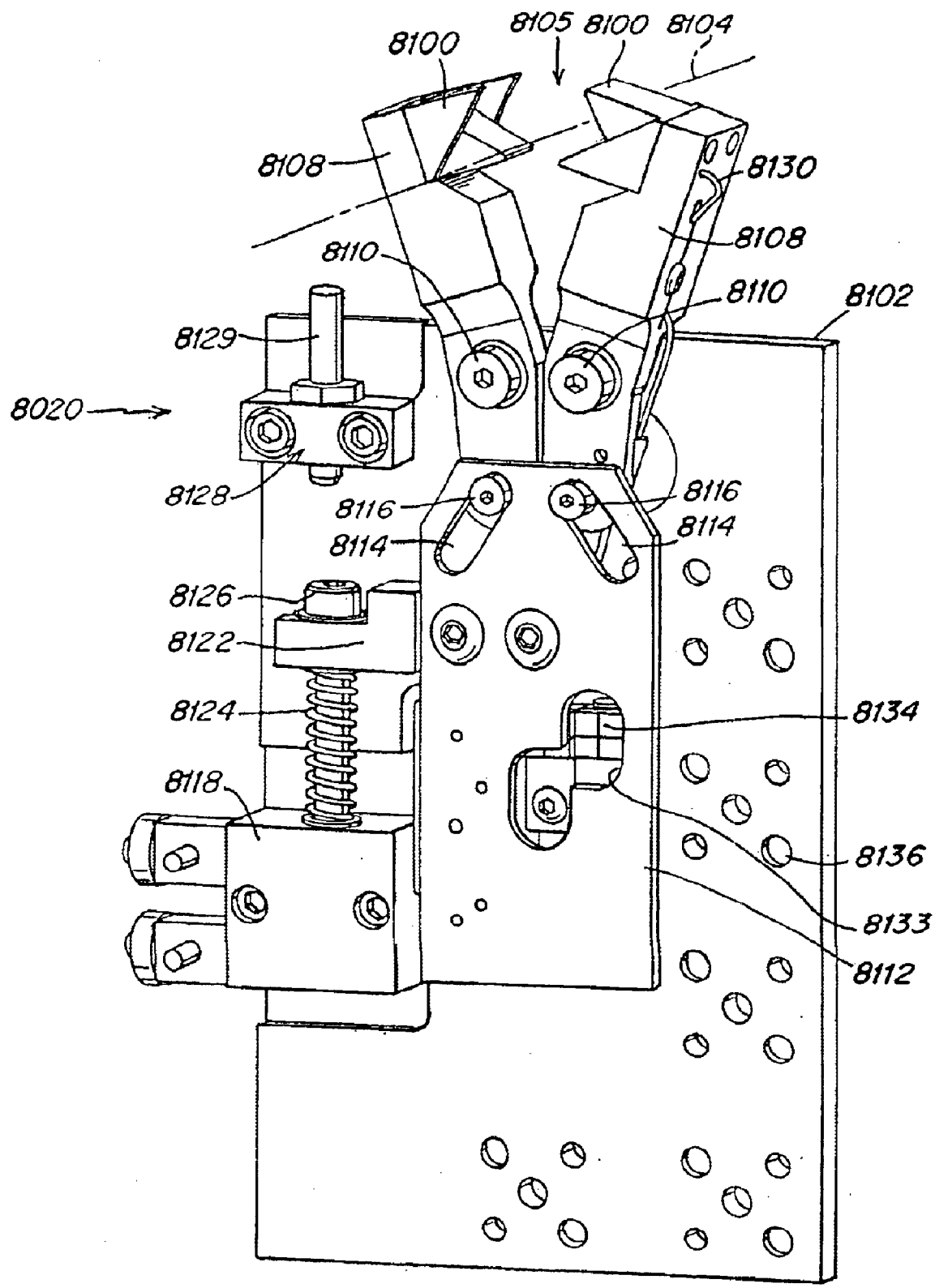
FIG. 71 is a perspective view of a centralizing clamp according to one illustrative embodiment, shown in the open position.
Figure 72:
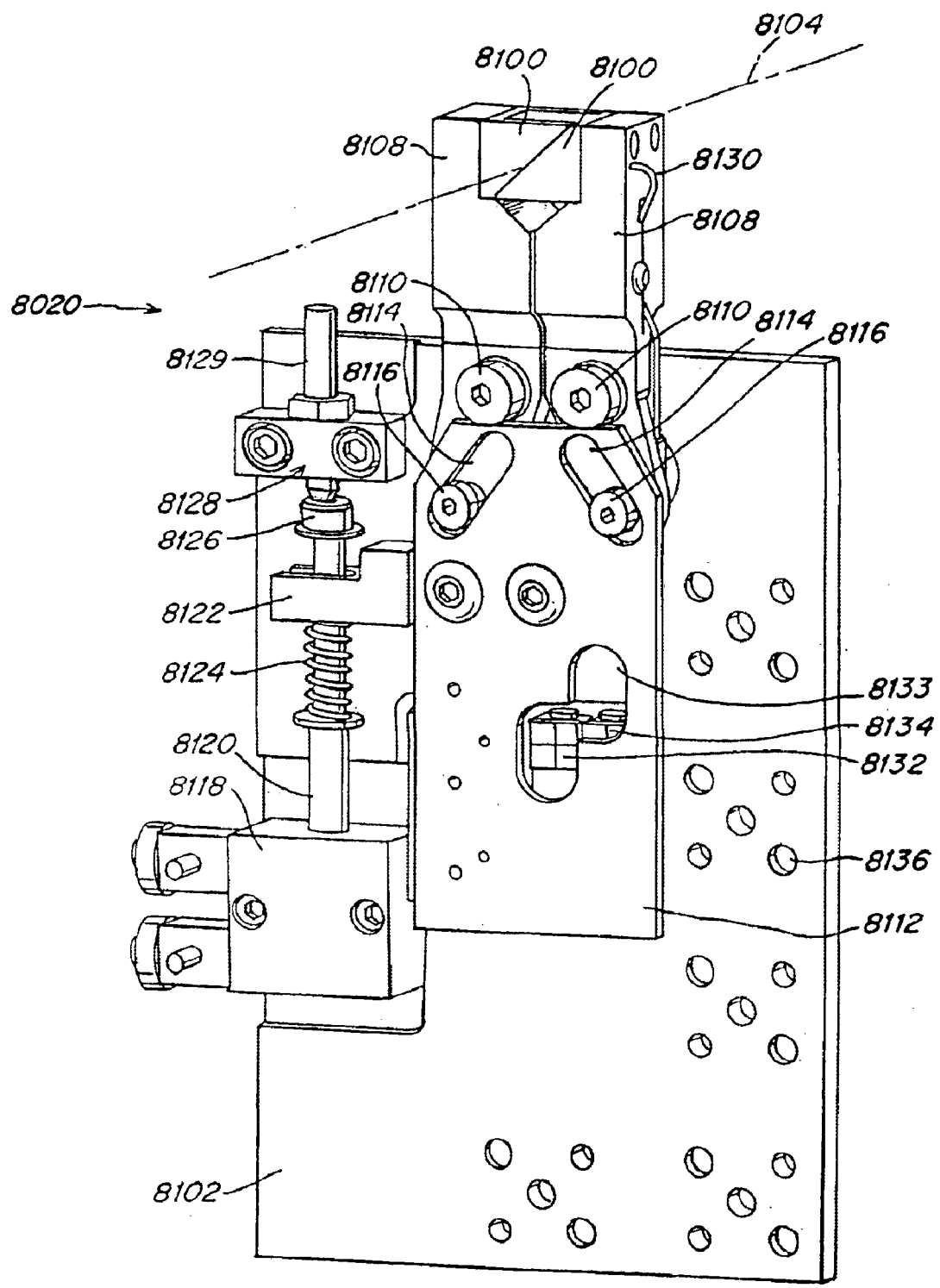
FIG. 72 is a perspective view of the centralizing clamp of FIG. 71 illustrated in the closed position.

In one illustrative embodiment shown in FIGS. 71–72, the centralizing clamp 8020 includes a pair of opposed clamping jaws 8100 that are moveably supported by a clamp base 8102 between an open position (FIG. 71) and a closed position (FIG. 72). The base is configured to support the jaws relative to a predefined clamping axis 8104. In the open position, the jaws 8100 form a radial opening 8105 that is adapted to receive a fiber in a radial direction relative to the clamping axis. In the closed position, the jaws 8100 capture the fiber located anywhere within a region of uncertainty between the jaws and position it coaxial with the clamping axis.

Each clamp jaw 8100 may include at least two clamp surfaces 8106 that are angled relative to each other so that, when the clamp is closed, at least four surfaces cooperate to position the fiber along the clamping axis. In one illustrative embodiment shown in FIG. 73, each clamp jaw 8100 includes a central clamp surface 8202 and a pair of end clamp surfaces 8204 disposed at opposite ends of the jaw. The end clamp 8204 surfaces are oriented transverse to the central clamp surface 8202 to form a generally V-shaped notch along the length of the jaw. This configuration provides two centralizing zones at opposite ends of the jaws to facilitate accurate positioning of the fiber coaxial with the clamping axis.

It is to be appreciated that other jaw configurations may be employed to center and grip the fiber. In this regard, each clamp jaw may comprise any number of clamping surfaces which may be of the same or different widths. For example, each jaw may include two, as opposed to three, clamp surfaces having the same surface area that are angled relative to each other to form the V-shaped notch. The clamp may also employ any suitable number of jaws including one or more clamp surfaces.

The jaws are configured to nest with each other so that the respective central clamp surfaces 8202 and end clamp surfaces 8204 are positioned opposite each other as the clamp is closed about a fiber with the central clamp surface 8202 on one jaw overlapping the end clamp surfaces 8204 of the opposing jaw. As illustrated in FIGS. 74–77, the opposing V-notch arrangement acts to surround a fiber 8300 located in the region of uncertainty 8302 and collect the fiber in a fiber receptacle 8304 that is formed by the notches coaxial with the clamping axis 8104. As the position of the jaws 8100 changes relative to each other, the size of the fiber receptacle 8304 varies (FIGS. 76–77) about the clamping axis 8104 so that the jaws may position fibers of varying diameters coaxial with the clamping axis.

The clamp surfaces of each jaw are angled relative to each other to establish intersecting planes 8402, 8404 (FIG. 75) between the jaws as they are placed in the closed position. Since a pair of opposing surfaces maintain a fiber parallel to a plane defined by the surfaces, employing a jaw configuration including two pairs of opposing surfaces maintains a fiber parallel to two intersecting planes which facilitate the positioning of the fiber coaxial with the clamping axis. In one illustrative embodiment, the central clamp surface 8202 is oriented perpendicular to the end clamp surfaces 8204. However, it is to be appreciated that the clamp surfaces may be oriented at any desired angle relative to each other provided that the angle formed between the clamp surfaces is equal for each of the clamp jaws.

The notched jaw configuration, illustrated in FIGS. 73–77, exerts equal and opposite clamping forces on a fiber gripped between the jaws with minimal, if any, shear forces being induced in the fiber. The end clamp surfaces 8204 may be recessed slightly from the central clamp surface 8202 so that the clamping force exerted on the fiber is uniformly distributed over the length of the central clamp surfaces 8202. This arrangement evenly distributes opposing forces over a large area of the fiber and reduces the risk of damaging the fiber, allowing the clamp to exert sufficient force to hold the fiber in position while it is placed under axial tension. However, the clamp is not limited in this regard and the end clamp surfaces 8204 need not be recessed such that the clamping force may be exerted by each of the clamp surfaces.

Referring again to FIGS. 71–72, in one illustrative embodiment, the jaws 8100 are attached to upper ends of a pair of clamp arms 8108 rotatably mounted to the base 8102 about a pair of arm pivots 8110. Lower ends of the clamp arms 8108 are coupled to a cam plate 8112 that is movably supported by the base. As shown, the upper end of the cam plate may include a pair of angled slots 8114 that cooperate with cam followers 8116 located on the lower ends of the arms to open and close the clamp jaws 8100. In this regard, moving the cam plate 8112 in a downward direction away from the jaws drives the cam followers 8116 toward each other, which in turn rotates the jaws apart toward the open position (FIG. 71). Conversely, moving the cam plate 8112 in an upward direction toward the jaws 8100 drives the cam followers 8116 apart, which in turn rotates the clamp jaws toward the closed position (FIG. 72). The cam plate 8112 is slidably mounted to the base 8102 with a rail 8115 and carriage 8117 arrangement (FIG. 80) disposed between the cam plate and the base.

It is to be understood that any suitable arrangement may be employed to move the clamp jaws 8100 between the open and closed positions. For example, the lower ends of the clamp arms 8108 may be coupled to independent links that are connected to a common follower. As another example, the clamp arms may mounted to the base to move toward and away from each other in a linear direction. As a further example, the clamp arms may be rotatably mounted to the base about a common axis. These examples are not intended to be limiting as other arrangements may be implemented as may be apparent to one of skill.

The cam plate 8112 may be coupled to an actuator which drives the cam plate in a linear direction along the base. In one illustrative embodiment, the actuator 8118 includes an air cylinder with a piston 8120 that is extended and retracted in response to the application of air pressure. The piston 8120 is coupled to the cam plate 8112 with a bracket 8122 extending from the side of the plate. It is to be appreciated, however, that any suitable actuation arrangement may be implemented to drive the cam plate relative to the base. For example, a motor and lead screw arrangement may be used to drive the cam plate.

Figure 78:
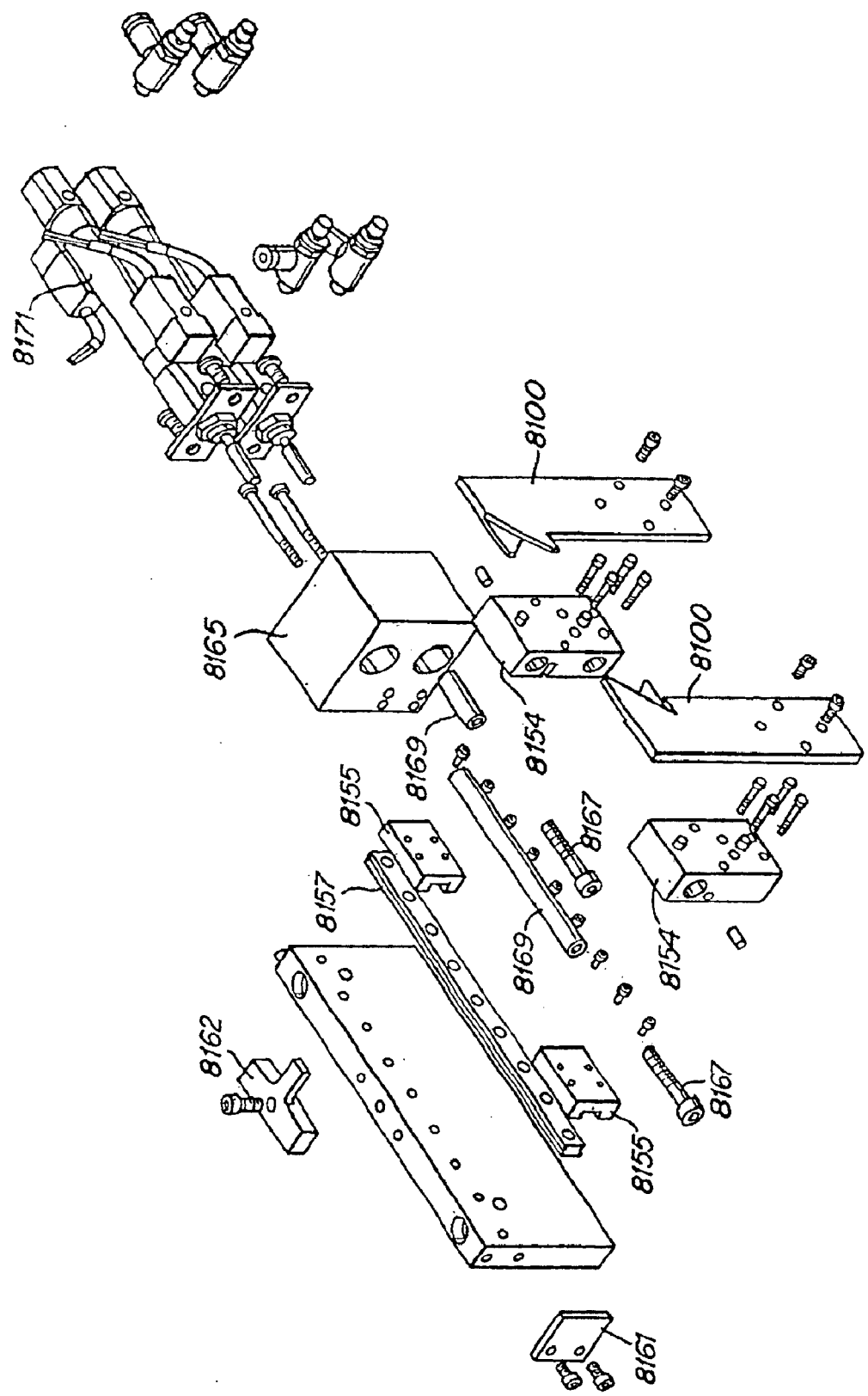
FIG. 78 is an exploded perspective view of another illustrative embodiment of a centralizing clamp.

Alternatively, according to another embodiment, the clamp jaws may not be rotatably mounted to the base, but may be moved in a linear direction between the open and closed positions. An exploded view of a clamp having clamp jaws that are movably supported by the base is illustrated in FIG. 78. The clamp jaws 8100 are mounted to clamp blocks 8154 which may slide on carriages 8155. The carriages 8155 move linearly on a rail 8157, but any suitable method of bringing the two jaws 8100 together may be used. A stop 8161 on one end and a cylinder mount 8165 on the other end may provide limits to the outward movement of the clamp jaws 8100. A hard stop 8162 may be provided to prevent the clamp jaws 8100 from closing too far and damaging the fiber. Fasteners 8167 may be used to attach the clamp blocks 8154 to cylinder couplings 8169 that may be driven by pneumatic cylinders 8171 in opposite directions. That is, one coupling retracts while the other extends open and shut the jaws. Any suitable actuator may be used to bring the two jaws 8100 together such as, for example, a solenoid or electric motor. A single actuator coupled to both clamp jaws 8100 may also be used.

In addition to centralizing a fiber along the clamping axis, it may be desirable to grip the fiber with sufficient force to securely hold it in position, without damaging the fiber, while the fiber is placed under axial tension as may occur during one or more operations on the fiber end. For example, stripping or cleaving the end of an optical fiber may require that the fiber be placed under significant axial tension. The amount of clamping force may vary depending on the particular operation and/or the particular type of fiber being clamped. Thus, the clamp may be configured to control the amount of clamping force applied to a fiber.

In one illustrative embodiment shown in FIGS. 71–72, a compression spring 8124 is disposed between the piston 8120 and the cam bracket 8122. The spring may be held in position using any suitable retainer 8126, such as a shoulder screw and the like, that extends through the cam bracket 8122 and into the end of the piston 8120. Once the piston drives the clamp to its closed position (FIG. 72), further extension of the piston causes the spring 8124 to compress against the cam bracket 8122 thereby generating a clamping force between the jaws. Of course, other arrangements for generating a desired clamping force may be implemented as may be apparent to one of skill.

It may be desirable to adjust the amount of clamping force for a particular fiber and/or process on the fiber. In the illustrative embodiment, the clamp includes a stop 8128 that is aligned with the piston 8120 so as to be engaged by the retainer 8126 as it is driven upward by the piston. Once the retainer 8126 engages the stop 8128, further extension of the piston 8120 is blocked, thereby limiting the amount of spring compression and, therefore, the clamping force.

To adjust the clamping force in the illustrative embodiment, the stop 8128 includes an adjustable pin 8129 that may be extended toward and retracted away from the end of the retainer. The stop may be adjustable based on, for example, the diameter of the fiber to be clamped, or a predetermined clamping force for withstanding an axial tension anticipated to be exerted on the fiber. Since the amount of clamping force is a function of the spring constant and the amount of spring compression, one or both of these parameters may be fixed or adjusted to achieve a desired clamping force. It is also to be appreciated that any suitable adjustable force arrangement, if even desired, may be implemented on the clamp.

It may be desirable in some applications to monitor one or more parameters associated with the clamp. In this regard, the clamp may be employed in an automated manufacturing process that would benefit from monitoring a particular parameter of the clamp. For example, it may be desirable to determine if a fiber is present in the jaws before proceeding with an operation requiring the presence of the fiber. As another example, determining if the clamp is open or closed may be desirable before proceeding with certain steps in a process.

Figure 73:
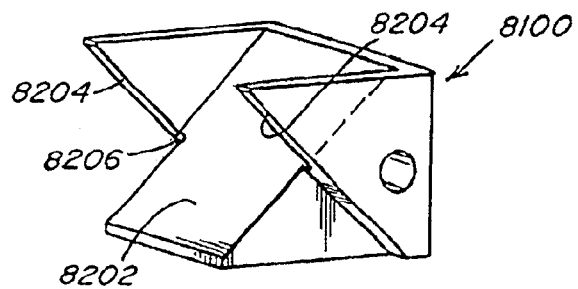
FIG. 73 is a perspective view of one illustrative embodiment of a clamp jaw for the centralizing clamp of FIG. 71.
Figure 74:
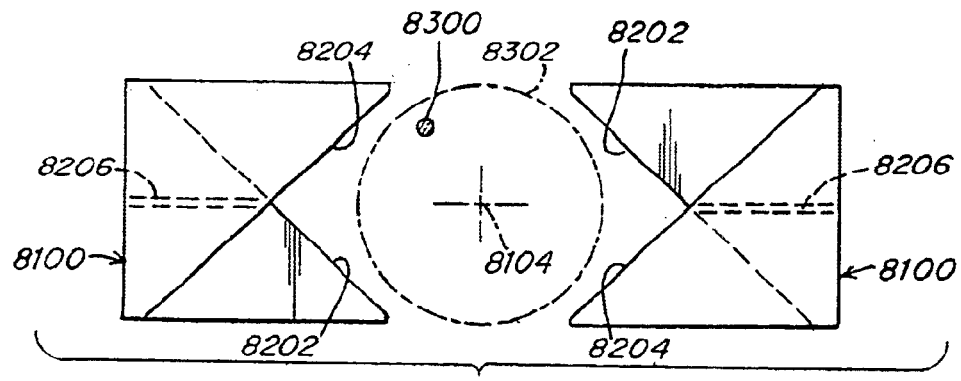
FIGS. 74–75 are schematic views of the clamp jaws of the centralizing clamp of FIG. 71 in the open and closed positions.
Figure 75:
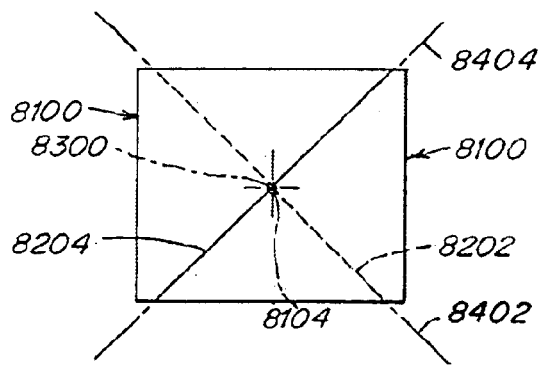
Figure 76:
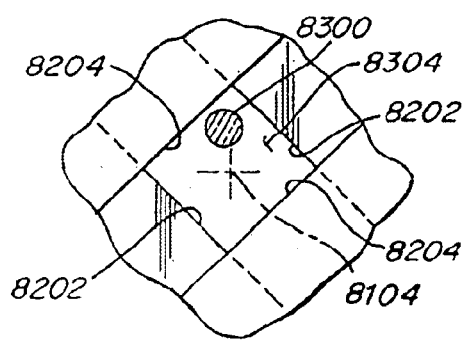
FIGS. 76–77 are enlarged schematic views of the clamp jaws illustrating a fiber receptacle closing about and positioning a fiber.
Figure 77:
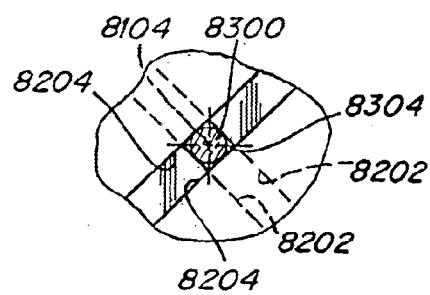

In one illustrative embodiment shown in FIGS. 71–73, the clamp includes a sensor 8130 that is adapted to detect the presence of the fiber within the fiber receptacle. The sensor 8130 may be supported adjacent at least one of the clamping jaws 8100 and positioned to monitor the fiber receptacle 8304 (FIG. 76). As shown, the sensor 8130 may be positioned at the intersection of the clamp surfaces 8202, 8204 of the jaw. It is to be appreciated, however, that the sensor, if even desired, may be placed in any location, within or adjacent the clamp jaw, that is suitable for detecting the presence of a fiber when the clamp is in the closed position.

In one embodiment, the sensor 8130 is a reflective optical sensor located in a hole 8206 (FIGS. 73–74) provided in one of the clamp jaws 8100 with a corresponding hole 8206 being provided in the opposing jaw. When a fiber is located within the fiber receptacle with the clamp heads closed, at least a portion of the light emitted by the sensor is reflected by the fiber back to the sensor. In response to detection of reflected light, the sensor generates a signal indicating the presence of the fiber. Should there be no fiber present in the receptacle when the jaws are closed, light emitted by the sensor passes through the fiber receptacle and corresponding hole in the opposing clamp jaw so that no light is reflected back to the sensor. In the absence of reflected light, the sensor generates no signal indicative of the presence of a fiber in the fiber receptacle. Although a reflective optical sensor is disclosed, it is to be understood that any suitable sensor may be employed to detect the presence of a fiber in the clamp.

At least one sensor may be provided to determine if the clamp is open or closed. In one illustrative embodiment, the clamp includes a pair of sensors supported by the base. A first sensor 8132 is configured to determine if the clamp is open, while a second sensor 8134 is configured to determine if the clamp is closed.

In one embodiment, the sensors 8132, 8134 are inductive proximity sensors that respond to the presence of a metal being located adjacent each sensor. In this regard, the sensors 8132, 8134 are configured to determine if the clamp is open or closed by monitoring the position of the cam plate relative to each sensor. As shown in FIGS. 71–72, the sensors 8132, 8134 are mounted to the base plate 8102 below the cam plate 8112 which has one or more apertures 8133 extending therethrough. When the clamp is placed in the open position (FIG. 71), the first sensor 8132 is covered by the cam plate 8112 while the aperture 8133 overlies the second sensor 8134 such that the first sensor generates a signal, indicative of the open position of the clamp. Conversely, in the closed position (FIG. 72), the aperture 8133 overlies the first sensor 8132 while the cam plate 8112 covers the second sensor 8134 so that the second sensor generates a signal indicative of the closed position of the clamp.

The dual sensor arrangement provides a relatively reliable sensor arrangement, since a positive signal is generated when the clamp is placed in both the open and closed positions. It is to be understood, however, that any number of sensors, including a single sensor, may be utilized in any suitable arrangement to monitor the positioning of the clamp jaws as being open and closed. It is also to be appreciated that the clamp may employ any suitable type of sensor, such as an optical sensor and the like, for monitoring the clamp positions.

Any of the signals, or lack thereof, may be used with a process control system and the like to determine whether or not to continue with one or more process steps, generate a fault indication and the like.

The clamp base 8102 may be provided with one or more sets of mounting holes 8136 to enable the clamp to be attached to various manufacturing equipment, tools and the like. A plurality of different sets of mounting holes may be provided to accommodate different mounting arrangements on various equipment.

The centralizing clamp may include one or more features for performing various other functions in conjunction with centralizing and gripping a fiber. For example, it may be desirable to clamp the end of a fiber in a desirable position to be cleaned, for example, in a solvent bath. In such an application, it may be desirable to seal the opening through which the fiber extends into the cleaning bath with a seal provided on the clamp.

Figure 79:
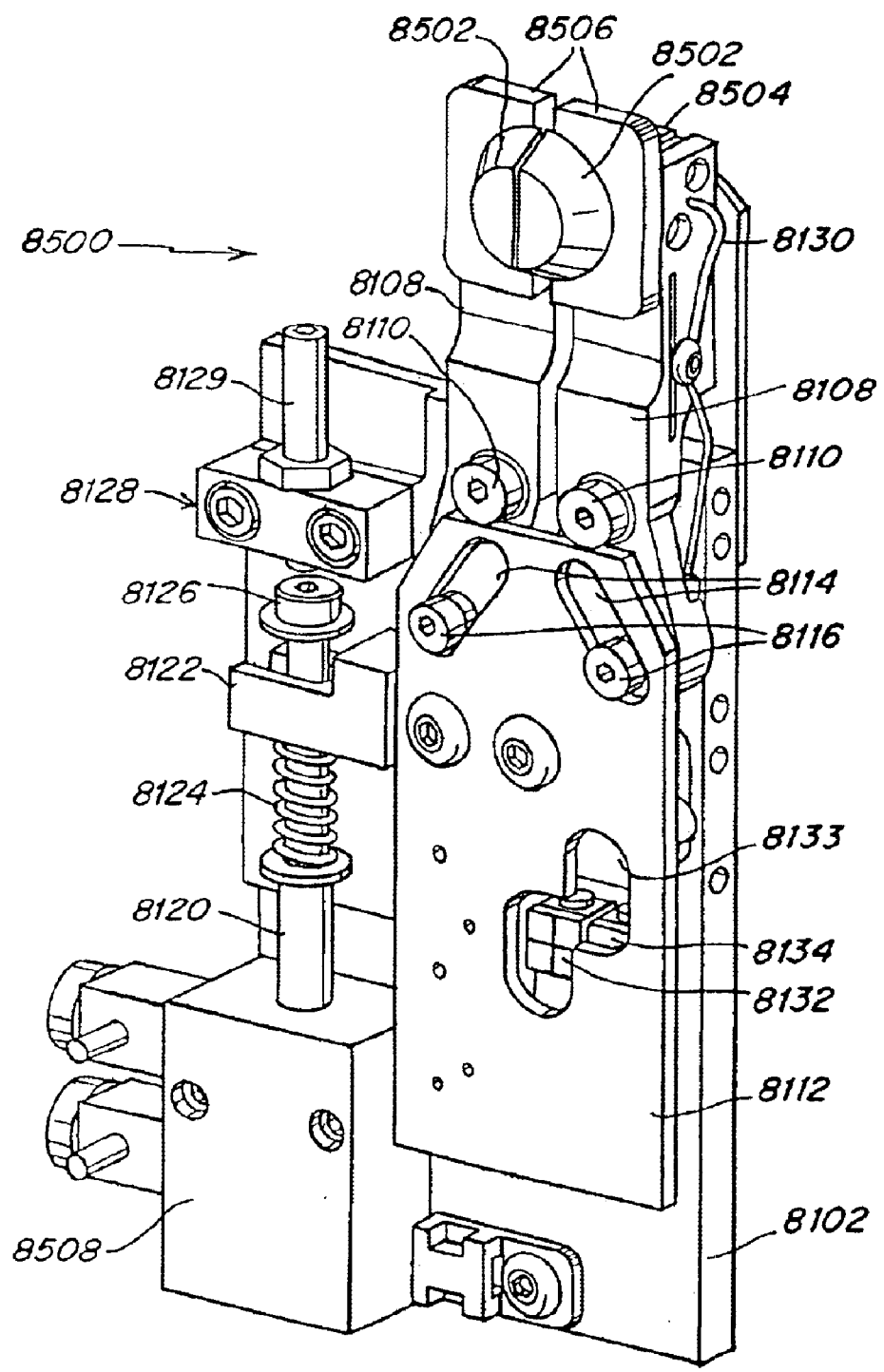
FIG. 79 is a perspective view of a centralizing clamp including a sealing fixture.
Figure 80:
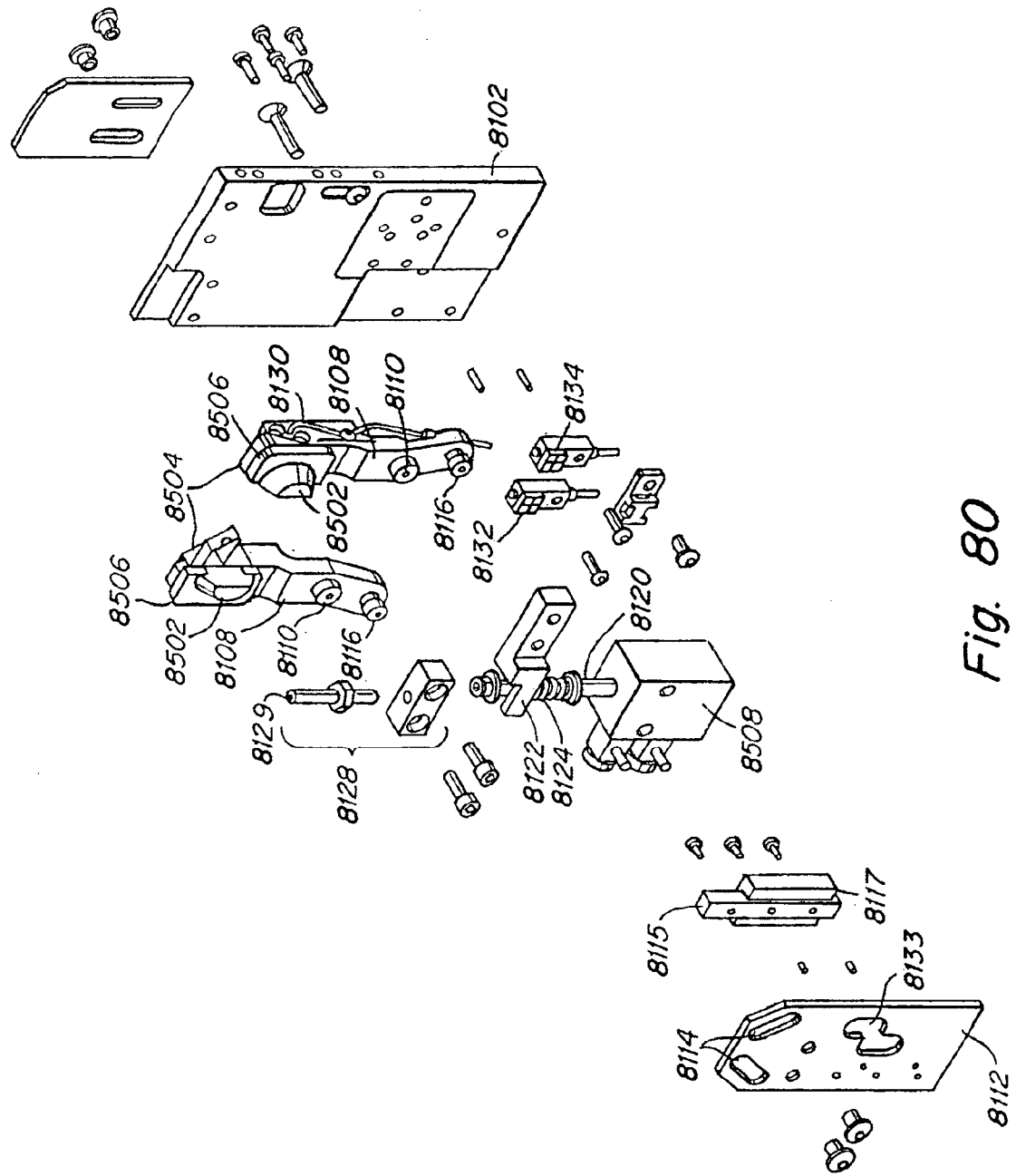
FIG. 80 is an exploded perspective view of the centralizing clamp of FIG. 79.
Figure 81:
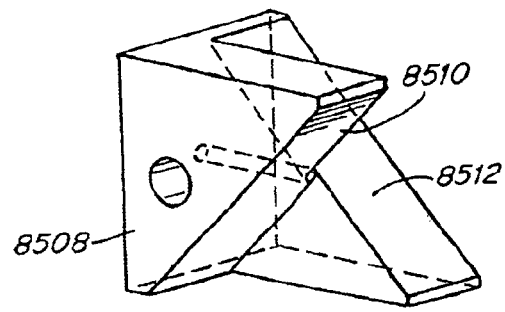
FIG. 81 is a perspective view of another illustrative embodiment of a clamp jaw for the centralizing clamps of FIGS. 1 and 9.

In one illustrative embodiment, shown in FIGS. 79–81, a centralizing clamp 8500 includes a seal formed by a pair of opposing seal members 8502 supported adjacent a pair of clamp jaws 8504. The seal members 8502 are configured to be compressed about the fiber in the closed position. The seal members are also configured to form a plug that may be inserted into the fiber entry port of a cleaning tool.

In one embodiment, the plug has a frusto-conical shape that corresponds to the sealing gland on a cleaning tool. The plug is formed from a compliant, abrasion resistant material, such as a polyurethane material having a hardness of 55 Shore A. As is to be appreciated, however, the seal may be formed from any suitable material for preventing leakage of a solvent or other fluid and may have any suitable shape that is compatible with a corresponding sealing surface.

In the illustrative embodiment, each sealing member 8502 is mounted to a corresponding clamp arm 8108 using a mounting plate 8506 that is attached to the arm. The sealing members 8502 may be attached to the mounting plates using any suitable fastening arrangement, such as adhesives, screws, rivets and the like.

It may be desirable to maintain a seal with the corresponding sealing surface should there be a disruption of air pressure or other signal to the actuator. In one embodiment, the clamp may employ an actuator 8508 configured with a passive, spring extendable cylinder (not shown) within the air cylinder that will maintain the piston 8120 in its extended position in the absence of air pressure to the air cylinder. Other arrangements may be implemented to maintain the seals closed, if desired, as may be apparent to one of skill.

The clamp jaws may be similar to or different from those described above, provided the jaws centralize and clamp the fiber along the predefined clamping axis. In another illustrative embodiment shown in FIG. 81, each clamp jaw 8504 includes a pair of angled clamp surfaces 8510, 8512 that provide a centralizing zone midway between the ends of the jaw. Similar to the jaws described above, the angled clamp surfaces form a generally V-shaped notch configured cooperate with the corresponding notch of the opposed jaw to capture and position the fiber coaxial with the clamping axis. Again, it is to be appreciated that other jaw configurations may be employed to center and grip the fiber.

Figure 82:
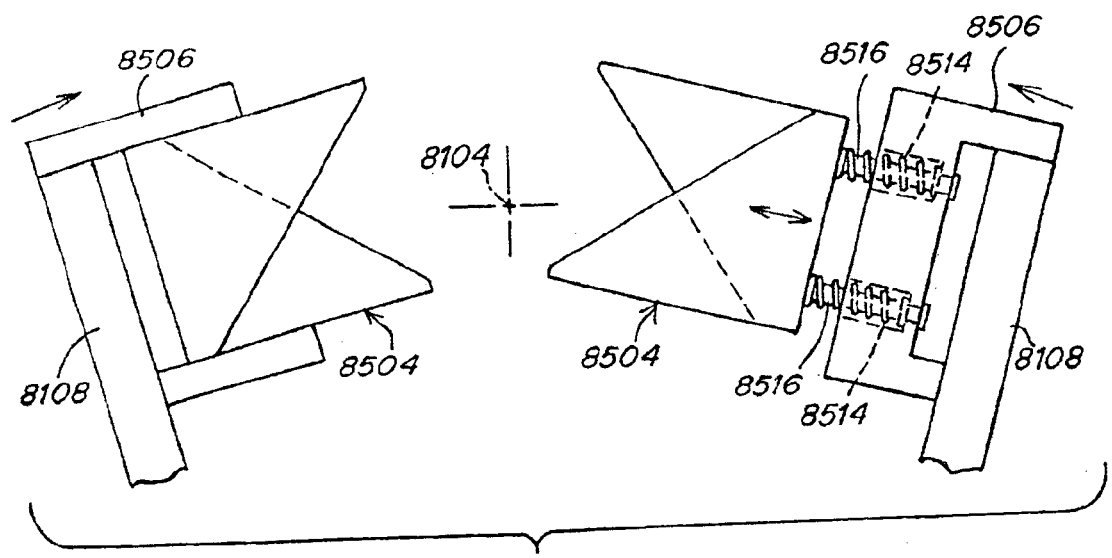
FIG. 82 is a schematic view illustrating one embodiment of the mounting arrangement for the clamp jaws of the centralizing clamp of FIG. 79.

In some applications, it may be desirable to capture and centralize the fiber before it becomes sealed between the seal members to ensure that the fiber is accurately positioned coaxial with the clamping axis as the clamp is actuated to the closed position. In one illustrative embodiment shown in FIG. 82, one of the clamp jaws is fixed to the clamp arm, while the opposing clamp jaw is movably supported on its clamp arm so as to move in a reciprocating radial direction relative to the clamping axis. At least one biasing element, such as a compression spring 8514, may be disposed between the movable jaw 8504 and its clamp arm 8108 to bias the jaw inwardly toward the clamping axis 8104 and opposing jaw 8504 so that the jaws engage a fiber prior to the seal members as the clamp arms rotate toward the closed position. As illustrated, the movable jaw may be slidably connected to the clamp arm 8108 with a pair of slide pins 8516. A pair of compression springs 8514 may be supported about the pins 8516 to bias the jaw outwardly. It is to be understood, however, that any suitable mounting arrangement may be implemented for movably mounting at least one of the jaws, if desired and that the clamp is not limited to the illustrative arrangements.

In this embodiment, as the clamp arms 8108 close toward each other, the fiber is first captured and loosely positioned within the clamp jaws 8504 prior to the clamp being fully closed. As the clamp arms 8108 continue to close, the clamp jaws 8504 centralize and lightly clamp the fiber. Additional force generated by the actuator causes the springs 8514 in the spring-loaded jaw to compress, thereby more tightly clamping the fiber until the clamp jaws are fully closed about the fiber at which time the seal members 8502 engage each other to seal the fiber.

Having described various embodiments of a centralizing clamp for use in the fiber preparation system, it should be understood that the description is by way of example only and that other suitable configurations may be implemented with the system as would be apparent to one of skill.

Transport Tray

The system may also include a tray for a coiled fiber, such as an optical fiber. An example of one tray suitable for use with any of the embodiments of the present invention is described in co-pending U.S. patent application entitled "Tray for a Coiled Optical Fiber", filed on even date herewith, and incorporated herein by reference (hereafter the "Work Tray Application"). However, it should be appreciated that the various embodiments of the present invention directed to automated preparation of optical fiber is not limited to use with any particular transport medium. Various illustrative embodiments of a tray, as provided in the Work Tray Application, are presented below.

The tray is configured to transport the fiber through an automated manufacturing process, such as fiber preparation and ferrule attachment to one or both ends of an optical fiber to fabricate a fiber pigtail. The tray may also be configured to maintain one or more portions of the fiber in a desired position to facilitate the manufacturing process. The tray may protect the fiber from damage that can occur due to handling, transportation and/or storage.

The tray may include any one or more of a number of features for retaining the coiled fiber thereon. In this regard, the tray may include a containment feature, such as a receptacle, that receives the coiled fiber and maintains the fiber in a coiled position while the fiber is transported, stored and/or assembled. A locking mechanism may be provided to retain the coiled fiber in the receptacle. One or more retainers may be provided on the tray to hold one or both end portions of the fiber in a selected position, either during transportation or storage of the fiber, or during manufacturing processes on the end portion of the fiber. The retainer may be configured to hold a fiber having any one of a range of fiber diameters or ferrules of various shapes attached to the end of an optical fiber. This feature adds to the utility and convenience of the tray, since it allows the same tray to be used to transport or store fibers having different fiber diameters and/or ferrule shapes.

The tray may also include any one or more of a number of registration features configured to facilitate the handling and positioning of the tray during a manufacturing process. The registration features may be configured to mate with corresponding features provided on one or more manufacturing tools or stations to position the tray relative to the tool or station. Registration features may also be employed to cooperate with a transporter that moves the tray between multiple fiber processing stations.

While the tray is particularly suited for the fabrication, transportation and storage of an optical fiber, it is to be appreciated that the tray may be employed with any type of fiber, wire, cable or cable-like device that may need to be retained in a coiled configuration.

Figure 83:
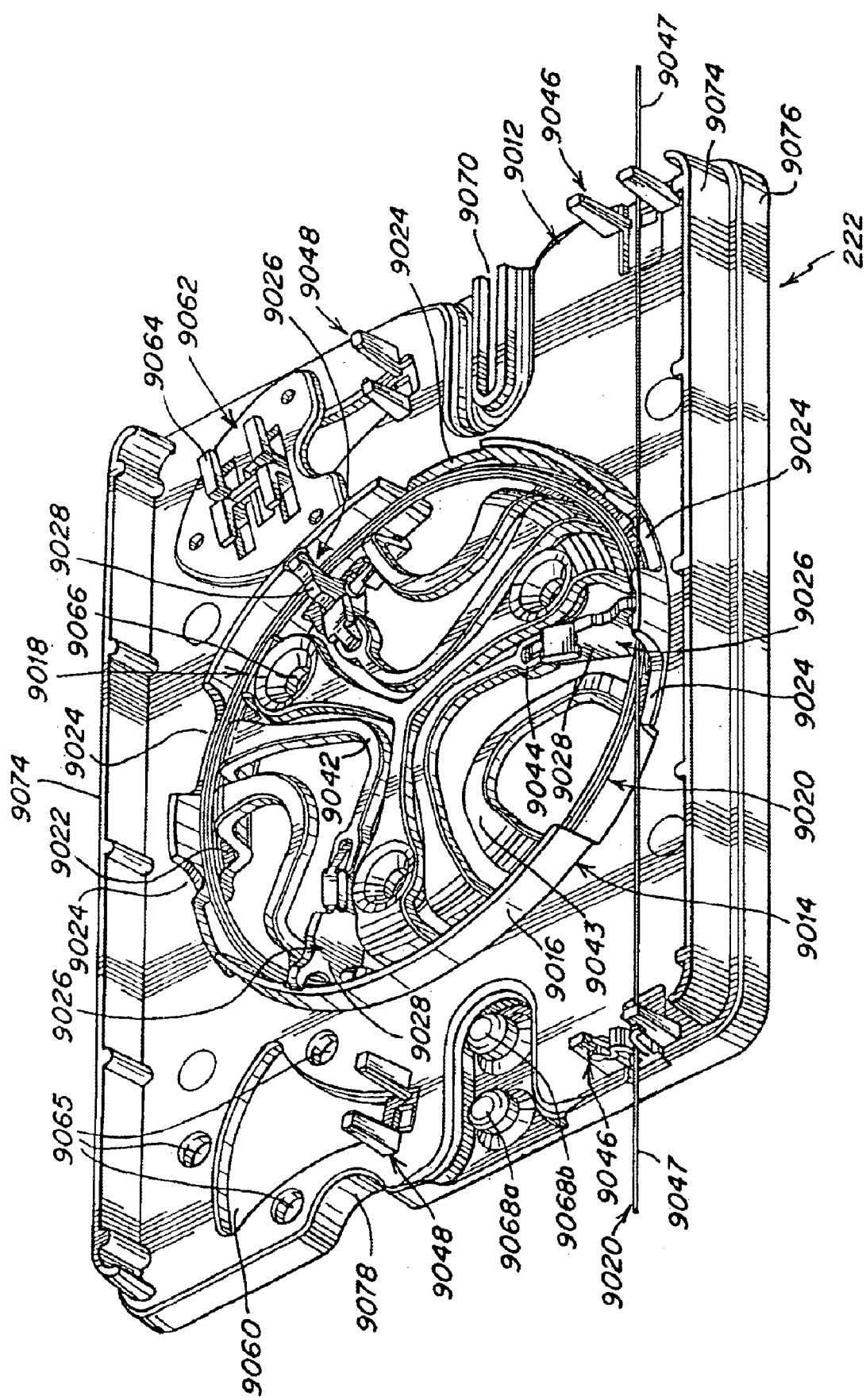
FIG. 83 is a top perspective view of a transport tray for a coiled fiber according to one illustrative embodiment.
Figure 84:
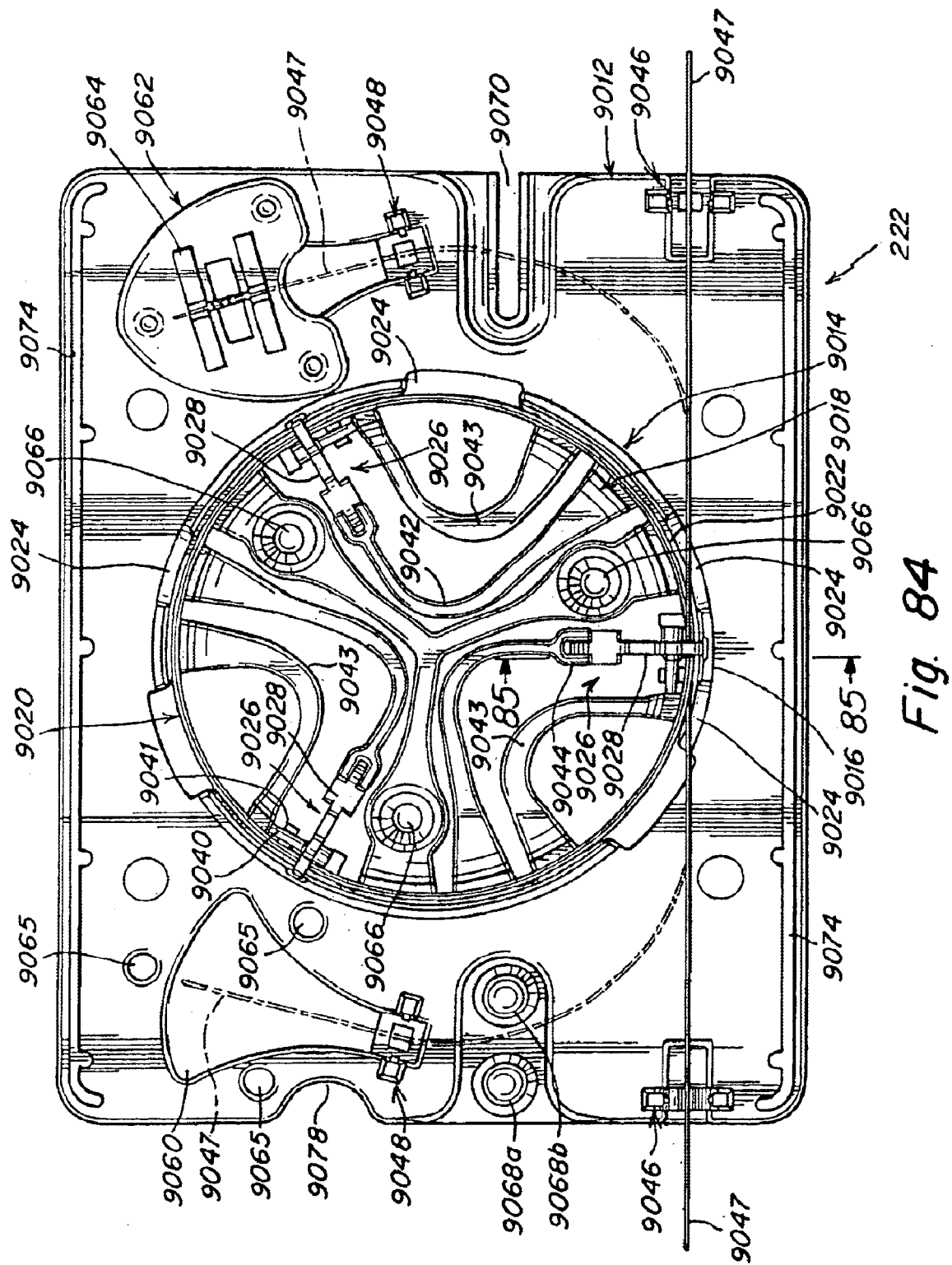
FIG. 84 is a top view of the tray of FIG. 83.

In one illustrative embodiment shown in FIGS. 83–84, the tray 222 includes a base 9012 with a receptacle 9014 that is configured to receive one or more coils of the fiber 9020. The receptacle may be configured to receive coils of fiber, which have been coiled about a coil axis, in a direction along the coil axis. Alternatively, the fiber may be coiled into the receptacle, also in a direction along a coil axis. As illustrated, the receptacle 9014 has a circular shape that is configured to match the shape of the coiled fiber. In this regard, it may be desirable to configure the receptacle with a diameter that equals or exceeds a minimum bend radius allowable for the fiber. This may have particular application for an optical fiber which could be damaged should it be coiled too tightly. In one embodiment, the receptacle has a diameter of approximately 75 mm. It is to be appreciated, however, that the receptacle may be configured to have any suitable shape and size to receive a coiled fiber.

The receptacle 9014 is centrally located on the base 9012 and configured to position and hold the coiled fiber 9020 in a known location on the base. In the illustrative embodiment, the receptacle 9014 includes one or more upstanding walls 9016 which provide a coil containment feature. The receptacle may also include a central hub 9018 spaced inwardly from the wall to form an annular recess 9022 in the base 9012 that is configured to provide a secure location for the coiled fiber.

It may be desirable to allow one or both end portions of the coiled fiber to extend from the receptacle so that any of a number of various manufacturing processes may be performed on the fiber. For example, it may be desirable to prepare the end portion of an optical fiber held in the tray for attachment of a ferrule. In one embodiment illustrated in FIG. 84, the receptacle wall includes openings or breaks 9024 to allow the ends of the coiled fiber to exit from the same general region of the containment receptacle. It is to be appreciated that any number of openings may be located on any desirable portion of the receptacle suitable for any particular application.

To ensure a secure attachment of the coiled fiber within the receptacle, the tray may be provided with a lock mechanism to retain the coiled fiber on the tray. The lock mechanism may be configured to be operable between an open or unlocked position and a closed or locked position. With the lock mechanism in the unlocked position, the coiled fiber may be inserted into or removed from the receptacle, while the fiber is retained in the receptacle when the lock mechanism is in the locked position.

In one illustrative embodiment shown in FIGS. 83–84, the lock mechanism 9026 includes a plurality of latches 9028 that are movably supported on the base of the tray. Each latch may be rotatably supported from the receptacle wall 9016 so as to move toward and away from the inner surface of the receptacle wall between the locked and unlocked positions, respectively. As shown, the lock mechanism may employ three latches 9028 equally spaced about the perimeter of the receptacle. It is to be appreciated, however, that any number of latches may be located as desired relative to the receptacle.

Figure 85:
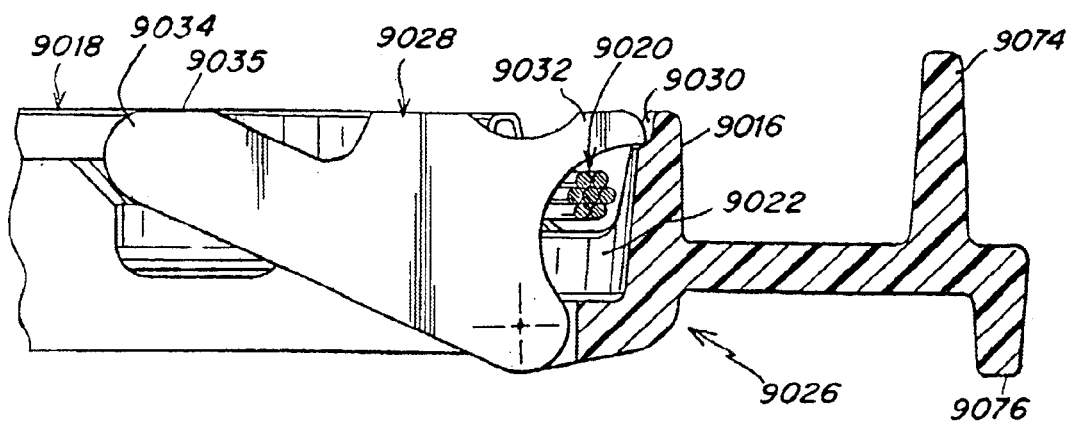
FIG. 85 is a cross-sectional view taken along section line 85—85 in FIG. 84 illustrating one embodiment of a locking mechanism in the closed position.

In the closed position as illustrated in FIG. 85, each latch 9028 overlies the recess 9022 and engages the inner surface of the receptacle wall 9016 to retain the coiled fiber in the receptacle. A portion of the receptacle wall opposite the latch may be provided with a recess or depression 9030 that is configured to receive a nose portion 9032 of the latch therein to enhance the containment capability of the receptacle.

Figure 86:
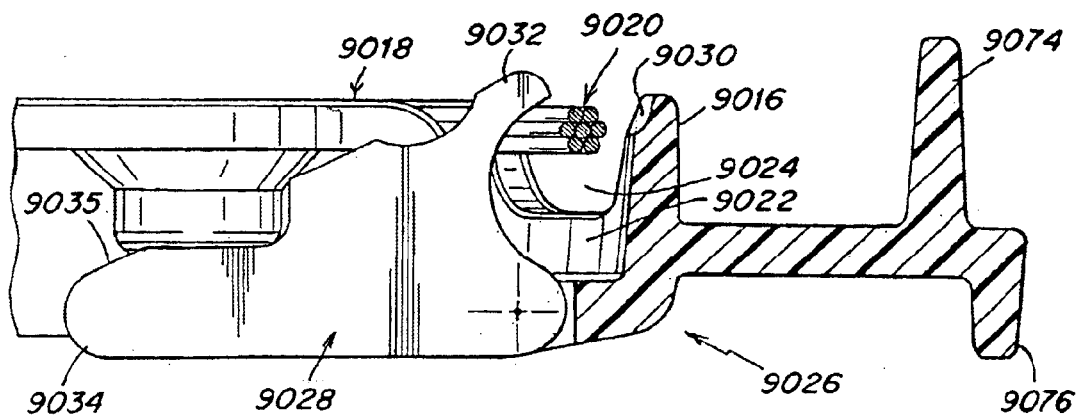
FIG. 86 is the cross-sectional view of the locking mechanism of FIG. 85 in the open position.

In the unlocked configuration as shown in FIG. 86, each latch 9028 is rotated away from the inner wall to free the coiled fiber 9020 from the recess 9022 so that it can be removed from the receptacle. Each latch 9028 may be opened by depressing a lever portion 9034 of the latch either manually or with a process tool. The latch may include a camming surface 9035 configured to receive pressure from an operator or process tool to rotate the latch to the open position.

Figure 87:
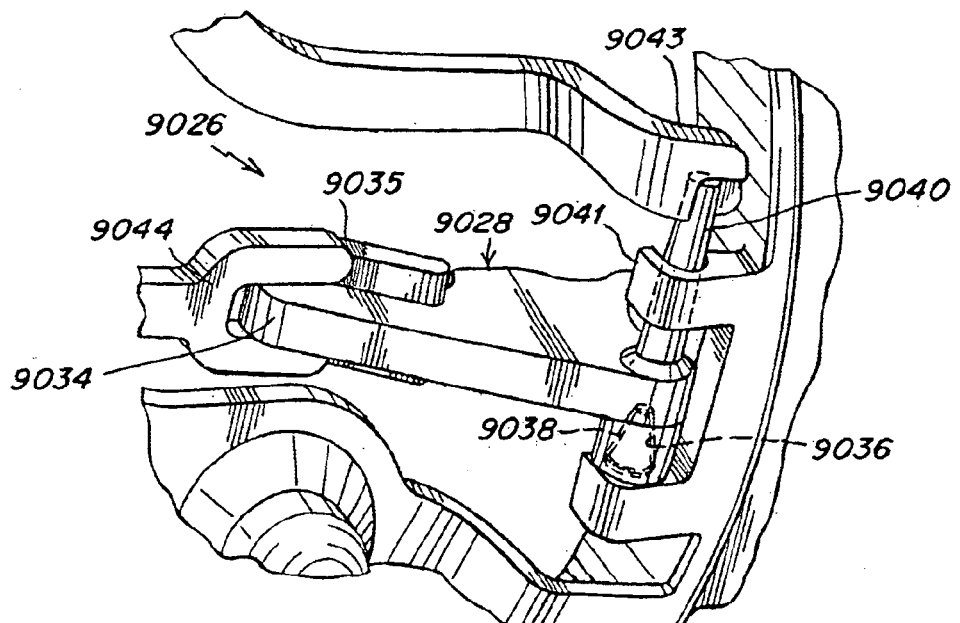
FIG. 87 is a partial, bottom perspective view of the locking mechanism.

As indicated above, each latch 9028 is rotatably supported within the receptacle 9014. In one illustrative embodiment shown in FIG. 87, one side of the latch includes a conical recess 9036 configured to mate with a corresponding conical pin 9038 extending from a support provided on the receptacle wall. The opposite side of the latch includes an elongated conical pin 9040 that is journal ed on a support 9041 provided on the receptacle wall. The pin 9040 is held in the support with a biasing member, such as a cantilevered spring 9043, that engages the tip of the pin. It is to be appreciated that other connection arrangements may be employed to rotatably mount the latches to the tray.

To ensure that the latch 9028 securely maintains the fiber within the receptacle, the latch may be biased toward the closed position and into engagement with the wall. In one illustrative embodiment shown in FIGS. 83–84, each latch is biased toward the closed position with a cantilevered leaf spring 9042. The spring includes a U-shaped end 9044 that is slidably coupled to the lever portion 9032 of the latch. The spring may be configured to preload the latch to ensure that it engages the wall in the closed position with some amount of locking force.

As illustrated, the spring 9042 may be curved to provide a spring length capable of generating a desired amount of spring force. The spring may also have a tapered shape along its length to distribute force evenly along the length of the spring.

Since it may be desirable to secure the end portions of the fiber to facilitate a manufacturing process, reduce potential damage to the ends and the like, the tray 222 may be provided with one or more retainers configured to hold end portions of the fiber in one or more orientations. In this regard, one or both end portions may be positioned to allow work to be done on the ends of the fiber while the remainder of the fiber is maintained in the coiled configuration, thus precluding the need to uncoil and recoil the fiber during assembly procedures. Conversely, one or both end portions may be positioned on the tray in a storage position to protect the ends from potential damage during handling, transport, storage and the like.

As shown in the illustrative embodiment, the tray 222 includes a pair of first retainers 9046 and a pair of second retainers 9048 positioned on the tray to hold the end portions of the fiber in one or more predetermined locations or orientations.

The first retainers 9046 are aligned with each other at opposite ends of the tray to allow each end 9047 of the fiber to extend outwardly from the tray. This orientation positions the fiber ends in readily accessible locations to facilitate manufacturing processes on one or both ends of the fiber. For some applications, the tray may be positioned so that the same or different processes may be performed simultaneously on both ends of the fiber. For an optical fiber, this orientation may be suitable for stripping, cleaning, cleaving, ferrule attachment and the like to the ends of the fiber.

The second retainers 9048 are positioned on the tray base at an orientation that differs from the first retainers 9046 to maintain the fiber ends 9047 within the confines of the tray (shown in phantom). In one embodiment, the second retainers are located on the base of the tray such that the minimum bend radius of the fiber is maintained when the end of the coil extends from the receptacle 9014 to the retainer 9048. The minimum bend radius of the fiber may thus, at least to a certain degree, dictate the size of the tray, and also define the location and angular orientation of the retainers. The second retainers 9048 are particularly suited to storing the end portions 9047 of the fiber on the tray to reduce the possibility of damaging the fiber ends during handling, transportation, storage and the like. It is to be understood that the number and location of retainers may vary to suit any desirable application.

Each retainer 9046, 9048 may be configured to hold a fiber having any one of a range of diameters. This feature provides flexibility and allows the same tray to be used in many different applications for various fibers. For example, one application in which the tray may be particularly useful is the preparation of coiled optical fiber. At present, the industry uses several standard optical fibers having diameters ranging from 180 $\mu$m to 900 $\mu$m. It is desirable that the same tray may be used to transport or store any of these fibers. Therefore, the retainer is configured to accommodate a range of diameters.

In one illustrative embodiment shown in FIG. 88, the retainer includes a spring-type clip 9050 that is attached to the base between a pair of opposing posts 9052. The clip includes a pair of resilient legs 9051 arranged in a generally V-shaped configuration. The upper ends of the legs 9051 press against the posts 9052 to urge the legs toward each other to grip a fiber placed between them. The resiliency of the legs allows the retainer to grasp fibers having any of a range of outer diameters with sufficient force to secure them in the retainer while also limiting potential damage to the fiber. The clip 9050 may be a detachable part configured to be plugged into a hole in the base between the posts.

Since it may be desirable to limit the number of separate components for the tray, the retainers 9046, 9048 may be integrally formed with the base of the tray. In one illustrative embodiment shown in FIG. 89, the retainer includes a tapered notch 9054 integrally formed between the posts 9052. The retainer includes opposing sidewalls that converge toward each other from the top end of the posts toward the bottom end of the posts to form the notch.

As illustrated, the taper may be non-uniform and become steeper at the lower portion. This allows for more secure holding of narrower fibers. In one embodiment, the walls 9056 along the upper portion of the notch may be angled approximately 12° relative to a vertical line through the center of the notch, while the walls 9058 along its lower portion may be angled approximately 8° from the vertical line. These exemplary angles may be suitable for securing fibers having an outer diameter from approximately 180 $\mu$m to approximately 900 $\mu$m. It is to be appreciated that retainers having any suitable configuration may be employed to secure the fiber ends in the tray.

While the second retainers position the end portions of the fiber within the tray for protection, the fiber ends may nevertheless be susceptible to damage. For example, the end of an optical fiber may become scratched, chipped or suffer other damage from contact with the tray. Thus, it may be desirable to configure the tray to avoid contact with the fiber end.

In one illustrative embodiment shown in FIGS. 83–84, the tray includes an aperture 9060 in the base located proximate to the second retainer 9048. The aperture allows the fiber end 9047 extending beyond the retainer to "float" without contacting the base of the tray. As shown, aperture 9060 may be bell-shaped or cone-shaped, to allow for movement of the end of the fiber extending beyond the retainer. It is to be appreciated, however, that the aperture may be any desired shape.

For some applications, it may be desirable to further secure the fiber ends to the tray, rather than allowing the end to float. For example, due to the added weight of a ferrule, it may be advantageous to secure the ferrule to the tray. In one illustrative embodiment, a fiber end retainer 9062 may be provided adjacent one or both of the second retainers 9048 to secure that portion of the fiber end 9047 extending beyond the second retainer. The fiber end retainer 9062 may include a clip 9064 that is configured to retain the fiber end and or ferrule attached to the fiber end. The retainer 9062 may be attached to the base using one or more snaps, studs, or other suitable fastener that is configured to mate with a corresponding feature, such as a hole 9065, on the base of the tray. As shown, the fiber end retainer 9062 may be adapted to fit over the aperture 9060 described above. It is to be appreciated that the fiber end retainer may be attached to the tray using any suitable fastening arrangement and it may be configured to accommodate a fiber end and/or ferrule having any shape and/or size.

Since fibers and/or ferrules have various shapes and sizes, the tray may be provided with at least two interchangeable retainers 9062 that are detachably supported on the base of the tray. Depending on the size or shape of the fiber or component, such as a ferrule, attached to the fiber end, one of the retainers may be selectively attached to the base. Any number of interchangeable retainers may be provided to accommodate a variety of shapes and sizes of fibers and ferrules, which allows the same tray to be used in any number of applications.

To enhance the utility of the tray for one or more manufacturing applications, the tray may be provided with one or more registration features to facilitate handling, positioning and/or maintaining the tray, and a coiled fiber contained thereon, in a desired location. For example, the registration features may be provided to align and mate the receptacle with a fiber spooling and insertion tool. Other examples include, but are not limited to, registration features for positioning and maintaining the tray at one or more various manufacturing stations, and coupling the tray to a transporter that carries the tray between various locations.

In one illustrative embodiment, the tray includes a plurality of receptacle registration features 9066 located on the central hub of the receptacle that are configured to cooperate with corresponding features on a fiber spooling and insertion tool to facilitate transfer of coiled fiber from the tool to the receptacle. These registration features may be separate and independent from any other registration features on the tray that may be used to transport the tray from one location to another. This allows the coiled fiber to be accurately positioned in the receptacle regardless of any system tolerances or uncertainty in the location of the tray that may arise from other tools. As shown, three registration features are arranged in a triangular configuration. The receptacle registration features 9066 are configured as upwardly facing recesses having a funnel or frusto-conical shape to facilitate mating with corresponding conical pins on the tool. It is to be appreciated, however, that any number of registration features may be provided having any shape and arrangement as desired.

As indicated above, the tray may also include one or more registration features for transporting and positioning the tray at one or more process tools. In one illustrative embodiment, the tray includes a pair of registration holes 9068a, 9068b at one end and an elongated slot 70 at the other end of the base that are linearly aligned with each other. The slot 9070 provides some flexibility in the registration and prevents the tray from being over-constrained. The outer hole 9068a and slot 9070 may be employed to position the tray relative to a process tool, while the inner hole 9068b may cooperate with the slot 9070 for transporting the tray between various process tools. The holes and slot are configured as downwardly facing recesses having a funnel or frusto-conical shape to facilitate mating with corresponding pins on a locating and/or transporting device. This feature allows the tray to be positioned accurately with respect to one or more tools that perform operations on the ends of the fiber. As mentioned previously, this feature may be independent of another registration feature used to position the tray to receive the coiled fiber. It is to be understood that any number and arrangement of registration features having any suitable shape may be implemented on the tray.

The tray may be provided with a stacking feature to facilitate manufacturing processes and/or storage by allowing a plurality of trays to be stacked on top of one another. In one illustrative embodiment, the tray includes one or more upstanding ribs 9074 along the perimeter of the base and a complementary skirt 9076 extending downwardly from the perimeter of the base. The skirt 9076 is configured to mate with and rest on the upstanding ribs 9074 of an adjacent tray. The skirt and ribs may also be configured to interlock in a manner that reduces movement between stacked trays.

Since the tray, as illustrated, has an asymmetrical configuration, it may be desirable to provide a keying feature to ensure that the tray is properly oriented during a manufacturing process. In one embodiment, the tray includes a key 9078 in the form of a semi-circular relief along one end of the base. The key 9078 ensures that the tray is positioned in a particular orientation when used in conjunction with a tool having a corresponding keying feature. Of course, the tray may incorporate any suitable keying feature.

The tray may be formed from a material capable of withstanding relatively high temperatures, for example up to 150° C., since for some applications, such as optical fiber preparation and assembly, the tray may need to be subjected to high temperatures to set and cure an adhesive employed to attach a component, such as a ferrule, to the fiber. It may also be desirable to use a material that is resistant to various process chemicals and/or meets industry standards regarding electrostatic discharge (ESD). The retainers may be formed from the same or a more compliant material for accommodating various shapes and sizes of fiber and ferrules while also reducing potential damage to the components. In one embodiment, the tray is injection molded from a carbon-filled polysulfone plastic material and the plug-in retainers 9050, 9062 are molded from a copolyester elastomer, such as Arnitel UM551 available from DSM Engineering Plastics. It is to be appreciated, however, that the tray and retainers may be formed of any suitable material using any manufacturing process.

As illustrated, the tray may have a rectangular base configuration with the circular receptacle centrally located on the base. In one embodiment, the tray has a width of approximately 4.5 inches, a length of approximately 6.0 inches and a height of approximately 0.5 inches. The tray is also configured with a stackable pitch distance of approximately 0.375 inches. It should be understood that the tray may be configured to have any suitable size and shape for an application.

Having described various embodiments of a tray for use in the fiber preparation system, it should be understood that the description is by way of example only and that other suitable configurations may be implemented with the system as would be apparent to one of skill.

Having described several illustrative embodiments of the invention in detail, various modifications and improvements will readily occur to those skilled in the art. Such modifications and improvements are intended to be within the scope of the invention. Accordingly, the foregoing description is by way of example only and is not intended as limiting. The invention is limited only as defined by the following claims and the equivalents thereto.

What is claimed is:

1. An automated fiber preparation apparatus for an optical fiber, comprising:

a transporter having an upstream end and a downstream end, the transporter being constructed and arranged to automatically and simultaneously index a plurality of trays to a plurality of process stations in a direction from the upstream end toward the do stream end in response to a control signal, each of the plurality of trays being configured to hold an optical fiber;

a strip tool positioned at one of the plurality of process stations between the upstream end and the downstream end of the transporter, the strip tool being constructed and arranged to automatically strip coating from an end portion of the optical fiber in response a control signal;

a cleave tool positioned at one of the plurality of process stations between the upstream end and the downstream end of the transporter, the cleave tool being constructed and arranged to automatically cleave the end portion of the optical fiber in response to a control signal; and a load module positioned at the upstream end of the transporter, the load module being constructed and arranged to automatically load each of the trays onto the transporter in response to a control signal.

2. The fiber preparation apparatus according to claim 1, wherein the cleave tool is positioned between the strip tool and the downstream end of the transporter.

3. The fiber preparation apparatus according to claim 1, further comprising a cleaning tool positioned at one of the plurality of process stations between the upstream end and the downstream end of the transporter, the cleaning tool being constructed and arranged to automatically clean the end portion of the optical fiber in response to a control signal.

4. The fiber preparation apparatus according to claim 3, wherein the cleaning tool is positioned between the strip tool and the downstream end of the transporter.

5. The fiber preparation apparatus according to claim 1, further comprising a spooling tool positioned between the upstream end and the downstream end of the transporter, the spooling tool being constructed and arranged to automatically wind, in response to a control signal, the optical fiber into a coiled fiber that includes at least one coil of fiber with the end portion of fiber extending from the at least one coil.

6. The fiber preparation apparatus according to claim 5, wherein the spooling tool is constructed and arranged to place the coiled fiber onto each of the trays.

7. The fiber preparation apparatus according to claim 5, wherein the spooling tool is positioned between the upstream end of the transporter and the strip tool.

8. The fiber preparation apparatus according to claim 1, further comprising a ferrule attachment tool positioned between the upstream end and the downstream end of the transporter, the ferrule attachment tool being constructed and arranged to automatically attach a ferrule to the end portion of the optical fiber in response to a control signal.

9. The fiber preparation apparatus according to claim 8, wherein the ferrule attachment tool is positioned between the cleave tool and the downstream end of the transporter.

10. The fiber preparation apparatus according to claim 1, wherein the transporter is configured to index the tray in a linear direction.

11. The fiber preparation apparatus according to claim 10, wherein the transporter includes a walking beam.

12. The fiber preparation apparatus according to claim 1, further comprising a fiber placement tool that is constructed and arranged to reposition the end portion of the fiber on each of the trays in response to a control signal.

13. The fiber preparation apparatus according to claim 1, in combination with the plurality of trays.

14. The combination according to claim 13, wherein each of the trays has an outer perimeter, each of the trays being constructed and arranged to retain at least one end portion of the optical fiber extending outwardly beyond the outer perimeter.

15. An automated fiber preparation apparatus for an optical fiber, comprising:

a transporter having an upstream end and a downstream end, the transporter being constructed and arranged to automatically and simultaneously index a plurality trays to a plurality of process stations in a direction from the upstream end toward the do stream end in response to a control signal, each of the plurality of trays being configured to hold an optical fiber;

a strip tool positioned at one of the plurality of process stations between the upstream end and the downstream end of the transporter, the strip tool being constructed and arranged to automatically strip coating from an end portion of the optical fiber in response to a control signal;

a cleave tool positioned at one of the plurality of process stations between the upstream end and the downstream end of the transporter, the cleave tool being construct and arranged to automatically cleave the end portion of the optical fiber in response to a control signal; and an unload module positioned at the downstream end of the transporter, the unload module being constructed and arranged to automatically unload each of the trays from the transporter in response to a control signal.

16. The fiber preparation apparatus according to claim 15, wherein the cleave tool is positioned between the strip tool and the downstream end of the transporter.

17. The fiber preparation apparatus according to claim 15, further comprising a cleaning tool positioned at one of the plurality of process stations between upstream end and the downstream end of the transporter, the cleaning tool being constructed and arranged to automatically clean the end portion of the optical fiber in response to a control signal.

18. The fiber preparation apparatus according to claim 17, wherein the cleaning tool is positioned between the strip tool and the downstream end of the transporter.

19. The fiber preparation apparatus according to claim 15, further comprising a spooling tool positioned between the upstream end and the downstream end of the transporter, the spooling tool being constructed and arranged to automatically wind, in response to a control signal, the optical fiber into a coiled fiber that includes at least one coil of fiber with the end portion of fiber extending from the at least one coil.

20. The fiber preparation apparatus according to claim 19, wherein the spooling tool is constructed and arranged to place the coiled fiber onto each of the trays.

21. The fiber preparation apparatus according to claim 19, wherein the spooling tool is positioned between the upstream end of the transporter and the strip tool.

22. The fiber preparation apparatus according to claim 15, further comprising a ferrule attachment tool positioned between the upstream end and the downstream end of the transporter, the ferrule attachment tool being constructed and arranged to automatically attach a ferrule to the end portion of the optical fiber in response to a control signal.

23. The fiber preparation apparatus according to claim 22, wherein the ferrule attachment tool is positioned between the cleave tool and the downstream end of the transporter.

24. The fiber preparation apparatus according to claim 15, wherein the transporter is configured to index the tray in a linear direction.

25. The fiber preparation apparatus according to claim 24, wherein the transporter includes a walking beam.

26. The fiber preparation apparatus according to claim 15, further comprising a fiber placement tool that is constructed and arranged to reposition the end portion of the fiber on each of the trays in response to a control signal.

27. The fiber preparation apparatus according to claim 15, in combination with the plurality of trays.

28. The combination according to claim 27, wherein each the trays has an outer perimeter, each of the trays being constructed and arranged to retain at least one end portion of the optical fiber extending outwardly beyond the outer perimeter.

29. An automated fiber preparation apparatus for an optical fiber, comprising:
- a plurality of trays, each of the plurality of trays being configured to hold an optical fiber, wherein each of the trays has an outer perimeter, each of the trays being constructed and arranged to retain opposite ends of the optical fiber extending outwardly beyond the outer perimeter at opposite ends for the tray;
- a transporter having an upstream end and a downstream end, the transporter being constructed and arranged to automatically and simultaneously index the plurality of trays to a plurality of process stations in a direction from the upstream end toward the downstream end in response to a control signal;
- a strip tool positioned at one of the plurality of process stations between the upstream end and the downstream end of the transporter, the strip tool being constructed an arranged to automatically strip coating from an end portion of the optical fiber in response to a control signal; and
- a cleave tool positioned at one of the plurality of process stations between the upstream end and the downstream end of the transporter, the cleave tool being constructed and arranged to automatically cleave the end portion of the optical fiber in response to a control signal.

30. The fiber preparation apparatus according to claim 29, wherein the cleave tool is positioned between the strip tool and the downstream end of the transporter.

31. The fiber preparation apparatus according to claim 29, further comprising a cleaning tool positioned at one of the plurality of process stations between the upstream end and the downstream end of the transporter, the cleaning tool being constructed and arranged to automatically clean the end portion of the optical fiber in response to a control signal.

32. The fiber preparation apparatus according to claim 31, wherein the cleaning tool is positioned between the strip tool and the downstream end of the transporter.

33. The fiber preparation apparatus according to claim 29, further comprising a spooling tool positioned between the upstream end and the downstream end of the transporter, the spooling tool being constructed and arranged to automatically wind, in response to a control signal, the optical fiber into a coiled fiber that includes at least one coil of fiber with the end portion of fiber extending from the at least one coil.

34. The fiber preparation apparatus according to claim 33, wherein the spooling tool is constructed and arranged to place the coiled fiber onto each of the trays.

35. The fiber preparation apparatus according to claim 33, wherein the spooling tool is positioned between the upstream end of the transporter and the strip tool.

36. The fiber preparation apparatus according to claim 29, further comprising a ferrule attachment tool positioned between the upstream end and the downstream end of the transporter, the ferrule attachment tool being constructed and arranged to automatically attach a ferrule to the end portion of the optical fiber in response to a control signal.

37. The fiber preparation apparatus according to claim 36, wherein the ferrule attachment tool is positioned between the cleave tool and the downstream end of the transporter.

38. The fiber preparation apparatus according to claim 29, wherein the transporter is configured to index the tray in a linear direction.

39. The fiber preparation apparatus according to claim 38, wherein the transporter includes a walking beam.

40. The fiber preparation apparatus according to claim 29, further comprising a fiber placement tool that is constructed and arranged to reposition the end portion of the fiber on each of the trays in response to a control signal.

41. An automated fiber preparation apparatus for an optical fiber, comprising:
- a tray including a fiber receptacle disposed between opposing ends thereof, the fiber receptacle being constructed and arranged to contain the optical fiber therein with opposing end portions of the optical fiber extending toward the opposing ends of the tray;
- a transporter having an upstream end and a downstream end, the transporter being constructed and arranged to automatically index the tray in a direction from the upstream end toward the downstream end in response to a control signal;
- a fiber preparation module including at least one pair of automated fiber preparation tools positioned on opposite sides of the transporter between the upstream end and the downstream end thereof, the at least one pair of fiber preparation tools being constructed an arranged to automatically process the opposing end portions of the optical fiber in response to a control signal.

42. The fiber preparation apparatus according to claim 41, wherein the at least one pair of automated fiber preparation tools includes at least one of a fiber strip tool, a fiber cleaning tool, a fiber cleave tool, and a ferrule attachment tool.

43. The fiber preparation apparatus according to claim 42, further comprising a spooling tool positioned between the upstream end and the downstream end of the transporter, the spooling tool being constructed and arranged to automatically wind, in response to a control signal, the optical fiber into a coiled fiber that includes at least on coil of fiber with the end portion of fiber extending from the at least one coil.

44. The fiber preparation apparatus according to claim 43, wherein the spooling tool is constructed and arranged to place the coiled fiber onto the tray.

45. The fiber preparation apparatus according to claim 43, wherein the spooling tool is positioned between the upstream end of the transporter and the at least one pair of automated fiber preparation tools.

46. The fiber preparation apparatus according to claim 41, further comprising a load module positioned at the upstream end of the transporter, the load module being constructed and arranged to automatically load the tray onto the transporter in response to a control signal.

47. The fiber preparation apparatus according to claim 41, further comprising an unload module positioned at the downstream end of the transporter, the unload module being constructed and arranged to automatically unload the tray from the transporter in response to a control signal.

48. The fiber preparation apparatus according to claim 41, wherein the tray is constructed and arranged to support the opposing end portions of the optical fiber to extend beyond the opposing ends of the tray.

49. The fiber preparation apparatus according to claim 48, further comprising at least one fiber placement tool that is constructed and arranged to automatically reposition at least one of the opposing end portions of the optical fiber inboard the tray in response to a control signal.

50. An automated fiber preparation apparatus for an optical fiber, comprising:

a transporter having an upstream end and a downstream end, the transporter being constructed and arranged to automatically index a tray, which is configured to hold the optical fiber, in a direction from the upstream end toward the downstream end in response to a control signal;

a fiber preparation module including at least one automated fiber preparation tool positioned between the upstream end and the downstream end thereof, the at least one fiber preparation tool being constructed and arranged to automatically process an end portion of the optical fiber in response to a control signal;

a load module positioned at the upstream end of the transporter, the load module being constructed and arranged to hold a stack of trays and to automatically load the tray from the stack of trays onto the transporter in response to a control signal; and an unload module positioned at the downstream end of the transporter, the unload module being constructed and arranged to hold a stack of trays and to automatically unload the tray from the transporter into the stack of trays in response to a control signal.

51. The fiber preparation apparatus according to claim 50, wherein the fiber preparation module includes at least one of a fiber strip tool, a fiber cleaning tool, a fiber cleave tool, and a ferrule attachment tool.

52. The fiber preparation apparatus according to claim 50, further comprising a spooling tool positioned between the upstream end and the downstream end of the transporter, the spooling tool being constructed and arranged to automatically wind, in response to a control signal, the optical fiber into a coiled fiber that includes at least on coil of fiber with the end portion of fiber extending from the at least one coil.

53. The fiber preparation apparatus according to claim 52, wherein the spooling tool is constructed and arranged to place the coiled fiber onto the tray.

54. The fiber preparation apparatus according to claim 53, wherein the spooling tool is positioned between the upstream end of the transporter and the fiber preparation module.

55. The fiber preparation apparatus according to claim 50, further comprising a plurality of trays that are constructed and arranged to be stacked with each other, each of the trays being configured to hold an optical fiber, each of the trays to be automatically loaded onto the transporter from the stack of trays by the loading module and automatically unloaded from the transporter into the stack of trays by the unload module.

* * * * *